United States Patent
Burgess et al.

(10) Patent No.: US 12,249,022 B2
(45) Date of Patent: Mar. 11, 2025

(54) DISPLACED MICRO-MESHES FOR RAY AND PATH TRACING

(71) Applicant: NVIDIA Corporation, Santa Clara, CA (US)

(72) Inventors: John Burgess, Austin, TX (US); Gregory Muthler, Chapel Hill, NC (US); Nikhil Dixit, Austin, TX (US); Henry Moreton, Woodside, CA (US); Yury Uralsky, Los Gatos, CA (US); Magnus Andersson, Lund (SE); Marco Salvi, Seattle, WA (US); Christoph Kubisch, Aachen (DE)

(73) Assignee: NVIDIA Corporation, Santa Clara, CA (US)

( * ) Notice: Subject to any disclaimer, the term of this patent is extended or adjusted under 35 U.S.C. 154(b) by 211 days.

(21) Appl. No.: 17/946,515

(22) Filed: Sep. 16, 2022

(65) Prior Publication Data

US 2023/0081791 A1    Mar. 16, 2023

Related U.S. Application Data

(60) Provisional application No. 63/245,155, filed on Sep. 16, 2021.

(51) Int. Cl.
*G06T 15/06* (2011.01)
*G06T 1/60* (2006.01)
(Continued)

(52) U.S. Cl.
CPC ............... *G06T 15/06* (2013.01); *G06T 1/60* (2013.01); *G06T 9/001* (2013.01); *G06T 15/40* (2013.01);
(Continued)

(58) Field of Classification Search
CPC ........... G06T 15/06; G06T 1/60; G06T 9/001; G06T 15/40; G06T 17/10; G06T 17/20;
(Continued)

(56) References Cited

U.S. PATENT DOCUMENTS

| | | |
|---|---|---|
| 11,270,507 B1 | 3/2022 | Lambert |
| 2003/0227457 A1 | 12/2003 | Pharr et al. |

(Continued)

OTHER PUBLICATIONS

Smits, Brian, Peter Shirley, and Michael M. Stark. "Direct ray tracing of displacement mapped triangles." Rendering Techniques 2000: Proceedings of the Eurographics Workshop in Brno, Czech Republic, Jun. 26-28, 2000 11. Springer Vienna, 2000. (Year: 2000).*

(Continued)

*Primary Examiner* — Jeffery A Brier
(74) *Attorney, Agent, or Firm* — Nixon & Vanderhye P.C.

(57) ABSTRACT

A Displaced Micro-mesh (DMM) primitive enables high complexity geometry for ray and path tracing while minimizing the associated builder costs and preserving high efficiency. A structured, hierarchical representation implicitly encodes vertex positions of a triangle micro-mesh based on a barycentric grid, and enables microvertex displacements to be encoded efficiently (e.g., as scalars linearly interpolated between minimum and maximum triangle surfaces). The resulting displaced micro-mesh primitive provides a highly compressed representation of a potentially vast number of displaced microtriangles that can be stored in a small amount of space. Improvements in ray tracing hardware permit automatic processing of such primitive for ray-geometry intersection testing by ray tracing circuits without requiring intermediate reporting to a shader.

18 Claims, 99 Drawing Sheets

(51) Int. Cl.
 *G06T 9/00* (2006.01)
 *G06T 15/40* (2011.01)
 *G06T 17/10* (2006.01)
 *G06T 17/20* (2006.01)
 *G06T 19/20* (2011.01)

(52) U.S. Cl.
 CPC .............. *G06T 17/10* (2013.01); *G06T 17/20* (2013.01); *G06T 17/205* (2013.01); *G06T 19/20* (2013.01); *G06T 2210/08* (2013.01); *G06T 2210/21* (2013.01); *G06T 2210/36* (2013.01); *G06T 2219/2016* (2013.01)

(58) Field of Classification Search
 CPC ... G06T 17/205; G06T 19/20; G06T 2210/08; G06T 2210/21; G06T 2210/36; G06T 2219/2016
 See application file for complete search history.

(56) References Cited

U.S. PATENT DOCUMENTS

| | | | |
|---|---|---|---|
| 2008/0100617 A1 | 5/2008 | Keller | |
| 2008/0316202 A1 | 12/2008 | Zhou | |
| 2011/0080405 A1 | 4/2011 | Moreton | |
| 2015/0269770 A1 | 9/2015 | Jenkins | |
| 2018/0096516 A1 | 4/2018 | Luebke | |
| 2020/0051314 A1 | 2/2020 | Laine et al. | |
| 2020/0051316 A1 | 2/2020 | Laine | |
| 2020/0294301 A1 | 9/2020 | Surti | |
| 2021/0201559 A1* | 7/2021 | Gruen | G06T 1/20 |
| 2021/0287431 A1 | 9/2021 | Woop | |
| 2022/0101483 A1 | 3/2022 | Riguer | |
| 2023/0017659 A1 | 1/2023 | Thonat | |

OTHER PUBLICATIONS

Pharr, Matt, and Pat Hanrahan. "Geometry caching for ray-tracing displacement maps." Rendering Techniques' 96: Proceedings of the Eurographics Workshop in Porto, Portugal, Jun. 17-19, 1996 7. Springer Vienna, 1996. (Year: 1996).*
Non-Final Office Action issued in related U.S. Appl. No. 17/946,828 dated Jun. 12, 2024.
Theoktisto, Victor; Parallel GPU Collision Computation in Conformal Warped Space for Surface Detail Haptic Rendering; Jul. 2016; Universitat Politecnica de Catalunya; p. 63. (Year: 2016).
International Search Report and Written Opinion issued in PCT Application No. PCT/US2022/043788 dated Jan. 13, 2023.
Thrane et al., "A Comparison of Acceleration Structures for GPU Assisted Ray Tracing", pp. 1-107, XP009068493, Aug. 1, 2005.

* cited by examiner

Example Process To Generate an Image

Example Ray Tracing Shading Pipeline

FIG. 5 TRAVERSAL COPROCESSOR

| Base Triangle | | | With Maximum Displacement Blocks: Uncompressed 8x8 64B Format | | | | With Minimum Displacement Blocks: Compressed 32x32 64B Format | | | | Explicit Triangle Blocks (Peak Builder: 12 tris / block) | | |
|---|---|---|---|---|---|---|---|---|---|---|---|---|---|
| Level | Resolution | Micro Triangles | Displacement Blocks | Triangle Blocks | Memory footprint (Disp. Set + Tri Blocks) | Bits/ Micro Triangles | Displacement Blocks | Triangle Blocks | Memory footprint (Disp. Set + Tri Blocks) | Bits/ Micro Triangles | Triangle Blocks | Memory Footprint | Bits/ Triangle |
| 0 | 1 x 1 | 1 | 1 | 1 | 64 B + 128 B | 1,536.0 | 1 | 1 | 64 B + 128 B | 1,536.0 | 1 | 128 B | 1024 |
| 1 | 2 x 2 | 4 | 1 | 1 | 64 B + 128 B | 384.0 | 1 | 1 | 64 B + 128 B | 384.0 | 1 | 128 B | 256 |
| 2 | 4 x 4 | 16 | 1 | 1 | 64 B + 128 B | 96.0 | 1 | 1 | 64 B + 128 B | 96.0 | 2 | 256 B | 128 |
| 3 | 8 x 8 | 64 | 1 | 1 | 64 B + 128 B | 24.0 | 1 | 1 | 64 B + 128 B | 24.0 | 6 | 768 B | 96 |
| 4 | 16 x 16 | 256 | 4 | 1 | 256 B + 128 B | 12.0 | 1 | 1 | 64 B + 128 B | 6.0 | 22 | 3 KB | 88 |
| 5 | 32 x 32 | 1,024 | 16 | 1 | 1 KB + 128 B | 9.0 | 1 | 1 | 64 B + 128 B | 1.5 | 86 | 11 KB | 86 |
| 6 | 64 x 64 | 4,096 | 64 | 1 | 4 KB + 128 B | 8.3 | 4 | 1 | 256 B + 128 B | 0.8 | 342 | 43 KB | 85 |
| 7 | 128 x 128 | 16,384 | 256 | 4 | 16 KB + 512 B | 8.3 | 16 | 1 | 1 KB + 128 B | 0.6 | 1,366 | 171 KB | 85 |
| 8 | 256 x 256 | 65,536 | 1,024 | 16 | 64 KB + 2 KB | 8.3 | 64 | 1 | 4 KB + 128 B | 0.5 | 5,462 | 683 KB | 85 |
| 9 | 512 x 512 | 262,144 | 4,096 | 64 | 256 KB + 8 KB | 8.3 | 256 | 4 | 16 KB + 512 B | 0.5 | 21,846 | 3 MB | 85 |
| 10 | 1024 x 1024 | 1,048,576 | 16,384 | 256 | 1 MB + 32 KB | 8.3 | 1,024 | 16 | 64 KB + 2 KB | 0.5 | 87,382 | 11 MB | 85 |
| 11 | 2048 x 2048 | 4,194,304 | 65,536 | 1,024 | 4 MB + 128 KB | 8.3 | 4,096 | 64 | 256 KB + 8 KB | 0.5 | 349,526 | 43 MB | 85 |
| 12 | 4096 x 4096 | 16,777,216 | 262,144 | 4,096 | 16 MB + 512 KB | 8.3 | 16,384 | 256 | 1 MB + 32 KB | 0.5 | 1,398,102 | 171 MB | 85 |
| 13 | 8192 x 8192 | 67,108,864 | 1,048,576 | 16,384 | 64 MB + 2 MB | 8.3 | 65,536 | 1,024 | 4 MB + 128 KB | 0.5 | 5,592,406 | 683 MB | 85 |

FIG. 11

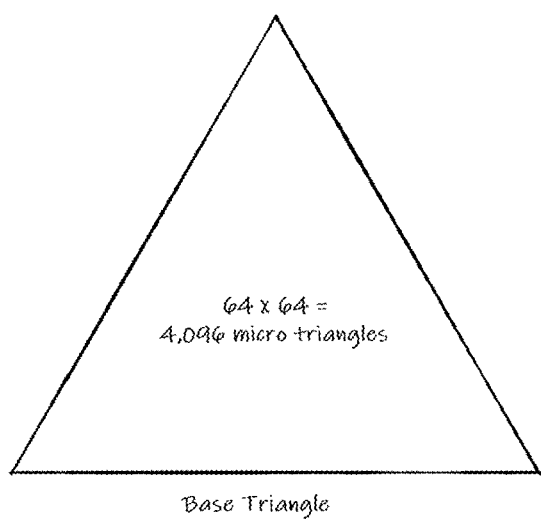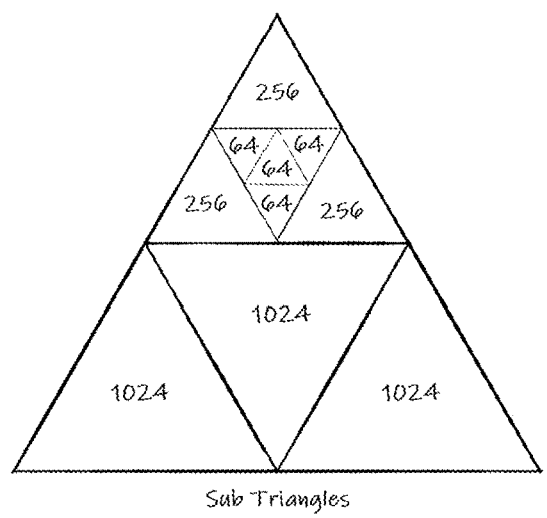
FIG. 26A    FIG. 26B
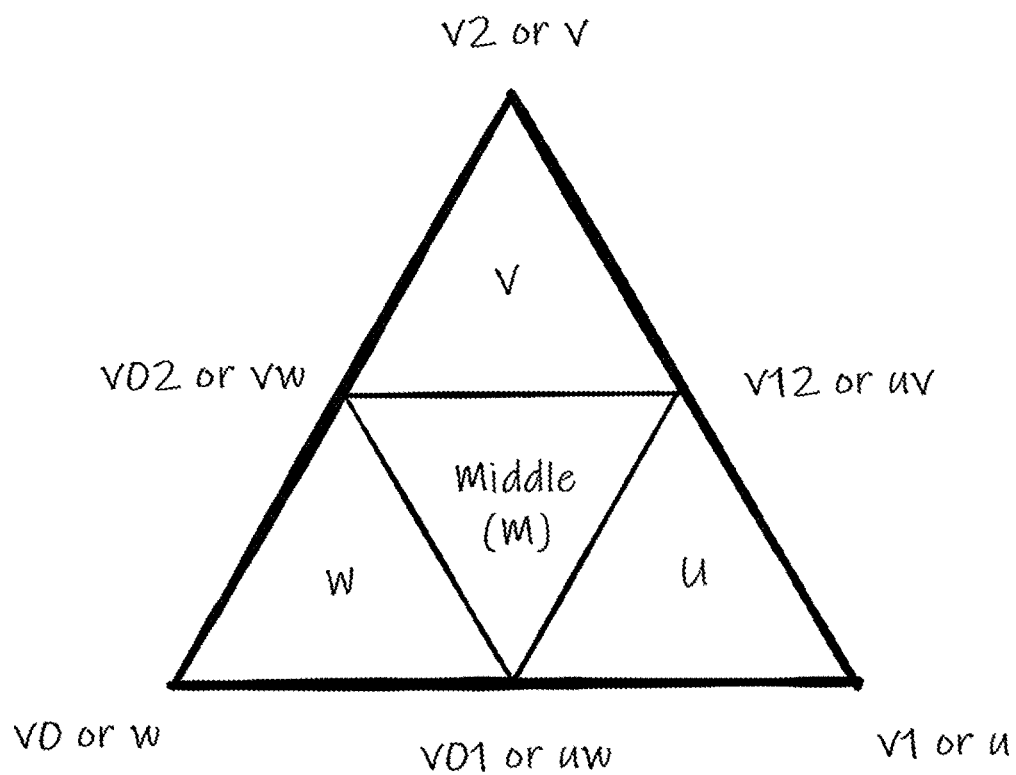
FIG. 27

| Level: n | Resolution: $2^n \times 2^n$ | Micro Triangles: $4^n$ | uTri Index bits $\log_2(4^n)$ | Level Encoding bits: $\log_2(n+1)$ |
|---|---|---|---|---|
| 0 | 1 x 1 | 1 | 0 | 0 |
| 1 | 2 x 2 | 4 | 2 | 1 |
| 2 | 4 x 4 | 16 | 4 | 2 |
| 3 | 8 x 8 | 64 | 6 | 2 |
| 4 | 16 x 16 | 256 | 8 | 3 |
| 5 | 32 x 32 | 1,024 | 10 | 3 |
| 6 | 64 x 64 | 4,096 | 12 | 3 |
| 7 | 128 x 128 | 16,384 | 14 | 3 |
| 8 | 256 x 256 | 65,536 | 16 | 4 |
| 9 | 512 x 512 | 262,144 | 18 | 4 |
| 10 | 1024 x 1024 | 1,048,576 | 20 | 4 |
| 11 | 2048 x 2048 | 4,194,304 | 22 | 4 |
| 12 | 4096 x 4096 | 16,777,216 | 24 | 4 |
| 13 | 8192 x 8192 | 67,108,864 | 26 | 4 |
| 14 | 16384 x 16384 | 268,435,456 | 28 | 4 |
| 15 | 32768 x 32768 | 1,073,741,824 | 30 | 4 |
| 16 | 65536 x 65536 | 4,294,967,296 | 32 | 5 |

FIG. 28

```
1   // This function subdivides an input triangle to produce 4 subdivided triangles
2   // Inputs:
3   //       vertex_w - the w vertex of the triangle
4   //       vertex_u - the u vertex of the triangle
5   //       vertex_v - the v vertex of the triangle
6   // Outputs:
7   //       triangle_w - the new subdivided w triangle (bottom-left)
8   //       triangle_m - the new subdivided m triangle (middle)
9   //       triangle_u - the new subdivided u triangle (bottom-right)
10  //       triangle_v - the new subdivided v triangle (top)
11  function subdivide_triangle(vertex_w, vertex_u, vertex_v) {
12
13      // compute 3 new vertices by averaging the input vertices
14      vertex_vw = average(vertex_v, vertex_w)
15      vertex_uv = average(vertex_u, vertex_v)
16      vertex_uw = average(vertex_u, vertex_w)
17
18      // form 4 new triangles
19      triangle_w = triangle( w, uw, vw)
20      triangle_m = triangle(vw, uv, uw)
21      triangle_u = triangle(uw,  u, uv)
22      triangle_v = triangle(uv, vw,  v)
23
24      return { triangle_w, triangle_m, triangle_u, triangle_v }
25  }
```

FIG. 34 example uncompressed displacement block

```
1
2    // This function extracts and compacts the even bits of its input
3    function extract_even_bits(x) {
4        x &= 0x55555555
5        x = (x | (x >> 1)) & 0x33333333
6        x = (x | (x >> 2)) & 0x0f0f0f0f
7        x = (x | (x >> 4)) & 0x00ff00ff
8        x = (x | (x >> 8)) & 0x0000ffff
9
10       return x
11   }
12
13   // This function returns a prefix exclusive-or of its input
14   function prefix_xor(x) {
15       x ^= x >> 1
16       x ^= x >> 2
17       x ^= x >> 4
18       x ^= x >> 8
19
20       return x
21   }
22
23   // This function returns the discrete barycentric coordinates of a specified micro-triangle
24   // Inputs:
25   //     level - the subdivision level
26   //     index - the bird index of the target micro-triangle at the input subdivision level
27   // Outputs:
28   //     dbary_iu - the "u" discrete barycentric coordinate
29   //     dbary_iv - the "v" discrete barycentric coordinate
30   //     dbary_iw - the "w" discrete barycentric coordinate
31   function index_to_discrete_barycentrics(level, index) {
32       b0 = extract_even_bits(index)
33       b1 = extract_even_bits(index >> 1)
34
35       fx = prefix_xor(b0)
36       fy = prefix_xor(b0 & ~b1)
37
38       t = fy ^ b1
39       u = (fx & ~t) | (b0 & ~t) | (~b0 & ~fx & t)
40       v = fy ^ b0
41       w = (~fx & ~t) | (b0 & ~t) | (~b0 & fx & t)
42
43       dbary_iu = u & ((1 << level) - 1)
44       dbary_iv = v & ((1 << level) - 1)
45       dbary_iw = w & ((1 << level) - 1)
46
47       return { dbary_iu, dbary_iv, dbary_iw }
48   }
```

FIG. 45

| Displaced Micro-mesh Motion Support | | | | | |
|---|---|---|---|---|---|
| | TriBlock | SubTri | Disp. Maps | uTri Count | Sum Count |
| Complet | Block0 at key0 | 1 | 32x32 | 1024 | 1024 |
| Complet | Block0 at key1 | | | | 1024 |
| Complet | Block0 at key2 | 2 | 8x8 | 32 | 1056 |
| Complet | Block0 at key3 | 3 | 16x16 | 256 | 1312 |
| Complet | Block0 at key4 | | | | 1312 |
| Complet | Block0 at key5 | 4 | 8x8 | 32 | 1344 |
| Complet | Block0 at key6 | | | | 1344 |
| | Block0 at key7 | 5 | 32x32 | 1024 | 2368 |
| Complet | Block0 at key0 | | | | 2368 |
| Complet | Block0 at key1 | 6 | 8x8 | 32 | 2400 |
| Complet | Block0 at key2 | 7 | 8x8 | 32 | 2432 |
| Complet | Block0 at key3 | 8 | 32x32 | 1024 | 3456 |
| Complet | Block0 at key4 | | | | 3456 |
| Complet | Block0 at key5 | 9 | 16x16 | 256 | 3712 |
| Complet | Block0 at key6 | | | | 3712 |
| | Block0 at key7 | 10 | 16x16 | 256 | 3968 |
| | | | | | 3968 |
| | | 11 | 8x8 | 32 | 4000 |
| | | | | | 4000 |
| | | 12 | 8x8 | 32 | 4032 |
| | | 13 | 8x8 | 32 | 4064 |
| | | 14 | 8x8 | 32 | 4096 |

FIG. 46

Base Triangle Pass

Sub Triangle Pass

Intersection Pass example TTU ray-triangle test and instance transform circuit

Compressed Displacement Block (1024b or 512b)

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | anchor | | | | corrections... | | | | | | | | | | | |
| 16 | | | | | | | | ... | | | | | | | | |
| 32 | | | | | | | | ... | | | | | | | | |
| 48 | | | | | | | | ... | | | | | | | | |
| 64 | | | | | | | | ... | | | | | | | | |
| 80 | | | | | | | | ... | | | | | | | | |
| 96 | | | | | | | | ... | | | | | | | | |
| 112 | | ... | | | | | shifts | | | | | | | | | |

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | anchor | | | | corrections... | | | | | | | | | | | |
| 16 | | | | | | | | ... | | | | | | | | |
| 32 | | | | | | | | ... | | | | | | | | |
| 48 | | ... | | | | | shifts | | | | | | | | | |

| | | | | | 128B Displacement Block (1024b) | | | | | | 64B Displacement Block (512b) | | | | | |
|---|---|---|---|---|---|---|---|---|---|---|---|---|---|---|---|---|
| | | | | | 8x8 = 64 utri | | | 16x16 = 256 utri | | | 32x32 = 1024 utri | | | 16x16 = 256 utri | | |
| | Field | Description | Entries | Bit/Entry | Start | End | Bit/Entry | Start | End | Bit/Entry | Start | End | Bit/Entry | Start | End |
| anchor | anchor.u | Anchor point for vertex u (unorm11) | 1 | 11 | 0 | 10 | 11 | 0 | 10 | 11 | 0 | 10 | 11 | 0 | 10 |
| | anchor.v | Anchor point for vertex v (unorm11) | 1 | 11 | 11 | 21 | 11 | 11 | 21 | 11 | 11 | 21 | 11 | 11 | 21 |
| | anchor.w | Anchor point for vertex w (unorm11) | 1 | 11 | 22 | 32 | 11 | 22 | 32 | 11 | 22 | 32 | 11 | 22 | 32 |
| corrections | correct.level1 | Corrections for level 1 | 3 | 11 | 33 | 65 | 11 | 33 | 65 | 11 | 33 | 65 | 11 | 33 | 65 |
| \| | correct.level2 | Corrections for level 2 | 9 | 8 | 66 | 137 | 11 | 66 | 164 | 8 | 66 | 137 | 8 | 66 | 137 |
| \| | correct.level3 | Corrections for level 3 | 30 | 4 | 138 | 257 | 10 | 165 | 464 | 4 | 138 | 257 | 4 | 138 | 257 |
| v | correct.level4 | Corrections for level 4 (>= 256 utri) | 108 | 2 | 258 | 473 | 5 | 465 | 1004 | 2 | 258 | 473 | 2 | 258 | 473 |
| | correct.level5 | Corrections for level 5 (1024 utri only) | 408 | 1 | 474 | 881 | | | | 0 | -- | -- | | | |
| empty space | | | | | 882 | 971 | 2 | 1005 | 1007 | 2 | 474 | 475 | 2 | 474 | 475 |
| ^ | shift.level5 | Shift for level 5 | 4 | 4 | 972 | 987 | | | | | | | | | |
| \| | shift.level4 | Shift for level 4 | 4 | 4 | 988 | 1003 | 3 | 1008 | 1019 | 4 | 476 | 491 | 4 | 476 | 491 |
| \| | shift.level3 | Shift for level 3 | 4 | 3 | 1004 | 1015 | 1 | 1020 | 1023 | 3 | 492 | 503 | 3 | 492 | 503 |
| shifts | shift.level2 | Shift for level 2 | 4 | 2 | 1016 | 1023 | 0 | 1024 | 1023 | 2 | 504 | 511 | 2 | 504 | 511 |

FIG. 52
example compressed displacement block

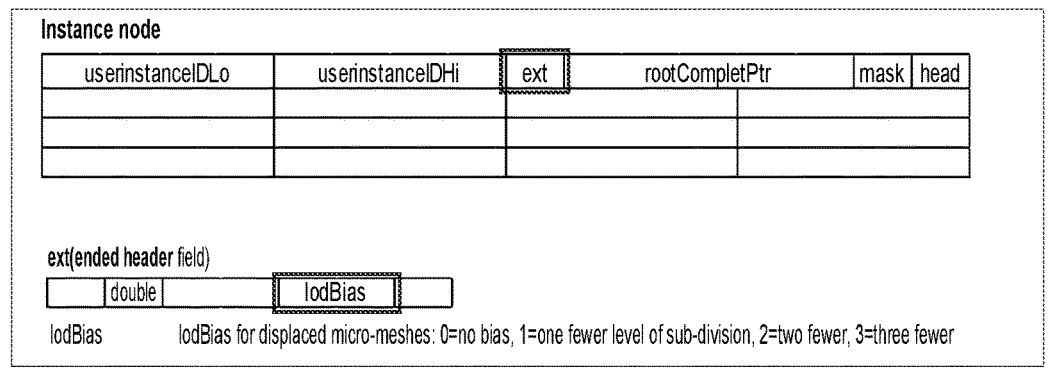

FIG. 53
example single instance node

Double Instance node

| userInstanceIDLo | userInstanceIDHi | ext | rootCompletPtr | mask | head |
|---|---|---|---|---|---|
|  |  |  |  |  |  |
|  |  |  |  |  |  |
| visibilityMaskBasePtr | | displacementBasePtr | | dbl.h. |  |
|  |  |  |  |  |  |
|  |  |  |  |  |  |

FIG. 54
example double instance node

| dm_f | (modeDisplacedMicromeshFail) | displaced micro-mesh mode | (rayOp fail) | 0=process in RTT, 1=cull, 2=return as node ref, 3=return to SM |
| dm_p | (modeDisplacedMicromeshPass) | displaced micro-mesh mode | (rayOp pass) | 0=process in RTT, 1=cull, 2=return as node ref, 3=return to SM |

FIG. 55
example ray flags

HitType_DisplacedSubTri

| triPtrLoAligned | | |
|---|---|---|
|  | subTriIdx | triPtrHiAligned |
| t | | |
|  | | |

FIG. 56
example displaced sub triangle hit type

FIG. 57 example displaced subtri stack entry

FIG. 58 example microtri addr stack entry

| StackInit | triPtrLoAligned | | | |
|---|---|---|---|---|
| MicroTriFetch | | microTriIdxLo | subTriIdx | triPtrHiAligned |
| | InstancePtrLo | | | |
| | | | InstancePtrHi | |

FIG. 59
example StackInit MicroTriFetch stack initializer

Displaced Micro-mesh Triangle Block (1024b)

| Position0.X | Position0.Y | | Position0.Z | | Position1.X | |
|---|---|---|---|---|---|---|
| Position1.Y | Position1.Z | | Position2.X | | Position2.Y | |
| Position2.Z | Direction0.X | Direction0.Y | Direction0.Z | Direction1.X | Direction1.Y | Direction1.Z |
| Direction2.X | Direction2.Y | Direction2.Z | | | | |
| | | | ... | | | |
| subTri Array | | | | | | displacementScale |
| ... | | | utriStartIdx | DMOffset64 | | DMOffset128 |
| ... | VMOffset | | | TriangleID | | DMM Header |

FIG. 60
example displaced micro-mesh triangle block subTri Array

| 0.subSize | 0.subRes | 1.subSize | 1.subRes | 2.subSize | 2.subRes | 3.subSize | 3.subRes | ... | 63.subSize | 63.subRes |
|---|---|---|---|---|---|---|---|---|---|---| i.subSize  SubTri i displacement block size: 0 = 64B (subRes 1 and 2), 1 = 128B (subRes 0)
i.subRes   SubTri i displacement block resolution: 0 = 8x8 (64 utri), 1 = 16x16 (256 utri), 2 = 32x32 (1024 utri)

FIG. 61 example subtri array inside the DMM triangle block

Displaced Micro-mesh Header

| Mode | M | alpha | vmLevel | vmType | vmAper | baseResolution | dmAp | edgeDecimation |
|---|---|---|---|---|---|---|---|---|

Mode            0: uncompressed tri, 1: compressed tri, 2: motion blur tri, 3: compressed tri + visibility mask, 4: motion tri + vm, 5: displaced micro-mesh
NumTris ("M")   Number of sub-triangles
alpha           Alpha bit for all sub-triangles (applicable when VMs are absent or disabled)
baseResolution  Resolution of API base triangle mesh = 2^n*2^n = 4^n: 0 = 1x1 = 1; 1 = 2x2 = 4; 2 = 4x4 = 16; 3 = 8x8 = 64; 4 = 16x16 = 256; 5 = 32x32 = 1024, ..., 13 = 8k x 8k = 67M
dmAp(erture)    0 = global, 1 = local (add to instance node DMM base pointer)
                If instance node DM base pointer and DM local offset are both 0, then whether the DM offset is absolute or relative
edgeDecimation  For each API base triangle edge, should it be decimated. Edge order: v01 (bit 0), v12 (bit 1), v20 (bit 2)

FIG. 62 example header inside the DMM triangle block

```
1
2   // This function generates a maximum triangle given the base triangle block
3   // Inputs:
4   //      base_triangle - the base triangle data from the triangle block
5   // Outputs:
6   //      max_triangle - the generated maximum triangle
7   function generate_maximum_triangle(base_triangle) {
8
9       // get the base triangle's displacement scale
10      // this is the maximum allowed displacement
11      max_displacement = base_triangle.displacement_scale
12
13      // iterate over base triangle vertices
14      for (base_vertex_id = 0; base_vertex_id < 3; base_vertex_id += 1) {
15
16          // get the base triangle vertex
17          base_vertex = base_triangle.vertices[base_vertex_id]
18
19          // get the initial displacement direction for this vertex
20          displacement_direction = base_triangle.displacement_direction[vertex]
21
22          // compute the maximum displacement vector
23          max_displacement_vector = displacement_direction * max_displacement
24
25          // displace the base vertex to get the corresponding maximum triangle vertex
26          max_triangle[base_vertex_id] = base_vertex + max_displacement_vector
27      }
28
29      return max_triangle
30  }
```

FIG. 63

```
1
2   // This function generates a displacement block address for a target sub triangle
3   // Inputs:
4   //      base_triangle - the base triangle data from the triangle block
5   //      target_subtri_index - the index of the target sub triangle on the base triangle
6   // Outputs:
7   //      displacement_addr - the generated displacement address
8   function generate_displacement_address(base_triangle, target_subtri_index) {
9
10      // begin by converting the DMOffset128 to a 64B-aligned address
11      displacement_addr = base_triangle.dmoffset128 << 1
12
13      // for 64B sub triangles, add the sign extended dmoffset64
14      target_subtri_size = base_triangle.subtri_array[target_subtri_index].size
15      if (target_subtri_size == 0)
16          displacement_addr += sign_extend(base_triangle.dmoffset64)
17
18      // iterate through all valid sub triangles and adjust the displacement address
19      for (subtri_index = 0; subtri_index < target_subtri_index; subtri_index += 1) {
20
21          // if the sub triangle is the same size as the target sub triangle, account for its displacement block
22          if (base_triangle.subtri_array[subtri_index].size == target_subtri_size) {
23              // a sub triangle size of 0 increments the address by 1 (64B)
24              // a sub triangle size of 1 increments the address by 2 (128B)
25              displacement_addr += (target_subtri_size + 1)
26          }
27      }
28
29      // note: this address may further be further added to the instance level displacement offset, if such an offset exists
30      return displacement_addr
31  }
```

FIG. 64

```
1
2    // This function generates the micro-triangle start index for a target sub triangle
3    // Inputs:
4    //      base_triangle - the base triangle data from the triangle block
5    //      target_subtri_index - the index of the target sub triangle on the base triangle
6    // Outputs:
7    //      start_index - the generated start index of the target sub triangle
8    function generate_subtri_start_index(base_triangle, target_subtri_index) {
9
10       // start by converting the base triangle's micro-triangle start index to a full 26bit index
11       start_index = base_triangle.utri_start_index << 6
12
13       // iterate through all valid sub triangles and adjust the start index
14       for (subtri_index = 0; subtri_index < target_subtri_index; subtri_index += 1) {
15
16           // inspect each sub triangle's size and adjust the start index accordingly
17           switch (base_triangle.subtri_array[subtri_index].res) {
18               case 0: // sub triangle contains 64 micro-triangles
19                   start_index += 64
20                   break
21               case 1: // sub triangle contains 256 micro-triangles
22                   start_index += 256
23                   break
24               case 2: // sub triangle contains 1024 micro-triangles
25                   start_index += 1024
26                   break
27           }
28       }
29
30       return start_index
31   }
```

FIG. 65

```
1
2    // This function initializes the culling stack with the data from the RTT Base RAM
3    // Inputs:
4    //      rtt_base_ram - the RTT Base RAM's data
5    // Outputs:
6    //      culling_stack - the initialized culling stack
7    function initialize_culling_stack(rtt_base_ram) {
8
9        // start with an empty culling stack, here represented as an array
10       culling_stack = []
11
12       // push the first entry into the culling stack
13       culling_stack.push({
14           level: rtt_base_ram.base_resolution,              // start at the base triangle resolution and subdivide towards level 0
15           bird_index: rtt_base_ram.subtri_start_index << 6, // compute a full 26-bit bird index for the sub triangle
16           micro_vertex0: { min_position: rtt_base_ram.min_coordinates[0], max_position: rtt_base_ram.max_coordinates[0], displacement_amount: 0 },
17           micro_vertex1: { min_position: rtt_base_ram.min_coordinates[1], max_position: rtt_base_ram.max_coordinates[1], displacement_amount: 0 },
18           micro_vertex2: { min_position: rtt_base_ram.min_coordinates[2], max_position: rtt_base_ram.max_coordinates[2], displacement_amount: 0 },
19       })
20
21       return culling_stack
22   }
```

FIG. 66

```
1
2    // This function subdivides two input vertices to generate a new vertex
3    // Inputs:
4    //      micro_vertex_1 - the first micro-vertex's data
5    //      micro_vertex_2 - the second micro-vertex's data
6    // Outputs:
7    //      new_micro_vertex - the new subdivided micro-vertex
8    function subdivide_micro_vertices(micro_vertex_1, micro_vertex_2) {
9
10       // FAVG performs a point average between two floating point numbers
11
12       // compute the new micro-vertex's position on the minimum triangle
13       new_micro_vertex.min_position.x = FAVG(micro_vertex_1.min_position.x, micro_vertex_2.min_position.x)
14       new_micro_vertex.min_position.y = FAVG(micro_vertex_1.min_position.y, micro_vertex_2.min_position.y)
15       new_micro_vertex.min_position.z = FAVG(micro_vertex_1.min_position.z, micro_vertex_2.min_position.z)
16
17       // compute the new micro-vertex's position on the maximum triangle
18       new_micro_vertex.max_position.x = FAVG(micro_vertex_1.max_position.x, micro_vertex_2.max_position.x)
19       new_micro_vertex.max_position.y = FAVG(micro_vertex_1.max_position.y, micro_vertex_2.max_position.y)
20       new_micro_vertex.max_position.z = FAVG(micro_vertex_1.max_position.z, micro_vertex_2.max_position.z)
21
22       return new_micro_vertex
23   }
24
25   // This function subdivides a culling stack entry and generates four new candidate triangles for the next pass
26   // Inputs:
27   //      stack_entry - the input entry from the culling stack
28   // Outputs:
29   //      candidate_triangle_w - the candidate w triangle for the next pass
30   //      candidate_triangle_m - the candidate m triangle for the next pass
31   //      candidate_triangle_u - the candidate u triangle for the next pass
32   //      candidate_triangle_v - the candidate v triangle for the next pass
33   function subdivide_entry(stack_entry) {
34       // average the triangle vertices to generate three new micro-vertices
35       micro_vertex_01 = subdivide_micro_vertices(stack_entry.micro_vertex_0, stack_entry.micro_vertex_1)
36       micro_vertex_12 = subdivide_micro_vertices(stack_entry.micro_vertex_1, stack_entry.micro_vertex_2)
37       micro_vertex_02 = subdivide_micro_vertices(stack_entry.micro_vertex_0, stack_entry.micro_vertex_2)
38
39       next_level = stack_entry.level - 1
40       bird_index_shift = next_level * 2
41
42       // generate the four new candidate triangles
43       candidate_triangle_w = {
44           level: next_level,
45           micro_vertex_0: stack_entry.micro_vertex_0,
46           micro_vertex_1: micro_vertex_01,
47           micro_vertex_2: micro_vertex_02,
48           displacement_amount: 0,
49           bird_index: stack_entry.bird_index | (0 << bird_index_shift)
50       }
51
52       candidate_triangle_m = {
53           level: next_level,
54           micro_vertex_0: micro_vertex_02,
55           micro_vertex_1: micro_vertex_12,
56           micro_vertex_2: micro_vertex_01,
57           displacement_amount: 0,
58           bird_index: stack_entry.bird_index | (1 << bird_index_shift)
59       }
60
61       candidate_triangle_u = {
62           level: next_level,
63           micro_vertex_0: micro_vertex_01,
64           micro_vertex_1: stack_entry.micro_vertex_1,
65           micro_vertex_2: micro_vertex_12,
66           displacement_amount: 0,
67           bird_index: stack_entry.bird_index | (2 << bird_index_shift)
68       }
69
70       candidate_triangle_v = {
71           level: next_level,
72           micro_vertex_0: micro_vertex_12,
73           micro_vertex_1: micro_vertex_02,
74           micro_vertex_2: stack_entry.micro_vertex_2,
75           displacement_amount: 0,
76           bird_index: stack_entry.bird_index | (3 << bird_index_shift)
77       }
78
79       return { candidate_triangle_w, candidate_triangle_m, candidate_triangle_u, candidate_triangle_v }
80   }
```

FIG. 67

```
1
2   // This function returns the displacement amount for a specified micro-vertex
3   // Inputs:
4   //      displacement_block - the displacement block
5   //      edge_type - the edge on which the specified micro-vertex lives
6   //      subdiv_type - the type of subdiv to perform
7   //      subdiv_level - the level of subdiv
8   //      subdiv_bird_index - the bird index of the subdivided triangle (at the subdiv level)
9   //      subtri_resolution - the resolution of the sub triangle
10  //      subtri_size - the displacement block size of the sub triangle
11  //      v0_displacement - the displacement amount for v0 vertex of the subdivided triangle, used for predict-and-correct
12  //      v1_displacement - the displacement amount for v1 vertex of the subdivided triangle, used for predict-and-correct
13  // Outputs:
14  //      displacement_amount - the micro-vertex's computed displacement amount
15  function get_micro_vertex_displacement(
16      displacement_block,
17      edge_type,
18      subdiv_type,
19      subdiv_level,
20      subdiv_bird_index,
21      subtri_resolution,
22      subtri_size,
23      v0_displacement,
24      v1_displacement) {
25
26      // for anchor displacements, read them directly from the block
27      // EDGE_TYPE_01 returns the anchor displacement for the "w" vertex of the sub triangle
28      // EDGE_TYPE_12 returns the anchor displacement for the "u" vertex of the sub triangle
29      // EDGE_TYPE_02 returns the anchor displacement for the "v" vertex of the sub triangle
30      if (subdiv_type == DISP_TYPE_ANCHORS)
31          return displacement_block.get_anchor_displaement(edge_type)
32
33      if (subdiv_type == DISP_TYPE_SUBDIVIDE) {
34          // for uncompressed displacement blocks, fetch the displacement amount from the block
35          if (displacement_block.type == BLOCK_TYPE_UNCOMPRESSED)
36              displacement_amount = displacement_block.get_displacement_amount(edge_type, subdiv_level, subdiv_bird_index)
37
38          // for compressed displacement blocks, fetch the displacement correction from the block and perform predict-and-correct
39          if (displacement_block.type == BLOCK_TYPE_COMPRESSED) {
40              displacement_correction = displacement_block.get_displacement_correction(edge_type, subtri_resolution, subtri_size, subdiv_level, subdiv_bird_index)
41              predicted_displacement = (v0_displacement + v1_displacement + 1) >> 1;   // +1 here allows for rounding instead of truncation
42              displacement_amount = (predicted_displacement + displacement_correction) & 0x7FF
43          }
44      }
45
46      return displacement_amount;
47  }
```

FIG. 68

```
49   // This function computes displacement amounts for the three new micro-vertices generated by subdivision
50   // Inputs:
51   //      rtt_base_ram - the RTT Base RAM's data
52   //      displacement_block - the displacement block
53   //      entry - the current culling stack entry
54   //      micro_vertex_01 - the new micro-vertex between micro-vertex 0 and micro-vertex 1
55   //      micro_vertex_12 - the new micro-vertex between micro-vertex 1 and micro-vertex 2
56   //      micro_vertex_02 - the new micro-vertex between micro-vertex 0 and micro-vertex 2
57   // Outputs:
58   //      micro_vertex_01 - the new micro-vertex between micro-vertex 0 and micro-vertex 1 with displacement
59   //      micro_vertex_12 - the new micro-vertex between micro-vertex 1 and micro-vertex 2 with displacement
60   //      micro_vertex_02 - the new micro-vertex between micro-vertex 0 and micro-vertex 2 with displacement
61   function compute_micro_vertex_displacements(rtt_base_ram, displacement_block, entry, micro_vertex_01, micro_vertex_12, micro_vertex_02) {
62
63       // determine the type of displacement to apply
64       // - above the sub triangle level, no displacements are computed
65       // - at the sub triangle level, get the anchor displacements
66       // - below the sub triangle level, either fetch the displacement directly from the block or perform predict-and-correct
67       if (entry.level > rtt_base_ram.subtri_resolution) subdiv_type = DISP_TYPE_NONE
68       if (entry.level == rtt_base_ram.subtri_resolution) subdiv_type = DISP_TYPE_ANCHORS
69       if (entry.level < rtt_base_ram.subtri_resolution) subdiv_type = DISP_TYPE_SUBDIVIDE
70
71       // done if no displacements to compute
72       if (subdiv_type == DISP_TYPE_NONE) return;
73
74       // current subdiv level within the sub triangle (counts up from 0 to sub triangle level-1)
75       subdiv_level = rtt_base_ram.subtri_resolution - entry.level
76
77       // compute a sub-triangle relative subdiv intermediate triangle's bird index
78       // then mask off non sub triangle bits (don't care about higher order bits for displacements)
79       subdiv_mask = (1 << (subdiv_level * 2)) - 1
80       subdiv_bird_index = entry.bird_index >> (entry.level * 2)
81       subdiv_bird_index = subdiv_bird_index & subdiv_mask
82
83       // get the micro-vertex displacement amounts for the current entry, for predict-and-correct
84       micro_vertex_0_disp = entry.micro_vertex_0.displacement_amount
85       micro_vertex_1_disp = entry.micro_vertex_1.displacement_amount
86       micro_vertex_2_disp = entry.micro_vertex_2.displacement_amount
87
88       // get displacement amounts for the new micro-vertices
89       micro_vertex_01.displacement_amount = get_micro_vertex_displacement(
90           displacement_block,
91           EDGE_TYPE_01,
92           subdiv_type, subdiv_level, subdiv_bird_index,
93           rtt_base_ram.subtri_resolution, rtt_base_ram.subtri_size,
94           micro_vertex_0_disp, micro_vertex_1_disp)
95
96       micro_vertex_12.displacement_amount = get_micro_vertex_displacement(
97           displacement_block,
98           EDGE_TYPE_12,
99           subdiv_type, subdiv_level, subdiv_bird_index,
100          rtt_base_ram.subtri_resolution, rtt_base_ram.subtri_size,
101          micro_vertex_1_disp, micro_vertex_2_disp)
102
103      micro_vertex_02.displacement_amount = get_micro_vertex_displacement(
104          displacement_block,
105          EDGE_TYPE_02,
106          subdiv_type, subdiv_level, subdiv_bird_index,
107          rtt_base_ram.subtri_resolution, rtt_base_ram.subtri_size,
108          micro_vertex_0_disp, micro_vertex_2_disp)
109
110      return { micro_vertex_01, micro_vertex_12, micro_vertex_12 }
111  }
```

FIG. 69

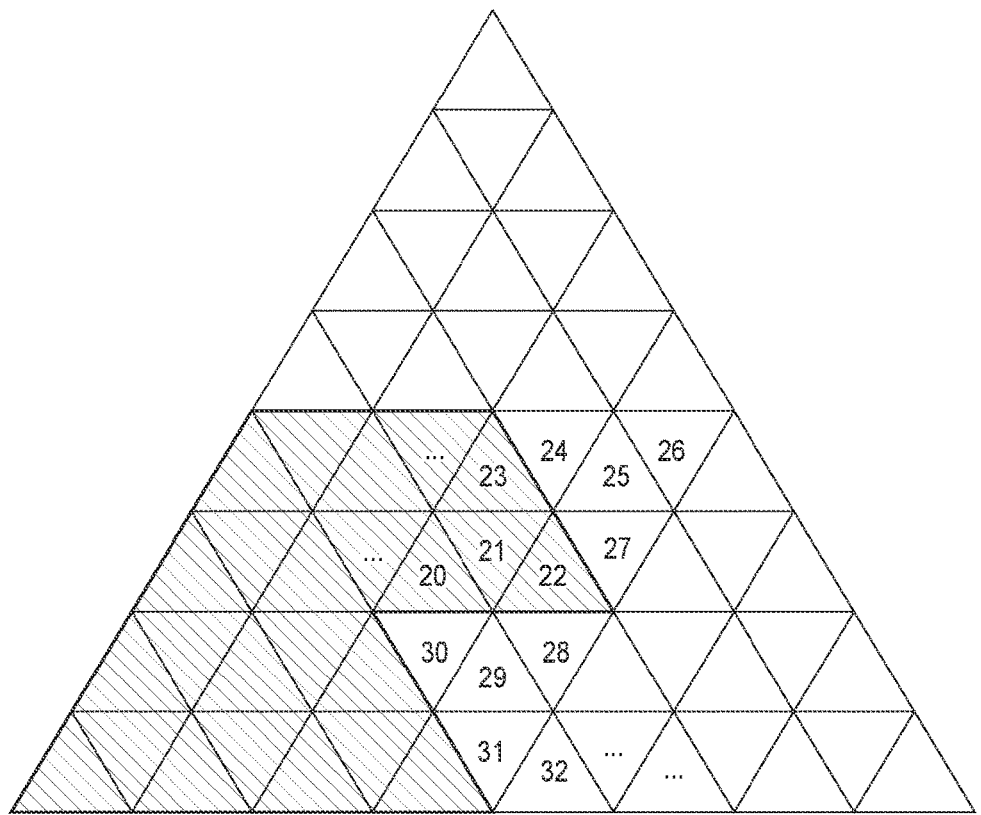

FIG. 70

```
1
2   function culling_pipe() {
3       // pop the top entry from the stack
4       stack_entry = culling_stack.pop()
5
6       // subdivide the stack entry
7       candidate_w, candidate_m, candidate_u, candidate_v, micro_vertex_01, micro_vertex_12, micro_vertex_02 = subdivide_entry(stack_entry)
8
9       // compute displacement amounts for new micro-vertices
10      compute_micro_vertex_displacements(micro_vertex_01, micro_vertex_12, micro_vertex_02)
11
12      // send the final six vertices to generation pipe if the next level is the micro-triangle level
13      // increasing the LOD bias effective increases the final micro-triangle level and reduces resolution
14      next_level = stack_entry.level - 1
15      if (next_level == ray.lod_bias) {
16          return [ micro_vertex_0, micro_vertex_1, micro_vertex_2, micro_vertex_01, micro_vertex_12, micro_vertex_02 ]
17      }
18
19      /* further logic - culling checks and pushing back on to the stack */
20  }
```

FIG. 71

```
1
2    // This function displaces a micro-vertex to produce its final position
3    // Inputs:
4    //     micro_vertex - the micro-vertex to displace
5    // Outputs:
6    //     displaced_vertex - the displaced micro-vertex
7    function displace_micro_vertex(micro_vertex) {
8        // convert the displacement amount to a normalized amount (in the [0, 1] range)
9        normalized_amount = UNORM11_to_FP32(micro_vertex.displacement_amount)
10
11       // also compute its linear inverse (1 - normalized_amount)
12       inverse_normalized_amount = UNORM11_to_FP32(~micro_vertex.displacement_amount & 0x7FF)
13
14       // linearly interpolate between the minimum and maximum points using a 2-component dot product
15       displaced_vertex.x = FP32_DP2(inverse_normalized_amount, micro_vertex.min_position.x, normalized_amount, micro_vertex.max_position.x)
16       displaced_vertex.y = FP32_DP2(inverse_normalized_amount, micro_vertex.min_position.y, normalized_amount, micro_vertex.max_position.y)
17       displaced_vertex.z = FP32_DP2(inverse_normalized_amount, micro_vertex.min_position.z, normalized_amount, micro_vertex.max_position.z)
18   }
```

FIG. 72

| HitType_Triangle | |
|---|---|
| | triangleID |
| a | t |
| f | u |
| 0 | v | f    facing: 0=front, 1=back
a    alpha: 0=opaque, 1=alpha (after all modes and visibility masks applied)

FIG. 73 example HitType_Triangle field

| HitTrianglePtr | | | | | | |
|---|---|---|---|---|---|---|
| | triPtrLoAligned | | | | triPtrHiAligned | If hit is not of type HitType_Triangle, zero |
| ut. | microTriIdxLo | subTriIdx | | | | Otherwise, address of micro triangle that was returned as the hit |
| | | microTriIdx | | | | |
| ut. | | | edgeDec | lod | res | lod: level of detail bias from ray and instance node |
| | | | | | | res: base triangle resolution |

FIG. 74 example HitTrianglePtr data for microtriangles

Complet Header

| mode | | | | | |
|------|---|---|---|---|---|
| leafPtrLo | | | | | |
| | | | | | |
| | | | | | |
| | | | | | |
| | | | | | |
| | | | | | |

FIG. 75 example typical compressed treelet (complet)

--- mode field

| leafType | |
|----------|---| leafType    leaftype 3=displaced micro-mesh

FIG. 76 example first displaced micro-mesh child in a complet

--- data field

| (first leafType=3) | alpha | 1 | subTriIdx |
|---|---|---|---| alpha        indication that tri range may contain alpha triangles, or a visibility mask resulting in alpha triangles
subTriIdx    sub-triangle index

FIG. 77 example first displaced micro-mesh child in a complet example complet misc field for displaced micro-mesh leaves

|  | data field | | | |
|---|---|---|---|---|
| (next leafType=3) | alpha | 1 | next | lineStrideLo |

|  |  |  |
|---|---|---|
|  | alpha | indication that tri range may contain alpha triangles, or a visibility mask resulting in alpha triangles |
|  | next(Line) | if 1, advance displaced micro-mesh triangle block pointer for this child and set subTrildx to 0 |
| (nextLine=1) | lineStrideLo | displaced micro-mesh line stride for this child. Valid only if nextLine=1. |
|  |  | e.g., {nextLine, lineStride with Hi and Lo}: {0,0} = +0; {1,0} = +1; {1,1} = +2; ... ; {1,255} = +256 |

FIG. 79 example subsequent displaced micro-mesh children in a complet

DISPLACED MICRO-MESHES FOR RAY AND PATH TRACING

CROSS-REFERENCE TO RELATED APPLICATIONS

This application claims priority to U.S. Provisional Patent Application No. 63/245,155 filed Sep. 16, 2021, the entire content of which is herein incorporated by reference.

This application is related to the following commonly-owned patent applications each of which is incorporated herein by reference for all purposes as if expressly set forth herein:

U.S. patent application Ser. No. 17/946,235 filed Sep. 16, 2022 entitled Micro-Meshes, A Structured Geometry For Computer Graphics (21-SC-1926US02; 6610-126) (the above-cited provisional patent application and this application hereinafter collectively referred to as "Micro-Meshes Patent")

U.S. patent application Ser. No. 17/946,221 filed Sep. 16, 2022 entitled Accelerating Triangle Visibility Tests For Real-Time (22-DU-0175US01; 6610-124) (hereinafter "Visibility Patent")

U.S. patent application Ser. No. 17/946,563 filed Sep. 16, 2022 entitled Displaced MicroMesh Compression (Our Ref 22-RE-0948US01/6610-129) (hereinafter "Displacement Compression Patent").

FIELD

The present technology relates to computer graphics, and more particularly to displacement mapping for ray and path tracing. Still more particularly, the technology herein relates to a new primitive type—the Displaced Micro-mesh (DMM) and associated acceleration data structures and hardware circuitry—that enables high complexity geometry while minimizing the associated builder costs and preserving high efficiency ray and path tracing.

BACKGROUND & SUMMARY

Interactive real time or nearly real time graphics systems are ubiquitous and becoming more and more popular and useful each day. Surgeons use real time computer graphics to perform surgery, motor vehicle drivers and pilots use real time computer graphics to pilot their vehicles, virtual and augmented reality users use real time computer graphics to enhance their experience of and navigate the world, gamers and metaverse explorers use real time computer graphics to navigate imaginary scenes, and students use real time computer graphics to learn knowledge and skills.

For many of these computer graphics applications, a goal tends to be photorealism of increasingly complex scenes. Because many computer graphics scenes are represented by polygons such as triangles, one way to rate or gauge modern computer graphics systems is their performance in terms of polygons or triangles per second. Modern graphics processing units (GPUs) are able to achieve a processing rate of on the order of 20 billion triangles per second. But even this astounding rate is sometimes insufficient for true photorealism of arbitrarily complex scenes. For example, it may be desirable in some cases to use a tool that can convert a photogrammetric scan of a very complex physical scene such as a desert canyon, a craggy mountaintop, a seascape, a Zen garden, mudflats, an ancient statue or monument, a human being, or any other complex object into a triangle mesh of very small triangles each having a displacement. Such representations can provide amazing photorealism but it becomes very expensive to build a so-called acceleration structure (AS) (which for ray tracing usually comprises a bounding volume hierarchy or BVH) incorporating such a mesh using conventional polygon primitives.

In terms of computer graphics techniques, rasterization is a technique that produces an image as seen from a single viewpoint. It's been at the heart of GPUs from the start. Modern GPUs can generate over 100 billion rasterized pixels per second. That's made rasterization ideal for real-time graphics, like gaming.

Ray tracing (see Whitted, "An Improved Illumination Model For Shaded Display", Proceedings of the $6^{th}$ Annual Conference on Computer Graphics and Interactive Techniques (1979)) is a more powerful technique than rasterization. Rather than being constrained to finding out what is visible from a single point, it can determine what is visible from many different points, in many different directions. Starting with the NVIDIA Turing architecture, NVIDIA GPUs have provided specialized ray tracing hardware to accelerate this difficult computation. Today, a single GPU can trace billions of rays per second.

Being able to trace all of those rays makes it possible to simulate how light scatters in the real world much more accurately than is possible with rasterization. Path tracing—which is built upon ray tracing—makes it possible to accurately represent the way light scatters throughout a scene. Path tracing was first discussed by James Kajiya in his seminal paper "The rendering equation" SIGGRAPH 1986: 143-150, doi:10.1145/15922.15902, ISBN 978-0-89791-196-2. It was seen as an elegant technique the most accurate approach known but it was completely impractical. The images in Kajiya's original paper were just 256 by 256 pixels, yet they took over 7 hours to render on an expensive mini-computer that was far more powerful than the computers available to most other people. But with the increase in computing power driven by Moore's law which described the exponential increase in computing power driven by advances that allowed chipmakers to double the number of transistors on microprocessors every 18 months—the technique became more and more practical. Beginning with movies such as 1998's A Bug's Life, ray tracing was used to enhance the computer-generated imagery in more and more motion pictures. And in 2006, the first entirely path-traced movie, Monster House, stunned audiences. The film was a big hit. And it opened eyes about what a new generation of computer animation could do. As more computing power became available, more movies came to rely on the technique, producing images that are often indistinguishable from those captured by a camera.

The problem: it still took hours to render a single image and sprawling collections of servers known as "render farms" are running continuously to render images for months in order to make a complete movie. Bringing that to real-time graphics would take an extraordinary leap.

Ray tracing algorithms often use acceleration data structures (ASes) representing bounding volume hierarchies (BVHs) to accelerate ray traversal queries. Typical ASes use triangles for a large portion of their geometry. Therefore, any ray traversal hardware or algorithm must be able to perform a ray-box test for hierarchical culling, and a ray-triangle intersection test for geometry contained in leaf level AS nodes.

As scenes increasingly add more geometric complexity, moving into the range of multi-billion or even trillions of triangles, two substantial bottlenecks become apparent. The storage capacity of the processor, such as a GPU, becomes a limiter. Scenes that exceed the GPU's memory capacity must stream in data from system memory or disk, significantly degrading performance. Furthermore, the time required for the software Builder to build or update a suitable AS generally increases linearly with the number of triangles. So, at extreme triangle counts, the AS build time can push traversal performance outside of the real-time range.

The problem is to enable high geometric complexity without the associated storage or AS build time costs.

Polygon meshes have long been used to increase the complexity of scenes that a graphics system can render. See for example Lee et al, "Displaced subdivision surfaces", SIGGRAPH '00: Proceedings of the 27th annual conference on Computer graphics and interactive techniques July 2000 Pages 85-94//doi.org/10.1145/344779.344829. For example, NVIDIA's Turing architecture introduced a new programmable geometric shading pipeline through the use of mesh shaders. See e.g., U.S. Ser. No. 10/909,739; U.S. Pat. No. 6,957,356. The new shaders brought the compute programming model to the graphics pipeline as threads are used cooperatively to generate compact meshes (meshlets) directly on the chip for consumption by the rasterizer. Applications and games dealing with high-geometric complexity benefit from the flexibility of the two-stage approach, which allowed efficient culling, level-of-detail techniques as well as procedural generation. Such mesh shaders provided efficient draw submission for many small objects, pre-computed topologies for different levels of detail, and flexible instancing. Rendering applications included for example vegetation, undergrowth, greebles, iso-surface extraction, particle or text glyphs, wide lines/shader-driven stippling and other effects, proxy hull objects, instancing of very basic shapes, CAD models, and more. See for example, Kubisch, "Turing—Meshing Shaders" SIGGRAPH Aug. 14, 2018) at youtu.be/721YVTlPfI8.

Other raster based solutions, such as Epic Games' Nanite®, look to enable high geometric complexity using polygon meshes but have their own restriction of linear rendering cost and so have different constraints that they are trying to meet/optimize. See e.g., Karis et al, "Nanite: A Deep Dive" (SIGGRAPH 2021).

Displacement, "z" and/or depth maps have also been used extensively in the past for various purposes. See for example US20140035940; US 20140340403; U.S. Pat. Nos. 8,730,252; 8,570,322; 7,385,604; 7,154,507; 6,828,980; Uludag, Hi-Z Screen-Space Cone-Traced Reflections" GPU Pro 5, pp. 149-192 CRC Press (2014); Thonat et al, Tessellation-free displacement mapping for ray tracing, pp 1-16 ACM Transactions on Graphics Volume 40 Issue 6 No.: 282 (December 2021) doi.org/10.1145/3478513.3480535, //dl.acm.org/doi/abs/10.1145/3478513.3480535; Pharr et al, "Geometry caching for ray-tracing displacement maps", Proceedings of the Eurographics workshop on Rendering Techniques (1996); Donnelly, Chapter 8. Per-Pixel Displacement Mapping with Distance Functions, GPU Gems 2 (NVIDIA 2005); Doggett, Displacement Mapping (ATI Research 1/13/03 (GDC 2003).

Meanwhile, ray tracing is now poised to do better than raster for high geometric complexity due to its logarithmic traversal cost versus the number of triangles.

BRIEF DESCRIPTION OF THE DRAWINGS

FIG. 9 is a flowchart of a builder process to construct an AS.

FIG. 11 is a table that shows the maximum and minimum number of displacement blocks and their corresponding memory footprints for each base triangle level. At best, a microtriangle can be specified in one embodiment in as few as 0.5 bits.

FIG. 16A shows an example base triangle; FIG. 16B shows direction vectors from each vertex of the base triangle; FIG. 16C shows an example planar micro-mesh surface displaced in space with respect to the FIG. 16B base triangle direction vectors; FIG. 16D shows an example non-planar, displacement mapped micro-mesh surface defined in space with respect to the FIG. 16B base triangle direction vectors; FIG. 16E shows an example curved micro-mesh surface displaced in space with respect to the FIG. 16B base triangle direction vectors; and FIG. 16F shows an example curved, displacement mapped micro-mesh surface displaced in space with respect to the FIG. 16B base triangle direction vectors.

FIG. 26A shows a 64×64 (resolution 6) base triangle.

FIG. 26B shows the FIG. 26A base triangle can be split into multiple sub triangles having different micro-mesh resolutions and which can be processed individually on the TTU.

FIG. 27 shows the anatomy of a subdivided triangle. The three corner microtriangles (w, u, and v) are named for their base vertices. The triangle in the middle is the "middle" (or m) triangle.

FIG. 28 shows a table of example non-limiting resolution and microtriangle counts at various subdivision levels. The third column indicates how many bits are used in one example embodiment to address each microtriangle at each subdivision level.

FIG. 34 shows example pseudo-code showing how to subdivide an initial triangle into 4 smaller subdivided sub triangles such as shown in FIG. 32.

Note that the middle (M) and V triangles have a winding that is flipped (clockwise versus counterclockwise) with respect to the base triangle (v0, v1, v2) in one embodiment.

Figure 36:
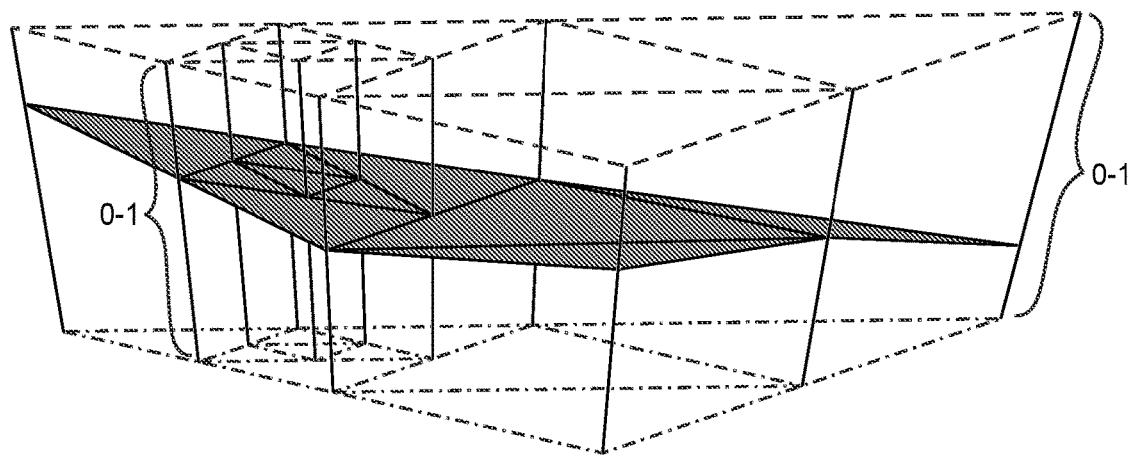

FIG. 36 shows a subdivided displaced micro-mesh (center) with displacement defined as a per-vertex linear interpolation between the minimum (bottom) triangle and the maximum (top) triangle in a prismoid representation. In one embodiment, each vertex specifies a displacement amount in the [0, 1] range (this may be conveniently represented using a UNORM representation such as UNORM11), which is used to linearly interpolate between the minimum and maximum triangles to generate a displaced vertex location for the triangle vertices.

Figure 37:
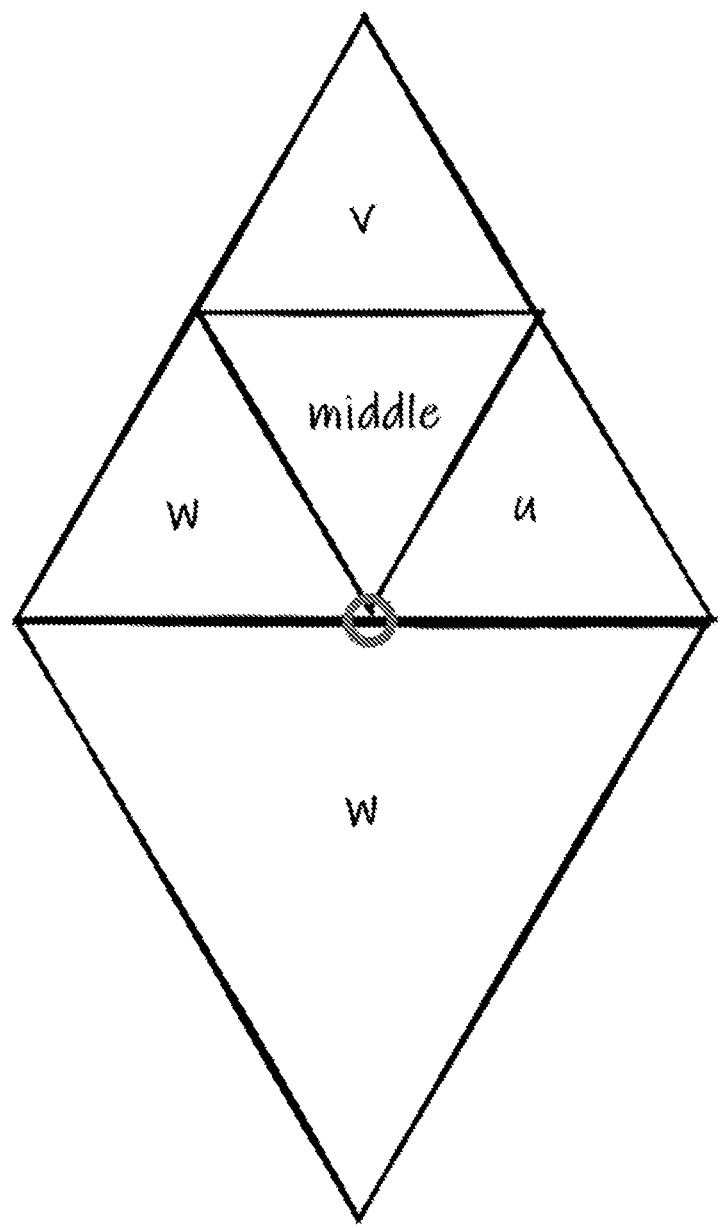
Figure 38A:
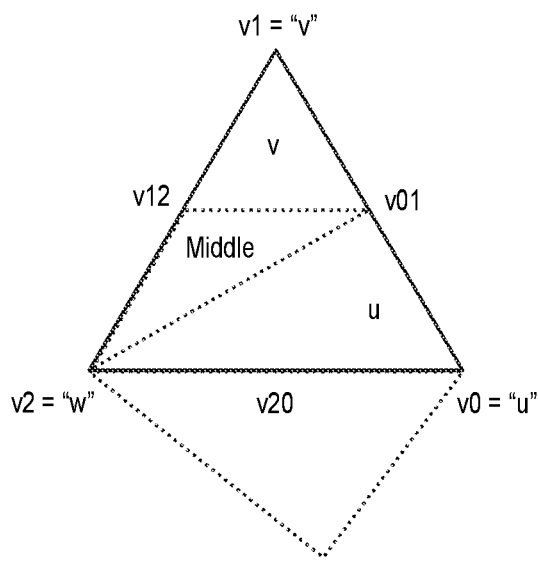
Figure 38B:
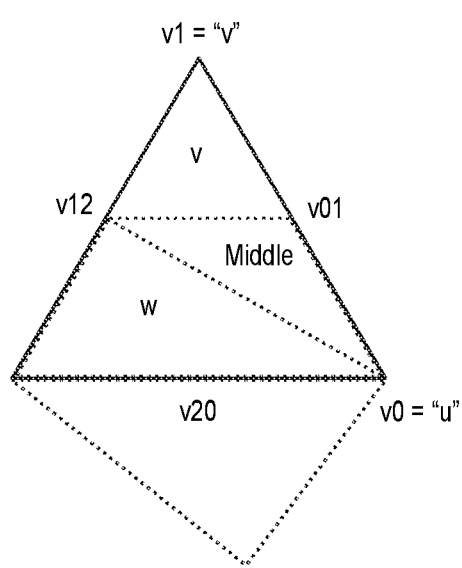
Figure 38C:
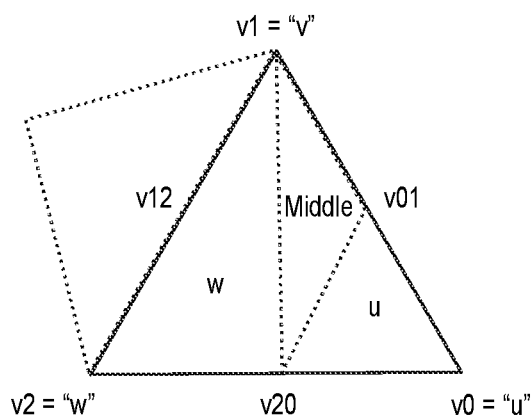
Figure 38D:
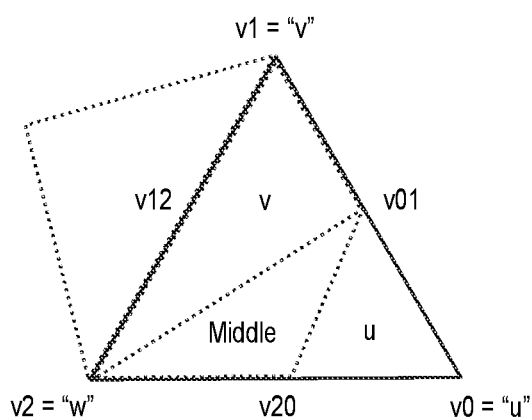
Figure 38E:
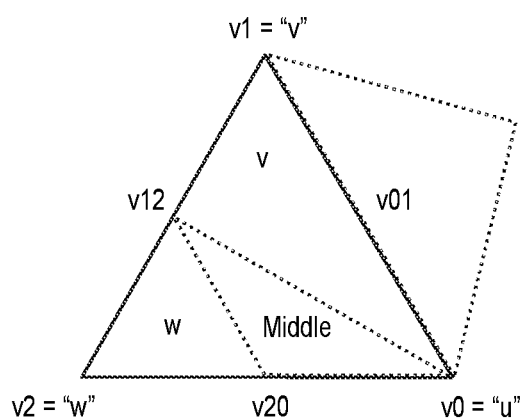
Figure 38F:
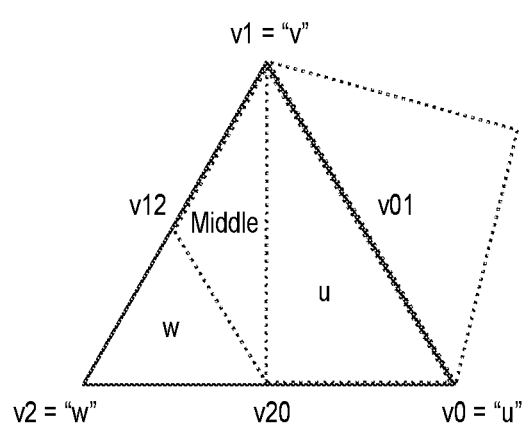

FIG. 37 shows adjacent base triangles of differing resolutions introduce T-junctions, as shown with the circle in the center of the figure. During subdivision, only the top base triangle will displace the micro-vertex designated with the circle as the bottom base triangle doesn't have that microvertex. If permitted, such T-junctions will lead to cracking and a non-watertight mesh.

FIGS. 38A, 38B, 38C, 38D, 38E, 38F show various edge "decimation" styles for a single shared edge between two adjacent base triangles. All or a subset of these styles may be used in a given implementation.

Figure 39A:
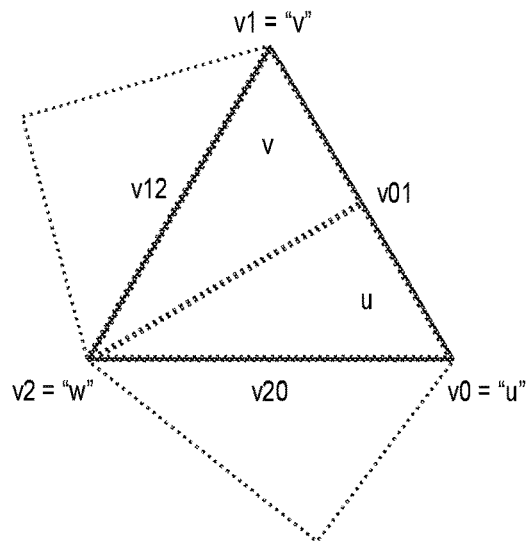
Figure 39B:
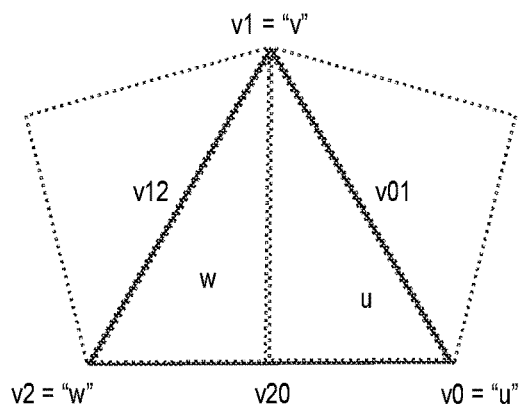
Figure 39C:
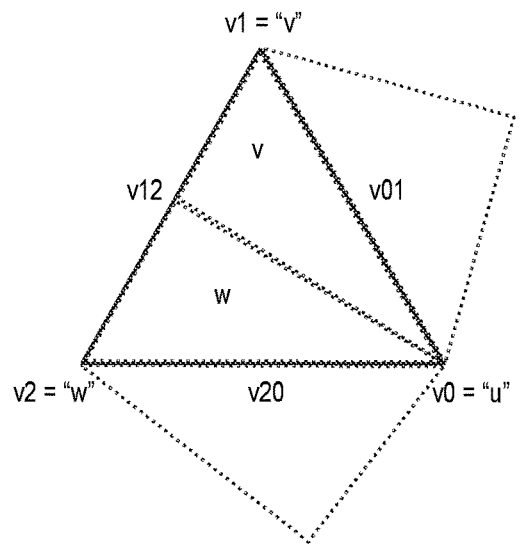

FIGS. 39A, 39B, 39C show various edge decimation styles for dual shared edge between three adjacent base triangles. These cases only happen at the corners of the base triangle, and so there are only 3 possible edge decimation styles.

Figure 40:
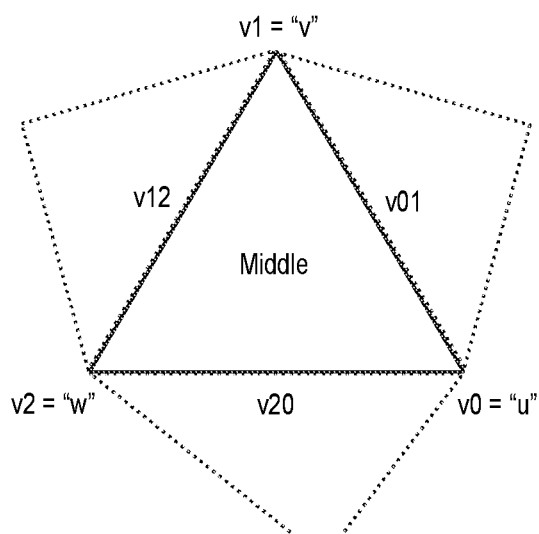

FIG. 40 shows a single edge decimation style when a base triangle adjacent to three other base triangles (in one embodiment, this case only applies to base triangles with a resolution of 1).

Figure 41:
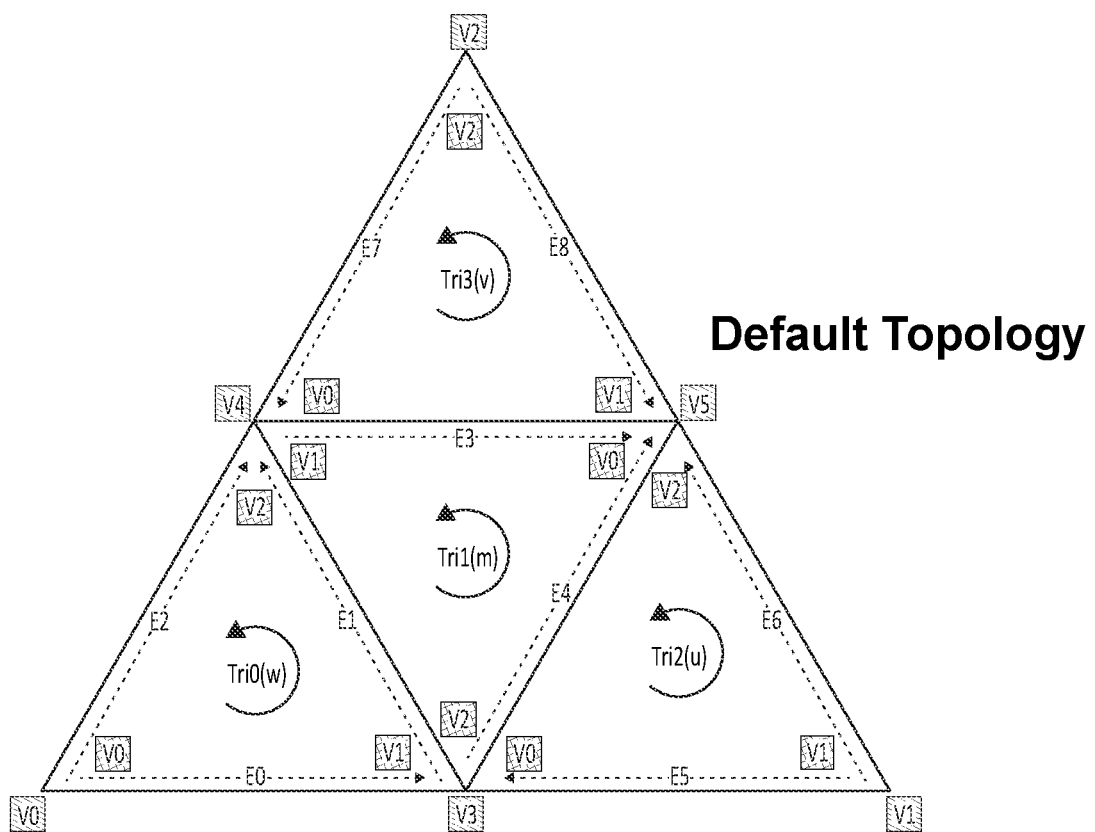

FIG. 41 shows an example default microtriangle topology when no edge decimation is applied. This occurs when either no edge decimation is specified or when the input triangle is not adjacent to a decimated base triangle edge.

Figure 42A:
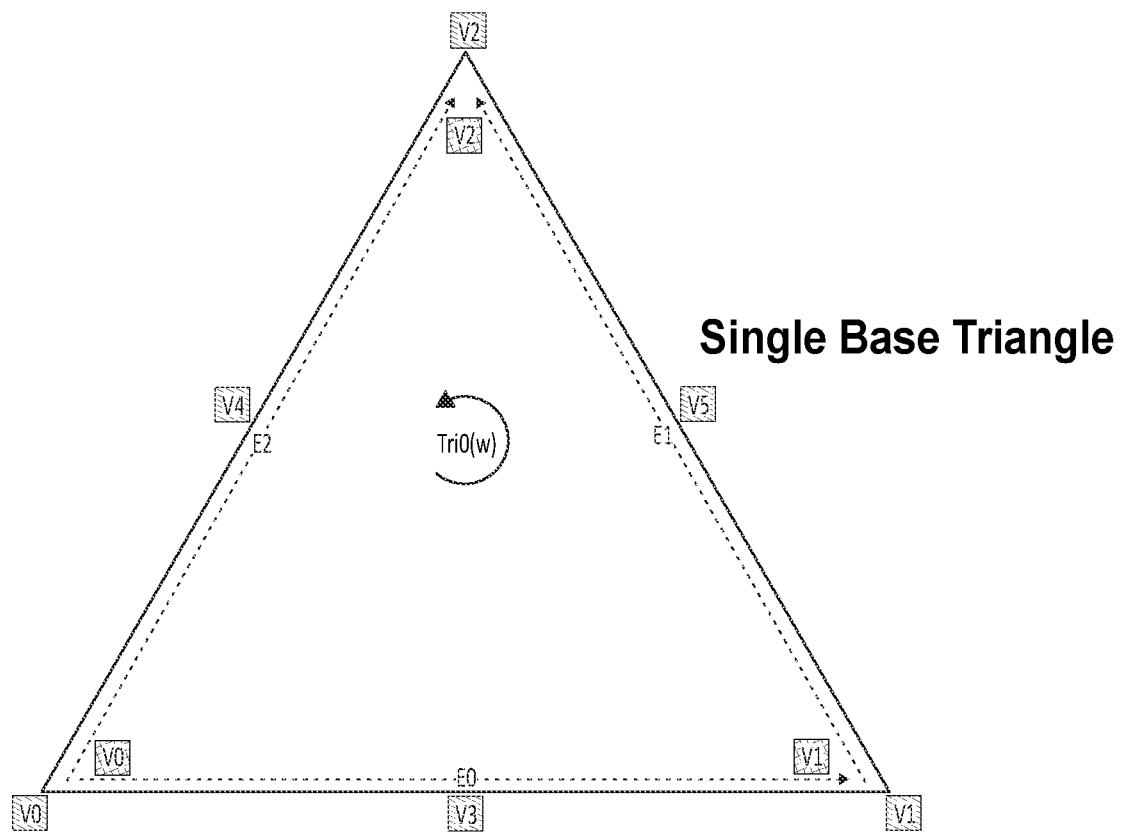

FIG. 42A shows an example microtriangle topology used when the effective base triangle resolution (base triangle resolution—LOD bias) is 0. In this case only a single microtriangle is generated.

Figure 42B:
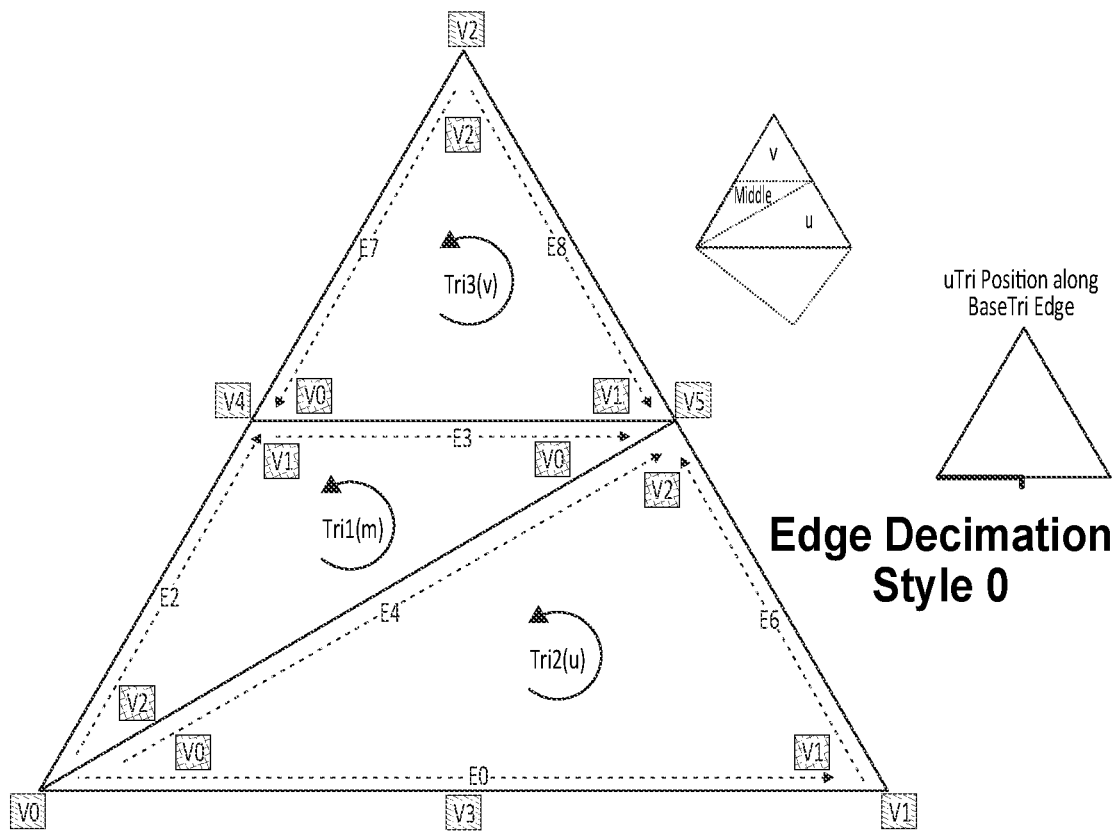

FIG. 42B shows an example microtriangle topology for edge decimation style 0. This style is used when the bottom edge is decimated and the input triangle is on the left half of the bottom edge.

Figure 42C:
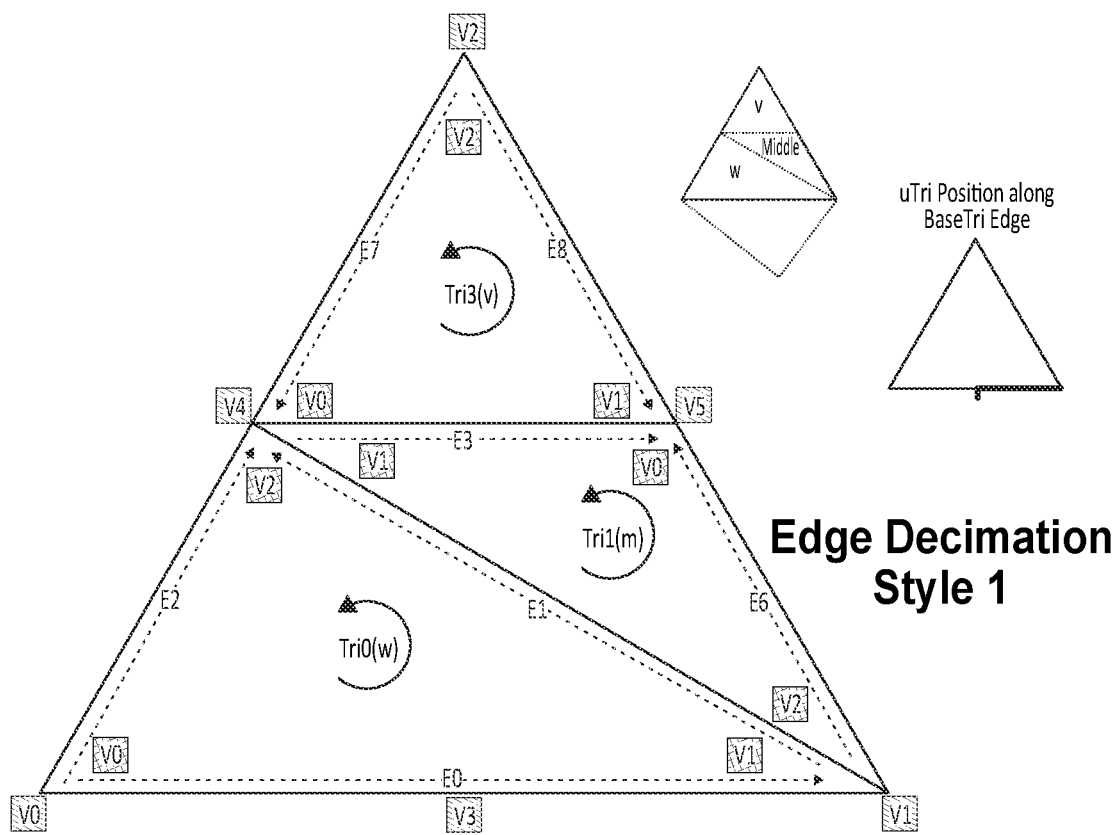

FIG. 42C shows an example microtriangle topology for edge decimation style 1. This style is used when the bottom edge is decimated and the input triangle is on the right half of the bottom edge.

Figure 42D:
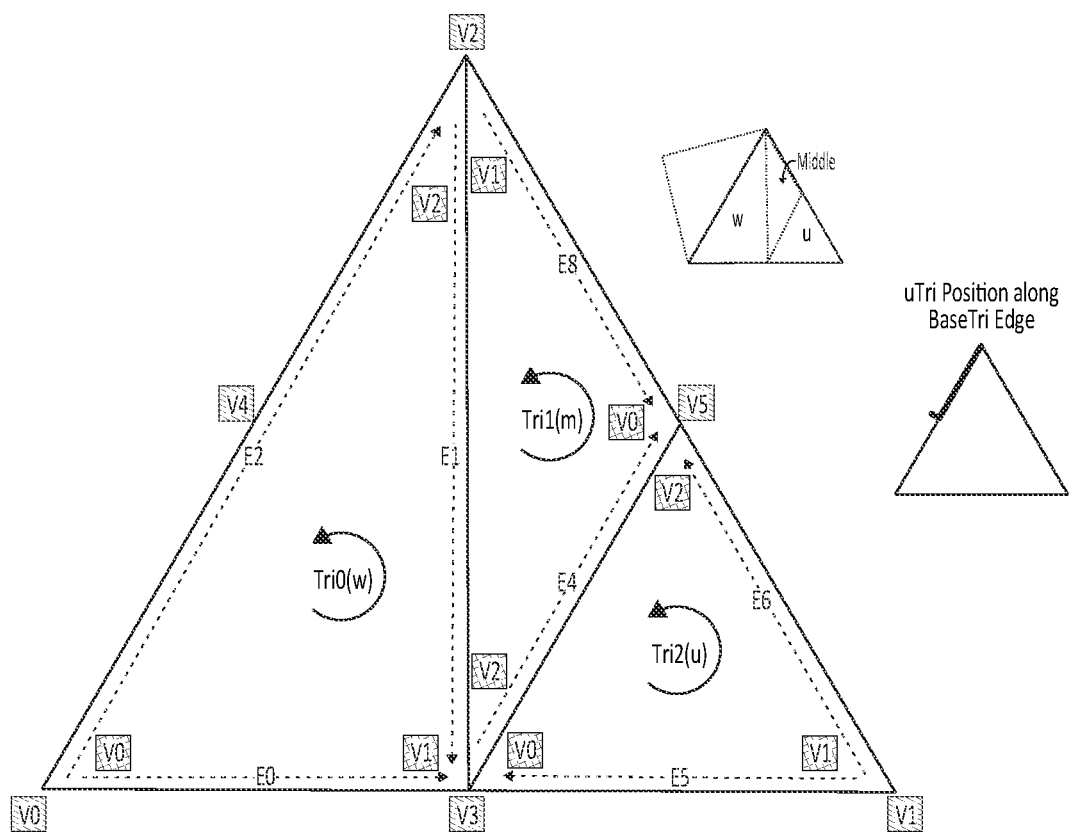

FIG. 42D shows an example microtriangle topology for edge decimation style 2. This style is used when the left edge is decimated and the input triangle is on the top half of the left edge.

Figure 42E:
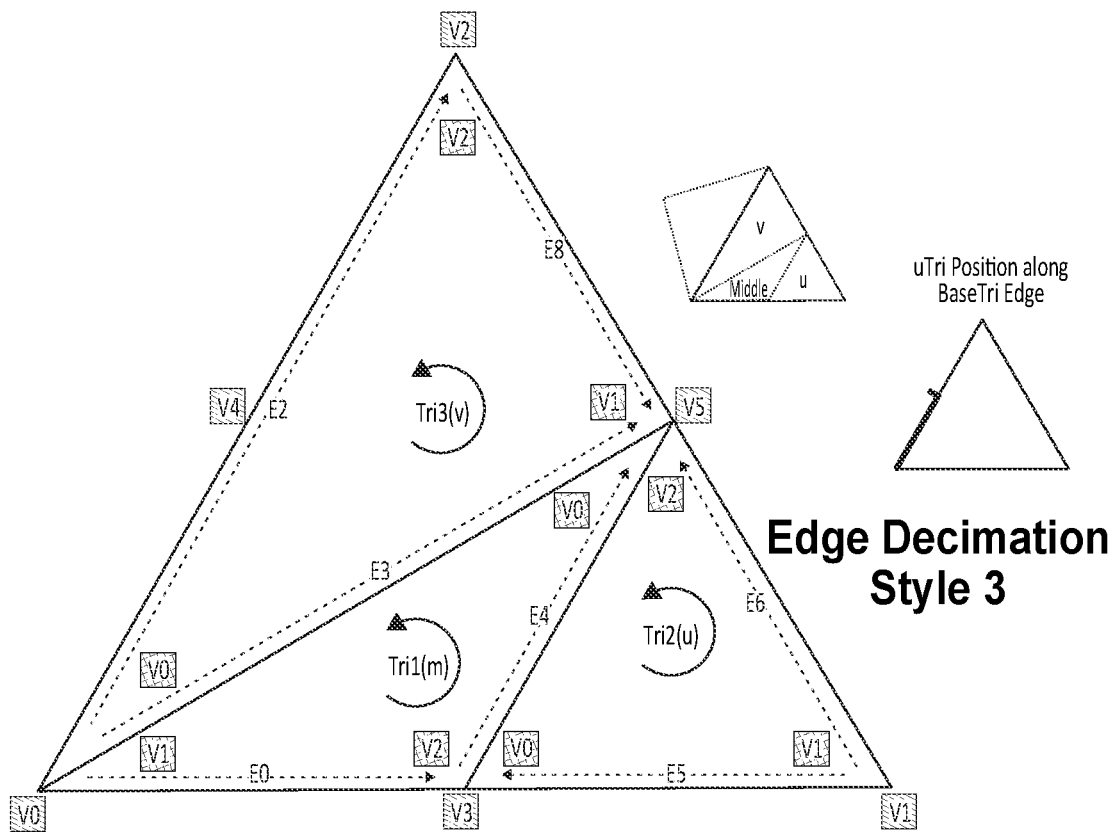

FIG. 42E shows an example microtriangle topology for edge decimation style 3. This style is used when the left edge is decimated and the input triangle is on the bottom half of the left edge.

Figure 42F:
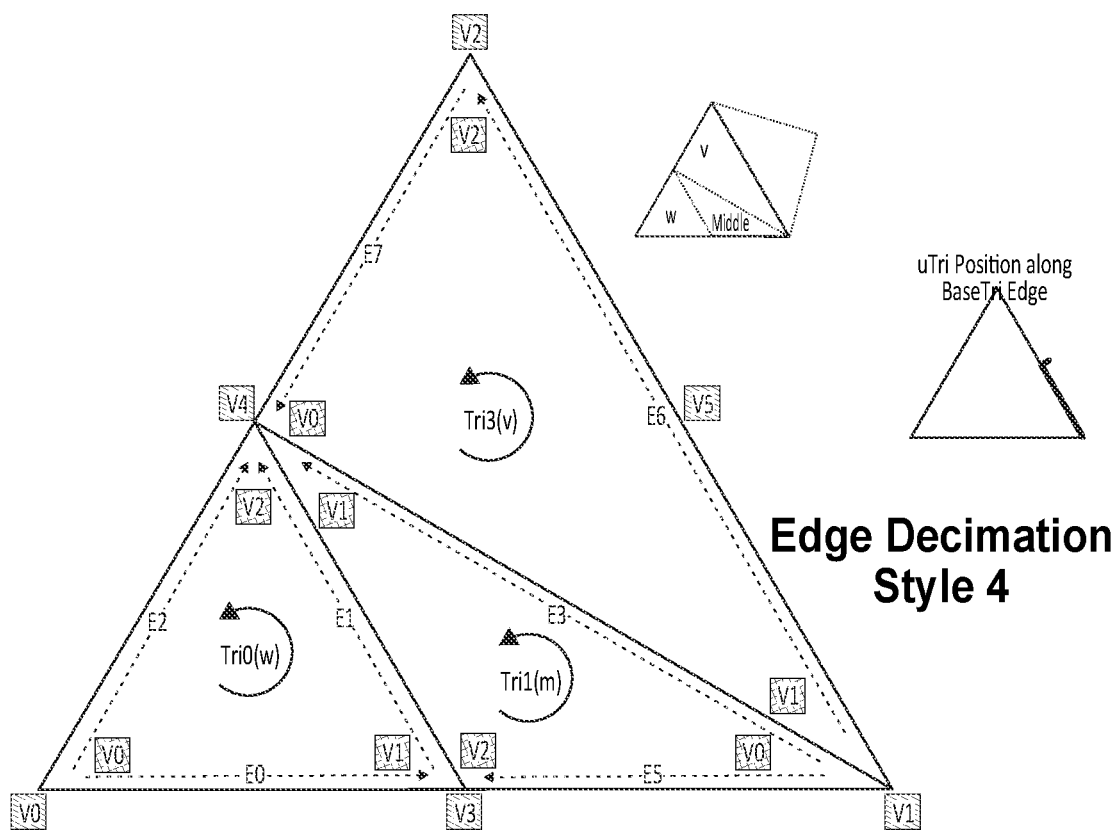

FIG. 42F shows an example microtriangle topology for edge decimation style 4. This style is used when the right edge is decimated and the input triangle is on the bottom half of the right edge.

Figure 42G:
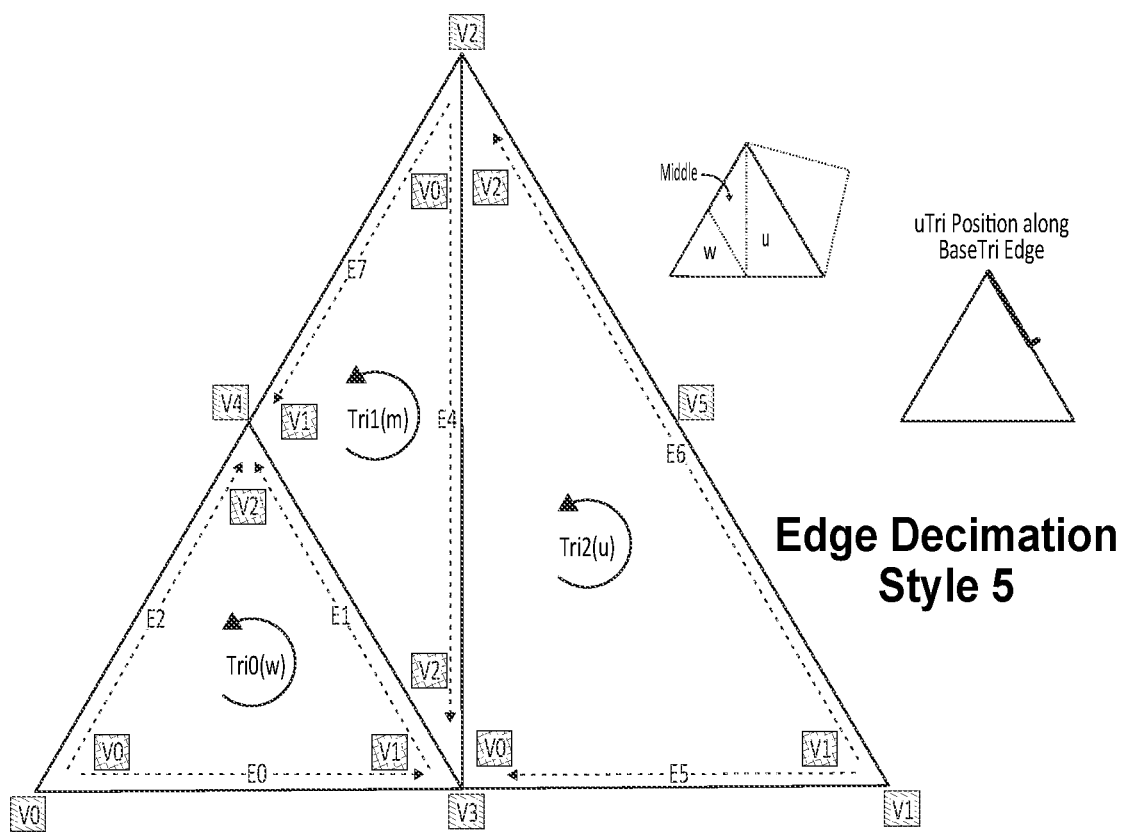

FIG. 42G shows an example microtriangle topology for edge decimation style 5. This style is used when the right edge is decimated and the input triangle is on the top half of the right edge.

Figure 42H:
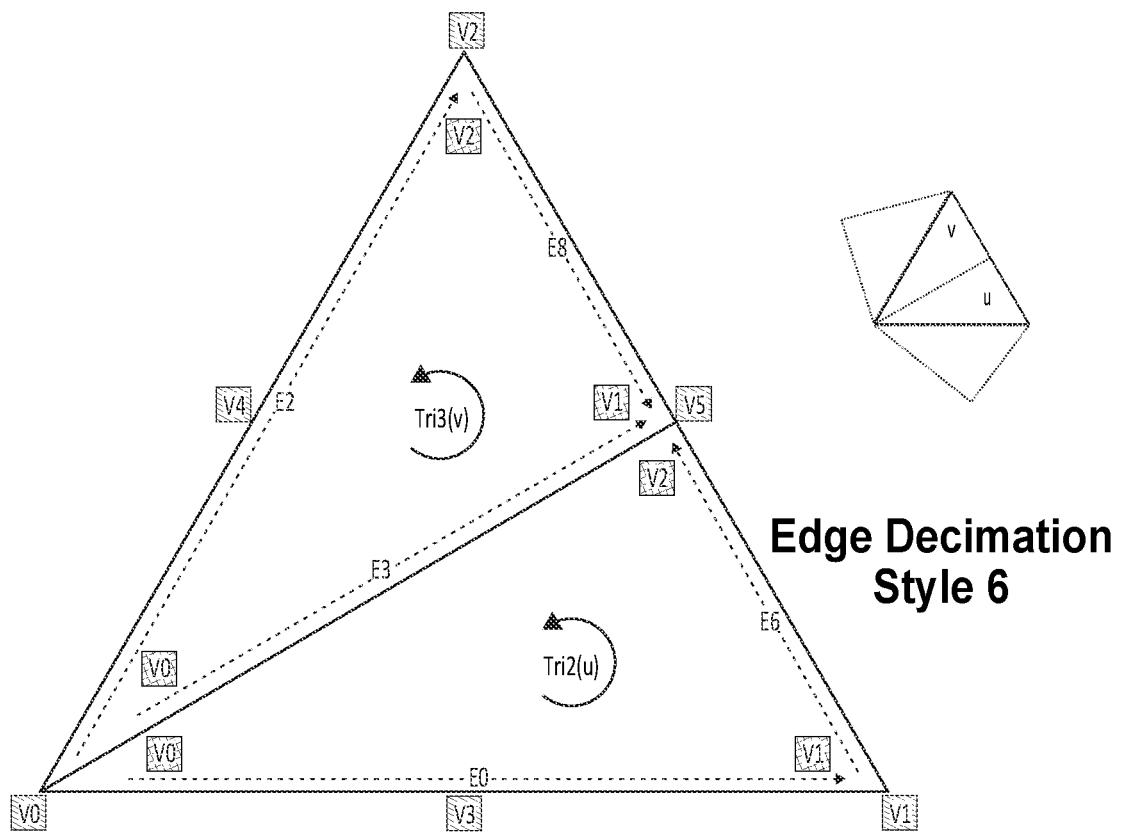

FIG. 42H shows an example microtriangle topology for edge decimation style 6. This style is used when the bottom and left edges are decimated and the input triangle is on the lower-left corner of the base triangle.

Figure 42I:
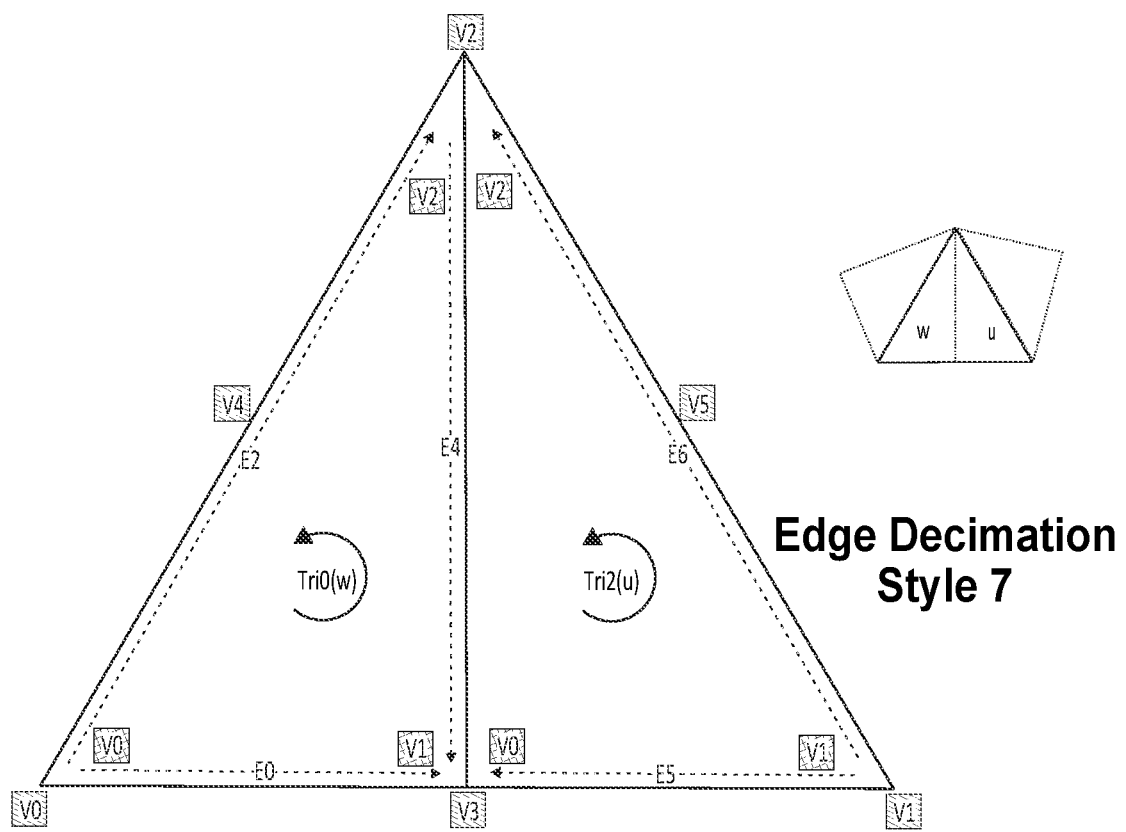

FIG. 42I shows an example microtriangle topology for edge decimation style 7. This style is used when the left and right edges are decimated and the input triangle is on the topmost corner of the base triangle.

Figure 42J:
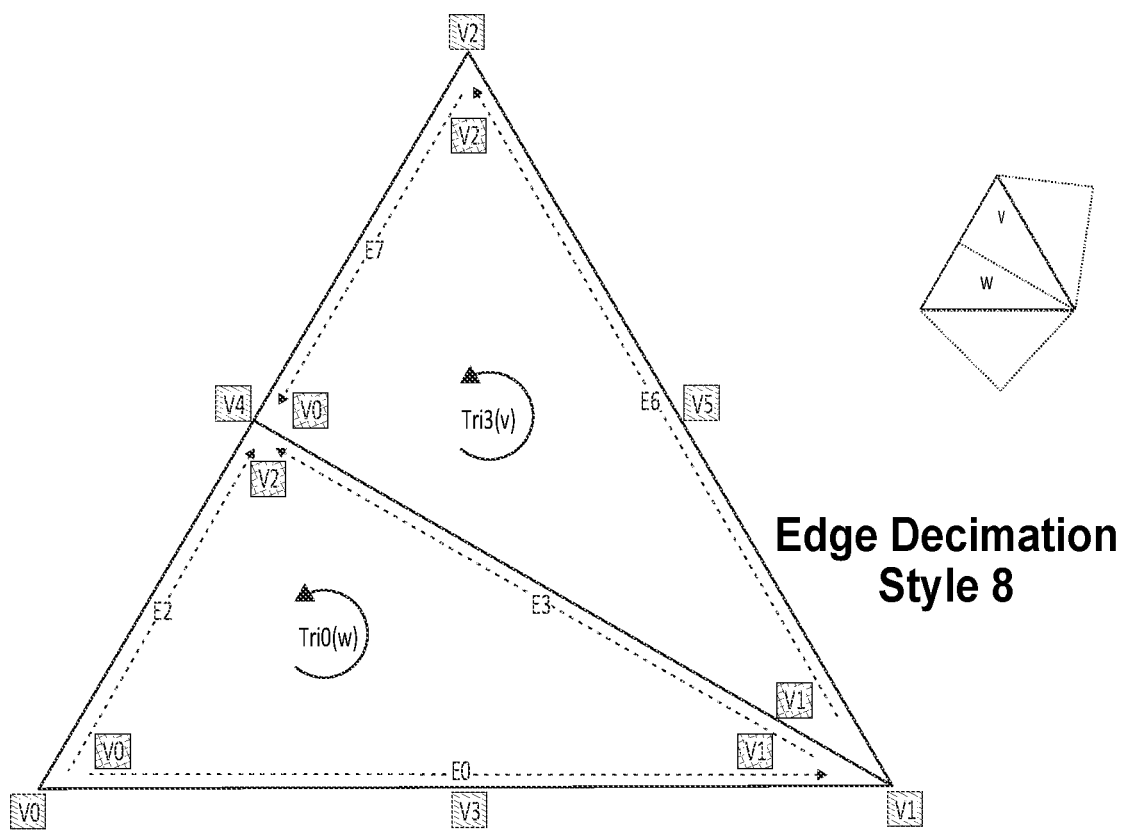

FIG. 42J shows an example microtriangle topology for edge decimation style 8. This style is used when the bottom and right edges are decimated and the input triangle is on the lower-right corner of the base triangle.

Figure 42K:
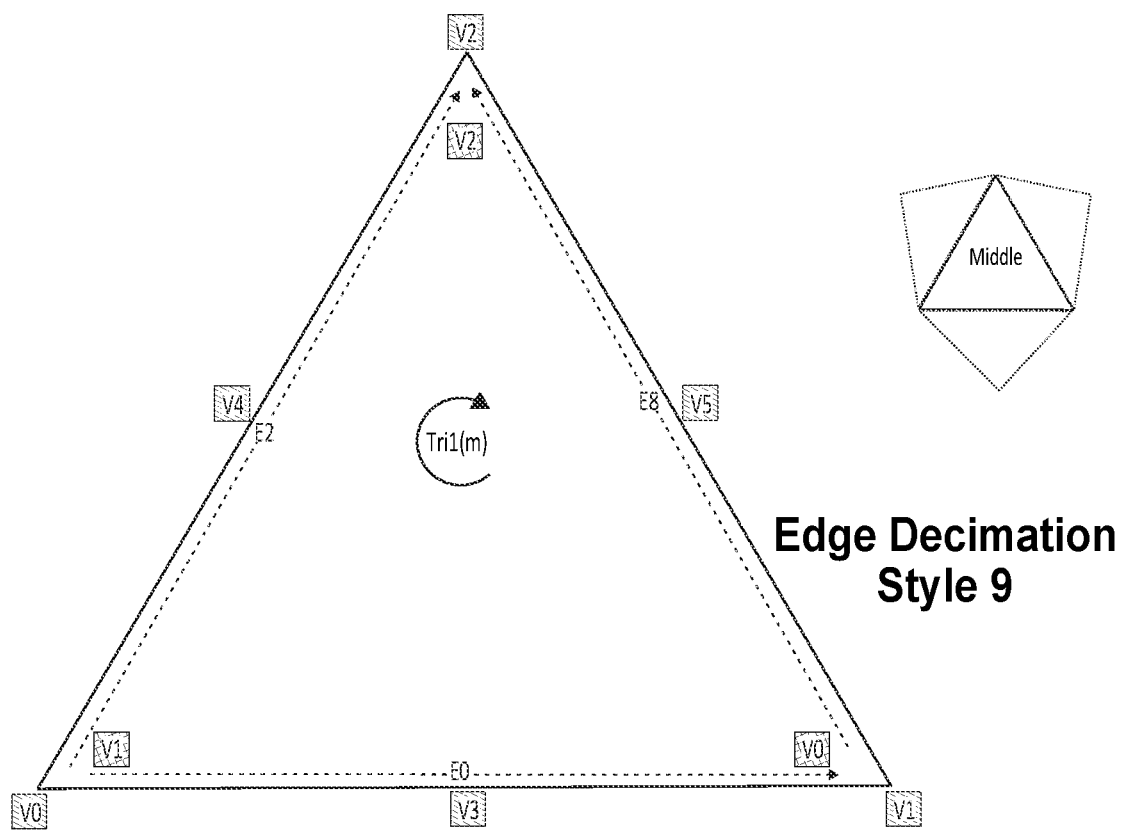

FIG. 42K shows an example microtriangle topology for edge decimation style 9. This style is used when all edges are decimated and the base triangle is resolution 1.

Figure 43:
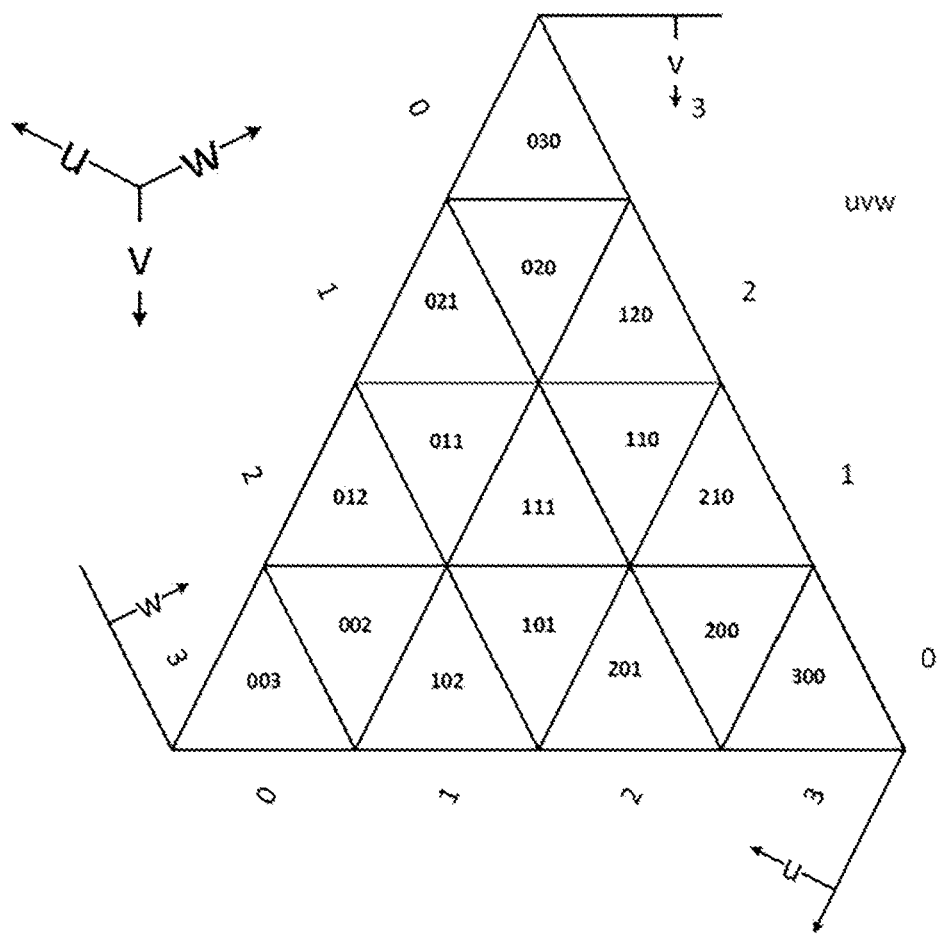

FIG. 43 shows a discrete barycentrics map of all microtriangles on a resolution 2 micro-mesh, with example identifiers used for decimation.

Figure 44:
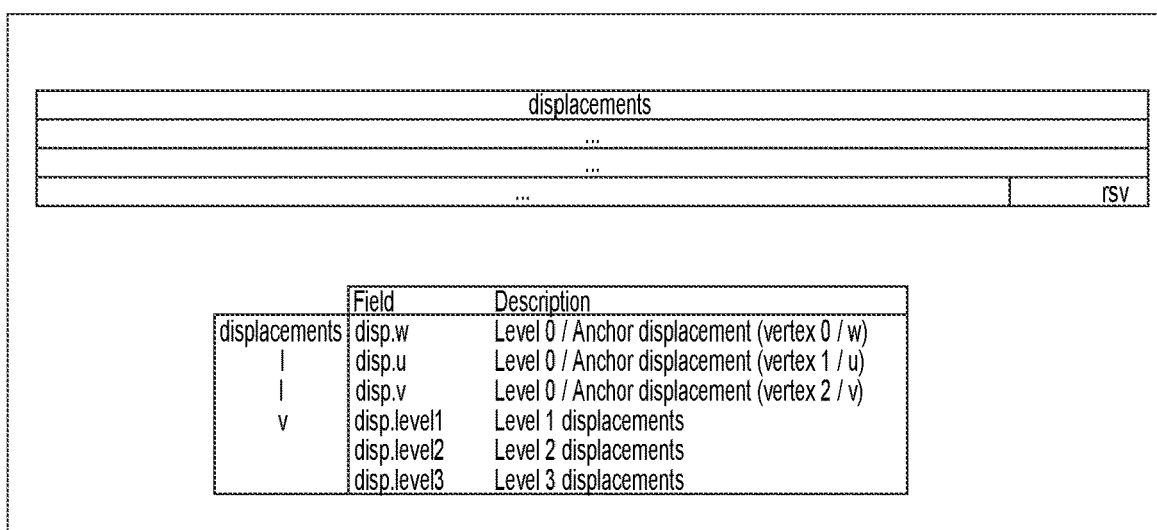
Figure 46A:
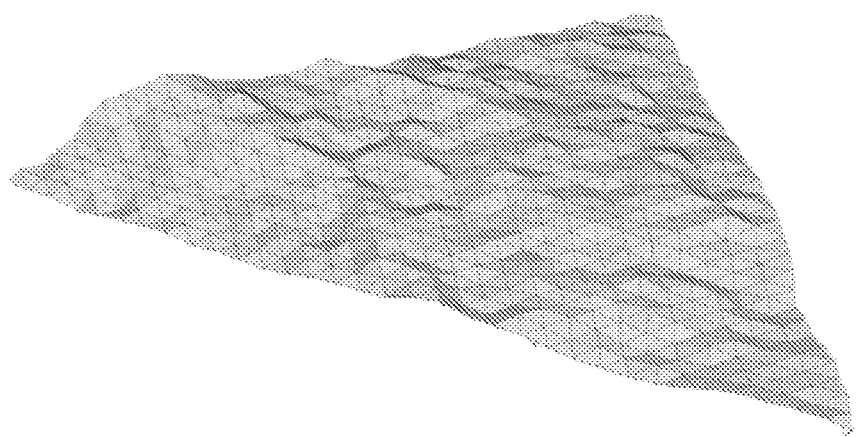
Figure 46B:
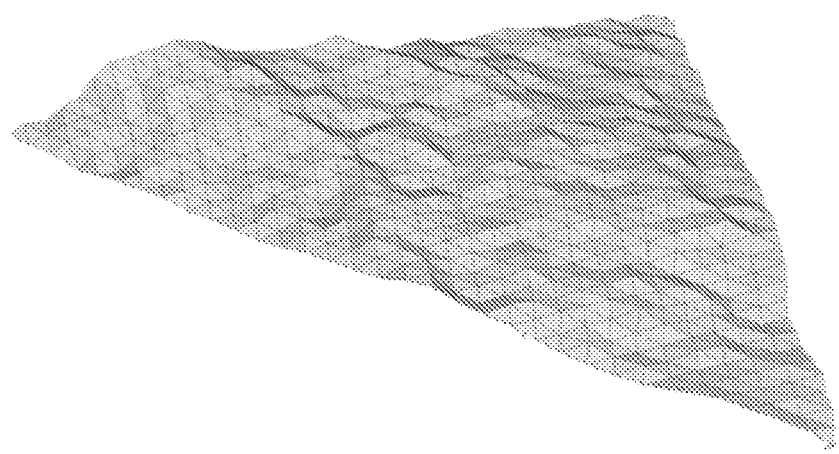
Figure 46C:
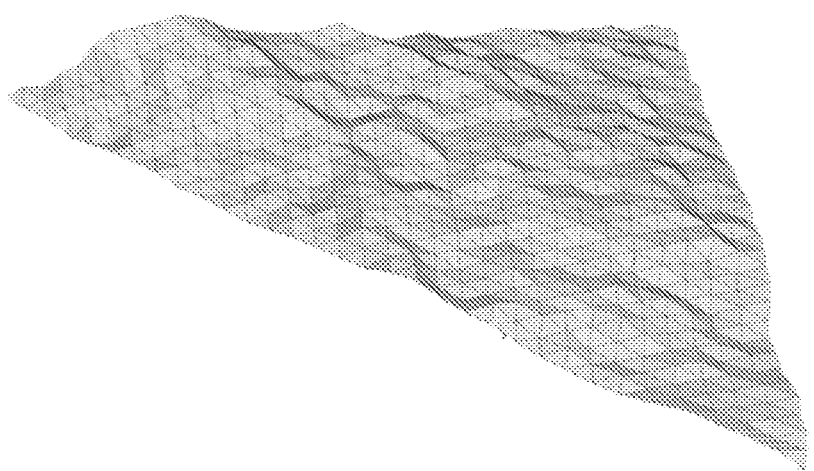
Figure 46D:
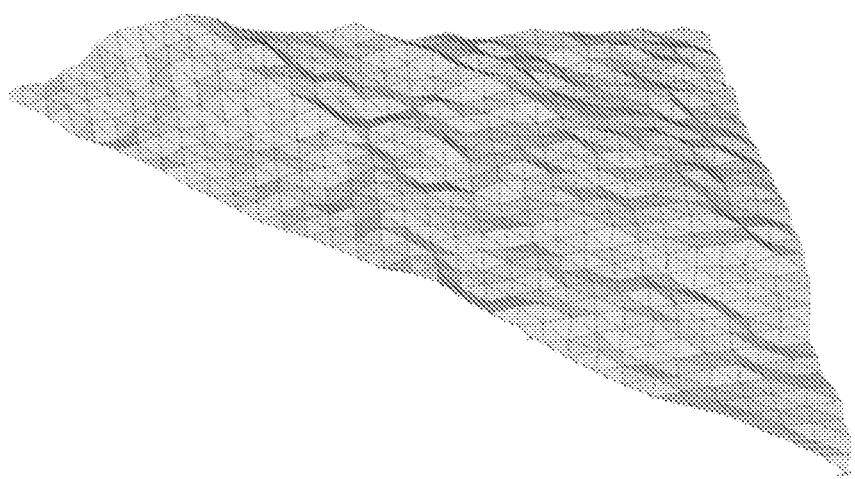
Figure 46E:
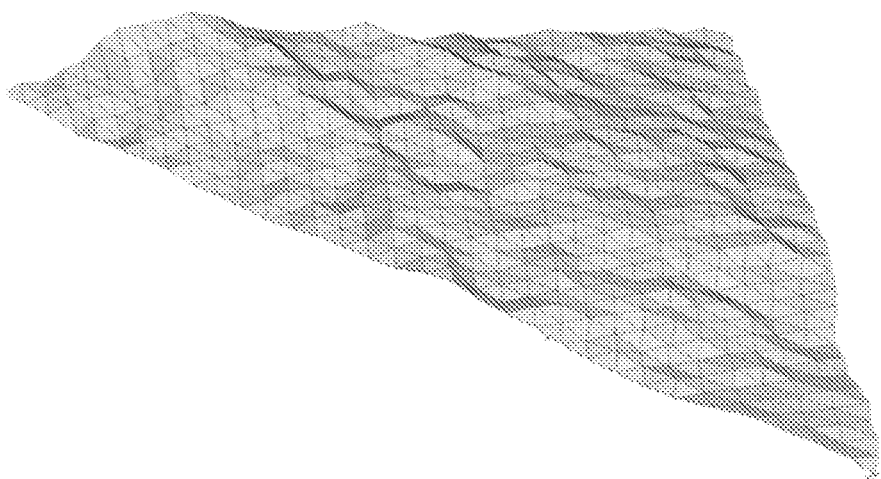

FIG. 44 shows an example memory layout of an uncompressed displacement block. This particular block encodes 45 UNORM11 displacement amounts, one for each microvertex of an 8×8 sub triangle.

FIG. 45 shows example pseudo-code illustrating an algorithm the hardware generation pipe uses to compute the discrete barycentrics for a given microtriangle group.

FIG. 46 shows an example high level motion blur structure. In an example embodiment, a single complet can point to multiple keys of multiple blocks with a limit of up to 127 keys per complet. The complet lineStride mechanism is used to jump between different blocks.

FIGS. 46A-46E are together a flip chart animation showing how the DMM primitive can be stretched and/or pitched without altering the displacement map, to produce certain animation effects.

FIGS. 47A-47D show an example flowchart of DMM primitive processing by ray and path tracing hardware.

FIGS. 48A-48G are together a flip chart animation that shows on a high level how the builder stores DMM primitive information into memory and how the TTU hardware reads and uses this stored DMM primitive information to create images.

Figure 5:
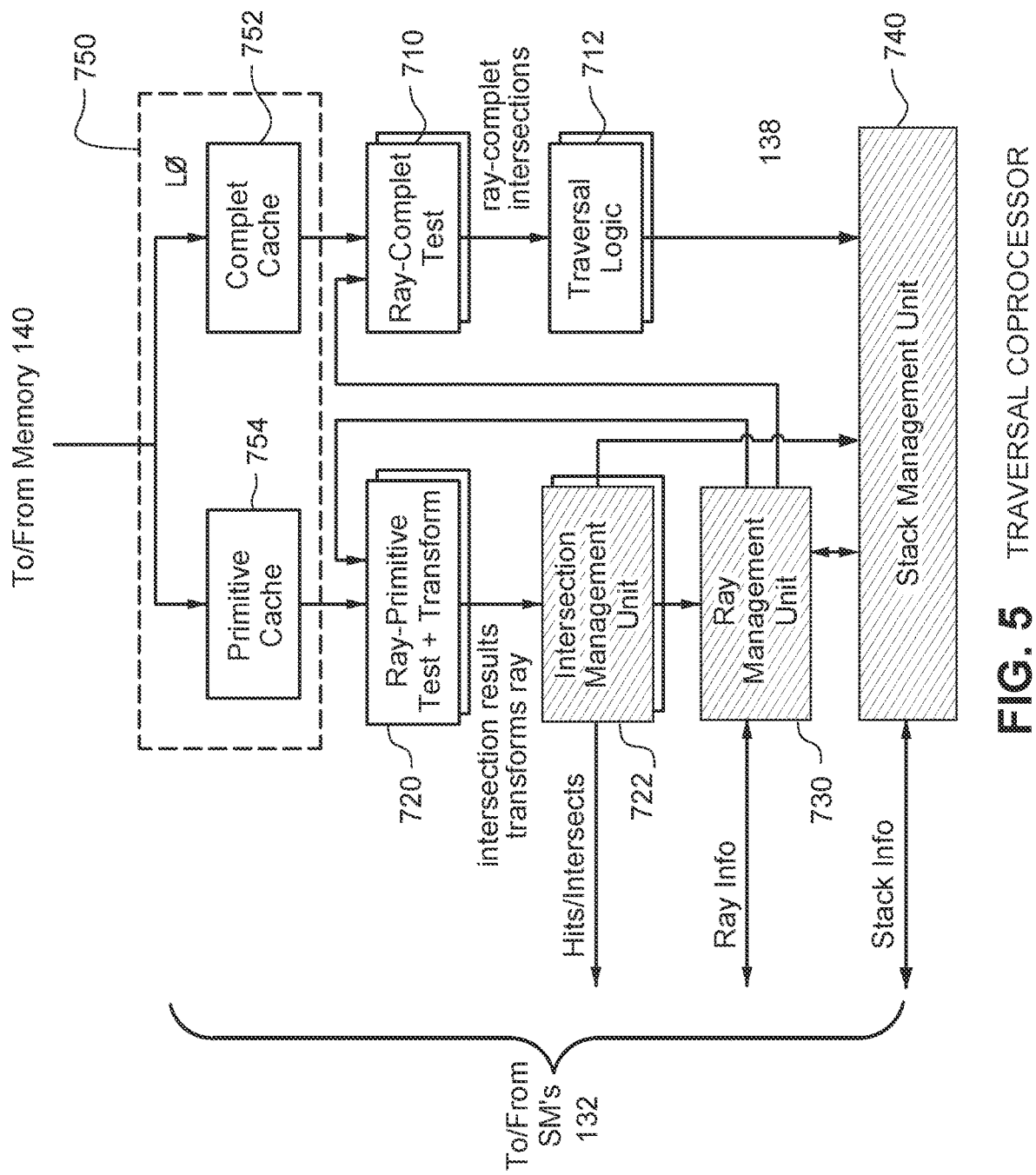
FIG. 5 is a block diagram of an example tree traversal coprocessor or "TTU".
Figure 49:
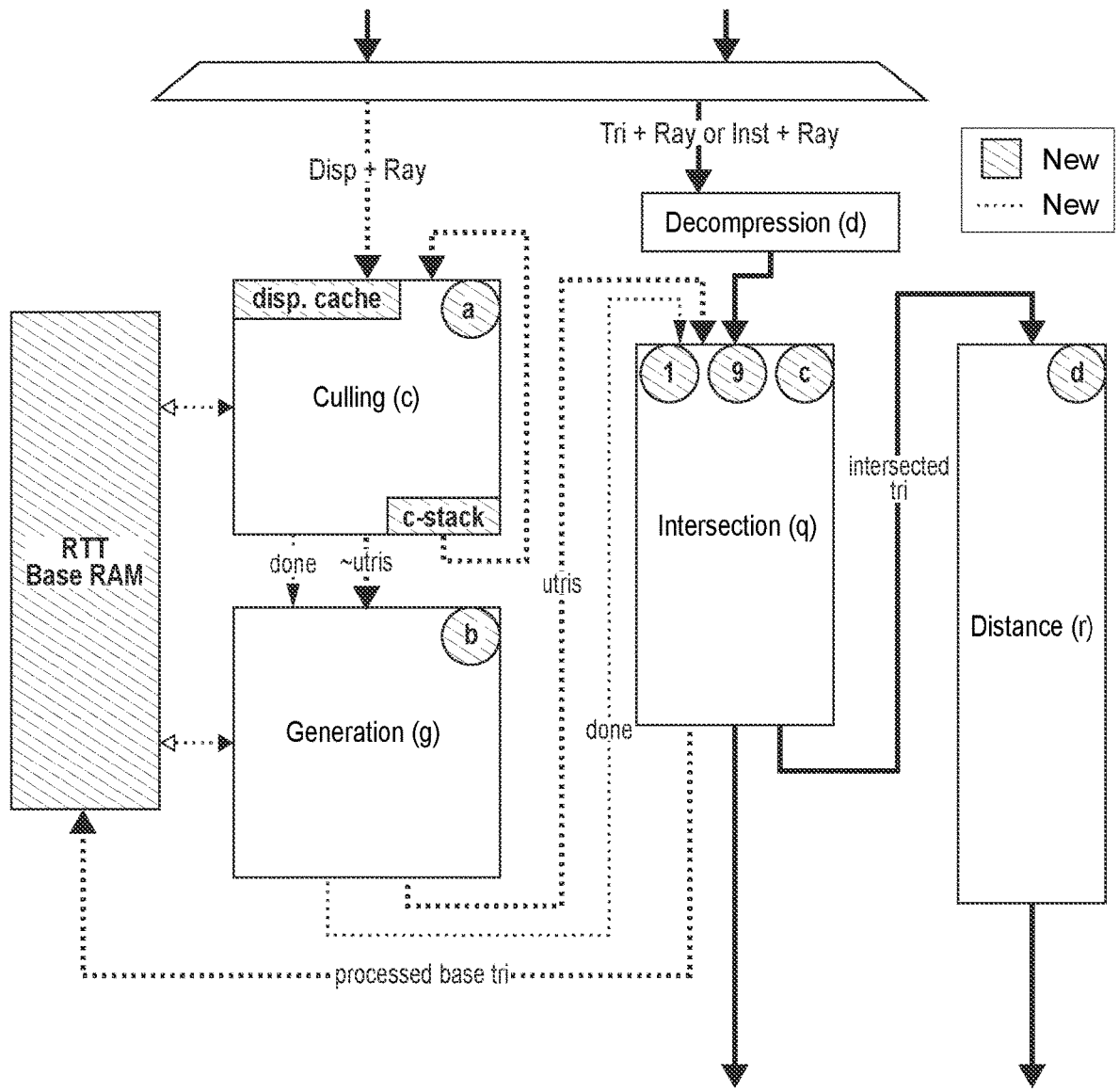

FIG. 49 is a block diagram of the TTU ray-triangle test and instance transform circuit block of the FIG. 5 TTU hardware showing new RAMs (shaded) and new datapaths (dotted lines) added to the RTT unit.

Figure 50:
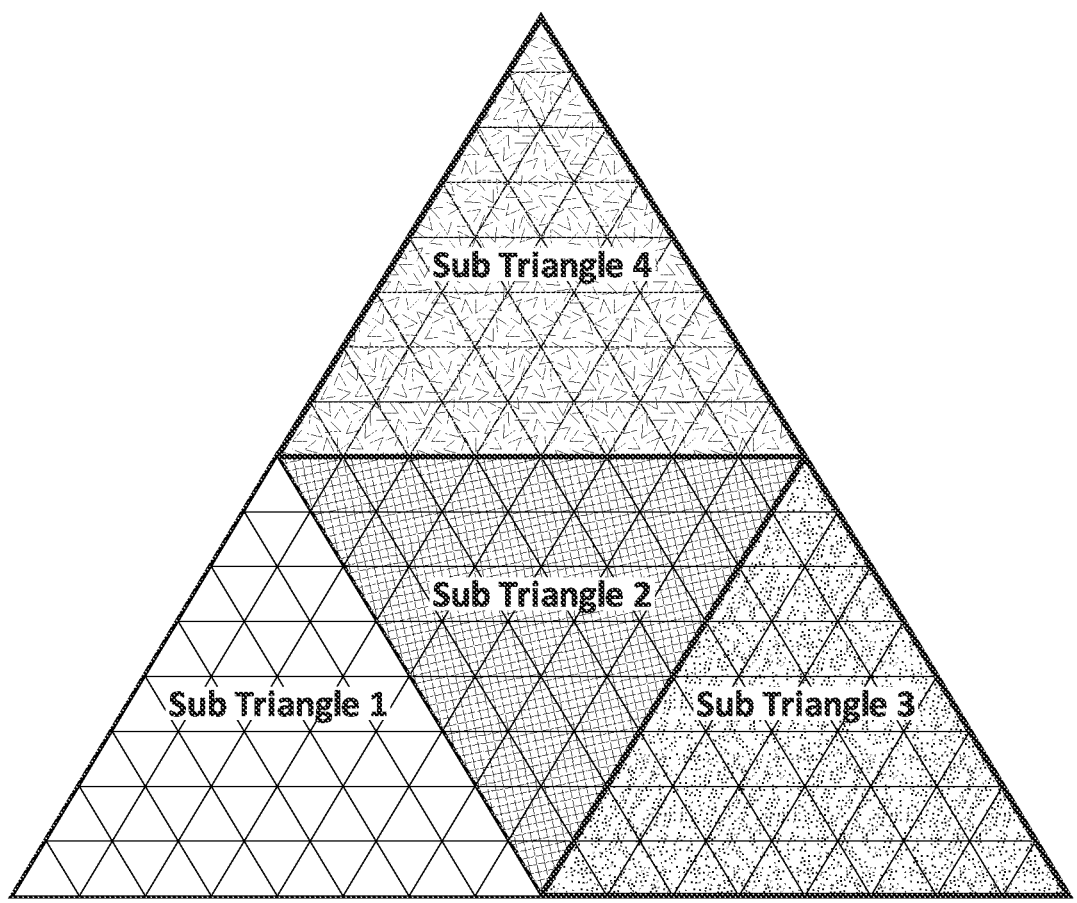

FIG. 50 shows an example resolution 4 base triangle composed of four sub triangles, each defining 64 microtriangles.

Figure 51:
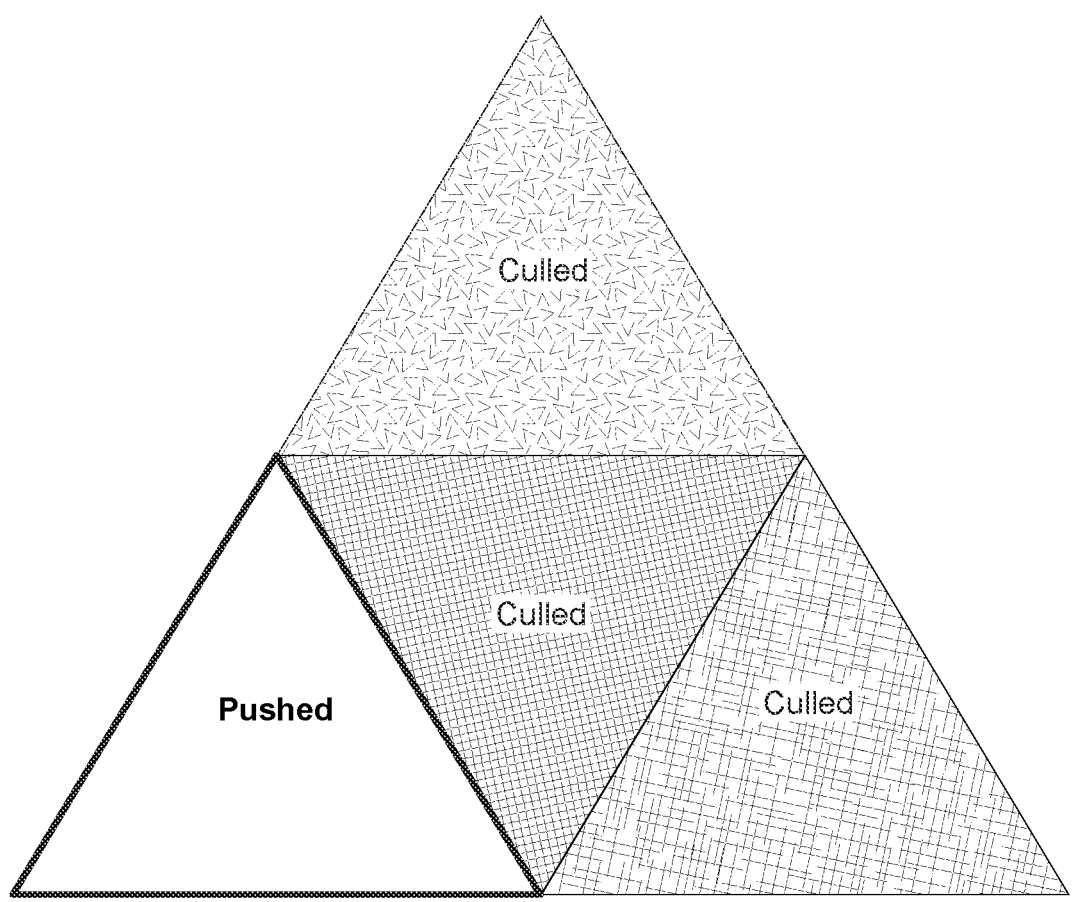

FIG. 51 shows an example of "bird index" culling where the target sub triangle index is 1. Each candidate triangle in the diagram corresponds to a resolution 3 sub triangle. During the first culling pipe pass, three of the four candidate triangles can be culled as they correspond to different sub triangles, and therefore do not need to be further subdivided.

FIG. 52 shows an example memory layout of a compressed displacement block. This block encodes the base anchor displacements in UNORM11, per micro-vertex corrections for each subdivision level in two's complement, and four unsigned shift variants per level. The bit widths for both corrections and shifts depend on the sub triangle resolution as well as the subdivision level.

FIG. 53 shows an example memory map of a single instance node. The lodBias in the extended header specifies the instance's LOD bias for all displaced micro-mesh primitives under the instance.

FIG. 54 shows an example memory map of a double instance node. The displacement base pointer is added to all displacement block memory requests during BLAS traversal.

FIG. 55 shows two new ray flags for displaced micromeshes: dm_f and dm_p. The two variants allow for different behavior for passing and failing ray-ops.

FIG. 56 shows an example memory map of the displaced sub triangle hit type. This hit type is returned when a ray with the "return to SM" ray flag set intersects a displaced-subtri leaf node.

FIG. 57 shows an example memory map of the displaced subtri stack entry. This stack entry is used to perform a ray-subtri intersection test.

FIG. 58 shows an example of a memory map of the microtri addr stack entry. This stack entry is used to perform a microtriangle fetch.

FIG. 59 shows an example memory map of the StackInit MicroTriFetch stack initializer. This stack initializer is used to perform a microtriangle fetch without the need for a stack restore.

FIG. 60 shows an example memory map of the displaced micro-mesh triangle block. This block describes the base triangle to be tested for intersection.

FIG. 61 shows an example memory map of the subtri array inside the DMM triangle block. This array contains the sizes and resolutions of all sub triangles in the triangle block, up to a maximum.

FIG. 62 shows an example memory map of the displaced micro-mesh header inside the DMM triangle block. The header contains metadata about the base triangle such as its resolution, alpha state, displacement block aperture, and desired edge decimation.

FIG. 63 shows an example pseudo-code showing how to generate a maximum triangle from an input base triangle block.

FIG. 64 shows an example pseudo-code showing how to generate a displacement block address for a target sub triangle in a given triangle block.

FIG. 65 shows an example pseudo-code showing how to generate a microtriangle start index for a target sub triangle in a given triangle block.

FIG. 66 shows an example pseudo-code showing how to initialize the culling stack.

FIG. 67 shows an example pseudo-code showing how to subdivide a culling stack entry to generate four new candidate triangles. Note that displacement amounts are initialized to 0 in this embodiment.

FIG. 68 shows an example pseudo-code showing how to get a micro-vertex displacement from a displacement block.

FIG. 69 shows an example pseudo-code showing how to compute the displacement amounts for the newly created micro-vertices during each subdivision pass.

FIG. 70 shows an example of microtriangle start index culling where the start index is 24. All microtriangles earlier in "bird curve" order (shaded) are culled. Micro-triangles at or after the start index (unshaded) are not culled.

FIG. 71 shows example pseudo-code showing logic to determine the final subdivision level in the culling pipe.

FIG. 72 shows example pseudo-code showing how the generation pipe displaces micro-vertices from the culling pipe.

FIG. 73 is an example memory map of the HitType_Triangle field. This field can be selectively read into the SM's registers via TTULD instructions. The returned barycentrics are in the hit microtriangle's frame of reference.

FIG. 74 is an example memory map of the HitTrianglePtr data for microtriangles. These fields provide some intersection metadata, including the full "bird index" of the hit microtriangle.

FIG. 75 shows an example memory layout of a typical compressed treelet (complet). This block contains spatial data about the complet, such as its corner position and size, as well as data for up to 12 children in one embodiment. Note the leafPtrLo field and mode fields used by displaced micro-mesh.

FIG. 76 shows an example mode field in the complet mode field. For displaced micro-meshes, a new leaf type (3) is added.

FIG. 77 shows example data fields specified for the first displaced micro-mesh child in a complet. An alpha bit and a sub triangle index are specified in one embodiment.

Figure 78:
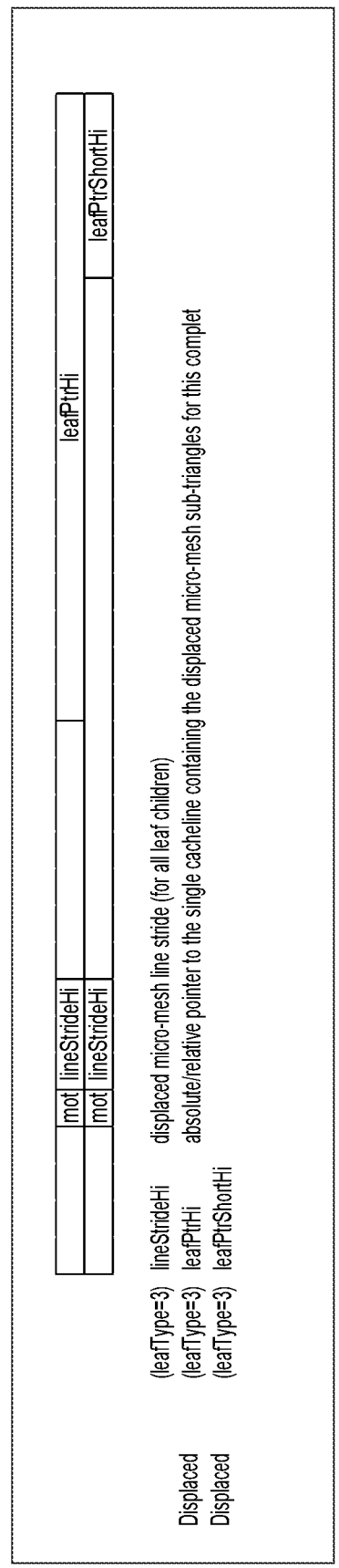

FIG. 78 shows example fields in the complet misc field for displaced micro-mesh leaves. A leaf pointer and a line stride high are specified in one embodiment. A "mot" flag specifies a motion enabled complet.

FIG. 79 shows example data fields specified for subsequent displaced micro-mesh children in a complet. An alpha flag, a nextLine flag, and a lineStrideLo are specified in one embodiment.

DETAILED DESCRIPTION OF NON-LIMITING EMBODIMENTS

The technology herein introduces a new primitive type—the Displaced Micro-mesh (DMM)—and associated builder and ray/path tracing hardware support—that enables high complexity geometry while minimizing the associated builder costs and preserving/supporting high efficiency ray and path tracing. Instead of explicitly encoding triangle vertices and indices for ray tracing, an embodiment uses a structured representation of geometry to implicitly encode vertices without the need for explicit vertex indexing. Basically, the technology herein in one embodiment employs a micro-mesh primitive that encodes a micro-mesh including microtriangles and their displacements. The encoded displacement information enables the system to interpolate microtriangle positions between minimum and maximum triangular planar surfaces also defined by the micro-mesh primitive to create a displacement mapped polygon micro-mesh that can be efficiently subdivided and tested in real time (e.g., 30 or 60 frames per second) by ray and path tracing hardware.

The resulting displaced micro-mesh primitive is a highly compressed representation of a large number of triangles that can be stored in a small amount of space. For example, with its structured representation of geometry, a displaced micro-mesh can achieve memory footprints down to as little as 0.5 bits per microtriangle (e.g., 2048 triangles per cache-line-sized storage block in one example implementation), while also reducing the number of triangles processed by the Builder by up to a factor of 1024× or more. Using instancing, the same displacement block may be referenced multiple times from within a single BLAS and/or from multiple BLASes, further contributing to the compactness of the representation. As a comparison, legacy triangle blocks can theoretically achieve a footprint of e.g., 64 bits per triangle (16 triangles per block), but are typically builder limited to e.g., 85 bits per triangle (12 triangles per block), and more often see averages around e.g., 128 bits per triangle (8 triangles per block). In some embodiments, displaced micro-meshes are included in the bounding volume hierarchy (BVH), but in other embodiments they may be stored separately from the AS.

By combining the compactness of micro-meshes with per-vertex displacements, displaced micro-meshes can encode complicated scenes with high compactness, while simultaneously supporting high efficiency ray tracing, level of detail, motion blur, and animation. By utilizing displaced micro-meshes in conjunction with visibility masks (see concurrently filed Visibility Patent), finely detailed shapes with interior cutouts, such as leaves, can be efficiently encoded and rendered. Users of the technology herein benefit from the visual complexity provided by an essentially arbitrarily-large number of triangles while reducing the number of triangles needed to be stored in the acceleration data structure ("AS") by the builder.

Order of Presentation

This specification begins by discussing an interactive real time computer graphics system including real time ray tracing "traversal coprocessor" or "TTU" hardware that can traverse and manipulate acceleration structures. The specification next describes a new displaced micro-mesh ("DMM") primitive and related concepts, and how to construct acceleration structures that support/provide the technology herein and can be encoded using wide complet formats and other example data structures used to implement the DMM primitive. The specification then discloses an example algorithm summary for intersecting, fetching, and testing microtriangles. The specification finally describes specific improvements and modifications to the ray and path tracing hardware described at the beginning of the specification to efficiently process the new displaced micro-mesh primitive in enable it to produce images of stunning complexity and detail.

For additional description of micro-mesh technology underlying the displaced micro-mesh primitive disclosed herein, please refer to U.S. patent application Ser. No. 17/946,235 filed concurrently herewith and entitled Micro-Meshes, A Structured Geometry For Computer Graphics, incorporated by reference herein for all purposes as if expressly set forth.

Example Hardware Based Interactive Real Time Graphics System

The presently disclosed non-limiting embodiments advantageously implement a hardware-based graphics processing unit that includes high performance processors such as one or more streaming processors or multiprocessors ("SMs") and one or more traversal co-processors or "tree traversal units" ("TTUs")—subunits of one or a group of streaming multiprocessor SMs of a 3D graphics processing pipeline. The following describes the overall structure and operation of such as system including a TTU 138 that accelerates certain processes supporting interactive ray tracing including ray-bounding volume intersection tests, ray-primitive intersection tests and ray "instance" transforms for real time ray and path tracing for image generation and other applications. See also e.g., U.S. Pat. Nos. 11,328,472; 11,302,056; 11,295,508; 11,282,261; 11,200,725; 11,189,075; 11,164,360; 11,157,414; 11,138,009; 11,113,790; 10,885,698; 10,867,429; 10,866,990; 10,825,232; 10,825,230; 10,810,785; 10,740,952; 10,580,196; 10,242,485; 10,235,338; 10,032,289; 10,025,879; 9,582,607; 9,569,559; US20160070820; US20160070767; https://www.nvidia.com/en-us/geforce/rtx/.

Figure 1:
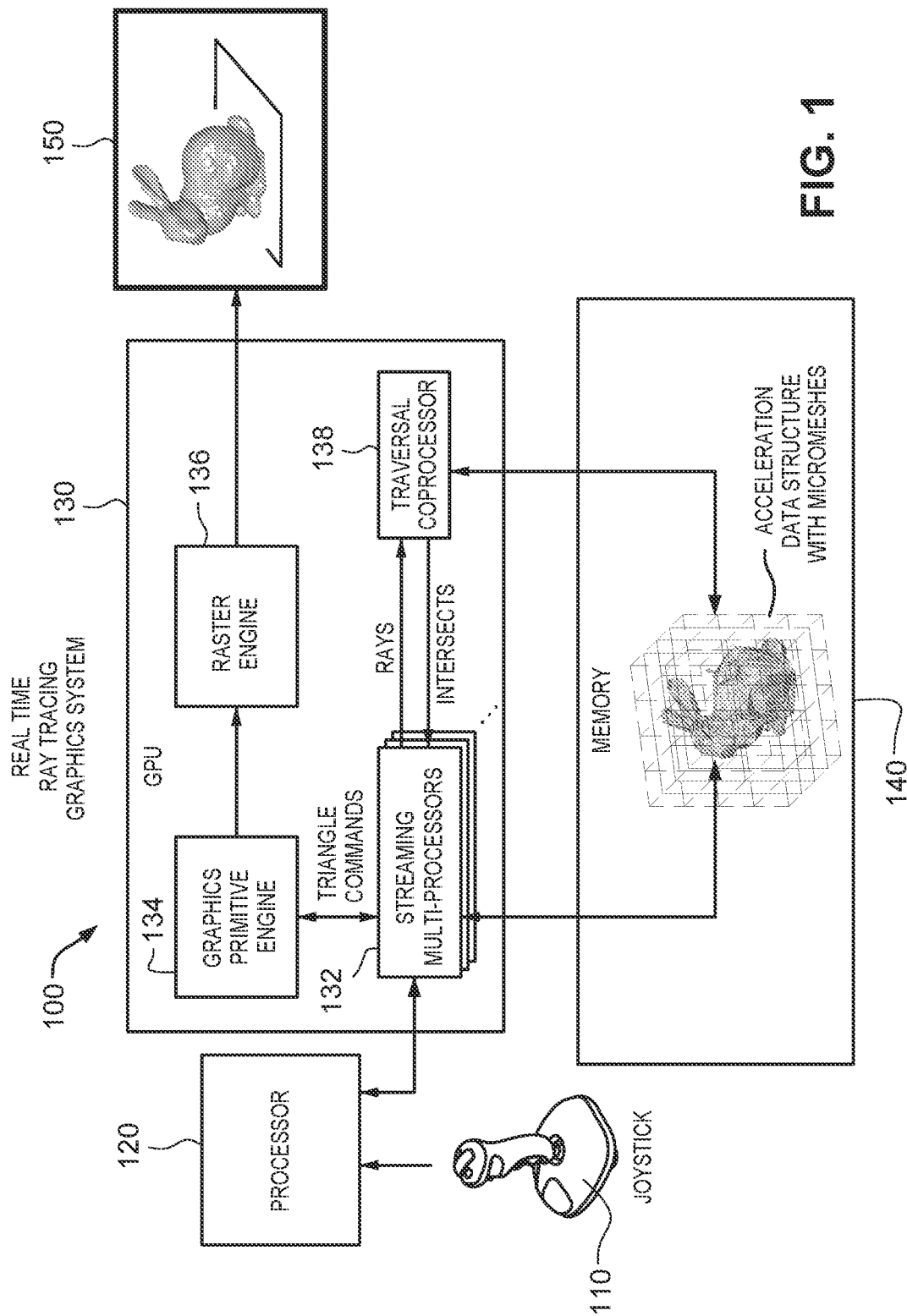
FIG. 1 is a block diagram of an interactive graphics system.

FIG. 1 illustrates an example interactive real time ray and/or path tracing graphics system 100 for generating images using three dimensional (3D) data of a scene or object(s). System 100 includes an input device 110, a processor(s) 120, a graphics processing unit(s) (GPU(s)) 130, memory 140, and a display(s) 150. The system shown in FIG. 1 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. The processor 120 may for example coordinate the operation by the processors 132 within the GPU 130 to execute one or more shaders including for example mesh shaders. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Images generated applying one or more of the techniques disclosed herein may be displayed on a monitor, via goggles, on a heads up display, through virtual or augmented reality glasses, on a handheld display, or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device via a wired or wireless connection. Such streaming allows, for example, heads up displays, augmented or virtual reality displace, metaverse displays, video games or other applications, which render images, to be executed on a server or in a data center and the rendered images to be transmitted and displayed on one or more user devices (such as a computer, goggles, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Furthermore, images generated applying one or more of the techniques disclosed herein may be used to display or convey information about a virtual environment such as the metaverse, Omniverse, or a digital twin of a real environment. Furthermore, Images generated applying one or more of the techniques disclosed herein may be used to display or convey information on a variety of devices including a personal computer (e.g., a laptop), an Internet of Things (IoT) device, a handheld device (e.g., smartphone), a vehicle, a robot, or any device that includes a display.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions or billions of graphics primitives (polygons) per second in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or processors including but not limited to "streaming multiprocessors" (SMs) 132 running in parallel.

In one example embodiment, the GPU 130 includes a plurality of programmable high performance processors that can be referred to as "streaming multiprocessors" ("SMs") or other processors 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory). A variety of software based programmable shaders such as task shaders, mesh generators, mesh shaders, tessellation based shaders, and geometry shaders may be used to support such rasterization.

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

To enable the GPU 130 to perform ray tracing in real time in an efficient manner, the GPU provides one or more "TTUs" 138 coupled to one or more SMs 132. The TTU 138 includes hardware components configured to perform (or accelerate) operations commonly utilized in ray tracing algorithms. A goal of the TTU 138 is to accelerate operations used in ray tracing to such an extent that it brings the power of ray tracing to real-time graphics application (e.g., games), enabling high-quality shadows, reflections, and global illumination. Results produced by the TTU 138 may be used together with or as an alternative to other graphics related operations performed in the GPU 130.

More specifically, SMs 132 and the TTU 138 may cooperate to cast rays into a 3D model and determine whether and where the rays intersect the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with TTU 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 138 is capable of accelerating in hardware certain of the more computationally-intensive aspects of that process.

Given an appropriately constructed AS, the TTU 138 performs a tree search where each node in the tree visited by the ray has a bounding volume for each descendent branch or leaf, and the ray only visits the descendent branches or leaves whose corresponding bound volume it intersects. In this way, TTU 138 explicitly tests only a small number of primitives for intersection, namely those that reside in leaf nodes intersected by the ray. In the example non-limiting embodiments, the TTU 138 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 138 does all of this in MIMD fashion, meaning that rays are handled independently once inside the TTU.

In the example non-limiting embodiments, the TTU 138 operates as a servant (coprocessor) to the SMs (streaming multiprocessors) 132. In other words, the TTU 138 in example non-limiting embodiments does not operate independently, but instead follows the commands of the SMs 132 to perform certain computationally-intensive ray tracing related tasks much more efficiently than the SMs 132 could perform themselves. In other embodiments or architectures, the TTU 138 could have more or less autonomy.

In the examples shown, the TTU 138 receives commands via SM 132 instructions and writes results back to an SM register file. For many common use cases (e.g., opaque triangles with at most one level of instancing), the TTU 138 can service the ray tracing query without further interaction with the SM 132. More complicated queries (e.g., involving alpha-tested triangles, primitives other than triangles, or multiple levels of instancing) may require multiple round trips (although the technology herein reduces the need for such "round trips" for certain kinds of geometry by providing the TTU 138 with enhanced capabilities to autonomously perform ray-bounding-volume intersection testing for certain kinds of alpha visibility without the need to ask the calling SM for help). In addition to tracing rays, the TTU 138 is capable of performing more general spatial queries such as where an AABB or the extruded volume between two AABBs (which we call a "beam") takes the place of the ray. Thus, while the TTU 138 is especially adapted to accelerate ray tracing related tasks, it can also be used to perform tasks other than ray tracing including but not limited to traversal and reporting on the structure of the AS.

The TTU 138 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the AS BVH. The ray follows the child pointers for the bounding volumes the ray hits to other nodes until the leaves or terminal nodes (volumes) of the AS BVH are reached.

Once the TTU 138 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the geometry that primitive defines). Such testing can include, as described above, testing a ray against triangles or other polygons. The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, developer.nvidia.com/rtx/raytracing/vkray.

As mentioned above, the TTU 138 also accelerates the transform of each ray from world space into object space to obtain finer and finer bounding box encapsulations of the primitives and reduce the duplication of those primitives across the scene. Objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Example Image Generation Pipeline Including Ray Tracing

Figure 2:
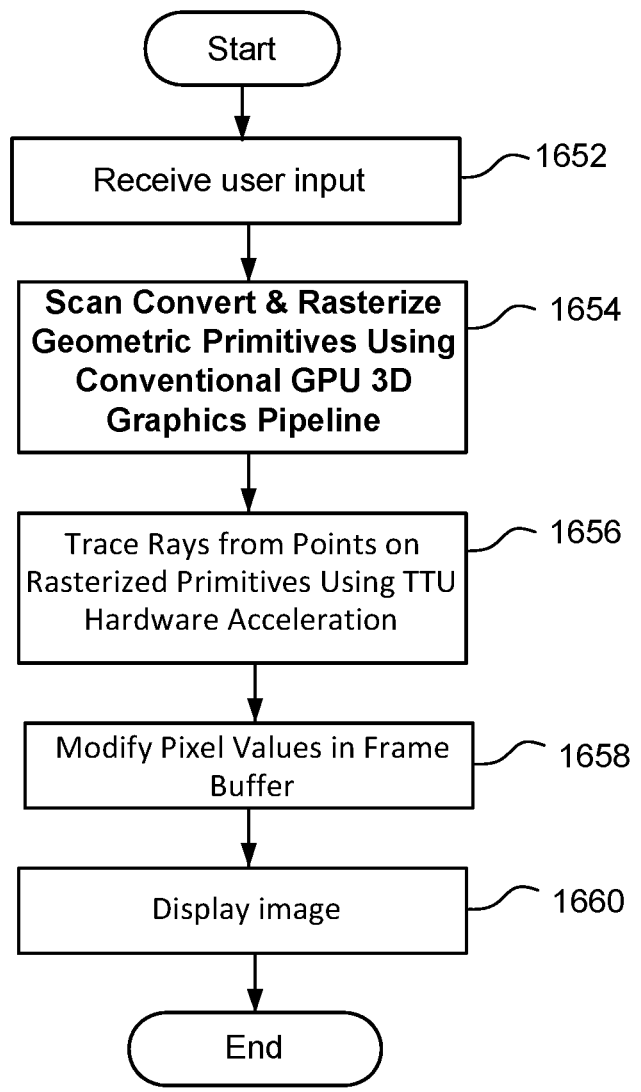
FIG. 2 shows an example process to generate an image using the FIG. 1 system.

FIG. 2 illustrates an example flowchart for processing primitives to provide image pixel values of an image, in accordance with an embodiment. As FIG. 2 shows, an image of a 3D model may be generated in response to receiving a user input (Step 1652). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1654). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1656, one or more rays may be traced from one or more points on the rasterized or other primitives using TTU hardware acceleration. The rays may be traced in accordance with the one or more ray-tracing capabilities disclosed in this application. Based on the results of the ray tracing, the pixel values stored in the buffer may be written to and/or modified (Step 1658). Modifying the pixel values may in some applications for example improve the image quality by, for example, applying more realistic reflections and/or shadows and/or levels of detail. In other embodiments, ray and path tracing is used to generate the entire and/or large portions of the image, and the rasterizing process is used for more limited purposes such as generating moving characters within a path traced background environment. An image is displayed (Step 1660) using the modified pixel values stored in the buffer.

Example Ray Tracing Processes

Figure 3:
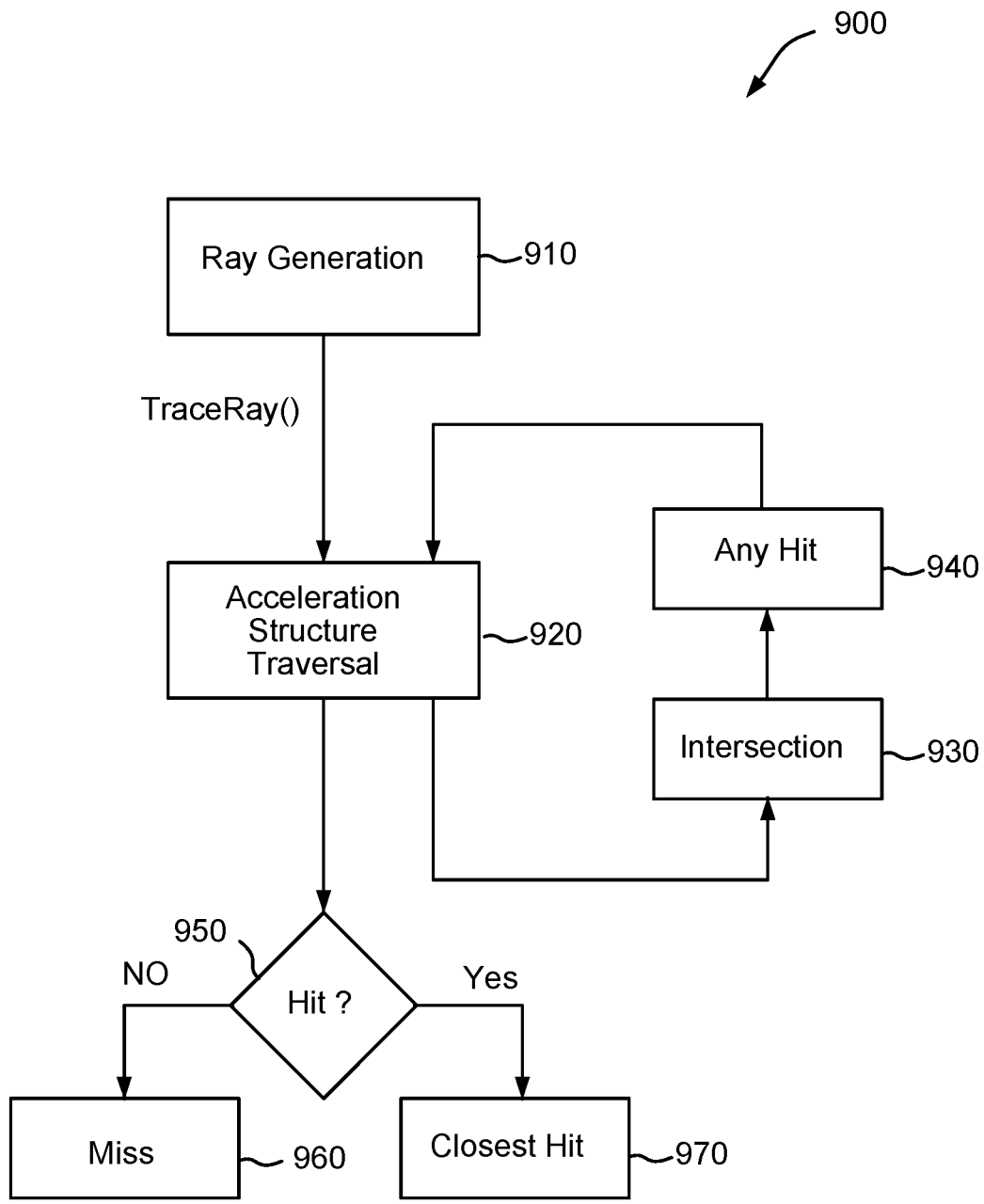
FIG. 3 is a flowchart of an example ray tracing shading pipeline.

FIG. 3 shows an exemplary ray tracing shading pipeline 900 that may be performed by SM 132 and accelerated by TTU 138. The ray tracing shading pipeline 900 starts by an SM 132 invoking ray generation 910 and issuing a corresponding ray tracing request to the TTU 138. The ray tracing request identifies a single ray cast into the scene and asks the TTU 138 to search for intersections with an acceleration data structure the SM 132 also specifies. The TTU 138 traverses (FIG. 3 block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 138 ray-primitive test block 720 performs an intersection 930 process to determine whether the ray intersects the primitives. The TTU 138 returns intersection information to the SM 132, which may perform an "any hit" shading operation 940 in response to the intersection determination. For example, the SM 132 may perform (or have other hardware perform) a texture or other lookup for an intersected primitive and decide based on the appropriate texel's value how to shade a pixel visualizing the ray. Or as explained below, in some cases the TTU 138 can perform such a lookup based on a visualization mask without having to bother the SM 132. The SM 132 keeps track of such results since the TTU 138 may return multiple intersections with different geometry in the scene in arbitrary order.

Figure 4:
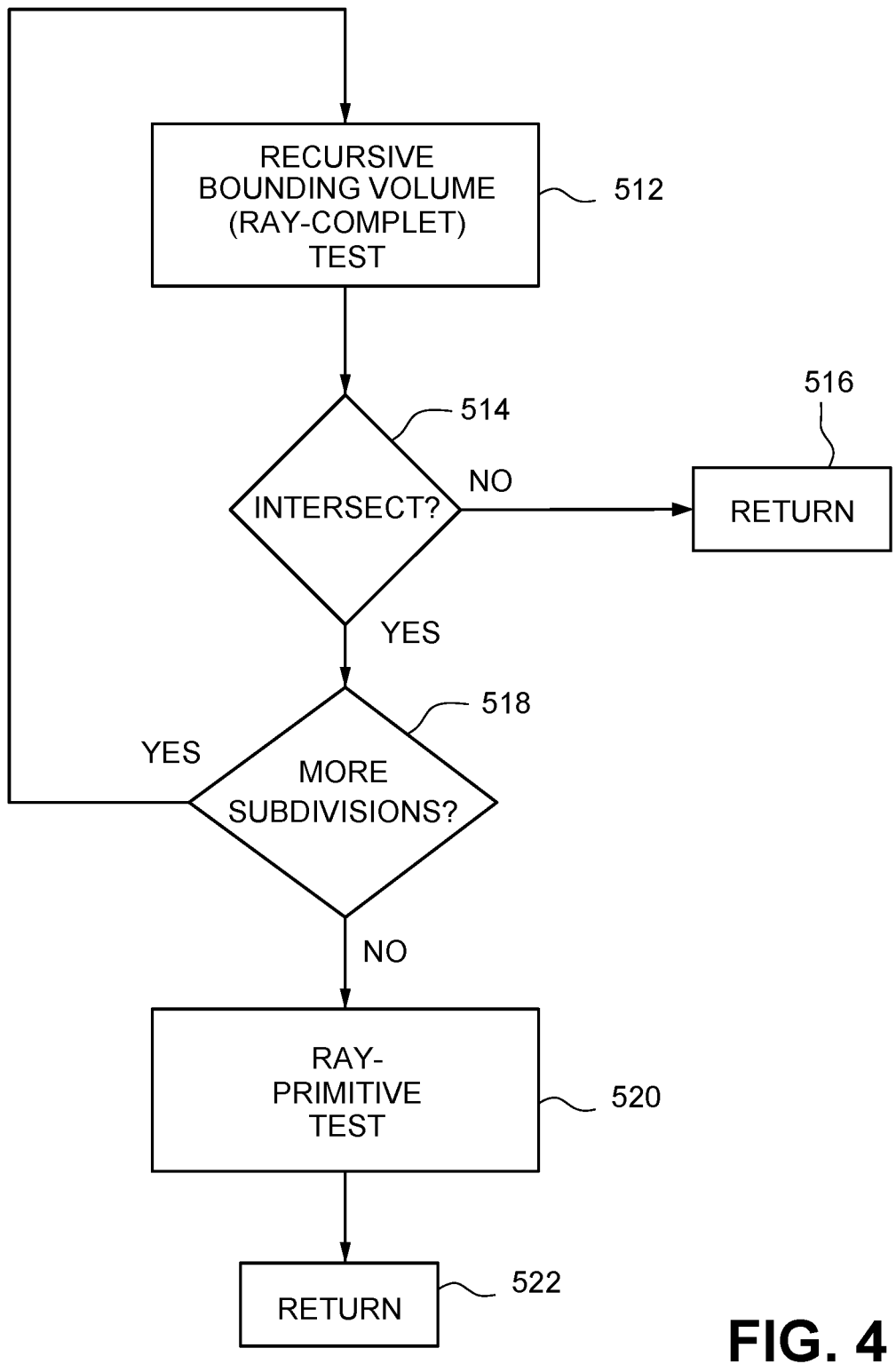
FIG. 4 is a flowchart of an example recursive bounding volume and primitive intersection test.

FIG. 4 is a flowchart summarizing example ray tracing operations the TTU 138 performs as described above in cooperation with SM(s) 132. The FIG. 4 flowchart and more detailed operations described below are performed by TTU 138 in cooperation with its interaction with an SM 132. The TTU 138 may thus receive the identification of a ray from the SM 132 and traversal state enumerating one or more nodes in one or more ASes that the ray must traverse. The TTU 138 determines which bounding volumes of a BVH data structure the ray intersects (the "ray-complet" test 512). The TTU 138 can also subsequently determine whether the ray intersects one or more primitives in the intersected bounding volumes and which triangles are intersected (the "ray-primitive test" 520)—or the SM 132 can perform this test in software if the TTU cannot for some reason perform itself (e.g., in the case of procedural primitives). In example non-limiting embodiments, complets specify root or interior nodes (i.e., volumes) of the bounding volume hierarchy with children that are other complets or leaf nodes of a single type per complet. In example embodiments, some of these complets at leaf nodes correspond to or represent DMM primitives, while others represent triangle primitives, while still others represent other types of primitives.

First, the TTU 138 inspects the traversal state of the ray. If a stack the TTU 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). If the bounding box test determines that the bounding volume is not intersected by the ray ("No" in step 514), then there is no need to perform any further testing for visualization and the TTU 138 can return this result to the requesting SM 132. This is because if a ray misses a bounding volume, then the ray will miss all other smaller bounding volumes inside the bounding volume being tested and any primitives that bounding volume contains.

If the bounding box test performed by the TTU 138 reveals that the bounding volume is intersected by the ray ("Yes" in Step 514), then the TTU determines if the bounding volume can be subdivided into smaller bounding volumes (step 518). In one example embodiment, the TTU 138 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by TTU 138 recursively applying steps 512-518.

Once the TTU 138 determines that the bounding volumes intersected by the ray are leaf nodes ("No" in step 518), the TTU 138 and/or SM 132 performs a primitive (e.g., triangle) intersection test 520 to determine whether the ray intersects primitives in the intersected bounding volumes and which primitives the ray intersects. The TTU 138 thus performs a depth-first traversal of intersected descendent branch nodes until leaf nodes are reached. The TTU 138 processes the leaf nodes. If the leaf nodes are primitive ranges, the TTU 138 or the SM 132 tests them against the ray. If the leaf nodes are instance nodes, the TTU 138 or the SM 132 applies the instance transform. If the leaf nodes are item ranges, the TTU 138 returns them to the requesting SM 132. In the example non-limiting embodiments, the SM 132 can command the TTU 138 to perform different kinds of ray-primitive intersection tests and report different results depending on the operations coming from an application (or an software stack the application is running on) and relayed by the SM to the TTU. For example, the SM 132 can command the TTU 138 to report the nearest visible primitive revealed by the intersection test, or to report all primitives the ray intersects irrespective of whether they are the nearest visible primitive. The SM 132 can use these different results for different kinds of visualization. Or the SM 132 can perform the ray-primitive intersection test itself once the TTU 138 has reported the ray-complet test results. Once the TTU 138 is done processing the leaf nodes, there may be other branch nodes (pushed earlier onto the ray's stack) to test.

Example Non-Limiting TTU 138 Hardware Implementation

FIG. 5 shows an example simplified block diagram of TTU 138 including hardware configured to perform accelerated traversal operations as described above. In some embodiments, the TTU 138 may perform a depth-first traversal of a bounding volume hierarchy using a short stack traversal with intersection testing of supported leaf node triangles and mid-traversal return of alpha triangles and unsupported leaf node triangles (items). The TTU 138 includes dedicated hardware to determine whether a ray intersects bounding volumes and dedicated hardware to determine whether a ray intersects triangles of the tree data structure. As explained below, the shaded portion(s) of TTU 138 can include the more detailed structure shown in FIG. 49, and perform operations shown in FIGS. 47A-47D in the various pseudocode presented herein, and otherwise described below, based on the various data structures also presented and discussed herein, to provide hardware functionality supporting and implementing displaced micromesh primitives.

TTU 138 includes an intersection management block 722, a ray management block 730 and a stack management block 740. Each of these blocks (and all of the other blocks in FIG. 5) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of an AS BVH. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 138. The results of the ray-complet test block 710 informs the traversal logic 712 as to whether further recursive traversals are needed. The stack management block 740 maintains stacks to keep track of state information as the traversal logic 712 traverses from one level of the AS to another, with the stack management block 740 pushing items onto the stack as the traversal logic traverses deeper into the AS and popping items from the stack as the traversal logic traverses upwards in the AS. The stack management block 740 is able to provide state information (e.g., intermediate or final results) to the requesting SM 132 at any time the SM requests.

The intersection management block 722 manages information about and performs operations concerning intersections between rays and triangles, using instance transforms as needed. The ray-triangle test block 720 retrieves information concerning geometry from memory 140 on an as-needed basis via an L0 triangle cache 754 that is part of TTU 138, and tests whether rays intersect geometry (including the DMM primitives described herein). As discussed below, the ray-triangle test block 720 has been enhanced in example embodiments to subdivide geometry represented by DMM primitives, apply displacements to resulting microtriangle microvertices, test resulting displaced microtriangles for ray intersection, and take appropriate action such as reporting intersection to the SM via the SMU or continue depending on a visibility mask value associated with the microtriangles. The intersection management block 722 is informed by results of intersection tests the ray-triangle test and transform block 720 performs. Thus, the ray-triangle test and transform block 720 provides intersection results to the intersection management block 722, which generally reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 138 including one or more ray-complet test blocks 710 and one or more traversal logic blocks 712. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 138 identifies which bounding volumes are intersected by the ray. Bounding volumes intersected by the ray need to be further processed to determine if the triangles associated with the intersected bounding volumes are intersected. The intersections for the triangles are determined in the ray-triangle test path including one or more ray-triangle test and transform blocks 720 and one or more intersection management blocks 722.

The TTU 138 receives queries from one or more SMs 132 to perform tree traversal operations. The query may request whether a ray intersects bounding volumes and/or triangles in an AS data structure. The query may identify a ray (e.g., origin, direction, and length of the ray) and an AS data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-triangle test.

The TTU 138 may request the AS data structure identified in the query to be retrieved from memory outside of the TTU 138. Retrieved portions of the AS data structure may be cached in the level-zero (L0) cache 750 within the TTU 138 so the information is available for other time-coherent TTU operations, thereby reducing memory 140 accesses. Portions of the AS data structure needed for the ray-complet test may be stored in a L0 complet cache 752 and portions of the AS data structure needed for the ray-triangle test may be stored in an L0 triangle cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 138 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the AS). These steps are repeated recursively until intersected leaf nodes of the AS are encountered The ray-complet test block 710 may provide ray-complet intersections to the traversal logic 712. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-triangle test and transform block 720. The ray-complet test block 710 may repeat the traversal on internal nodes identified in the stack to determine all leaf nodes in the AS that the ray intersects. The precise tests the ray-complet test block 710 performs will in the example non-limiting embodiment be determined by mode bits, ray operations (see below) and culling of hits, and the TTU 138 may return intermediate as well as final results to the SM 132.

Ray-Triangle Intersection Testing

The TTU 138 also has the ability to accelerate intersection tests that determine whether a ray intersects particular geometry or triangles enclosed by bounding volumes. For some cases in which the geometry is sufficiently complex (e.g., defined by procedural primitives such as curves or other abstract constructs as opposed to e.g., vertices) that TTU 138 in some embodiments may not be able to help with the ray-triangle intersection testing. In such cases, the TTU 138 simply reports the ray-complet intersection test results to the SM 132, and the SM 132 performs the ray-triangle intersection test itself. In other cases (e.g., triangles), the TTU 138 can perform the ray-triangle intersection test itself, thereby further increasing performance of the overall ray tracing process. For sake of completeness, the following describes how the TTU 138 can perform or accelerate the ray-triangle intersection testing.

As explained above, leaf nodes (found to be intersected by the ray identify (enclose) triangles that may or may not be intersected by the ray. One option is for the TTU 138 to provide e.g., a range of geometry identified in the intersected leaf nodes to the SM 132 for further processing. For example, the SM 132 may itself determine whether the identified triangles are intersected by the ray based on the information the TTU 138 provides as a result of the TTU traversing the AS. To offload this processing from the SM 132 and thereby accelerate it using the hardware of the TTU 138, the stack management block 740 may issue requests for the ray-triangle and transform block 720 to perform a ray-triangle test for the triangles within intersected leaf nodes the TTU's ray-complet test block 710 identified. In some embodiments, the SM 132 may issue a request for the ray-triangle test to test a specific range of triangles and transform block 720 irrespective of how that geometry range was identified.

After making sure the triangle data needed for a requested ray-triangle test is available in the triangle cache 754, the ray-triangle and transform block 720 may determine triangles that are intersected by the ray using the ray information stored in the ray management block 730. The ray-triangle test block 720 provides the identification of triangles determined to be intersected by the ray to the intersection management block 722.

The intersection management block 722 can return the results of the ray-triangle test to the SM 132. The results of the ray-triangle test may include identifiers of intersected triangles, the distance of intersections from the ray origin and other information concerning properties of the intersected triangles. In some embodiments, the intersection management block 722 may modify an existing ray-triangle test (e.g., by modifying the length of the ray) based on previous intersection results from the ray-triangle and transform block 720.

The intersection management block 722 may also keep track of different types of triangles. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the triangle to be trimmed based on the shape of a texture mapped onto the triangle—for example, cutting a leaf shape out of a triangle. (Note that in raster graphics, transparency is often called "alpha blending" and trimming is called "alpha test"). In other embodiments, the TTU 138 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 138 because the area of the opaque triangle blocks the ray from going past the surface of the triangle. For transparent triangles, ray intersections cannot in some embodiments be fully determined in the TTU 138 because TTU 138 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-triangle and transform block 720 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 138 (e.g., shortening the ray if the ray is blocked by the texture) based on this determination. In one embodiment, the TTU 138 may be configured to return all triangles determined to intersect the ray to the SM 132 for further processing. Because returning every triangle intersection to the SM 132 for further processing is costly in terms of interface and thread synchronization, the TTU 138 may be configured to hide triangles which are intersected but are provably capable of being hidden without a functional impact on the resulting scene. For example, because the TTU 138 is provided with triangle type information (e.g., whether a triangle is opaque or transparent), the TTU 138 may use the triangle type information to determine intersected triangles that are occluded along the ray by another intersecting opaque triangle and which thus need not be included in the results because they will not affect the visibility along the ray. If the TTU 138 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 138 and/or modify the query (e.g., shorten the ray if the ray is blocked by the texture) based on this determination.

As discussed above, the TTU 138 allows for quick traversal of an AS to determine which triangles (e.g., triangles used for generating a scene) in the data structure are intersected by a query data structure (e.g., a ray). For example, the TTU 138 may determine which triangles in the acceleration data structure are intersected by the ray and return the results to the SM 132. However, returning to the SM 132 a result on every triangle intersection is costly in terms of interface and thread synchronization. The TTU 138 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 138 disclosed in this application provides for some of the intersections to be discarded within the TTU 138 without SM 132 intervention so that less intersections are returned to the SM 132 and the SM 132 does not have to inspect all intersected triangles or item ranges.

Example Acceleration Structure

Figure 6:
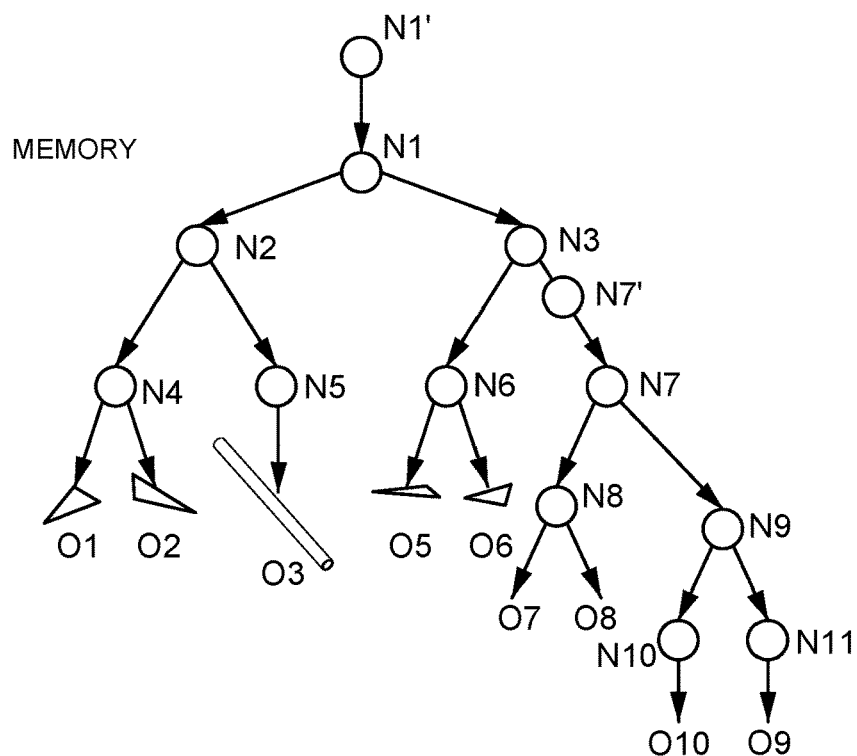
FIG. 6 shows an example acceleration data structure ("AS")

FIG. 6 shows an example of an acceleration structure (AS) "tree" that the ray tracer described above uses as input data. Traditionally, a hardware ray tracer does not subdivide objects itself but rather simply accesses a prestored AS constructed by a builder that contains results of a subdivision process the builder has already performed, including designation of leaf nodes, non-leaf nodes, instance nodes, etc., along with bounding volumes the TTU can use to perform ray-complet tests as described above. The AS tree shown in FIG. 6 can comprise a complete scene or some part of a scene, which the TTU traverses for enhancing visualization (e.g., by adding realistic shadow, reflections, etc., to an image created by a rasterizer from the same geometry stored in the AS) or to generate an initial image using path tracing. The tree data structure may be stored in memory and retrieved on demand based on queries.

In this particular example, the AS tree is only three to six levels deep so that volumes N4, N5, N6, N8, N10 and N11 constitute "leaf nodes"—that is, nodes in the tree that have no child nodes. FIG. 6 shows that leaf node bounding volumes N4, N6, and N8 each contains two triangles of the geometry in the scene. For example, volumetric subdivision N4 contains triangles O1 & O2; volumetric subdivision N6 contains triangles O5 & O6; and volumetric subdivision N8 contains triangles O7 & O8.

The tree structure shown in FIG. 6 represents these leaf nodes N4, N5, N6, and N7 by associating them with the appropriate ones of primitive O1-O8 of the scene geometry. To access this scene geometry, the TTU 138 traverses the tree data structure of FIG. 6 down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

Figure 7:
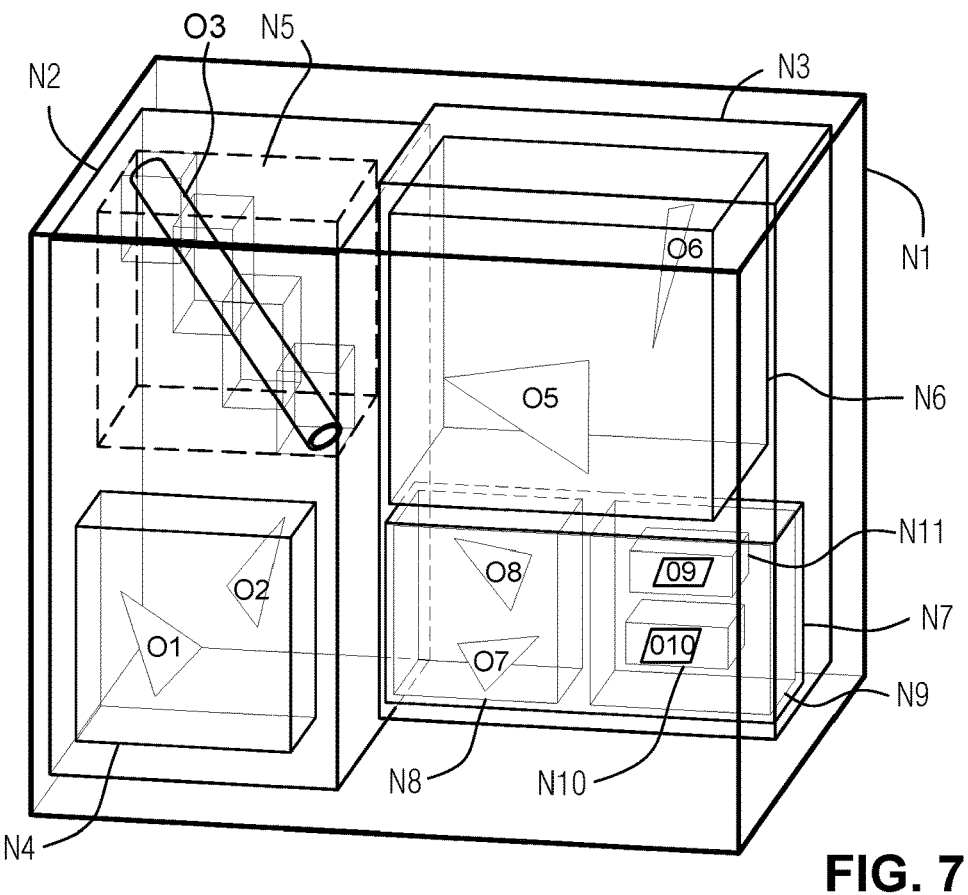
FIG. 7 shows an example bounding volume hierarchy ("BVH")

According to some embodiments, the AS of FIG. 6 can comprise or represent a bounding volume hierarchy (BVH) that includes or references bounding volumes for each node in the tree. FIG. 7 shows a recursively-subdivided bounding volume of a 3D scene corresponding to the FIG. 6 tree data structure that may be accessed by the ray tracer and used for hardware-accelerated operations. The tracing hardware in one embodiment uses these bounding volumes to perform intersection tests with input rays as the tracing hardware traverses the tree—enabling the tracing hardware to quickly cull large portions of the tree that do not intersect the input ray without having to test any geometry.

The FIG. 6 tree data AS structure discussed above may thus include a plurality of nodes arranged in a hierarchy with the root nodes N1 of the tree structure correspond to bounding volume N1 enclosing all of the primitives O1-O8 of the FIG. 7 bounding volume hierarchy. The root node N1 may identify the vertices of the bounding volume N1 and children nodes of the root node.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

In FIG. 7, bounding volume N1 is subdivided into bounding volumes N2 and N3. Children nodes N2 and N3 of the tree structure of FIG. 6 correspond to and represent the bounding volumes N2 and N3 shown in FIG. 7. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 6 tree structure correspond to and represent the FIG. 7 bounding volumes N4, N5, N6, N8, N10 and N11 in space.

In this example, the subtree rooted at N7 may represent a set of bounding volumes in a BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume corresponding to nodes N1-N3, with the bounding volumes corresponding to nodes N7 etc. by defining the transformation from the coordinate space of N1-N3 (e.g., world space) to the coordinate space of N7 etc. (e.g., object space).

As mentioned above, the AS tree of FIG. 6 and AS BVH representation of FIG. 7 are simplified for purpose of illustration. Typical AS trees for moderately complex scenes may have a very large number of nodes representing millions of triangles. One can see that as the triangle count increases, the tree structure grows and grows. This would not at first seem to be a problem because the AS tree's hierarchy has broken down the complex scene into small pieces the TTU can process, and the TTU traverses the AS tree very methodically one node at a time. The old joke "How do you eat an elephant? One bite at a time" is somewhat apt.

How to Increase Geometric Complexity Without Bloating AS Size

But there is still a potential problem: the entire AS tree must be stored in memory and "bite sized chunks" of the tree must be read into the TTU's cache memories for the TTU to process them. As the AS tree size gets larger to accommodate more and more complex geometry, it not only takes more memory to store the store the tree, but it takes more time to write all of those "bite sized chunks" into the TTU's cache memory. Thus, as scenes increasingly add more geometric complexity, moving into the range of multi-billion or even trillions of triangles, two substantial bottlenecks become apparent. The storage capacity of the processor, such as a GPU, becomes a limiter. Scenes that exceed the GPU's memory capacity must stream in data from system memory or disk, significantly degrading performance.

Furthermore, as discussed above, the builder must build the AS tree so it is sitting in the memory and ready to be consumed by the TTU. While large parts of the AS tree are often constructed in advance of run time, the CPU/GPU may need to update or change parts of the tree dynamically to represent changing conditions such as moving blades of grass, ripples across a pond, birds flying in the sky, etc. Or, in some applications, a CPU/GPU might generate an AS tree on the fly in response to real time data inputs such as information from a camera. As the tree becomes larger, the updates take longer. The time required for the software builder to build or update a suitable AS generally increases linearly with the number of triangles. So, at extreme triangle counts, the AS build time can push traversal performance outside of the real-time range.

The problem is how to increase the geometric complexity of the scene without a corresponding increase in the number of nodes of the AS tree.

Figure 8B:
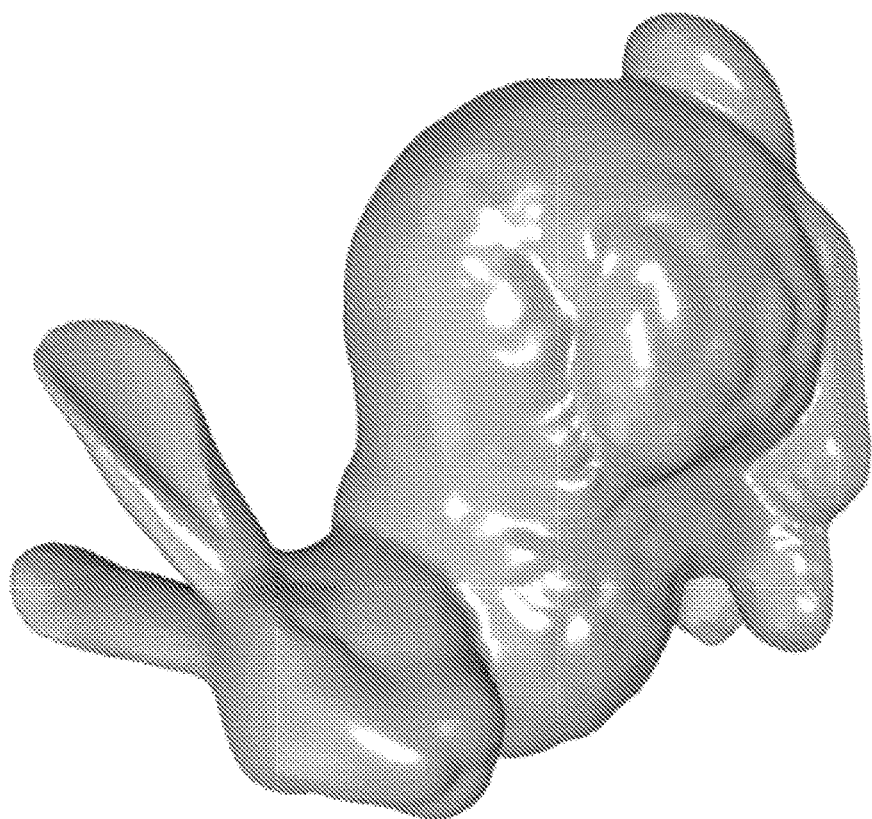
FIG. 8B shows combining the base triangles and displacement directions with the micro-vertex displacements recreates the full geometric complexity of the Stanford bunny.
Figure 8A:
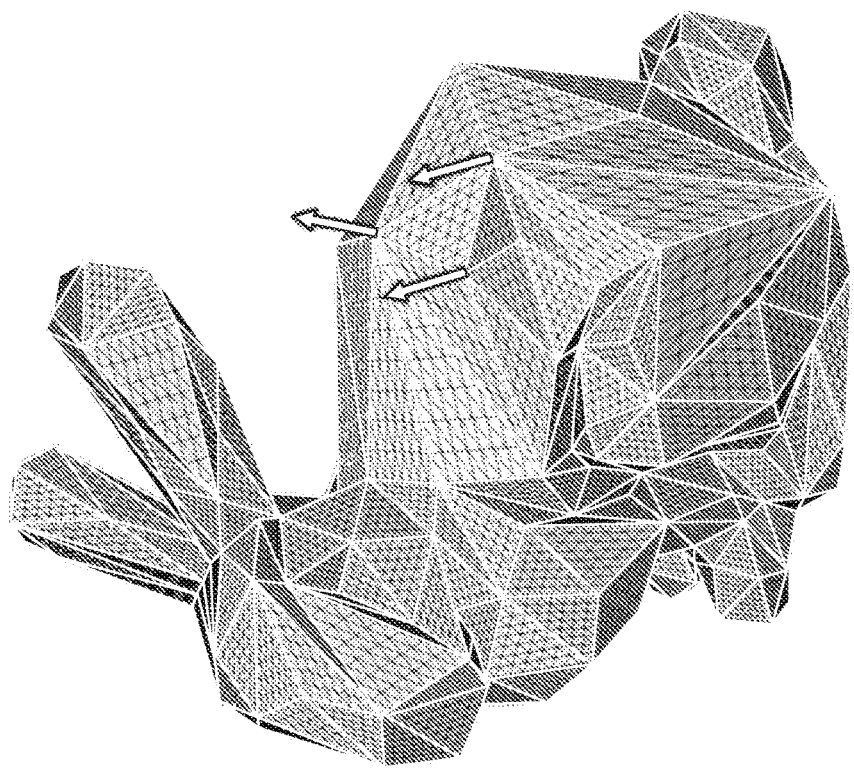
FIG. 8A shows the Stanford bunny represented using micro-meshes, drawn with a set of base triangles outlined in white with their implicit microtriangles within. Each base triangle vertex has a displacement direction shown as arrows for one of the base triangles.

FIGS. 8A and 8B show two images of the famous Stanford Bunny—a wireframe structure (FIG. 8A) and a rendered image (FIG. 8B). It can be seen that the number of triangles in the FIG. 8A wireframe may not appear to be excessive, but the fine level of detail of the smooth curves and bumps on the surface of the imaged FIG. 8B statue of the bunny is going to require a vast number of extremely small triangles—much smaller than those shown in FIG. 8A. If the triangles are too large, the bunny statue will look unrealistic—the viewer will be able to see that it is made out of triangles. To provide an AS tree that has triangles small enough to represent smoothly bumped continuous bunny surfaces is going to require many millions of triangles—and a correspondingly large AS tree with many millions of nodes.

Figure 8C:
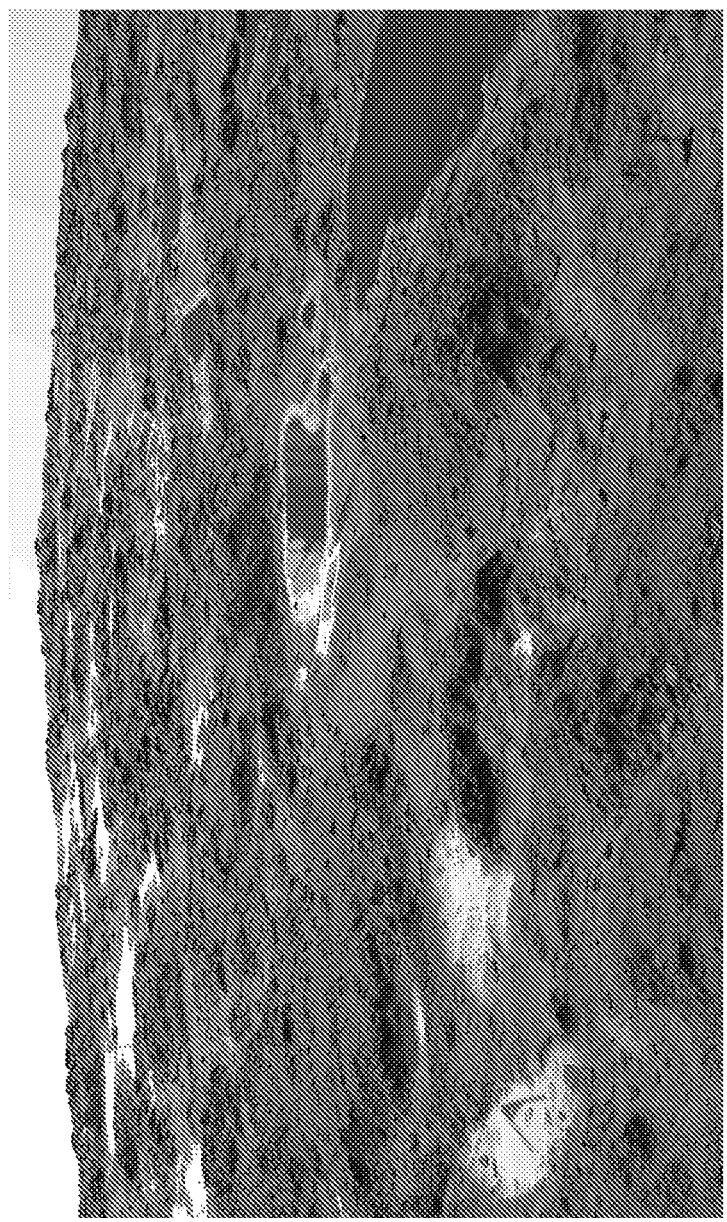
FIG. 8C shows a complex scene, such as this landscape, that can be efficiently stored and rendered with displaced micro-meshes.

FIG. 8C shows an example image of complex terrain of mud and standing water. The mud is randomly distributed in small hillocks and furrows with no discernible repeatable pattern—just as in a real mudflat. To represent the fine grained detail of the mudflat is going to take many millions of triangles and associated AS tree nodes.

Figure 8D:
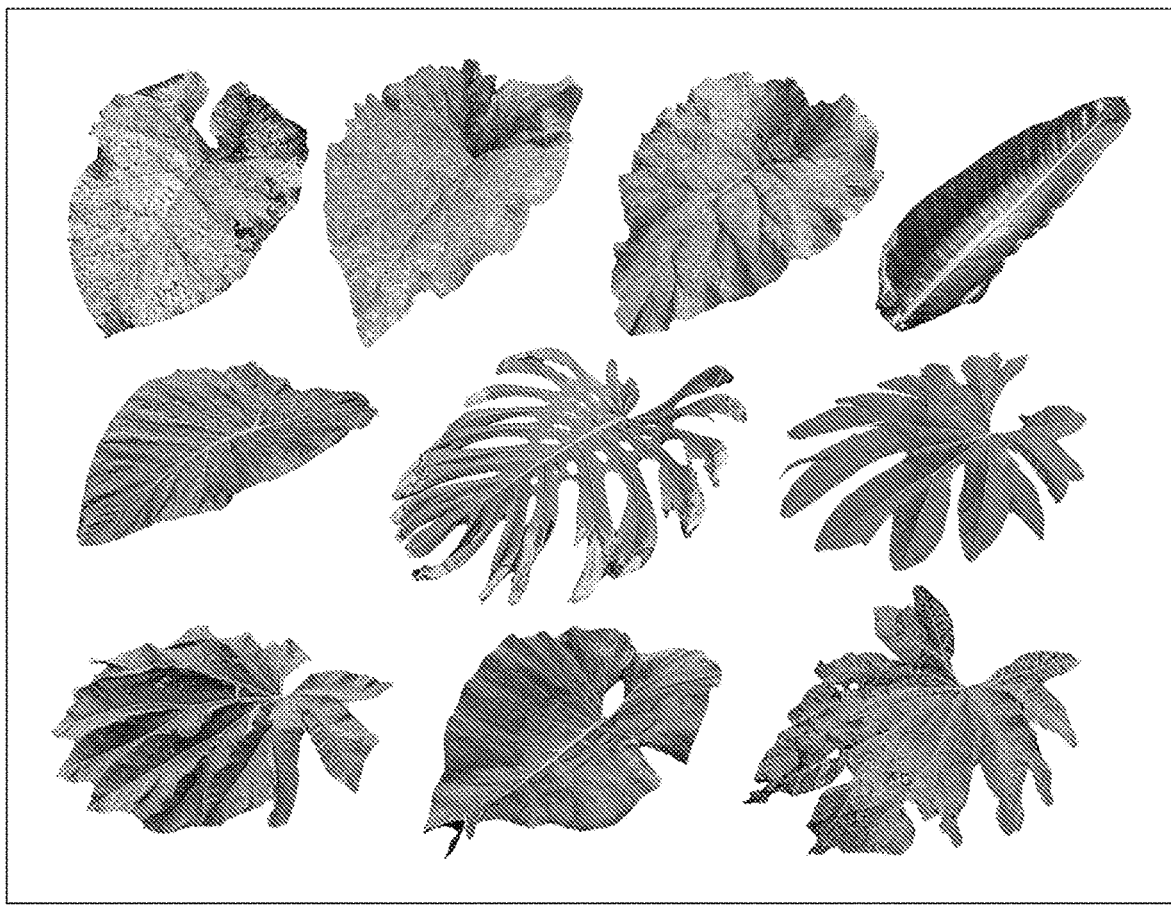
FIG. 8D shows how finely detailed leaves with detailed interior cut-outs and edges can be efficiently encoded and rendered by using displaced micro-meshes in conjunction with visibility masks.

FIG. 8D similarly shows various leaves with cutouts and finely detailed stem structures with fine ridges and furrows. Once again, to represent such leaves to a fine level of detail is going to require many millions of triangles and associated AS tree nodes.

We would like to explicitly encode in the AS tree only the larger triangles outlined in white lines in the wireframe structure of FIG. 8A Stanford bunny, and then provide the fine displacement detail of the Stanford Bunny shown in FIG. 8B through another triangle mesh mechanism that is included as part of the AS tree structure of FIG. 6 but which does not increase the number of nodes in the tree or substantially increase the size of the tree. We would like that additional triangle mesh mechanism to be dynamically subdividable by the TTU hardware itself so that the potentially millions of additional triangles resulting from the subdividing process do not have to be stored to or retrieved from memory. We would like such TTU-performed dynamic subdivision process to be performed "on the fly" and "just in time" at runtime in real time. We would like such dynamic subdivision to provide a variable, adjustable level of detail with advanced culling so the TTU does not need to waste time subdividing geometry that does not need to be subdivided, and can subdivide different regions to different levels of detail as needed for visualization, while maintaining watertightness of the mesh and avoiding pixel dropouts and other artifacts. Furthermore, we would like such dynamic subdividing to be supported using relatively small data structures that fit into individual cachelines of the type consumed by the TTU. In other words, referring again to FIG. 6, we would like some of the leaf node triangles such as O1, O2, O5, O6 to represent individual triangle meshes that can be efficiently subdivided into many thousands or more of much smaller triangles as controllable and variable levels of detail, that when processed by the TTU separately at different times, nevertheless do not cause watertightness problems that would turn the Stanford Bunny statute of FIG. 8B into a leaky sieve instead of a polished bumpy surface.

A New DMM Micro-Mesh Primitive

All of these goals and more are met by a new, highly efficient micro-mesh primitive representation that supports and underlies the explicit "API" triangle encoding shown in FIG. 6. In one embodiment, the AS builder structures the AS of FIG. 6 primarily based on the triangles outlined in white in FIG. 8A. In other words, the leaf node triangles O1, O2, etc. in the FIG. 6 AS tree can correspond to the larger white outlined triangles in the FIG. 8A wireframe structure. But instead of representing each of those leaf node triangles merely as a triangle with three sets of vertex coordinates or requiring each leaf node to explicitly define the 3D vertices and other characteristics of many additional triangles, example embodiments use this "base triangle" node as a platform for supporting a triangle mesh primitive that can be stored efficiently and subdivided and tested efficiently by the TTU "on the fly". Thus, from that geometric white triangle representation and included DMM micro-mesh primitives, the ray tracing hardware is able to produce the full resolution model of FIG. 8B. The basic legacy ray tracing processes and mechanisms still work with the AS representation of the larger white-outlined triangles of FIG. 8A, and the ray tracing hardware is configured to have further capability to use micro-mesh primitive constructs that are effectively layered on top of and supported by the white-outlined base triangles to produce the fine displacement details of FIG. 8B. A little like how the human brain comprises a genius cerebral cortex layered on top of an already remarkable mammalian limbic system, the resulting technology (AS builder, AS and graphics system including tree traversal hardware for ray and path tracing) builds upon and uses all of the previous generations of technology used for high efficiency real time ray and path tracing of explicitly specified triangles while expanding system capabilities to transform the planar triangles shown in FIG. 8A into visualizations associated with finely displaced 3D geometry of FIG. 8B.

From a developers perspective as well as from the perspective of the ray-triangle intersection test the TTU hardware performs, on the most basic level, the more finely subdivided microtriangles provided by the DMM primitive are simply triangles—polygons that are part of geometry that is being modeled by and encoded into the AS. If the micro-mesh primitive is used and included in the AS, then the TTU will be running on such microtriangles—or more specifically, on a stream of triangles some of which are triangle primitives and others of which are microtriangles derived from micro-mesh primitives. But in example embodiments, the TTU hardware now does something it has never done in the past—it uses its own hardware calculation capability to variably subdivide base triangles the AS tree specifies as leaf node triangles—on the fly—into smaller and smaller sub triangles also as the AS tree specifies until it reaches a declared/desired level of detail specified by the AS tree, then creates a micro-mesh of microtriangles each of which can have any desired orientation in 3D space, and processes those microtriangles with its ray-triangle test circuitry to test whether the microtriangles intersect with input rays.

The TTU thus manipulates tessellated surfaces at increasing levels of detail—but as explained below, it does so by traversing the AS to a leaf node defining a displaced base triangle and then recursively subdividing that base triangle into smaller and smaller sub triangles to thereby recursively traverse a predefined micromesh hierarchy (relentlessly culling nodes not of interest as it goes) further and further down into finer or finer levels of detail to find one or a small number (e.g., a quad in one embodiment) of geometric microtriangles at a (dynamically) selected level of detail (resolution) for intersection testing against a particular input ray. The DMM primitive representation herein is sufficiently compact and efficient for the TTU to access based on a relatively small amount of information (e.g., a single cache-line of data) the TTU is provided when the TTU begins processing the DMM primitive to minimize memory bandwidth and demands needed to support the traversal. In example embodiments, once the TTU determines the particular sub triangle(s) it will test as geometry against an input ray, it is able to efficiently access a corresponding particular displacement block in memory that allows it to reconstruct (once again, based on values the TTU has already derived or reconstructed in order to get to this level of detail) the prespecified input displacement data for each microvertex of the microtriangle(s) to be tested. These displacement values are in one embodiment not synthesized by the TTU based on an internal tesselator, but rather are reconstructed based on information received from outside the TTU and which the TTU can access in an extremely efficient way. The TTU uses such reconstructed microvertex displacements to define a displaced microtriangle in 3D space for testing against the input ray.

In one embodiment, the TTU follows the same or similar recursive subdividing process for defining this particular microtriangle that the builder performed when constructing the DMM primitive—but unlike the builder, the TTU does not need to tessellate the entire base triangle—only the particular subdivision(s) that lead to the microtriangle(s) that may be intersected by the input ray. Meanwhile, each such traversal the TTU performs is "on demand" and "just in time" based on a particular input ray—and culling of irrelevant sub triangles is similarly based on the particular input ray instead of being done by the TTU in advance.

A micro-mesh primitive can be inserted by the AS builder into any level or node of the FIG. 6 tree. In some embodiments, only certain leaf nodes of the FIG. 6 tree comprise DMM primitives, and other leaf nodes comprise triangle primitives or other kinds of primitives (e.g., procedural primitives). The FIG. 6 tree may thus comprise all, some or no DMM primitive leaf nodes depending on the geometry being modeled and the processes followed by the DMM builder.

Building An AS Hierarchy Including DMM Primitives

Figure 9:
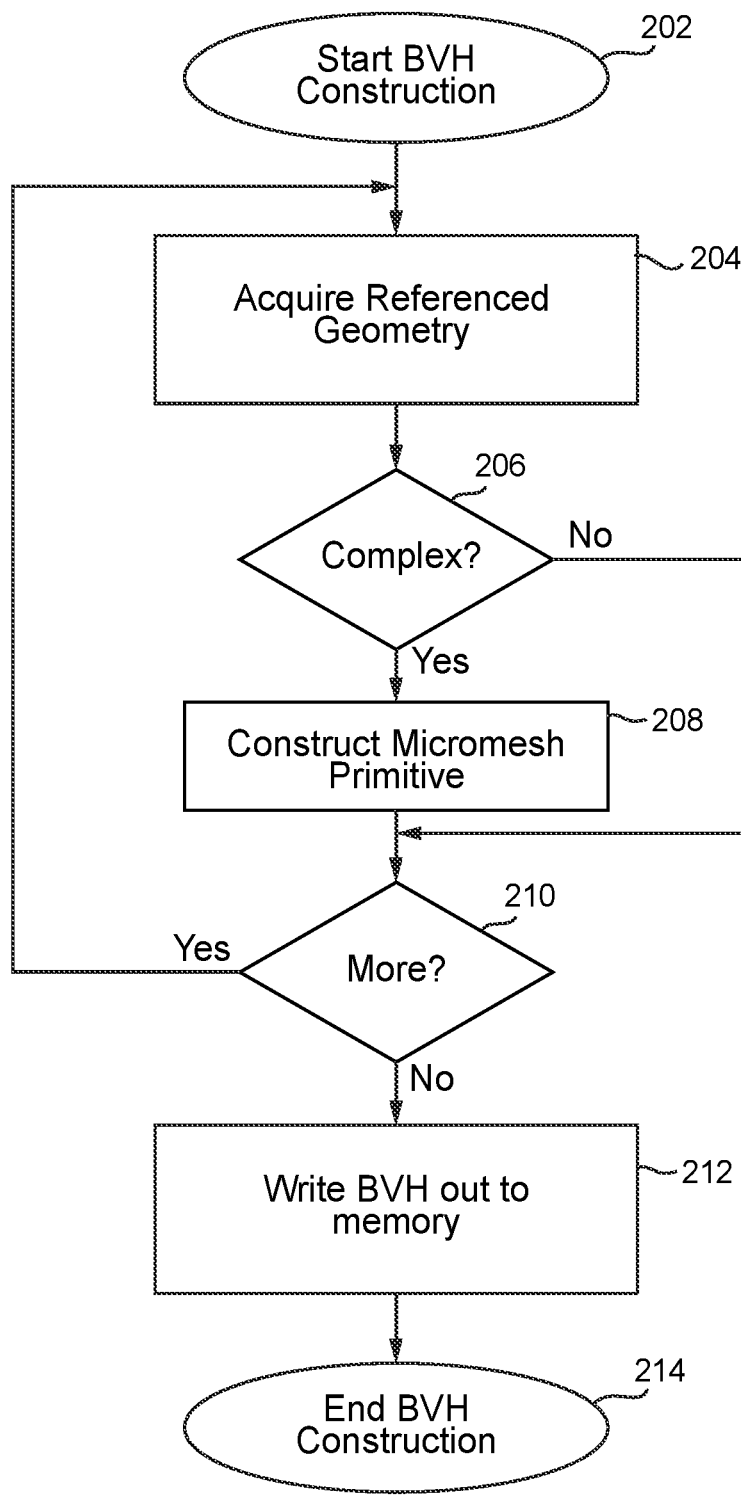

The AS builder will typically use the new DMM micro-mesh primitive primarily for highly complex geometry in the scene (see FIG. 9, block 206 decision and block 208 "construct Micro-mesh Primitive"). The builder will typically have a variety of other techniques (e.g., typical polygon representations, instancing, etc.) that could be used to represent such geometry. However, the DMM micro-mesh primitive provides specific advantages in terms of compression—namely, generating an extremely compact representation that will be more efficient for the builder to create and also take up far less space in memory than other ways to represent the geometry. Use of the DMM micro-mesh primitive may not make sense if the geometry is not very complex or can be represented effectively in other ways, but can provide huge efficiency advantages for certain kinds of highly complex geometry with high triangle counts. It should be noted that in many case, decision block 206 will be performed by the developer providing source materials in a different, displaced geometry format (see e.g., discussion below in connection with FIGS. 48A-48G)

From a developer's perspective, to use the micro-mesh primitive may in some embodiments require the developer to provide a representation of the geometry that the AS builder can easily translate into the compressed micro-mesh primitive representation—for example, the geometry representation may need to provide displacement information. It may be desirable in some cases to use a tool that can convert a photogrammetric scan of a physical scene such as a desert canyon, a craggy mountaintop, a seascape, a zen garden, mudflats (see FIG. 8C), deciduous leaves (see FIG. 8D), an ancient statue or monument, or any other complex object into a triangle mesh of very small triangles each having a displacement. Such representations can provide amazing photorealism but it becomes very expensive to build an AS incorporating such a mesh using conventional polygon primitives. In contrast, the DMM primitives described herein can substantially decrease the cost and time of building an AS incorporating such representations and of accessing the resulting AS for example in real time interactive graphics and other applications. In particular, the DMM primitive as represented in an AS provides a convenient, efficient self-culling structure (see culling description below) that can substantially speed up real time interactive processing by culling many, many thousands of microtriangles that do not need to be processed or tested at all.

Once this is done, the processes performed by the shader on a target device such as an SM 132 can treat TTU reports of intersection with a microtriangle encoded by the micro-mesh primitive in substantially the same way as the shader treats TTU reports of intersection with a triangle represented in a conventional way. In each case, the TTU determines intersects with a ray has known vertex locations and visibility characteristics that the TTU can report to the shader (although the shader in one embodiment does need to know that the intersected triangle is a DMM-represented microtriangle as opposed to a conventional triangle primitive based on the way the example embodiment stores visibility masks for microtriangles).

Just like any other triangles in the AS, the shader may use DMM-represented microtriangles for rasterization as well as for ray and path tracing. If the developer wishes to rasterize DMM-represented microtriangles, the shader can decompress the DMM primitive information in software or hardware and rasterize the microtriangles at an appropriate level of detail (see above) for distance between the viewpoint and the microtriangle geometry in the scene.

An AS Comprising DMM Primitives

As described above, an acceleration data structure typically comprises a BVH that recursively encapsulates smaller and smaller bounding volume subdivisions. The largest volumetric bounding volume may be termed a "root node." The smallest subdivisions of such hierarchy of bounding volumes ("leaf nodes") contain items—either directly or through instancing. And as mentioned above, in example implementations, intermediate bounding volumes can be designated alternate root nodes or alternate root complets in example embodiments.

The items in the leaf nodes could be primitives (e.g., polygons such as triangles) that define surfaces of the object. Or, an item could be a sphere that contains a whole new level of the world that exists as an item because it has not been added to the AS (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building an AS can occur in two parts: static and dynamic. In many applications, a complex scene is preprocessed and the AS is created based on static geometry of the scene. Then, using interactive graphics generation including dynamically created and manipulated moving objects, another part of the AS (i.e., some or all of the BLAS or an additional, linked AS(es) can be built in real time (e.g., in each frame) by driver or other software running on the real time interactive graphics system. AS construction need not be hardware accelerated (although it may be in some non-limiting embodiments) but may implemented using highly-optimized software routines running on SMs 132 and/or CPU 120 and/or other development systems e.g., during development of an application. Thus, AS construction may be accelerated by running it on one or more GPUs. FIG. 9 shows an AS construction process, which may be specified by a set of instructions stored in non-transitory memory and executed by a processor such as a CPU and/or a GPU such as shown in FIG. 1.

Figure 10:
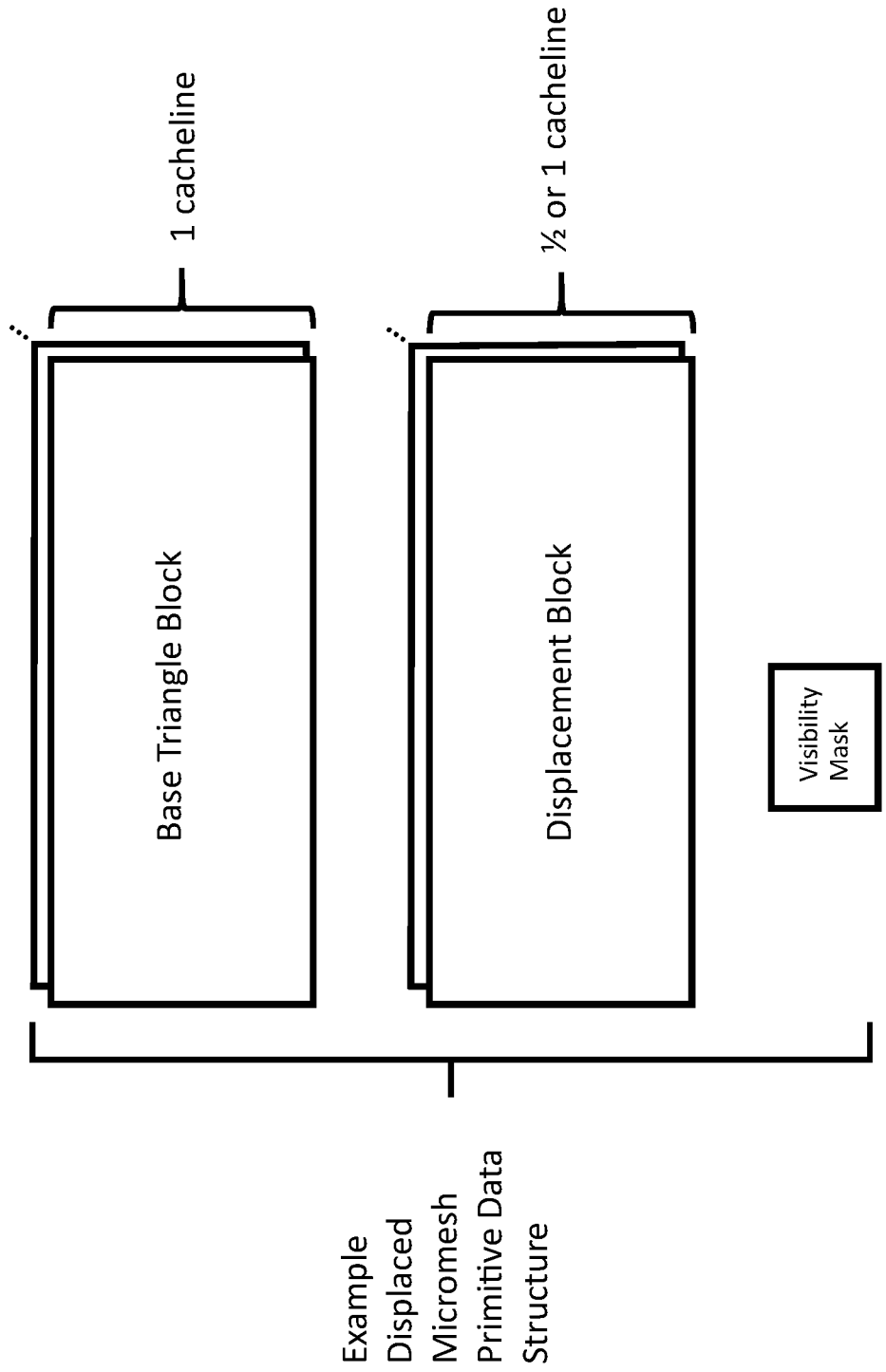
FIG. 10 shows an example schematic diagram of a displaced micro-mesh primitive data structure.

In one embodiment, each displaced micro-mesh primitive (DMM primitive) is comprised of two data structures: base triangle blocks and displacement blocks (see FIG. 10). Additionally, in one embodiment, visibility masks may optionally be associated with the DMM primitive.

In the first stage (FIG. 9, block 202) in AS construction, the referenced geometry is acquired (FIG. 9, 204). This may or may not include displacement blocks constructed before the AS build. In absence of prebuilt displacement blocks, the Builder may choose to construct DMM primitives to represent some or all of the input geometry. Where DMM primitives are used, DMM triangle blocks, with references to the associated displacement blocks, are constructed. For each DMM primitive, the Builder constructs one or more bounding shapes (e.g., bounding boxes) which together enclose the primitive, which are used as bounds in complets and leaf nodes.

Where DMMs are not used, the Builder will usually use typical triangle primitives to represent the geometry. Either way, the Builder will construct one or more complets, incorporate the complet into an acceleration tree structure, and write the AS out to memory (block 212).

For each micro-mesh primitives, the Builder constructs a bounding volume as a convex hull as described below for testing as part of the base triangle testing and subdivision process, develops a base triangle block and also develops a visibility mask and a displacement block for the primitive. The Builder uses this information to construct a data structure as described above that represents the DMM primitive. It can then incorporate such data structure into leaf nodes (or into memory storage referenced by such leaf nodes) that would otherwise just contain a triangle primitive. In other words, from a certain perspective, a typical triangle primitive and the new DMM primitive are interchangeable in that they both are defined at leaf nodes and have bounding volumes—but like a Maserati is interchangeable with a Toyota for bringing groceries home from the store, the DMM primitive does everything the typical triangle primitive can do and much more.

Because the DMM primitive has an advanced self-culling structure based on a convex hull that can be tested for intersection with a ray in a special way (e.g., in the ray's shear space). It may not be necessary for the builder to construct a typical AABB bounding volume encompassing the structure the DMM primitive defines. Therefore, if the Builder is not constructing a micro-mesh primitive for particular leaf node geometry (the same AS tree can contain some leaf nodes that contain micro-mesh primitives and other leaf nodes that contain traditional triangle primitives), the Builder executes for each non-micro-mesh geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. Those skilled in the art will understand that the example non-limiting approaches and associated wide complet representations described herein can also be applied to more expensive bounding constructs such as OBBs, bounding spheres and other bounding volume technology. On the other hand, depending on the shape of the underlying geometry, using AABB bounding volumes may provide efficiencies.

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the AS), the AS construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the AS construction process also decides or is instructed on instancing to avoid duplicate or redundant geometric specifications in the acceleration structure, thereby conserving memory space and associated memory bandwidth.

This process continues until all bounding volumes containing geometry have been sufficiently subdivided to provide a reasonable number of geometric primitives per bounding box (FIG. 9, 210). The real time ray tracer that uses the AS will determine ray-primitive intersections by comparing the spatial xyz coordinates of the vertices of each triangle with the xyz coordinates of the ray to determine whether the ray and the surface the primitive defines occupy the same space. The ray-primitive intersection test can be computationally intensive because there may be many triangles to test. In previous cases, it was thought to be more efficient to further volumetrically subdivide and thereby limit the number of primitives in any "leaf node" to something like 16 or fewer. This is still true with respect to base triangles, but using the new DMM primitive, each (or selected) base triangles can now be used to represent hundreds or thousands of microtriangles.

The resulting compressed tree comprising compressed treelets or "complets" is written out into a data structure in memory for later use by the graphics processing hardware/ software during e.g., real time graphics processing that includes real time ray tracing (FIG. 9, 212, 214).

Displaced Micro-Mesh Primitive Overview

The example displaced micro-mesh primitive (or "DMM" primitive) is built upon and references a triangle of the type typically represented by leaf nodes in the AS of FIG. 6 but includes more. For the DMM primitive in one embodiment, a "complet" data structure stored in a leaf node in the AS references a data structure such as shown in FIG. 10 that includes at least one base triangle block and at least one displacement block each of which is no more than a certain size so it can fit in a single cacheline. The base triangle block(s) provide information the TTU can use to subdivide the base triangle into microtriangles at a desired, needed or specified level of detail, and the displacement block(s) provide information the TTU uses to displace the microtriangles in 3D space to provide a displaced micro-mesh of microtriangles.

In one embodiment, there is also an optional visibility mask that provides visibility information (e.g., whether individual microtriangles are visible or invisible). The TTU can use the visibility mask to determine visibility significance of intersections of microtriangles with rays, thereby enabling the TTU to determine whether to report a found intersection to the SM or whether to continue to look for additional intersections.

Figure 10A:
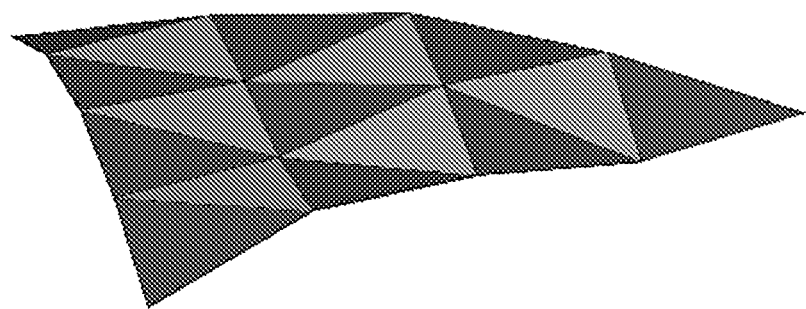
FIG. 10A shows an example micromesh.
Figure 10B:
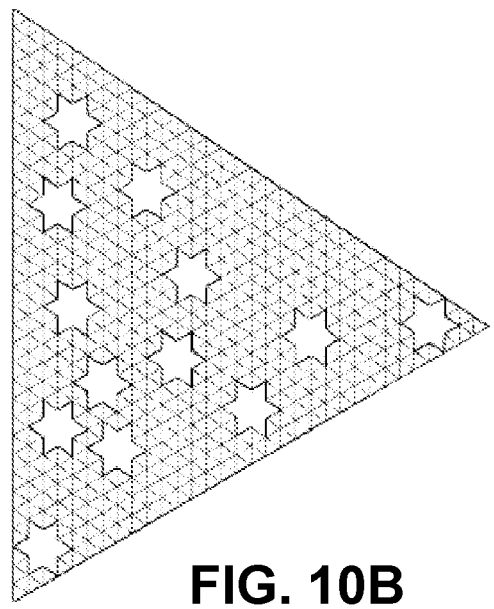
FIG. 10B shows an example micro-mesh with cutouts.
Figure 10C:
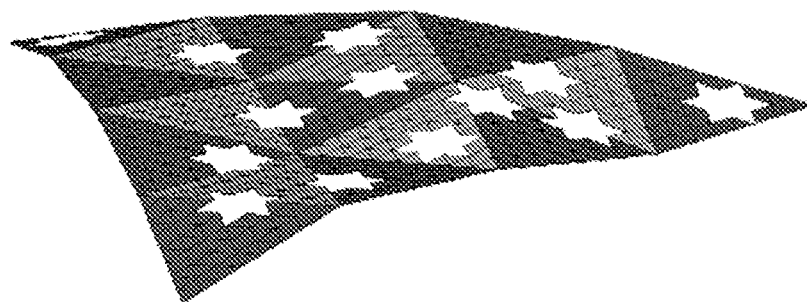
FIG. 10C shows results of mapping the micro-mesh with cutouts onto the FIG. 10A microtriangle mesh.

FIGS. 10A, 10B, 10C illustrate a basic idea. FIG. 10A shows a triangular patch or portion defining a triangle mesh made of up 16 smaller triangles. This particular triangle mesh could but need not be planar—note the height variations which displace the vertices of each of the smaller triangles. FIG. 10B shows how each smaller triangle could each be further subdivided into smaller and smaller triangles, and also that some of those smaller triangles are transparent to provide star-shaped cutouts in the surface. FIG. 10C shows the FIG. 10A mesh where each of the original triangles is now represented by 64 "microtriangles"—providing a finer level of detail. The cutouts are indicated by a visibility mask which marks each microtriangle as visible or invisible.

What is not shown in FIG. 10C but is explained below in detail: the TTU can displace each microtriangle individually based on the information from the DMM primitive's displacement block(s) so the resulting microtriangle mesh is displaced on a microtriangle-by-microtriangle (and microvertex and microvertex) basis to conform the mesh to any shape that is desire—like an origami sculpture but at an arbitrarily fine level of detail.

The example DMM primitive disclosed herein thus enables the TTU hardware to—on the fly—subdivide the triangle mesh of FIG. 10A into a micro-mesh of displaced microtriangles of arbitrarily coarse or fine level of detail while internally making visibility decisions that increase the TTU's "intelligence" or autonomy while reducing the number of reports the TTU makes to SM. Meanwhile, in one embodiment, the SM can tell the TTU how much it needs to be informed by what the TTU is doing and is also able to ask the TTU to explore the AS to report on a particular microtriangle—something the TTU because of its hardware capabilities can do much faster than the SM.

This arrangement provides great flexibility that can save vast amounts of memory space and memory bandwidth as well as the time needed to construct an AS. The FIG. 11 table shows that any given base triangle in one embodiment can be subdivided not at all (level 0), subdivided into 67,108,576 microtriangles, or to various subdivision levels in between (e.g., 4, 16, 64, etc.). As would be expected, higher subdivision levels require more triangle blocks and more displacement blocks—but in one example embodiment the DMM primitive can still encode the displaced micro-mesh structure very efficiently (e.g., 66 MB for over 67 million microtriangles, requiring only 8.3 bits per microtriangle). The table further shows that using an additional compression scheme such as the one disclosed in the Displacement Compression Patent can reduce the size from 66 MB to just over 4 MB and reduce the bit count to a remarkable 0.5 bits per microtriangle. The table compares results using explicit triangles for the same triangle count, which results in memory footprints and bit counts that are each an order of magnitude higher.

The following describes a particular example implementation of a DMM primitive structure in more detail. Alternative ways of structuring a DMM primitive are described in the above-referenced MicroMeshes Patent.

Base Triangles, Micro-Triangles, and Sub Triangles

Base Triangles

In one embodiment, we begin with a base triangle defined by three vertices—one vertex in each of the three corners of the triangle. Base triangle vertices can be labelled v0, v1 and v2 or using a standard w, u, and v labeling. See white outlined triangles in FIG. 8A and see also FIG. 27 discussed below. In one embodiment, the implementation makes use of the same triangle primitives used in AS structures shown in FIG. 6—but rather than treating such triangle primitives as the geometry to be imaged/visualized, the triangle primitives are not themselves intended to be visualized but instead serve as an invisible platform or support for a microtriangle micro-mesh. This is a little like opening a birthday present—the wrapped box needs to be opened to see the gift inside.

Just like in prior arrangements, the triangle primitive that serves as the base triangle for the DMM primitive can assume any size and orientation in 3D space, and has a planar triangular surface that lies in the plane and at a position in 3D space that is defined by the xyz coordinates of its three vertices. Such triangles are what a conventional graphics pipeline (including legacy ray tracing hardware) would typically treat as a geometric "primitive" at a leaf node of an AS, e.g., to be shaded and/or textured and rasterized and/or tested against a ray for ray-geometry intersection testing in ray or path tracing. The present technology is not limited to triangles, but could use other polygon types such as quadrilaterals as a base polygon primitive.

Micro-Triangle Mesh

Even though at least parts of the Builder and graphics pipeline may treat base triangles as a basic lowest-level geometric primitive for certain purposes such as some types of rasterization, complet tests, bounding volume testing/culling, etc., example embodiments extend their functionality by enabling the TTU to subdivide a surface defined by and associated with the base triangle into a polygon mesh. These subdivisions are referred to herein as sub triangles and "microtriangles" because they are triangles (geometry) that are below the level of (and typically but not always smaller than) the base triangle. In one embodiment, a sub triangle is a triangular subdivision of a surface the base triangle defines. The TTU can convert such sub triangles into displaced, visibility-masked "microtriangle" geometry for visualization or other purposes.

The polygon meshes these microtriangles define may itself be constructed by the builder based on tessellation techniques that cover a surface such as a plane using one or more geometric shapes with no overlaps and no gaps (see e.g. U.S. Pat. Nos. 8,120,607; 7,965,291; 7,724,254). In one embodiment, micro-mesh primitives are at least in part predefined ahead of time by the AS builder and stored in specialized micro-mesh primitive data structures for later access and use by a real time or other graphics system e.g., to render a 3D visualization such as shown in FIGS. 8B, 8C 8D. However, in other embodiments the CPU/GPU can alter parts of the AS in real time between frames to change the 3D scene for a succeeding frame. Described below are also techniques for using plural such displaced micro-mesh primitives together to animate such visualizations.

In example embodiments, each microtriangle models a discrete geometric structure with its own specified position, size and orientation in 3D space. While the microtriangles may have visibility properties, in one embodiment herein they represent 3D geometry and not merely base triangle visibility regions or subregions. Furthermore, as explained below, while the microtriangles can exist on a base triangle's surface, they can also be displaced from the base triangle's surface—and each microvertex of each microtriangle can be displaced by an amount and located at a specified, desired position in 3D space.

In one example embodiment, a displaced micro-mesh primitive is defined on or with respect to a "base triangle" (or "API triangle"-meaning a triangle primitive that can be specified by legacy API calls/commands) that the TTU can subdivide into a mesh of microtriangles laid out on a $2^n \times 2^n$ barycentric grid. The microtriangle meshes shown within the base triangles outlined in white in FIG. 8A could be examples of such microtriangle meshes, but see FIGS. 12A, 12B which show different topography and subdivision levels for the microtriangle mesh.

Figure 12A:
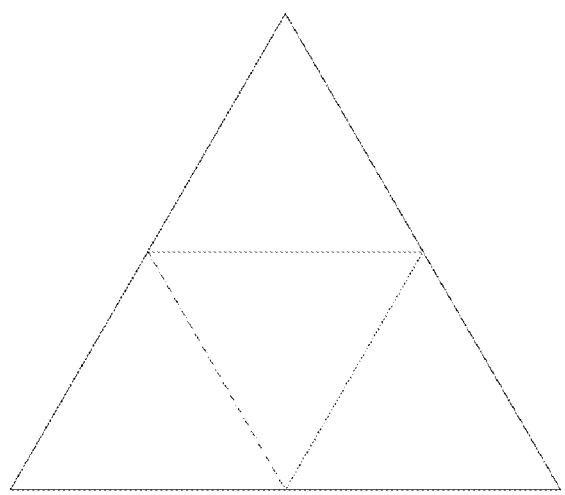
FIG. 12A shows a displaced micro-mesh as a structured representation of geometry on a $2^n \times 2^n$ barycentric grid, where "n" is the subdivision level of the grid where the displaced micro-mesh of level 1 has a total of 41 microtriangles.
Figure 12B:
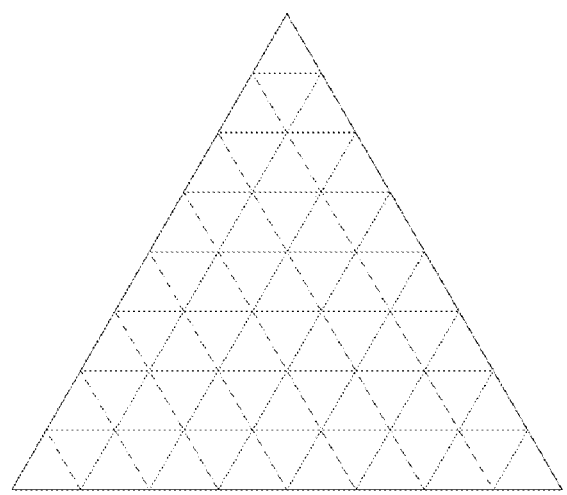
FIG. 12B shows a displaced micro-mesh of level 3 with a total of 64 microtriangles having 43 microvertices.

FIG. 12A for example shows a mesh of level n=1 that defines the base triangle surface into four sub triangles. FIG. 12B shows a mesh of level n=4 where the same triangle surface is subdivided into 64 sub triangles. In one embodiment, each further subdivision of a sub triangle produces four smaller sub triangles. This is a little like subdividing chicken wire mesh into finer and finer meshes such as fence or security mesh, air vent mesh, window screen mesh, etc. but with a specific rule that each time, a given cell of the mesh must be subdivided into four smaller cells. "n" is the subdivision level (or resolution) of the mesh (n can have a substantial range from zero to a much higher value that may be configurable per base triangle). Depending on system processing factors some of which may be specific to a ray, the TTU can use any such level of sub triangles as the basis for creating a mesh of displaced 3D "microtriangles" in 3D space. Moreover, in one embodiment, different rays striking the same DMM primitive can enable the production of differently pitched polygon micro-meshes of microtriangles.

In an embodiment, each microtriangle is defined by three vertices (microtriangle vertices can be called "micro-vertices" or "μ-vertices"). However, in the example embodiment, rather than specifying the three microtriangle vertices using absolute parameters such as full precision xyz spatial coordinates as typical triangle primitives are usually defined, the microtriangle vertices are defined relative and with reference to the base triangle and additional reference data—but with substantial flexibility and while still guaranteeing watertightness. In particular, each microvertex is encoded and defined relative to the vertices of base triangle of the primitive of which the associated microtriangle is a part using additional displacement data that can be represented far more compactly than explicit vertex coordinates.

Microdisplacement Map

As mentioned above, the microvertices of a microtriangle can but need not be disposed on the base triangle's plane; in example embodiments, microvertices can be displaced from or relative to the base triangle's plane by specified amounts. Furthermore, each of the three microvertices of any given microtriangle can be displaced from the base triangle's plane by different selected/specified displacements—allowing the microtriangle to have any desired orientation in 3D space.

Figure 13:
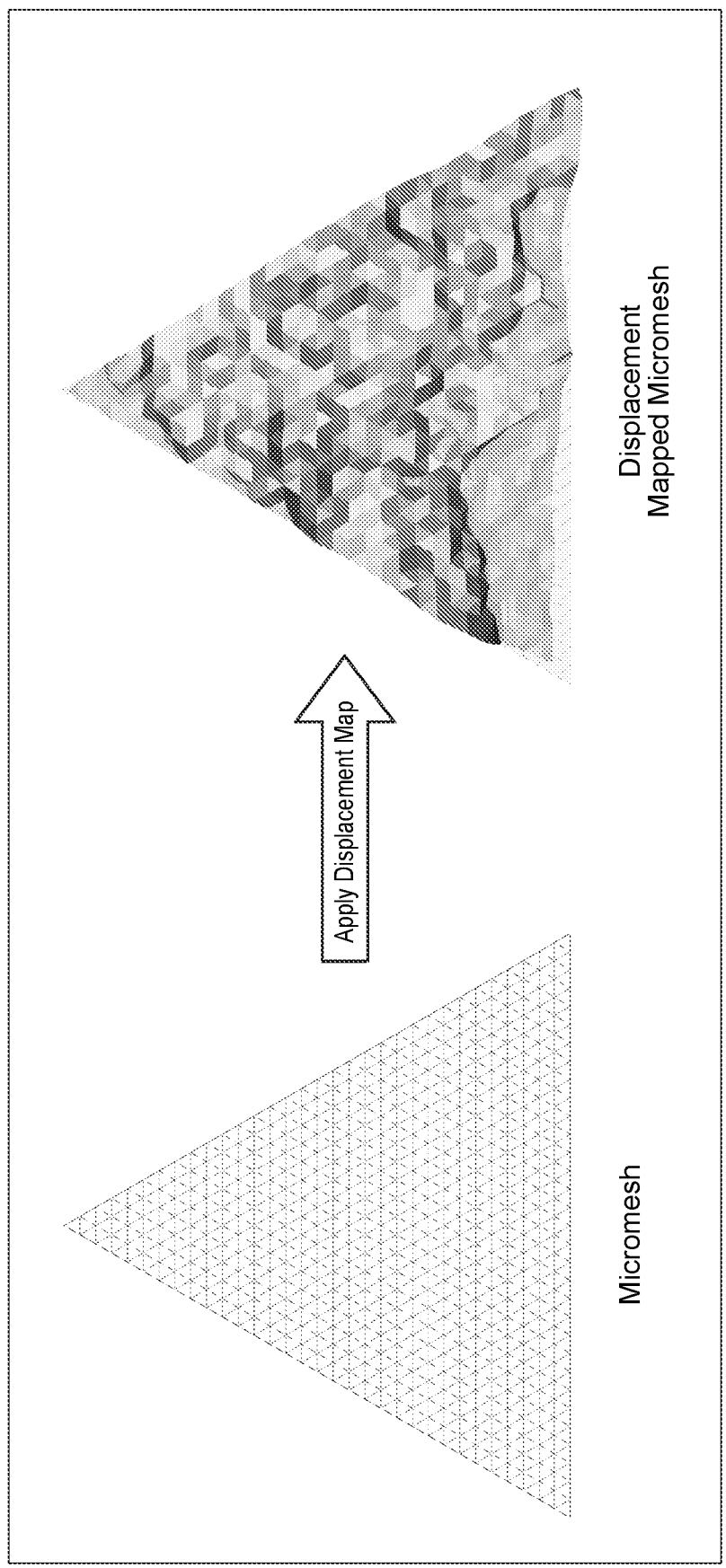
FIG. 13 shows how a microtriangle mesh can be used to model a displacement map.
Figure 14:
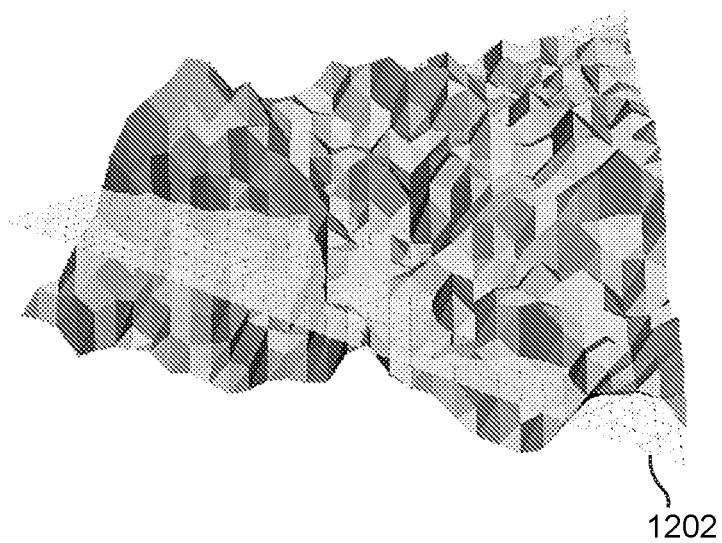
FIG. 14 illustrates an example displacement map.
Figure 15:
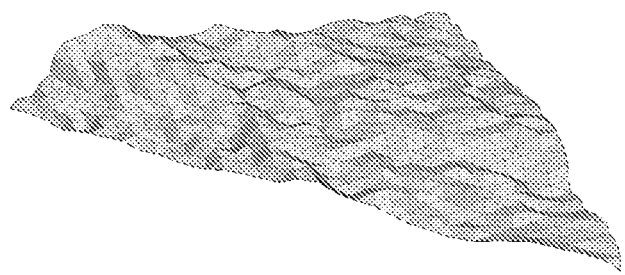
FIG. 15 shows an example displacement map mapped onto a micro-mesh.

In example non-limiting embodiments, displacement mapping is thus used to specify how to displace each microtriangle relative to the base triangle. This allows the mesh to define the equivalent of a raised 3D relief map—see FIGS. 13, 14, 15. FIG. 13 illustrates each microtriangle of the micro-mesh shown on the left size of the Figure can be displaced differently and in such a way that it has its own specified orientation in 3D space—providing a watertight triangle mesh. FIG. 14 shows that such displacements can be used to define the equivalent of a 3D relief map of arbitrary complexity (the complexity being determined by the coarse or fine size of the microtriangles and thus by the subdivision level discussed above). See also FIG. 15 which shows a surface defined by a base triangle where each microtriangle can be displaced by a different amount, and different microtriangles can have different orientations.

In one embodiment, the data structure that defines these microvertex displacements is called a displacement map ("DM") or microdisplacement map. See FIG. 15. Brute force implementations of such displacement maps that specify high precision displacements for each microvertex have the potential of creating high memory storage and memory bandwidth because of the large number of microvertices. To mitigate this downside, the present technology provides a new application of displacement maps to microtriangle meshes that provides advantages and improvements to real time and other ray and path tracing—in particular, a highly compressed, hierarchical representation that enables localized ray tracing subdivision and processing while guaranteeing bit-for-bit microtriangle microvertex precision on edges shared with other primitives and thus watertightness.

In particular, in one embodiment, the DM contains a scalar displacement per µ-mesh vertex which is used to offset or displace the µ-triangles of the µ-mesh in 3D space. In one embodiment, µ-mesh microvertex direction vectors in 3D space are obtained by linearly interpolating from base triangle information and other values previously calculated from previous recursive subdividing steps, and then each µ-vertex of interest is displaced along the direction vector using the scalar displacement looked up in the DM. No explicit representation of xyz microvertex coordinates needs to be stored in or read from memory.

Example embodiments guarantee "watertightness"— which means the microvertices of micro-meshes that line up together are exact matches for their neighbors. As will be explained below, example embodiments evaluate intersection with microtriangles in a shear space that is a function of a particular ray, so it may be important in some embodiments to at least match vertices generated for the same ray. As a consequence, example embodiments subdivide from the base triangle instead of for example some other subdivided level such as a sub triangle in order to ensure matching values among neighbors—even though the TTU in one embodiment consumes sub triangles rather than base triangles when subdividing using the DMM primitive. Furthermore, in one embodiment there is often no way to precompute any of these calculations because they depend on the current input ray the characteristics of which cannot usually be predicted in advance. A corollary is that it may be difficult to stitch the micro-mesh to "regular" triangles if their respective vertices are calculated in different ways.

Thus, the builder may in some embodiments take care about how to stitch the micro-mesh to other portions of an object. An alternative is to perform subdivision in the same space that regular triangles are specified in order to provide numerical matching between microtriangles and other triangles or objects outside of the micro-mesh.

Base Triangle Supports Micro-mesh

FIGS. 16A-16F are together a flip chart animation that one can view by pressing page down when viewing this patent on a computer or browser.

Figure 16A:
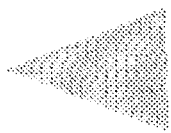
FIGS. 16A-16F are together a flip chart animation, where

FIG. 16A shows an example base triangle with a micro-mesh pattern on its planar surface. In actual implementations, there is no pattern defined on this base triangle's surface since—as will become clear from the discussion below—the base triangle typically is not itself visualized. Rather, the base triangle serves as platform for defining/supporting the displaced micro-mesh of microtriangles.

Figure 16B:
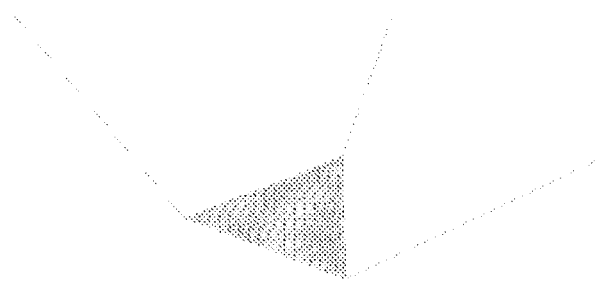

Hitting the page down key, FIG. 16B shows each of the three vertices v0, v1, v2 of the base triangle has an associated direction vector that indicates a displacement direction in 3D space. These direction vectors indicate the direction where the DMM primitive represents displacement. The direction vectors shown extend outwardly from the base triangle vertices in this example but each vector could extend in any direction. Thus, the direction vectors in one embodiment do not merely indicate directions such as up or down, but instead each direction vector defines a particular direction in 3D space. Moreover, the direction vectors of the three base triangle vertices shown each can have different, independently specified directions.

In one embodiment, changing the position(s) of the base triangle vertex/vertices and/or changing the direction(s) of the base triangle's direction vector(s) results in changing the shape of the micro-mesh the primitive defines. As explained below, interesting animation effects can be created by changing the direction vectors and/or the base triangle vertex positions over time such as between frames while keeping other parameters (e.g., displacement amounts) static. For example, one approach is to define two primitives that are identical except for the base triangle vertex position(s) and/or direction vector(s) to be changed, and then interpolate over time between the micro-meshes they respectively define. Such changes can be used to dynamically distort the shape of the micro-mesh, for example by moving, contracting, stretching or otherwise deforming it, from one time instant to another.

Micro-Mesh Displaced from Base Triangle

Figure 16C:
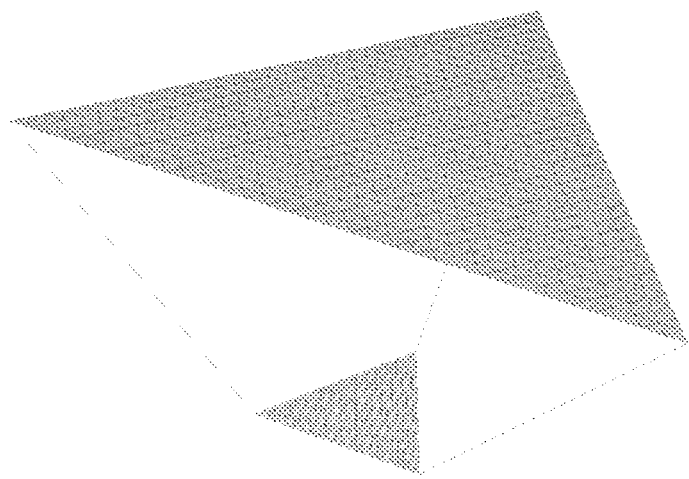

Hitting the page down key again, FIG. 16C shows a planar, triangular micro-mesh displaced from each of the base triangle vertices by a specified displacement amount. One can think of this as sliding the three anchor vertices of the micro-mesh along the base triangle direction vectors to freely adjust the displacement of each corner of the micro-mesh by a specified amount along an associated base triangle direction vector. Because each of the three base triangle direction vectors can have any arbitrary direction in 3D space, the size of the micro-mesh surface may and in a general case will change as the micro-mesh corner displacements change along direction vectors that can have arbitrary specified directions. Furthermore, in one embodiment, the micro-mesh in one embodiment will by default form a triangular surface but this triangular surface may or may not be parallel to the planar surface of the base triangle as shown.

Figure 16D:
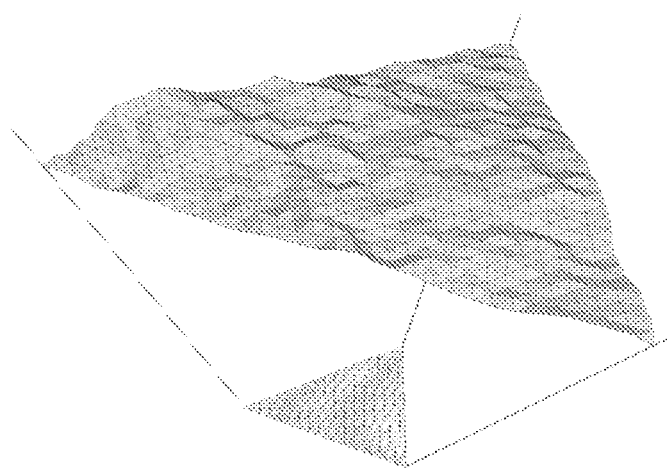

Hitting the page down key again, FIG. 16D shows how, in a general case, the microtriangles of the micro-mesh can in turn each be individually displaced based on a displacement map. In one embodiment, each microtriangle microvertex will have its own displacement specification so each microtriangle can have its own specified displacement and orientation.

Figure 16E:
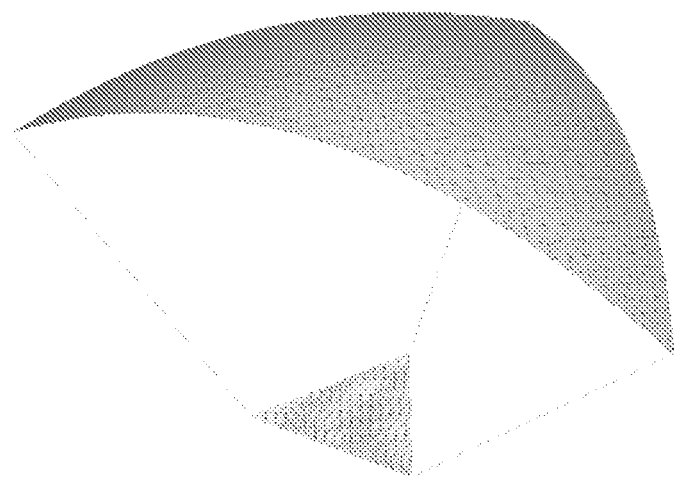
Figure 16F:
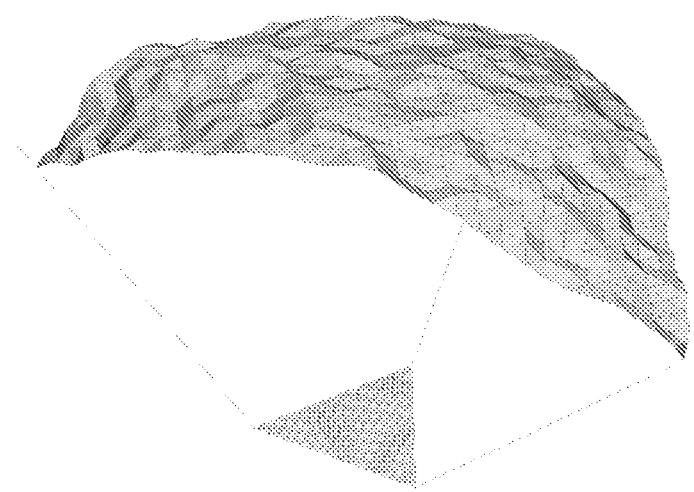
Figure 17A:
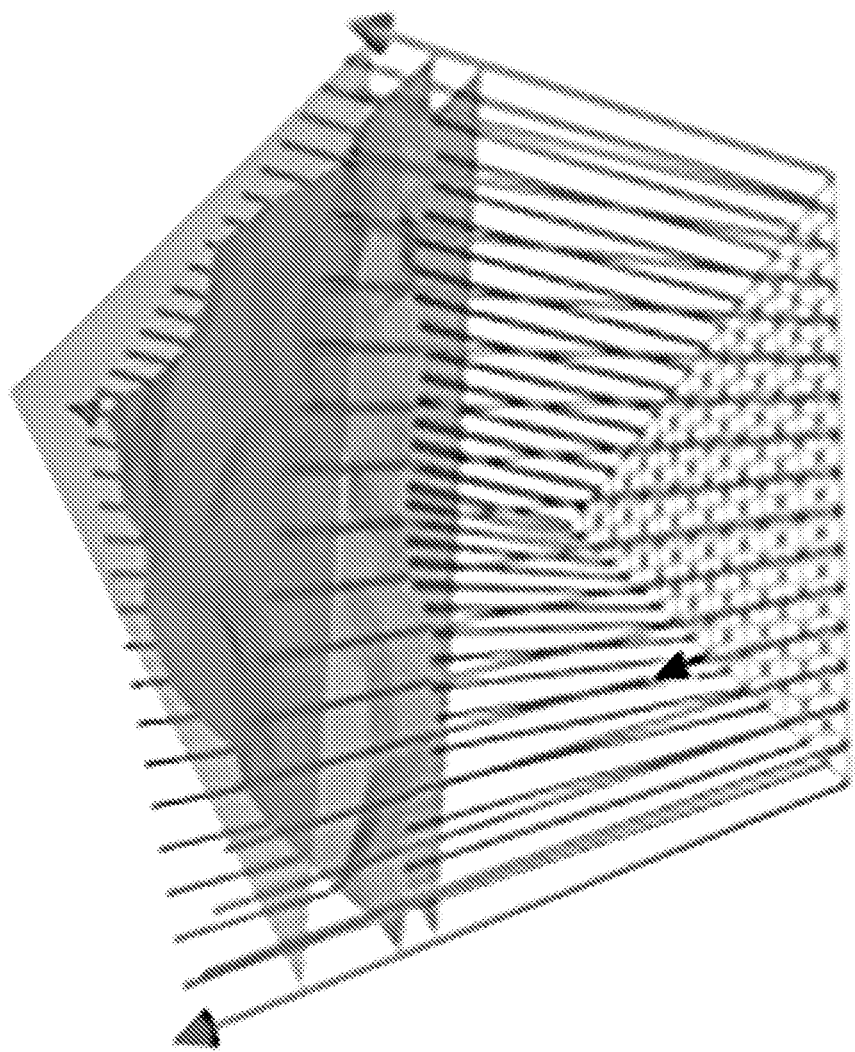
FIGS. 17A-17C & 18 show different views of an example model of a base triangle defining minimum and maximum triangles that sandwich a displacement mapped micro-mesh surface between them.
Figure 17B:
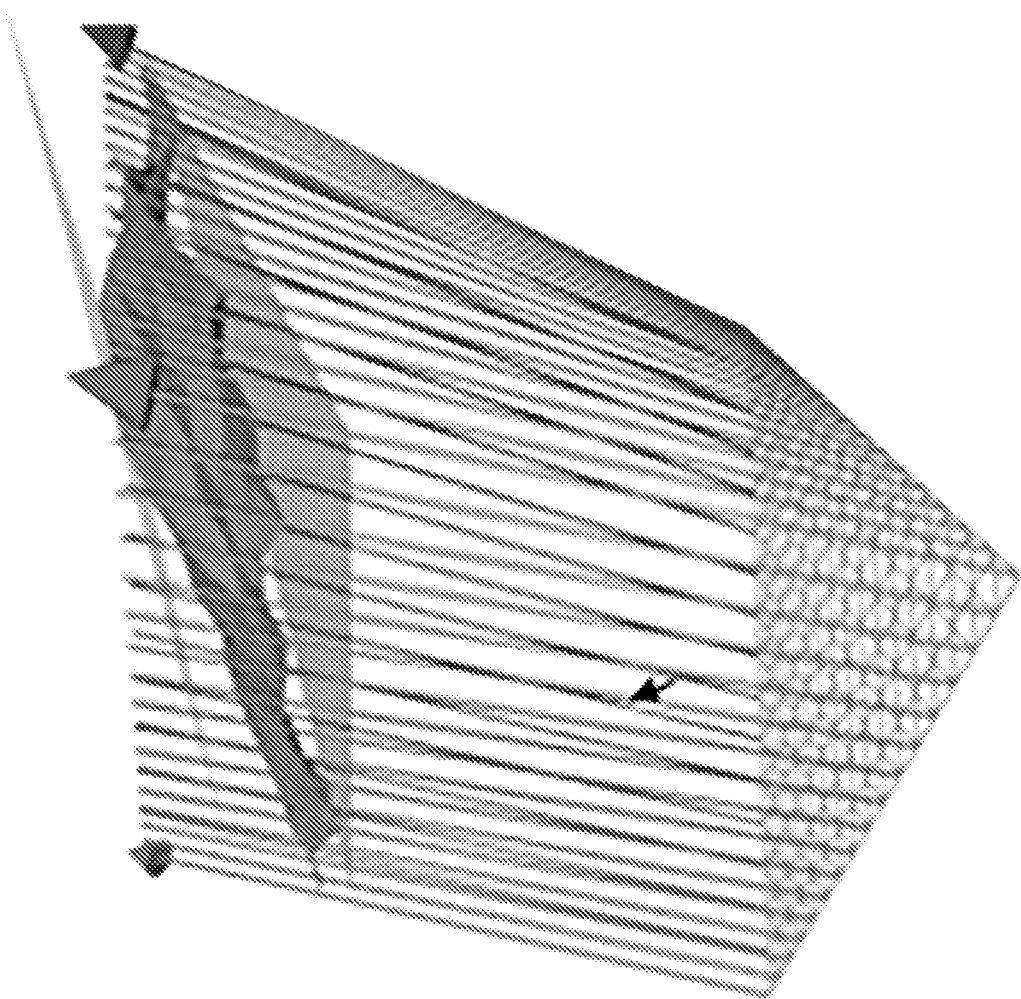
Figure 17C:
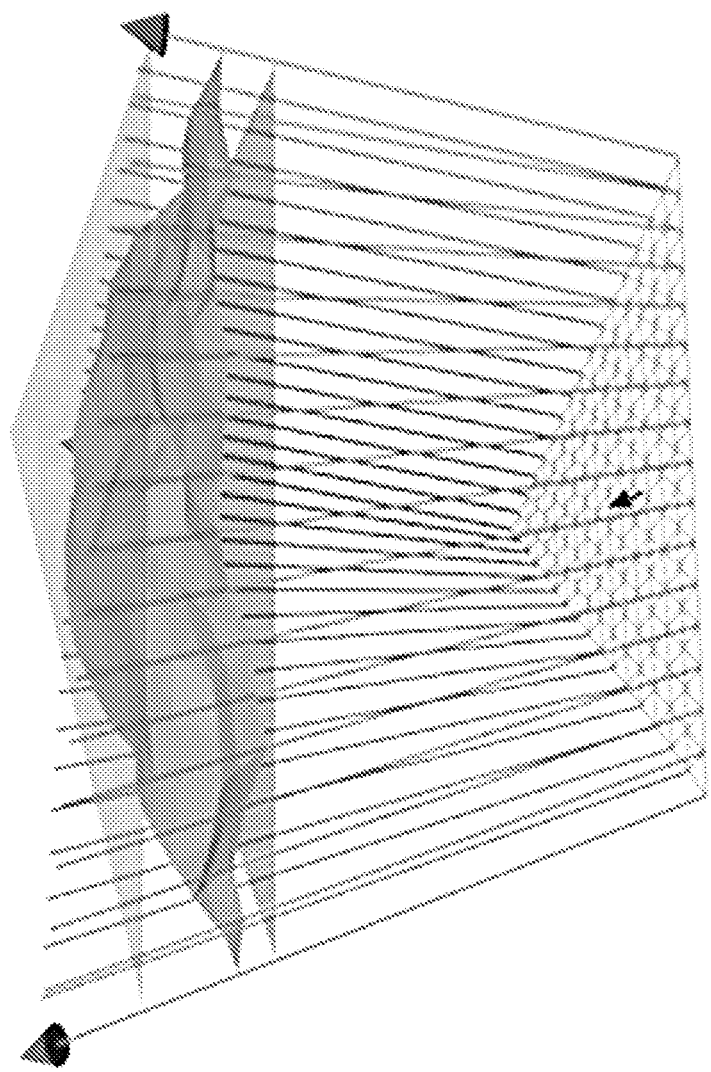
Figure 18:
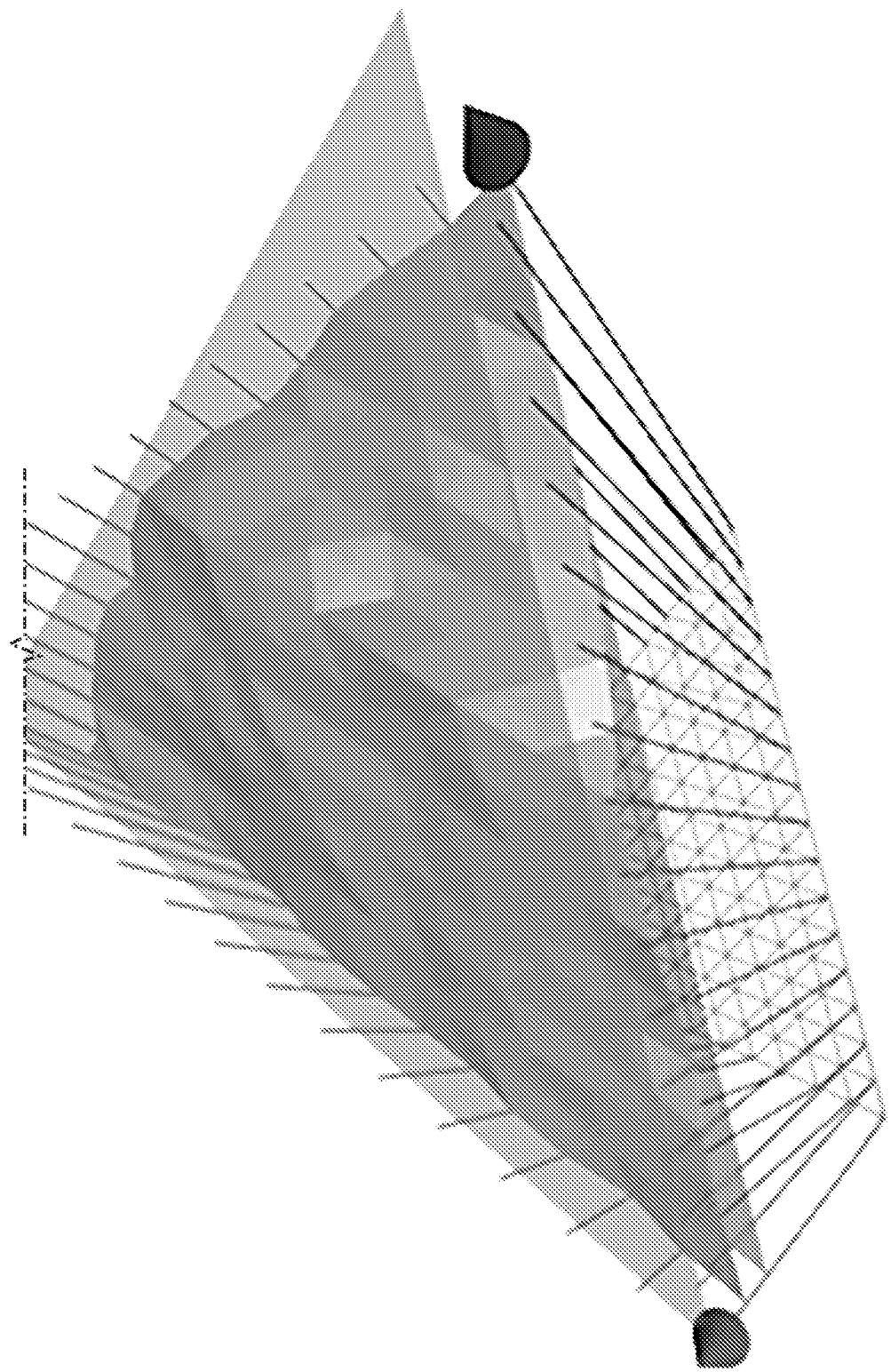

Hitting the page key down again, FIG. 16E shows that some embodiments do not define the micro-mesh default displacement as all microtriangles being coplanar, but rather define them on a curved surface. As FIG. 16F shows, also in the case of a curved-by-default micro-mesh, each microtriangle microvertex can still have its own specified displacement. This displacement can be specified relative to the base triangle or to some other triangle surface, as explained in detail below.

As explained below, example embodiments can in some cases specify such microvertex displacement specifications explicitly, but also offer more compact ways of representing them. For example, example non-limited embodiments provide such specified displacements for each microvertex in a compact representation and without the need to explicitly specify each microvertex position. Briefly, in one embodiment, the position of each (or any given) microvertex is derived (interpolated) from the base triangle vertex positions and the base triangle vertex direction vectors, based on a barycentric grid of an appropriate pitch. One can think of a triangular barycentric grid being anchored to particular 3D points along the base triangle direction vectors and thus sized to fit. Now that the sized and located barycentric grid defines barycenters for each of the microvertices, a direction vector passing through the barycenter of each (or any given) microvertex in the mesh is derived (linearly interpolated) from the three base triangle vertex direction vectors, and the microvertex is displaced along that direction vector by a displacement amount prespecified by a displacement map. As will be explained below, the TTU may recursively calculate such microvertex direction vectors as it subdivides the DMM primitive.

Interpolating Microtriangle Direction Vectors from Base Triangle Direction Vectors As explained above, in example embodiments, the displacement of each (or any given) microvertex along its respective direction vector is specified by microvertex-specific displacement parameters. One can think of this as sliding the microtriangles along their direction vectors to freely adjust each microvertex anchor point to its associated direction vector. Each of the three microvertices of a microtriangle can have a different displacement amount, which allows each microtriangle to have any desired orientation. Because adjacent microtriangles share two vertices and an edge, such adjacent microtriangles can still have different orientations but those orientations are constrained by the orientation of their shared edge—much like folding an origami sculpture. As explained below, since neighboring microtriangles tend to be displaced by similar amounts in very fine meshes, in one embodiment the range and/or precision of the displacement amounts the displacement map specifies for each microtriangle may depend on the density or pitch of the microtriangles in the micro-mesh.

FIGS. 17A-17C & 18 show an arbitrary micro-mesh defined by a DMM primitive anchored in its three corners to the base triangle direction vectors shown in FIG. 16D. As explained above, in example embodiments the mesh microvertices are positioned on the mesh based according to a barycentric grid that can be derived based on level (number of triangles) and positions of the base triangle direction vectors at the mesh's anchor points. Hence, in example embodiments, the number and locations of microtriangles in the mesh have certain constraints (although, as explained below, the hierarchical representation used nevertheless provides sufficient flexibility for most modeling) in order to avoid the need to explicitly specify each microvertex position (which would require substantial additional memory). Furthermore, an efficient way to locate the position and define the direction vector of a particular microvertex is to traverse a hierarchy of increasingly subdivided sub triangles to arrive at the microtriangle—but the TTU in one embodiment operates in such a way that it traverses the hierarchy as a matter of course as it recursively subdivides the base triangle into finer and finer triangles so that no extra or additional "traversal" work or associated time beyond the subdividing is actually involved. Furthermore, as explained below, example embodiments introduce ample opportunities for the TTU to cull sub triangles that are not of interest—either because they do not intersect the ray or because they do not contain a microtriangle being searched for—so that unnecessary traversal/subdivision work is minimized.

FIGS. 17A-17C, 18 show different views of an array of direction vectors for a number of microvertices. In example embodiments, rather than specifying the microvertex direction vectors explicitly, they can all be derived by linearly interpolating between direction vectors of their respective base triangles—which can be called anchors for the micro-mesh (see direction vectors with the large cone-shaped arrowheads on top). Such linear interpolation is performed in two dimensions so that microvertices—which are all "in between" two or three base triangle vertices by various distances—have their direction vectors calculated through linear interpolation (see discussion below). Direction vectors are calculated and assigned for all microvertices in the mesh—both outside vertices on the "edges" of the base triangle and inside vertices internal to the base triangle. However, the direction vectors for the internal microvertices are not shown in these drawings for ease of illustration. In some cases, there may be potentially thousands or millions of such direction vectors corresponding to thousands or millions of vertices.

As explained below, in the example embodiment, the hardware performs calculations so that outside vertices of different base triangles are bit-for-bit identical even though the base triangles may be processed separately at different times. Furthermore, as explained below, precautions are taken (i.e., topology is changed for intersection testing) so T-junctions that could cause pixel dropouts or cracks in the mesh are eliminated.

As will be appreciated, when using linear interpolation to develop the microtriangle vertex direction vectors from the base triangle direction vectors:

- direction vectors for microvertices that are spatially close to a base triangle direction vector will have directions that are similar to the directions of the base triangle direction vectors the microvertices are spatially close to;
- Microvertices that are equidistant between two base triangle direction vectors will be assigned direction vectors that are an equal mixture of the two base triangle direction vectors they are equidistant from.
- A microvertex that is equidistant between three base triangle direction vectors will be assigned a direction vector that is an equal mixture of the three base triangle direction vectors it is equidistant from.

Linear interpolation is not a requirement—other kinds of interpolation or calculations would be used instead for specific applications. However, linear interpolation can be performed very efficiently by the TTU hardware, and the fact that example embodiments derive microvertex positions and direction vectors from a barycentric grid and base triangle direction vectors results in a great savings in memory storage because each microvertex position and direction vector does not need to be explicitly specified in the DMM primitive data structure. Furthermore, as explained below, the hardware used to perform the calculations leverages from recursive subdivision processes and so can be relatively simple and fast.

As explained above, a further component of the primitive is a displacement map specifying the displacement amount of each microvertex (not just the base triangle vertices or "anchor points") along a respective displacement vector for the microvertex. In one embodiment, these displacement amounts are stored very compactly to reduce or minimize storage requirements. As FIG. 23A-23C explained below illustrates, each of the three microvertex positions of a given microtriangle can be displaced by any specified displacement amount along its own interpolated direction vector. But to do that, one example implementation provides an additional construct the micro-mesh primitive also defines—minimum and maximum triangles.

Prismoid: Maximum and Minimum Triangles

Referring again to FIGS. 17A-17C, 18, one can see two additional planar triangles anchored to the base triangle vertex direction vectors that sandwich the displaced micro-mesh surface and are parallel to one another. The maximum triangle is further displaced from the base triangle than the micro-mesh surface, and the minimum triangle is less displaced from the base triangle than the micro-mesh surface (or in some implementations, not displaced at all from the base triangle). The "minimum" and "maximum" triangles are not intended to be imaged or visualized, but are defined in order to simplify (a) how the microvertex displacements are specified and calculated, and (b) how the TTU tests a microtriangle for intersection with a ray.

It will now be understood that the micro-mesh primitive defines direction vectors for each microtriangle which anchor a potentially very complex, height-mapped micro-mesh surface at specified displacements from the base triangle in 3D space. Theoretically, such individual displacements could be any desired distance from the base triangle surface and could be specified by explicit high precision displacement values, but that would require a lot of memory. In order to provide numerical compactness of the individual microvertex displacement values, example embodiments define more compact ways to represent such individual microvertex displacement values.

In one embodiment, the DMM primitive defines upper and lower limits the microvertex displacement values may take—and the displacement values are specified relative to those upper and lower limits. These upper and lower limits effectively define an additional geometric construct of the primitive; the maximum and minimum triangles such as shown in FIGS. 17A-17C, 18 and see also FIG. 21. Each micro-vertex on the base triangle has a corresponding point projected along its direction vector onto each of the minimum triangle and the maximum triangle (or onto the maximum triangle and the base triangle if the base triangle serves as the minimum triangle), and a single scalar between 0 and 1 can in one embodiment be used to linearly interpolate the micro-vertex position between the maximum and minimum points. See FIGS. 23A-23C, 24.

Figure 22:
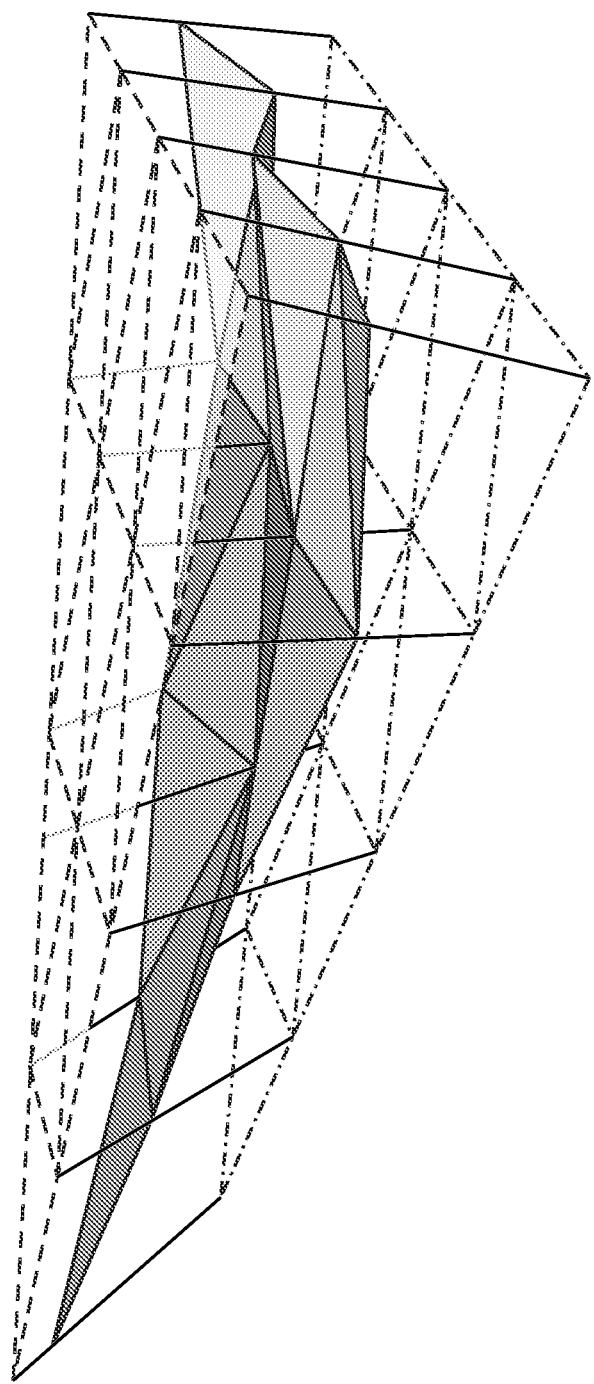
FIG. 22 is another view of the FIG. 21 example displacement mapped micromesh mesh defined within a prismoid shown in dotted and showing in dotted an example convex hull bounding volume.

The use of such maximum and minimum triangle surfaces provides a compact displacement map representation for storage and memory access bandwidth—for example, each displacement map representation for up to 64 microtriangles with scalar displacement values relative to the minimum and maximum triangles may fit into a half cacheline or single cacheline. In addition, as explained below, because the minimum and maximum triangles are planar surfaces that form a convex hull which completely bounds the displaced micro-mesh (see FIG. 22), a culling intersection test against a ray in the ray's shear space to determine if the ray passes through the convex hull can be performed by the TTU by very simple hardware operating on the minimum and maximum surfaces (while needing more complex hardware, this would also still do-able in real time in object space).

One might wonder why the base triangle surface could not itself serve as the minimum triangle. In some example implementations, it can and does. In other implementations, the minimum triangle is displaced relative to the base triangle such as shown in FIGS. 17A-17C, 18, 21, 22. Either way, the base triangle vertex positions, direction vectors and additional bias and scale parameters are used to create the minimum and maximum triangles that forms a prismoid which bounds the displaced micro-mesh. These minimum and maximum triangles are in turn used as references for displacing the potentially large number of microvertex displacements that make up the micro-mesh and also to help test bounding volumes for intersection between rays and microtriangles—which because they use the maximum and minimum triangles as maximum and minimum references for displacement, are always bounded by the maximum and minimum triangles.

Figure 23A:
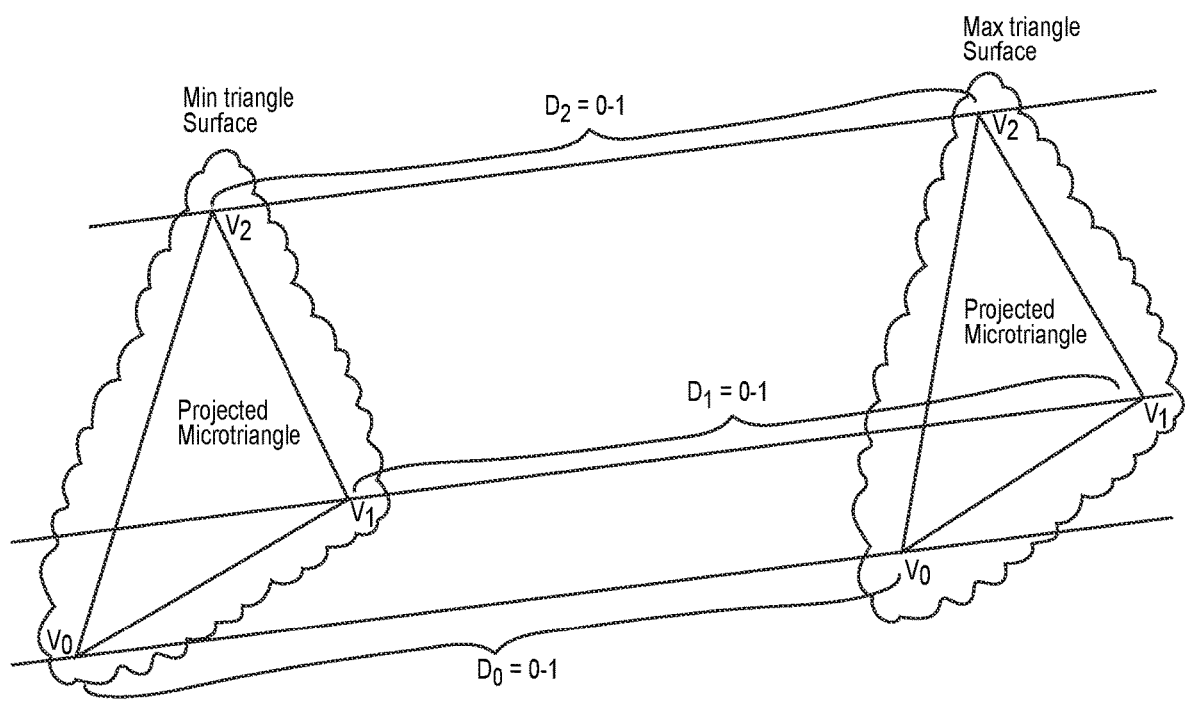
FIGS. 23A, 23B and 23C show, using a flip chart animation, interpolation of normalized displacements along minimum and maximum triangle defined direction vectors to define the position of a displaced microtriangle.
Figure 23B:
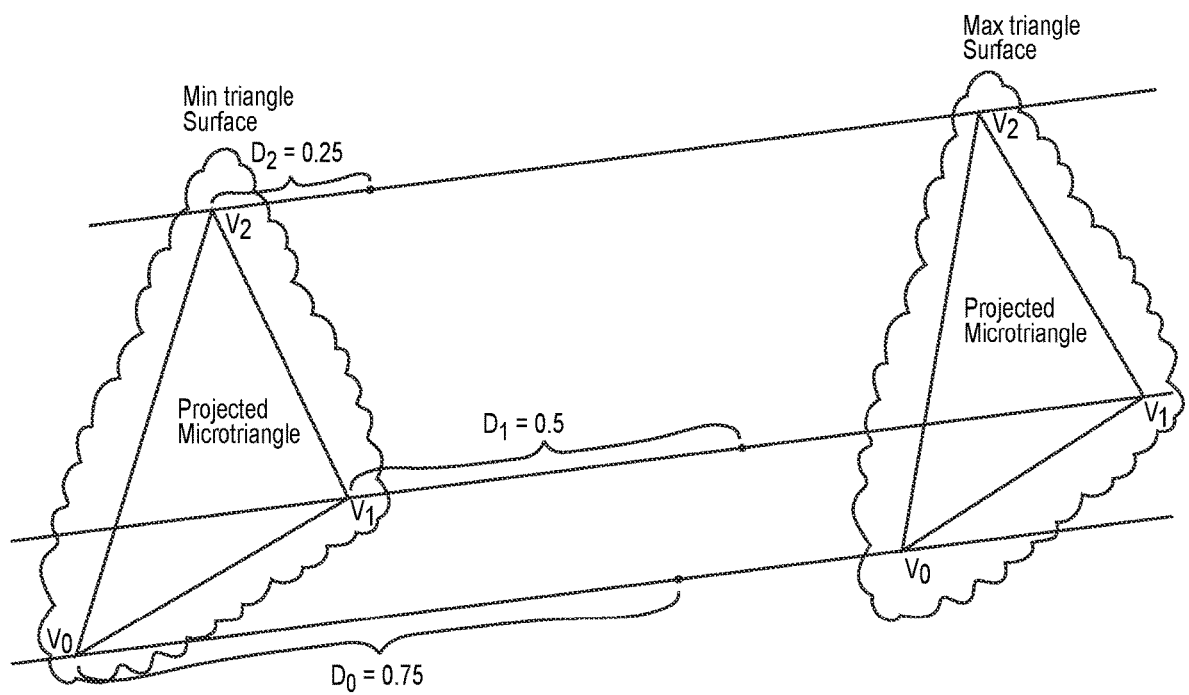
Figure 23C:
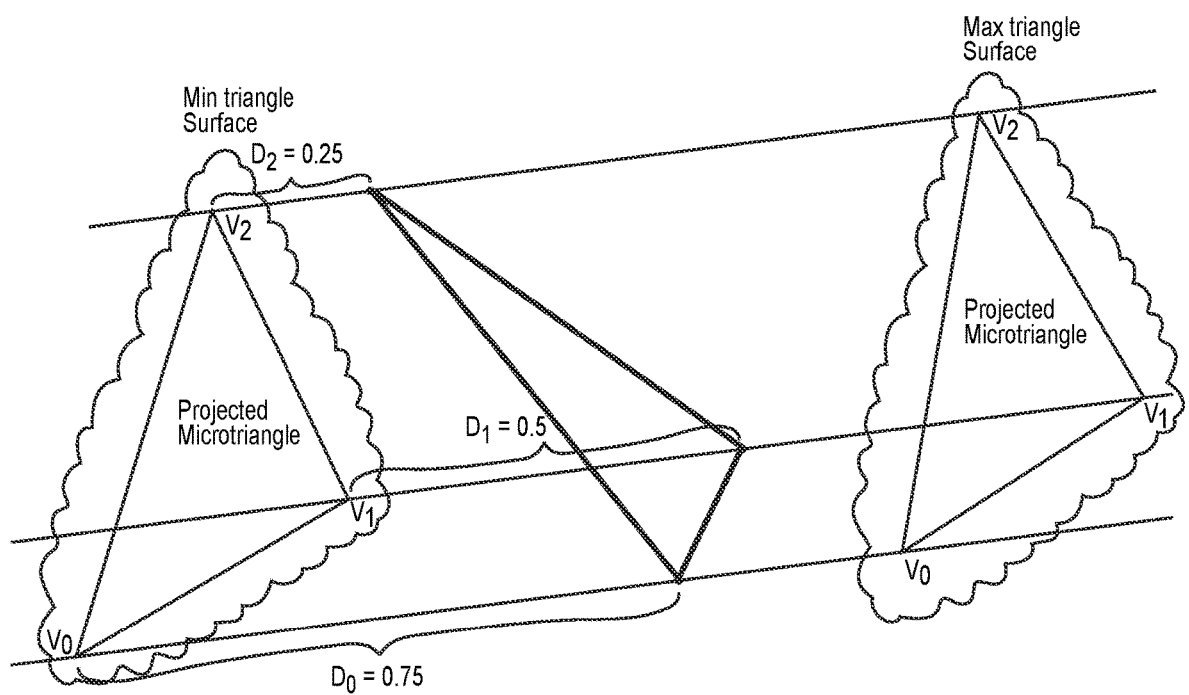

As FIGS. 23A, 23B & 23C show, the microtriangle vertices of the micro-mesh mesh may be thought of as being projected from a barycentric grid on the surface of the base triangle along their respective direction vectors onto the surfaces of each of the minimum and maximum triangles (or onto the surface of the maximum triangle if the base triangle surface serves as the minimum triangle). In one example embodiment, the three base triangle vertex direction vectors are linearly interpolated to determine/specify—in conjunction with the predetermined barycentric grid coordinates defining the mesh—the positions of the three microvertices of each microtriangle. One can thus think of this as defining a linearly-interpolated direction vector from each microtriangle vertex barycentric position on the base triangle's surface to a corresponding projected microtriangle vertex position on the maximum triangle's surface (and also on the minimum triangle's surface if the minimum triangle is not coplanar with the base triangle).

For example, if the micro-mesh has 64 microtriangles, the primitive will define a total of 42 microvertices in addition to the three base triangle vertices, and one implementation can use linear interpolation to define the corresponding microvertex direction vector for each of those microvertices—these direction vectors each being a line segment between the microvertex position on the minimum triangle's surface and extending to a corresponding position on the surface of the maximum triangle as shown in FIG. 23A.

The three interpolated microvertex displacement vectors of a microtriangle are used to respectively define the displacement directions of each microvertex of that microtriangle—and in conjunction with a displacement value for each microvertex and the barycentric grid at an appropriate level—the xyz position of the microtriangle's three microvertices in 3D space. This is illustrated in FIGS. 23B & 23C. In one example embodiment, a displacement block of the DMM primitive supplies normalized displacements along the respective direction vectors for each microvertex in the form of $0 \leq d \leq 1$. FIG. 23B shows locating a particular microtriangle with vertices V0, V1, V2 with displacements along these direction vectors of $D_0=0.75$, $D_1=0.5$, $D_2=0.25$.

FIG. 23C shows the resulting microtriangle with its microvertices defined at the specified displacements between the minimum and maximum triangles. Note that in this example, the microtriangle has a different orientation than the minimum and maximum triangles, which are parallel to one another as in a prismoid.

Micro-Mesh Displacement Map: Bias and Scale

As explained above, the μ-vertices are computed by linearly interpolating the vertices of the base triangle as well as the displacement directions. Displacement directions may be optionally normalized and then scaled by displacement values retrieved from the DM. No bias or scale is shown in the FIG. 23A-23C calculations for purposes of simplification, but example embodiments do provide bias and scale factors that each DMM primitive introduces in order to allow microvertex displacement values to be represented more compactly while increasing their dynamic range.

Renormalization is practiced in the film industry when modeling geometry with displaced subdivision surfaces. This is because the direction of displacement is typically determined using the normal to the subdivision surface. When modeling geometry using displacement mapped triangles, these vectors, which are referred to as displacement vectors, are usually explicitly specified. Like the normalized displacement vectors, the scalar displacements stored in the DM are specified/defined on the range from zero to one. As a result, the final displacement value is mapped to the range appropriate for the geometry being modeled. For a base mesh, displacement vectors, and μ-triangle mesh, the range of required displacement values, $d_{min}$ to $d_{max}$ are computed.

From $d_{min}$ and $d_{max}$ a mesh-wide scale and bias used in a displacement calculation can be computed as:

$$\text{bias} = d_{min}$$

$$\text{scale} = d_{max} - d_{min}.$$

Because in this implementation the bias as described above is used across the entire mesh, it need not be carried for each microvertex displacement but rather can be added at time of microvertex calculation. In particular, given a displacement scalar u, and interpolated base position b and displacement direction d as $$\hat{d} = \frac{\vec{d}}{\|\vec{d}\|} \quad \text{(optional)}$$

a μ-vertex $\vec{v}$ can be computed as $$\vec{v} = (\text{scale } u + \text{bias})\hat{d} + \vec{b} \quad (0.2)$$

If the interpolated displacement vectors $\vec{d}$ are not renormalized, then a useful degree of freedom may be retained. Note that renormalization reduces from three degrees of freedom to two.

If the interpolated displacement vectors $\vec{d}$ are not renormalized, an alternative equivalent representation that does not use mesh-wide scale and bias can be derived. Details of the transformation where triangle vertices that correspond to values of u equal to 0.0 and 1.0 can be pre-computed is provided below:

$$\vec{p}_{0_L} = (0.0 \text{scale} + \text{bias})\vec{d}_L + \vec{b}_L$$

$$\vec{p}_{1_L} = (1.0 \text{ scale} + \text{bias})\vec{d}_L + \vec{b}_L$$

In this arrangement. triangles $\vec{p}_0$ and $\vec{p}_1$ form a prismoid that fully contains the μ-mesh, and the barycentrically interpolated points on these bounding triangles can be linearly blended to compute the final μ-vertex:

$$\vec{v} = (1-u)\vec{p}_0 + u\vec{p}_1$$

Figure 19:
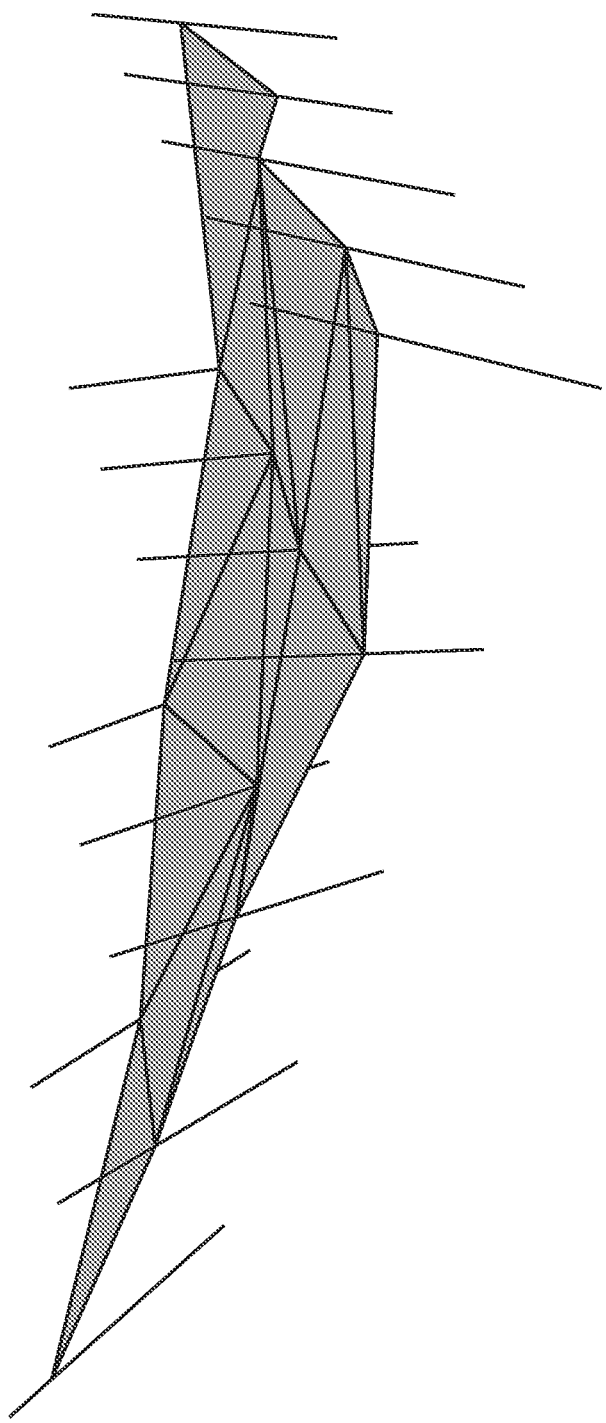
FIG. 19 shows a displacement mapped micromesh and also indicates direction vectors for the microvertices of the mesh.
Figure 20:
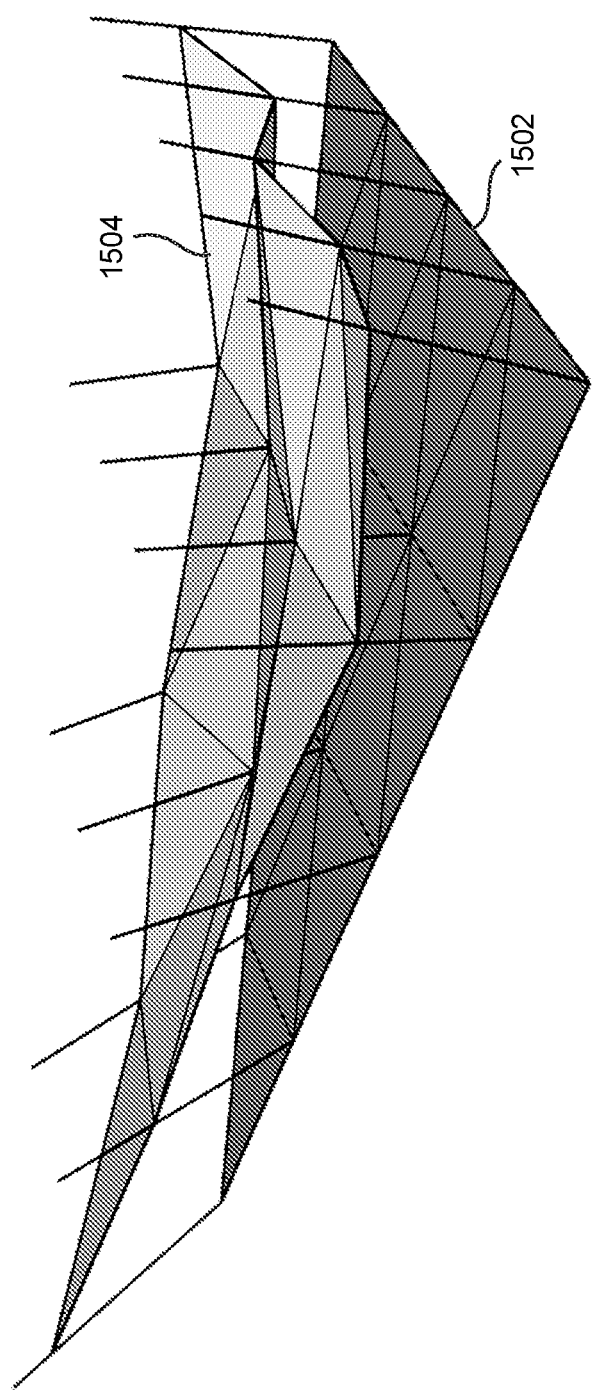
FIG. 20 shows an example displacement mapped micro-mesh defined above a planar subdivided base triangle.
Figure 21:
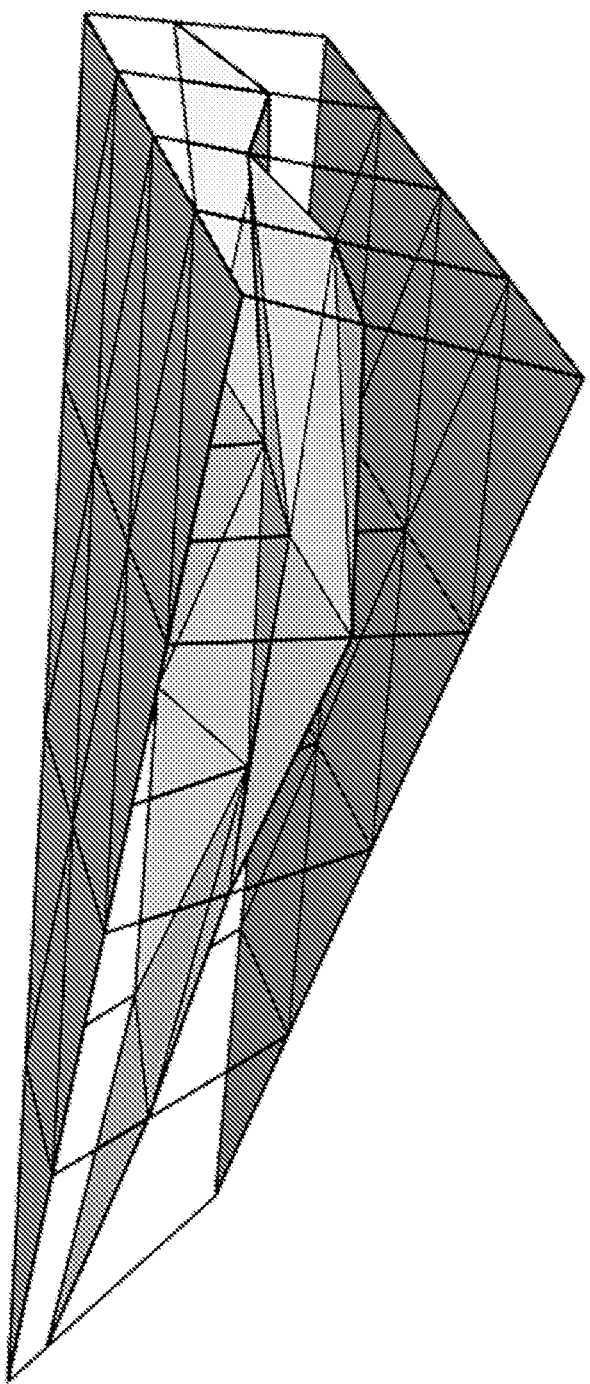
FIG. 21 shows another example displacement mapped micromesh defined within a prismoid comprising a maximum triangle and a minimum triangle, and also shows microvertex displacement vectors between the maximum and minimum triangles.
Figure 25:
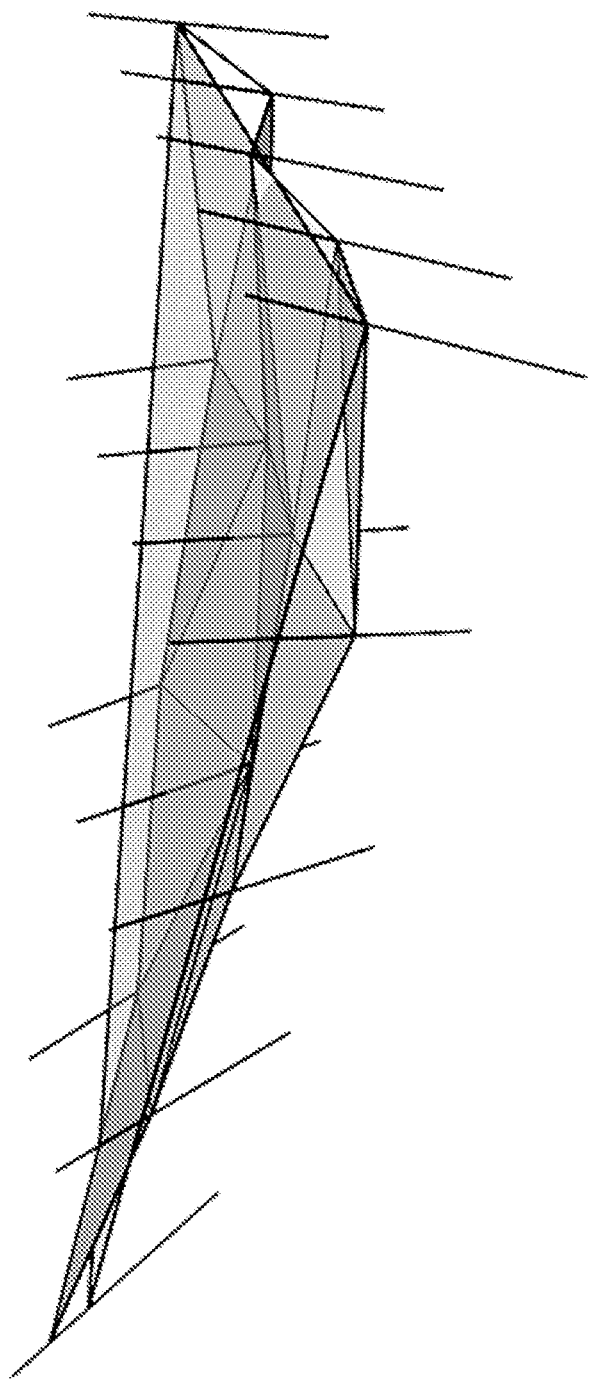
FIG. 25 shows an alternative embodiment example base and displacement "zero triangle" representation where displacements can be specified to be above or below the "zero triangle."

FIGS. 19 & 21 illustrate the two representations: base and displacement across an entire mesh (in FIG. 19) vs. a prismoid specification (in FIG. 21). A third representation shown in FIG. 20 is a combination of the two above described representations which provides displacement values above a minimum or base triangle. This third approach is useful since it makes use of the extra degree of freedom available when not renormalizing, while using a representation whose form is familiar to developers/users. A further approach graphically shown in FIG. 25 adds a so-called "zero-triangle" 1502 with displacement vectors to form the one-triangle 1504. Linear interpolation of the equation above becomes a weighted add of the interpolated displacement vector:

$$\vec{v} = \vec{p}_0 + \vec{d} u.$$

It will be understood that while these various different displacement representing/calculating models may provide respective advantages and disadvantages, any particular implementation includes some tradeoffs. As explained herein, the example embodiment adopts the prismoid model of FIGS. 21, 22, 24 with the further details that the maximum and minimum triangles might only apply to a particular base triangle, different base triangles can have different maximum and minimum triangles, and in one embodiment, the base triangle itself serves as the minimum (or maximum) triangle of the prismoid. Of course, the builder could apply a virtual mesh of same-displaced maximum and minimum base triangles across a range of base triangles for mesh-modeling a particular object such as a large relatively flat surface, although such a virtual maximum and minimum base triangle mesh would not be particularly suitable for other objects such as the FIG. 8A Stanford Bunny. The non-limiting example implementation herein that constructs maximum and minimum triangles for each base triangle provides certain advantages in terms of flexibility and localized processing (the TTU can process each sub triangle independently without needing to "know": anything about parameters or results of any other sub triangle) while requiring a small amount of additional data per DMM primitive.

A Base Triangle can be Non-Uniformly Subdivided

Figure 24:
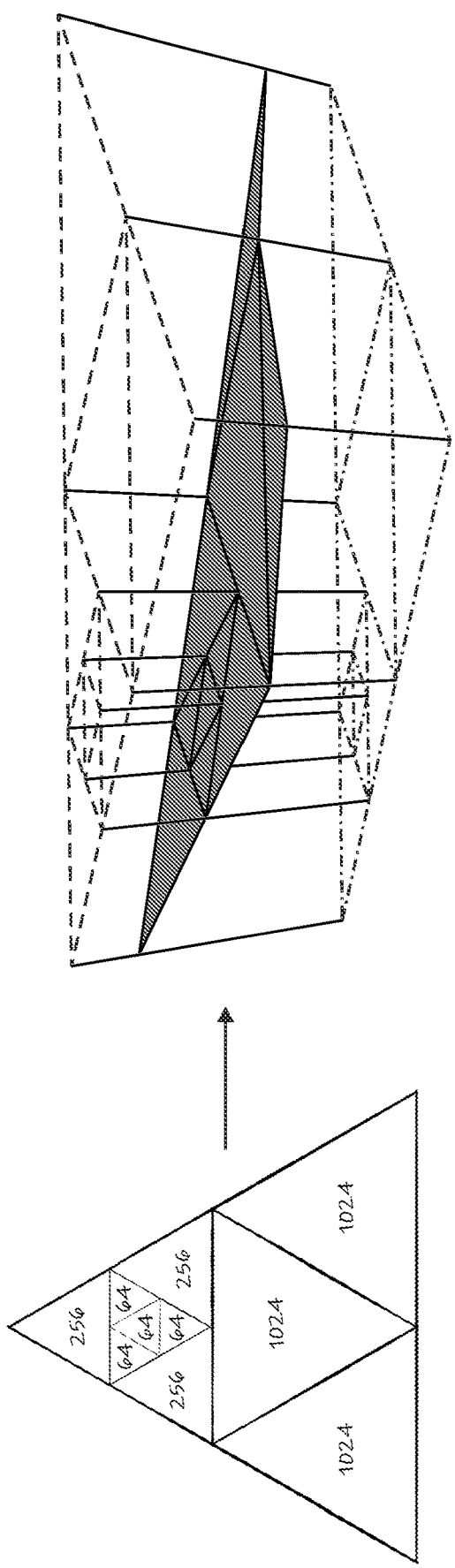
FIG. 24 shows an example DMM primitive including multiple sub triangles that define different micro-mesh resolutions, and a resulting displaced micro-mesh surface defined in a prismoid between minimum and maximum triangles.

As discussed above, the microtriangle mesh can be subdivided to a level k (k ranges from level 0 to a maximum level n where k and n are both integers) to provide $2^k \times 2^k$ microtriangles. Some of the examples discussed above show a mesh where all microtriangles are the same size. However, as FIG. 24 illustrates, the micro-mesh primitive supports non-uniform subdivision in example embodiments—that is, different triangular areas in the same primitive can be subdivided to different levels.

In example embodiments, depending on the level of detail in the geometry being modeled, the base triangles can sometimes become too large in terms of the number of microtriangles, which may mean that the hardware cannot store the displacement data for all of the microtriangles in a single displacement block that can fit in a single cacheline (which may be what is supplied/streamed to the traversal hardware). The example embodiment therefore provides a hierarchy of sub triangles that can be divided into smaller sub triangles, which can be further subdivided into still smaller sub triangles and so on—just like the increasingly littler cats in increasingly littler hats of Dr. Seuss's "The Cat in the Hat Comes Back" (Random House 1958) except that each hat could contain a set of four little cats instead of just one. In one embodiment, each such sub triangle has its own corresponding displacement block such that the microvertex displacement values are available if the micro-mesh the sub triangle defines is chosen as the final level of detail for ray tracing.

In one example embodiment, a sub triangle comprises a set of contiguous (at least in a "bird" traversal order) microtriangles on a base triangle the displacements for which can be stored in a single displacement block/cacheline. The traversal hardware is thus enabled to process (e.g., do all intersection testing for) an entire sub triangle without requiring additional information from memory. In one embodiment, sub triangles of up to 1024 microtriangles are supported by hardware (that is, 1024 microvertex displacement values can fit into a single displacement block), but other implementations could support smaller or larger numbers of microtriangles. In example embodiments, the builder can subdivide a base triangle having more microtriangles than can fit within a single cacheline, into any number of hierarchical sets of sub triangles of the same or different resolutions so that hardware can process the sub triangles in succession instead of all at once, to intersection-test the area of the entire base triangle. There are efficiency advantages in some embodiments to perform culling on each of the four new triangles resulting from subdividing a base or sub triangle (see discussion below).

For example, FIG. 26B schematically shows three different subdivision levels in the same primitive. Each sub triangle of the base triangle of FIG. 26A is further subdivided into four smaller sub triangles. There is no requirement in example embodiments that all sub triangles need to be subdivided to the same level of detail. FIG. 26A and FIG. 26B shows a base triangle that is subdivided into four smaller sub triangles, with the middle one of those sub triangles being further subdivided into four still smaller sub triangles. Each of the sub triangles defines a subarea of the base triangle, with the different subareas able to define different microtriangle subdivision levels. In this example, the three lower sub triangles shown in FIG. 26B are each subdivided into 1024 microtriangles, whereas three of the four top sub triangles are each subdivided into 256 microtriangles, and the middle sub triangle within the top (larger) sub triangle (recursively) defines four sub triangles each of which defines 64 microtriangles. In this example, each of sub triangles shown in FIG. 26B will have a corresponding displacement block containing displacement values for the corresponding microtriangles in the sub triangle, providing in this case 10 displacement blocks as follows:

- 3 displacement blocks each encoding displacements for 1024 microtriangles
- 3 displacement blocks each encoding displacements for 256 microtriangles
- 4 displacement blocks each encoding displacements for 64 microtriangles.

The resulting micro-mesh of FIG. 26B is thus non-uniformly subdivided into microtriangles across its surface, with some sub triangles having smaller/finer microtriangles than others. The builder can construct such primitives based on how compressible the surface is (smooth surfaces can be adequately represented using smaller numbers of microtriangles, whereas rougher or more irregular surfaces may need more data to provide an adequate representation). Hence, the builder can further, recursively subdivide any sub triangle as needed to for example achieve a sufficiently compact representation, and the system does not penalize the builder for such subdividing because—as explained in detail below—the self-culling capabilities of the DMM primitive mean the ray tracing hardware can pursue only a single downward path to reach a microtriangle of interest (like following the trunk of the tree up to a particular branch, then following the branch to a sub branch, then following the sub branch to a sub sub branch, and finally to a particular twig and a particular leaf on the twig) without wasting processing time on any other path or associated geometry.

The hardware meanwhile in one embodiment consumes the DMM primitive at the level of the sub triangle—which is the unit of the primitive the hardware operates on. However, for purposes of watertightness, the sub triangles are defined in the context of a base triangle.

In example embodiments, not only can base triangles can have different sizes, but the DMM primitive's hierarchy also enables different base triangles to be subdivided to different levels of detail, and the hierarchy further enables (with some restrictions in certain embodiments) different areas of a given base triangle's surface to be subdivided differently. This enables a DMM primitive to represent different levels of detail across its surface while still providing compact memory representations and orderly traversal/intersection testing.

Thus, in one embodiment, the microtriangle mesh hierarchy the primitive defines enables each sub triangle area of a base triangle to selectively be further (recursively) subdivided into smaller and smaller triangles each of which can have its own respective displacement. With some restrictions as discussed below relating to T-junctions that place vertices in the middle of shared edges, different parts of the mesh can selectively be subdivided to different sizes/resolutions. Thus, in one embodiment, the mesh can be subdivided non-uniformly, with different microtriangles in the mesh having different sizes and representing different levels of detail.

In example embodiments, the Builder may create the primitive by iteratively subdividing all or portions of the base triangle's surface until a desired level of detail is reached to adequately represent the geometry being modeled. Looking at FIG. 8B, one can see that some parts of a geometric object's surface may be smooth and flat (requiring only a low subdivision level and fewer microtriangles) while other portions of the object's surface is bumpy (requiring higher levels of subdivision and more microtriangles).

In example embodiments, each time a triangle in the hierarchy is subdivided, three new vertices are generated (see FIG. 26B). In example embodiments, the hierarchy is constructed so such sub triangles can be processed locally, i.e., without requiring adjacent base triangles to be processed concurrently and yet still ensuring a crackfree, watertight mesh surface. And in one embodiment, multiple base triangles of uniform or non-uniform resolution to be stitched together to construct larger meshes (see FIG. 8A). Furthermore, the builder can declare any subdivision level to be the microtriangle level, and the triangles on that level can be displaced in 3D space, and tested as geometry against a ray. In one example, different rays can select different subdivision levels for the same micro-mesh primitive to be the microtriangle level.

Example Displacement Block Implementation

As discussed above, in example embodiments the base triangle block of a DMM primitive defines:
  3 base triangle vertex positions/locations in 3D space
    for each base triangle vertex, a direction vector indicating a direction of displacement
    a bias
    a scale.

As discussed above, in one embodiment, each microtriangle microvertex in the mesh has an associated scalar displacement amount. In one embodiment, this microvertex scalar displacement amount is used in conjunction with the displacement scale the base triangle defines to displace the microvertex along a displacement direction which is derived from the displacement directions associated with the minimum and maximum triangles the primitive defines (FIG. 23A-23C).

As discussed above, the scalar displacement amount enables linear interpolation between minimum and maximum microtriangle positions to specify the position of each microtriangle vertex in 3D space. In one embodiment, these displacements can be stored very compactly such as in UNORM11 format but could be stored in binary or in some other format (see below). Using such linear interpolation, every microtriangle vertex is guaranteed to be within the volume defined between the convex hull defined between the maximum and minimum triangles such as shown in FIG. 24.

As briefly explained above, this is useful for intersection testing since a ray that does not intersect the convex hull cannot intersect any of the microtriangles within the convex hull. In one example implementation, the hardware uses axis aligned bounding boxes (AABB) that bounds the convex hull to perform ray-bounding volume intersection testing other than when reaching a leaf node containing the DMM primitive. In addition, culling is implicitly performed as part of the ray-geometry intersection testing by subdividing the convex hull into a hierarchy of prismoidal volumetric subdivisions corresponding to sub triangles. As will be recalled, the base triangle provides a platform for constructing the minimum and maximum triangles that form the convex hull.

As discussed above and shown in FIGS. 23A-23C, each micro-vertex has a corresponding point on both the minimum and the maximum triangle, and a single scalar between 0 and 1 can be used to linearly interpolate the micro-vertex between the two points. Displacement amounts for each micro-vertex are stored in the displacement map for the primitive in the ([0,1] range. See for example FIG. 36. During each subdivision step, the base triangle displacement directions are linearly interpolated to determine displacement directions for each new micro-vertex. Next, each micro-vertex's minimum and maximum position is computed (FIGS. 23A, 23B) using its displacement direction and the base triangle's displacement scale and bias. In one embodiment, because the position interpolation is linear, any bias can also be pre-added to the base triangle vertices by the Builder and the Builder can also apply any desired scale, e.g., to increase the distance between the highest and lowest points of the displaced micro-mesh for that DMM primitive. Finally, the micro-vertex's displacement amount is used to interpolate between its minimum triangle position and its maximum position (FIG. 23C). This produces the final micro-vertex position.

Displacement Storage Using Normalized Integers

In one embodiment, displacement amounts for each micro-vertex are specified in the UNORM11 format. A UNORM is an unsigned normalized integer where all 0s maps to 0.0f and all is maps to 1.0f. Conversion to float is done by expressing the integer value as a float, e.g., 2.0, and then dividing by $(2n-1)$, where here n is 11. For example, a UNORM11 value of 1024 approximates the value $0.5-1024/(211-1)=1024/2047 \approx 0.5$. The base triangle displacement scale effectively transforms the UNORM displacement amounts from the [0, 1] range to the [0, scale] range. Those skilled in the art will understand that other representations are also possible.

Displacement amounts can be stored in a flat, uncompressed format where the UNORM11 displacement for any micro-vertex can be directly accessed. Displacement amounts can alternatively be stored in a new compression format that uses a predict-and-correct mechanism to further reduce the amount of storage. The predict-and-correct mechanism exploits the natural recursive subdivision of a typical micro-mesh to provide additional displacement compression. See the Displacement Compression Patent. In cases where predict-and-correct does not adequately represent the geometry being modeled (e.g., due to lack of self-similarity of neighboring microvertices), the builder can recognize this and use apply no compression for the displacement map (or, in some applications, potentially use a different kind of compression)—thus providing two or more different compression modes (e.g., compression or no compression) depending on surface height characteristics of the geometry being modeled. Instead of picking no compression, the builder can first try to subdivide a microtriangle into four sub triangles and compress each of the sub triangles separately in search of meeting an error tolerance for the particular geometric model. See FIG. 26B.

Numerical Precision

Goals for the μ-mesh representation in example embodiments include both compactness and precision. A high-quality representation will be both compact and precise. Choices for specification precision reflect these goals. Geometry is specified on an arbitrary scale while taking advantage of the fact that the base mesh approximates the fine mesh of μ-triangles.

In one example embodiment, the base mesh can be computed using 32-bit floating point (e.g., IEEE floating point). The displacement vectors may be specified using reduced precision such as 16-bit floating point since they are offset from the base mesh. Similarly, the zero-triangle plus displacement representation may use these two precisions. In some embodiments, the prismoid representation uses 32-bit floating point for both $\vec{p_0}$ and $\vec{p_1}$ minimum and maximum triangles because they are specified irrespective of scale. Multiple factors may be considered in establishing the precision and format of the scalar displacement values u stored in the displacement map. In some embodiments, fixed-point is chosen because u maps a space of uniform importance. In some embodiments, UNORM (unsigned normalized integer) representation is chosen because it is a standard graphics format that maps the space from 0.0 to 1.0, inclusive. A UNORM is of the form $u/(2^n-1)$ where u is an f-bit unsigned integer. The size of an uncompressed DM is a consideration when choosing precision levels.

Example Base Triangle Subdivision Process

As discussed above, a base triangle has three vertices: v0, v1 and v2 (or w, u, and v). A subdivision step of this triangle creates four new triangles named w, m, u, and v (FIG. 27). The corner triangles are named for their base vertex. The triangle in the middle is the "middle" triangle. Each subsequent level of subdivision further divides each of those triangles into four more. This subdivision process can be performed recursively to yield more and more, finer and finer sub triangles. Therefore, this process generates $4^n$ microtriangles after n subdivision steps. FIG. 28 details example non-limiting resolution and number of microtriangles at various levels of subdivision (or subdivision levels), as well as the number of bits required to index each microtriangle at that level in one non-limiting example implementation. Example hardware can be capable of subdividing to level 0 or level 1 or level 2 or level 3 or level 4 or level 5 or level 6 or level 7 or level 8 or level 9 or level 10 or level 11 or level 12 or level 13 or level 14 or level 15 or level 16 or to levels higher than level 16. Furthermore, microtriangles with associated displacement maps can be defined at any of these levels.

"Bird" or Spacefilling Traversal Curve

A challenge of the recursive-subdivided, hierarchical structure described above is to efficiently access the appropriate displacement block and entry within that displacement block corresponding to a microvertex or microvertices of interest. While explicit memory addresses could be used, to conserve memory storage space, it is desirable to enable the ray or path tracing hardware that traverses the acceleration data structure containing micro-mesh primitives to derive indices to and into such displacement blocks so that explicit addresses are not needed.

Figure 29:
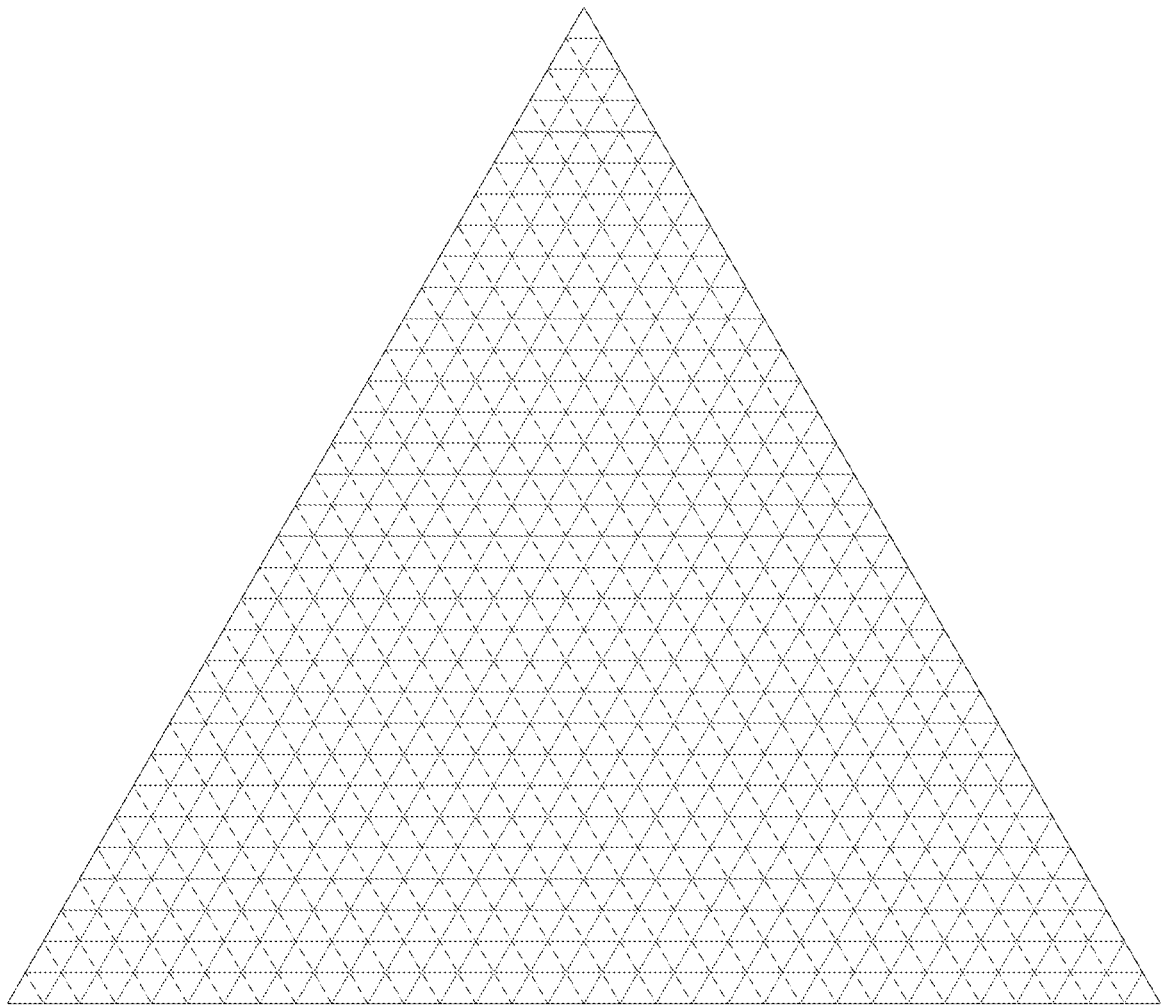
FIG. 29 shows a base triangle subdivided at level 5 containing 1024 microtriangles.
Figure 30:
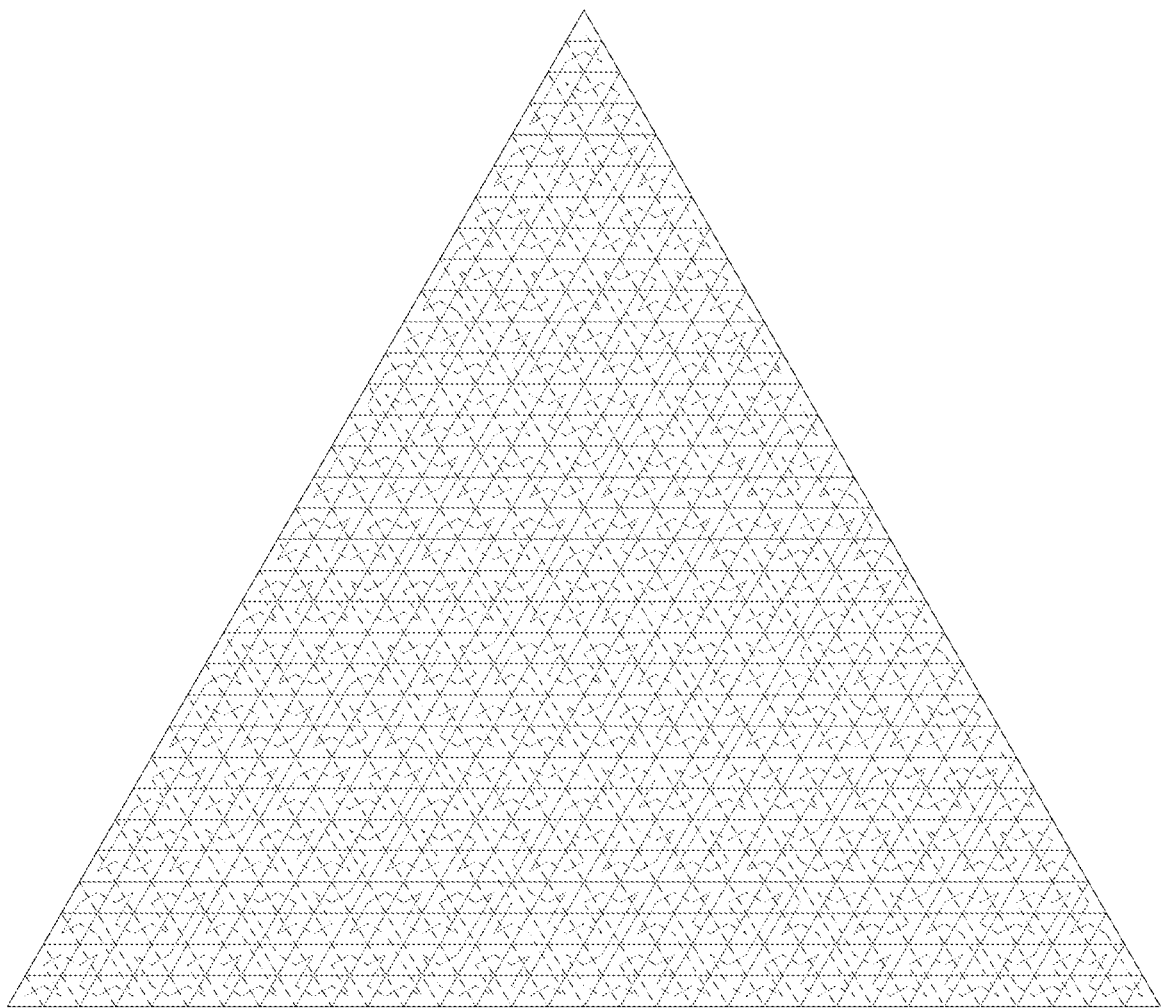
FIG. 30 shows a level 5 subdivided triangle with a space filling curve referred to herein as the "bird curve" applied. Each microtriangle is uniquely indexed by its distance along the curve, also known as the microtriangle's "bird index."
Figure 31:
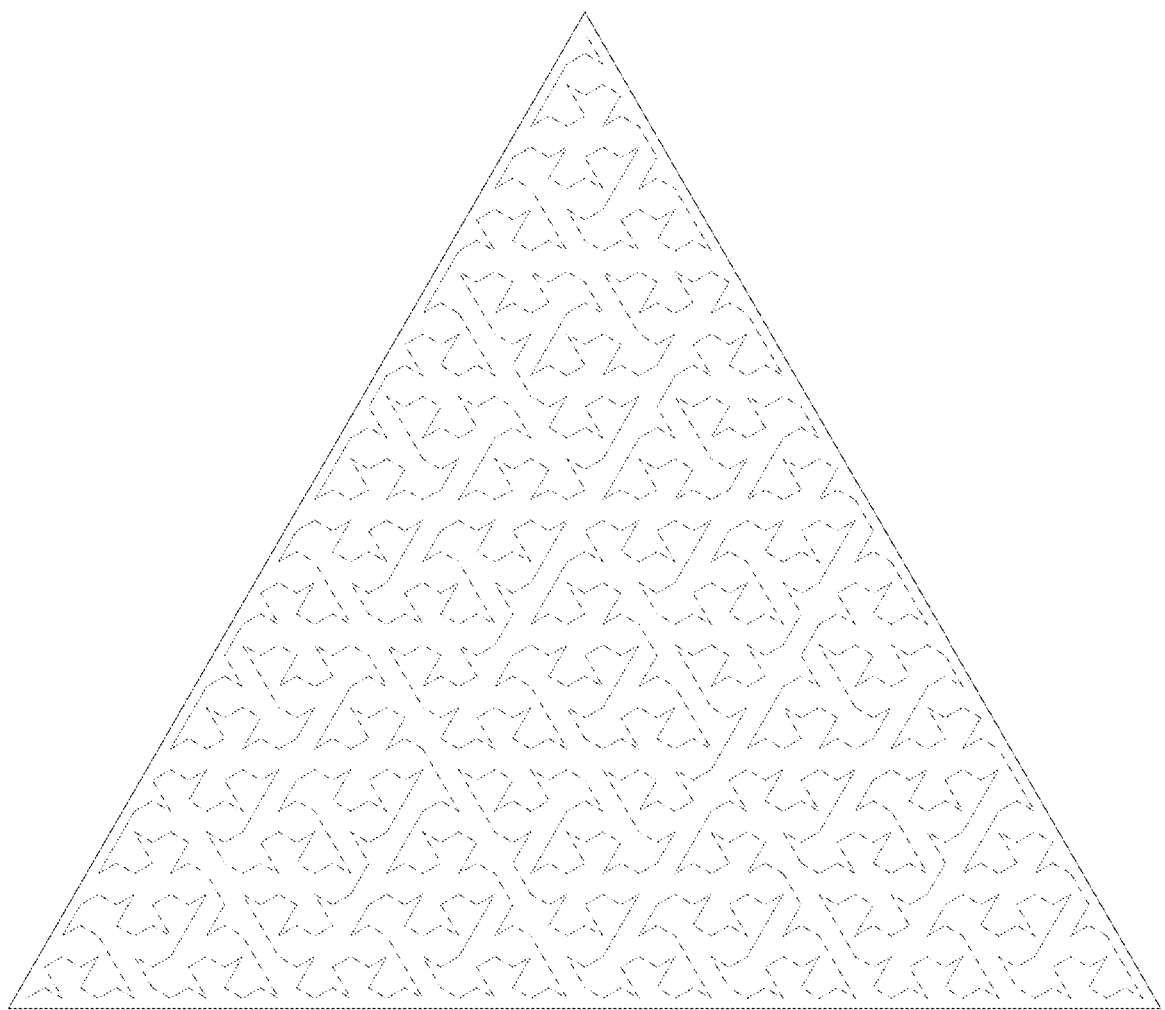
FIG. 31 shows the "bird curve" of a level 5 subdivided triangle, shown without the microtriangles to highlight the birdlike pattern of this particular space filling curve.

In order to consistently index sub triangles and microtriangles within the primitive, a space-filling curve over the power-of-two barycentric grid may be used. One embodiment uses a space-filling curve called the "bird curve" because of its resemblance to an Escher-like repeated bird pattern (see FIG. 31). FIG. 29 shows a base triangle subdivided at level 5 (1024 microtriangles), FIG. 30 shows the "bird curve" applied to that micro-mesh. FIG. 31 shows the "bird curve" without the micro-triangles drawn to show its Escher-like pattern.

In the embodiments shown, the barycenter of each microtriangle on the base triangle is uniquely indexed by the integer distance along the "bird curve" to reach it. This distance is called the "bird index", and it plays many roles (e.g., to reference both the displacement block information and visibility mask information). Space-filling curves defining traversal orders and associated implicit indices other than the "bird curve" and "bird index" are also possible—what is shown here is one example. See for example U.S. Ser. No. 10/573,058; U.S. Ser. No. 10/074,212; U.S. Pat. Nos. 9,396,512; 8,773,422; 7,808,512; 7,692,654; Moon et al, "Analysis of the clustering properties of the Hilbert space-filling curve", IEEE Transactions on Knowledge and Data Engineering (Volume: 13, Issue: 1, January-February 2001); Butz, Convergence with Hilbert's space filling curve, Journal of Computer and System Sciences Volume 3, Issue 2, May 1969, Pages 128-146/doi.org/10.1016/50022-0000 (69)80010-3; Boxm et al, XZ-Ordering: A Space-Filling Curve for Objects with Spatial Extension International Symposium on Spatial Databases SSD 1999: Advances in Spatial Databases pp 75-90 (1 Jan. 1999); Fung, Towards Adaptive Rendering of Smooth Primitives of GPUs, Master's Thesis, University of British Columbia (October 2005); Sagan, Hans, Space-Filling Curves, Universitext, Springer-Verlag, (1994) doi:10.1007/978-1-4612-0871-6, ISBN 0-387-94265-3.

In more detail, one can see from FIG. 30 that every microtriangle in the mesh is reachable by traversing the "bird curve", which—a bit like a labyrinth on the floor of a gothic cathedral—describes a single path through the micro-mesh. In this example, the "bird curve" visits the barycenter of every microtriangle in the mesh. Even though the labyrinthine "bird curve" touches or passes through some microtriangles more than once, each inflection point on the "bird curve" designates or indicates one and only one microtriangle in the mesh (one will also notice there are straight or non-inflected segments of the "bird curve" that are used to designate or indicate microtriangle barycenters). Thus, if one were to "walk" the "bird curve" shown in FIG. 30, one would visit every microtriangle barycenter in a repeatable, predetermined fixed sequence and could keep track of which microtriangle is currently being visited by counting the number of microtriangles previously visited since entering the labyrinth (the "bird index").

Figure 32:
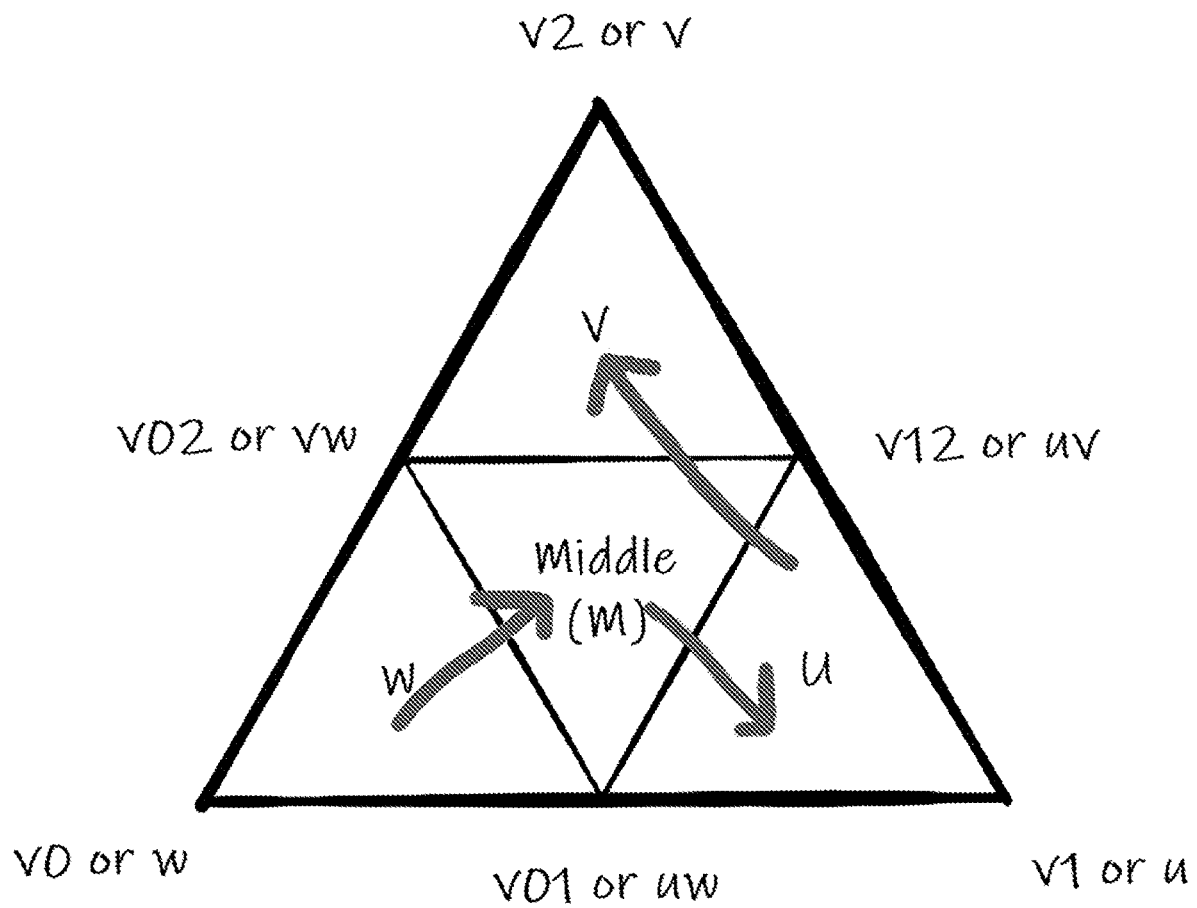
FIG. 32 shows the "bird curve" traversing a split in the w, m, u, and v microtriangle order. For a level 1 subdivided triangle, the w microtriangle's "bird index" is 0, the m microtriangle is index 1, the u microtriangle is index 2, and the v microtriangle is index 3 in one embodiment.
Figure 33A:
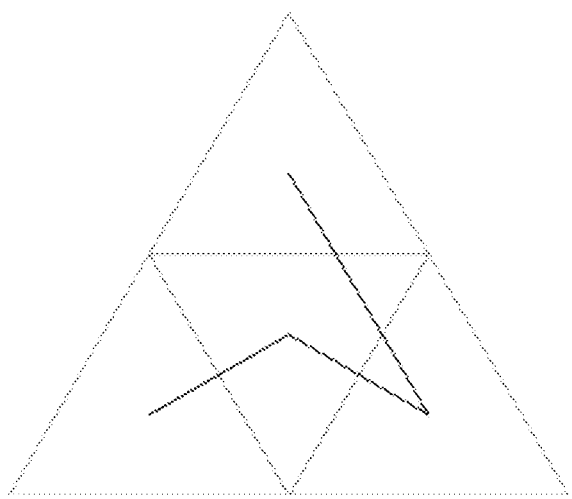
FIGS. 33A, 33B, 33C, 33D show "bird curves" applied to the first four levels of subdivision, demonstrating the recursive hierarchical splitting property of the curve.
Figure 33B:
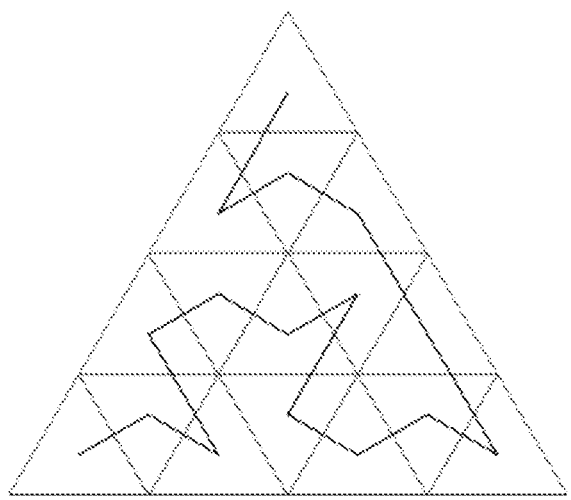
Figure 33C:
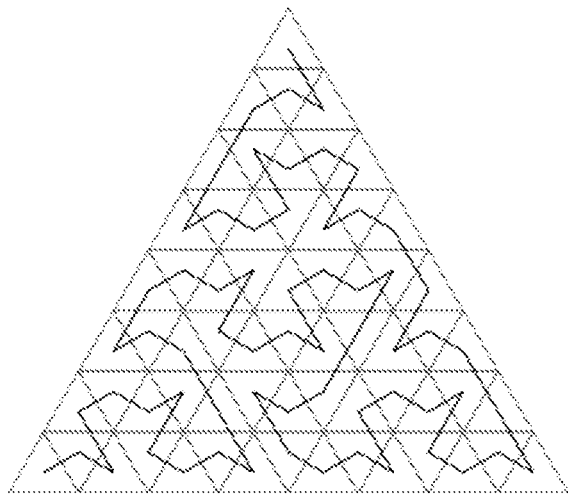
Figure 33D:
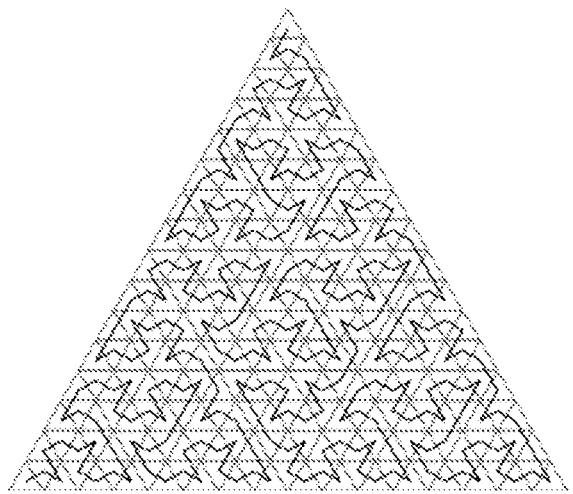

In one embodiment, the "bird index" is used to define the start position of a sub triangle within a base triangle. The "bird index" is also used to select individual microtriangles for triangle fetch operations. The "bird curve" has the useful property that it is purely hierarchical with recursive splitting. At each split, the curve enters at the W microtriangle, then traverses to the M microtriangle, followed by the U microtriangle, and finally exits at the V microtriangle (FIG. 32).

Figure 35:
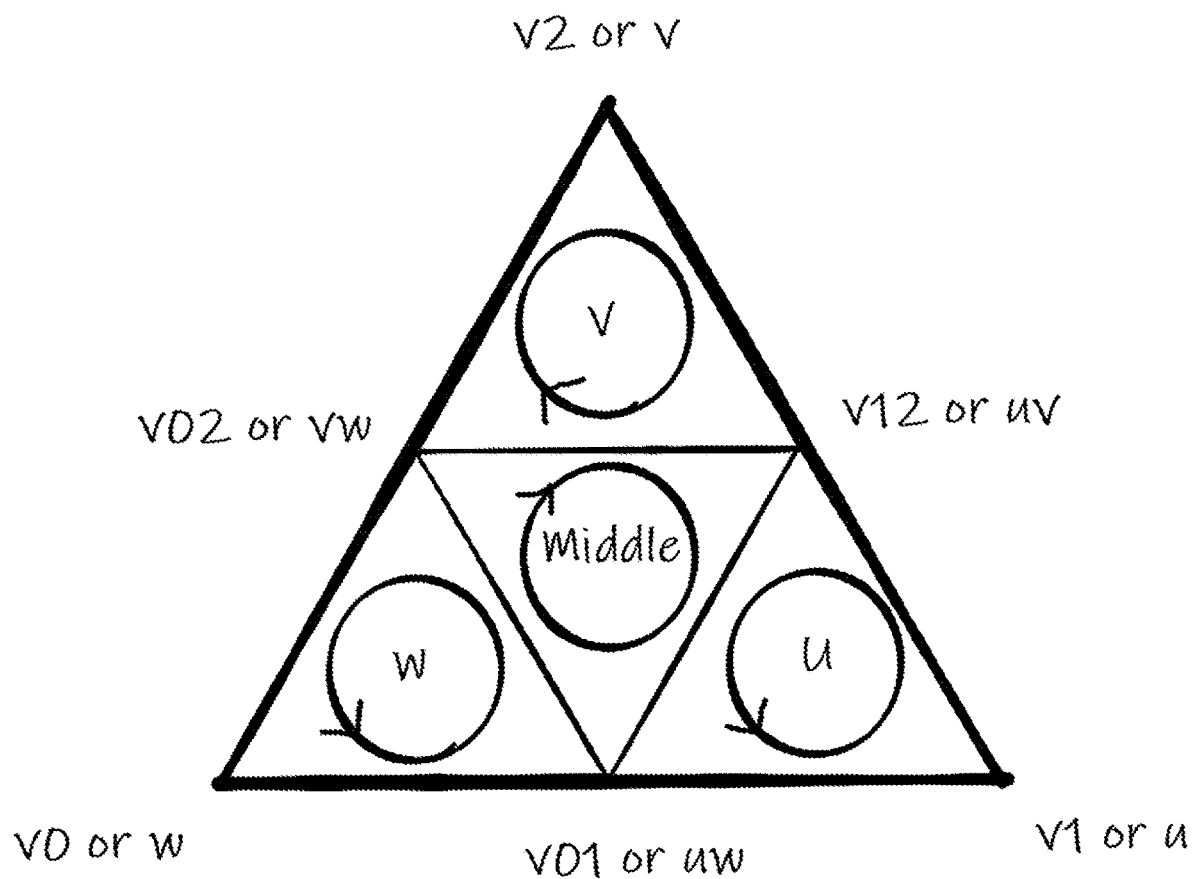
FIG. 35 shows example microtriangle windings produced as a result of subdivision process using the "bird curve".

FIGS. 33A, 33B, 33C, 33D show respectively the "bird curves" for the first four subdivision levels. To maintain a contiguous hierarchical ordering, some triangles are flipped and wound differently as shown in FIG. 35. The W triangle is constructed with the w, uw, and vw vertices. The middle triangle then starts at vw, goes to uv, and then uw. The assignments for all four triangles are shown in the example pseudo-code in FIG. 34.

This subdivision process produces M and V triangles that have a flipped winding with respect to the base triangle (FIG. 35). Flipped here means the direction the bird curve is followed—clockwise or counterclockwise. The flipped winding is eventually un-flipped when determining facing.

Edge Definition: Adjacent Base Triangle Resolutions and Edge Decimation

As explained above, in our DMM primitive examples, larger meshes can be constructed by stitching together multiple base triangles. This can result in creating T-junctions. In one embodiment, adjacent base triangles in that larger mesh are allowed to have different resolutions, but to prevent cracking can only differ by at most one level. For example, a resolution 8 base triangle can be next to a resolution 9 base triangle, but not next to a resolution 10 base triangle. However, the change in base triangle resolutions can propagate throughout the mesh such that, for example, a resolution 8 base triangle is next to a resolution 9 base triangle which itself is next to a resolution 10 base triangle.

When adjacent base triangles have different resolutions, the number of segments on the shared edge will differ by a factor of 2. This introduces T-junctions, which then introduce cracking as shown in FIG. 37. To solve this in one embodiment, shared edges that differ in resolution are "decimated" (by which we mean reduced) such that the segments on the shared edge are the same. See e.g., Schroeder et al, "Decimation of Triangle Meshes" (General Electric) (SIGGRAPH 1992), which used decimation to reduce the number of polygons for rendering. FIGS. 38A-38F, 39A-39C, 40, 41, and 42A-42K show the decimation or reduction that happens with a single shared edge, two shared edges, and three shared edges. In total there are ten edge decimation cases.

In more detail, referring again to FIG. 8A, as explained above, the white outlined triangles would typically be defined as base triangles. The larger FIG. 8B mesh can be provided by sticking together or connecting multiple base triangles. Recall however that the base triangles the DMM primitive defines can have differing resolutions. Because of this, watertightness problems can potentially arise with respect to microtriangle vertices on the edges of a base triangle, i.e., where the base triangle is connected to another base triangle. FIG. 37 shows a typical T junction problem that can arise due to such differing resolution. As FIG. 8B shows, there can be many such situations in a triangle mesh. As soon as it is possible to subdivide the base triangles to different microtriangle resolutions such as shown in FIG. 37, the problem of T-junctions can arise. In particular, in the FIG. 37 example, during subdivision, only the top base triangle will displace the micro-vertex as the bottom base triangle doesn't have that micro-vertex. This leads to cracking and a non-watertight mesh.

It should be noted that the FIG. 26B might appear to present a T junction problem internal to a base triangle but does not because all of the sub triangles are associated with the same base triangle. However, FIG. 37 shows a different situation—adjacent, different base triangles of differing resolutions sharing an edge that introduces a T-junction, as shown with the circle in the center of the figure.

In more detail, in this simple FIG. 37 illustration, a first (Level 1) base triangle defining four microtriangles (top) shares an edge with an adjacent (Level 0) base triangle where the entire base triangle defines a single microtriangle (bottom). The point in the very center of the figure shown in a circle is a T junction. The top base triangle can displace the lowermost microvertex of the center "middle" microtriangle, but there is no corresponding vertex of the lower base triangle that can be displaced. If not handled appropriately, this will cause a crack because the upper base triangle can displace the microvertex with a circle around it up or down (e.g., in a direction that projects out of the figure directly at you the viewer) whereas the lower base triangle has no ability to match that displacement.

Even if the microvertex of FIG. 37 with a circle around it were located at the average of the two vertex endpoints of the lower base triangle, floating point quantization (even for high floating point precision such as FP32 or FP64) might still result in visible pixel dropouts (lack of watertightness) unless some special measure (e.g., processing the two base triangles at the same time and using a common microvertex calculation result for both) is taken to avoid the problem. Otherwise, there is no way to exactly describe the microvertex with the circle around it with respect to the larger base triangle below.

T-junctions are known to cause artifact (e.g., cracking, lack of watertightness, pixel dropping) problems in polygon meshes, and various solutions have been proposed for various contexts. See for example U.S. Pat. No. 8,860,742; Brainerd et al, Efficient GPU rendering of subdivision surfaces using adaptive quadtrees, ACM Transactions on Graphics Volume 35 Issue 4 Jul. 2016 Article No.: 113 pp 1-12 doi.org/10.1145/2897824.2925874; Fisher et al, DiagSplit: parallel, crack-free, adaptive tessellation for micropolygon rendering, ACM Transactions on Graphics Volume 28 Issue 5 Dec. 2009 pp 1-10 doi.org/10.1145/1618452.1618496; Gu et al, Geometry images, SIGGRAPH '02: Proceedings of the 29th annual conference on Computer graphics and interactive techniques July 2002 Pages 355-361 doi.org/10.1145/566570.566589; Feng et al, Feature-preserving triangular geometry images for level-of-detail representation of static and skinned meshes, ACM Transactions on Graphics Volume 29 Issue 2 Mar. 2010 Article No.: 11pp 1-13 doi.org/10.1145/1731047.1731049; Chung et al, A Simple Recursive Tessellator for Adaptive Surface Triangulation, Journal of Graphics Tools Volume 5, 2000—Issue 36 April 2012//doi.org/10.1080/10867651.2000.10487524.

In embodiments herein, we propose a novel solution we call "decimation" as a way to solve this problem for our DMM primitive, builder and ray/path tracing hardware. In one example embodiment, decimation changes the topology of a higher resolution base triangle without changing its shape, to eliminate the T-junction. As a result of applying decimation, the microvertex of the top triangle in FIG. 37 that is enclosed by the circle is eliminated by a change in topography. A ray-geometry intersection test may still be carried out for a collection of microtriangles covering the same base triangle area, but the hardware effectively, dynamically alters the topology of microtriangles under test and—if an intersection is found—reports or otherwise handles the intersection based on the dynamically altered microtriangle topology.

For example, FIGS. 38A, 38B, 38C, 38D, 38E, 38F show various edge decimation styles for a single shared edge between two adjacent base triangles. All or a subset of these styles may be used in a given implementation. And FIGS. 39A, 39B, 39C show various edge decimation styles for dual shared edge between three adjacent base triangles. These cases only happen at the corners of the base triangle, and so there are only 3 possible edge decimation styles. FIG. 40 shows a single edge decimation style when a base triangle adjacent to three other base triangles (in one embodiment, this case only applies to base triangles with a resolution of 1—and means it's not possible to subdivide into plural microtriangles at all).

In these decimation examples, the triangle(s) comprising dotted lines outside of the solid line triangle(s) represent an additional, adjacent base triangle(s) that shares an edge with a microtriangle under test. Edge decimation in example embodiments thus occurs on a base triangle level, and is applied only on the edges of a base triangle. The goal for the builder is to recognize if the applicable pattern exists, and to decimate (eliminate one or more microvertices) to avoid creating a T-junction with this additional, adjacent triangle. Taking FIG. 38A as an example, a microvertex that would have been at the center of the V20 line segment (thus creating a T-junction with the adjacent base triangle below) is slid to the left—creating a different topology where the original w triangle is eliminated and the middle triangle now has a line segment between V01 and V2 instead of a line segment terminating in the center of the shared edge V20 line segment. The T-junction is thereby eliminated. The topologies of the microtriangles within the base triangle are thus adjusted to use fewer microvertices—and in particular, to avoid terminating on base triangle edges shared with other base triangles with different resolutions. Meanwhile, in example embodiments, the DMM hierarchy is structured so T-junctions within base triangles are never created in the first place, by matching up microvertices. Decimation is applied when T-junctions are created by the particular way that base triangles interact with respect to microvertices.

In one embodiment, the above decimation schemes do not affect culling or subdivision—only the results of testing an individual microtriangle against a ray (this is where the watertightness problem if there is one would arise). As explained below, the builder creating a DMM primitive recognizes the potential problem cases discussed above and encodes a decimation field indicating which (if any) edges of the base triangle should be decimated. In example embodiments, the decimation field is compact information that is carried along but does not affect anything until it's going to make a difference—namely in the ray-geometry intersection test at a last stage when the hardware generates a group of four non-culled microtriangles to test against a ray for intersection. At that point, the decimation field controls the hardware to alter the topology (but not the shapes) of the microtriangles it is testing to avoid the T-junction problem and associated artifacts, as follows:

FIG. 41 shows an example default microtriangle topology when no edge decimation is applied. This occurs when either no edge decimation is specified or when the input triangle is not adjacent to a decimated base triangle edge.

FIG. 42A shows an example microtriangle topology used when the effective base triangle resolution (base triangle resolution—LOD bias) is 0. In this case only a single microtriangle is generated.

FIG. 42B shows an example microtriangle topology for edge decimation style 0. This style is used when the bottom edge is decimated and the input triangle is on the left half of the bottom edge.

FIG. 42C shows an example microtriangle topology for edge decimation style 1. This style is used when the bottom edge is decimated and the input triangle is on the right half of the bottom edge.

FIG. 42D shows an example microtriangle topology for edge decimation style 2. This style is used when the left edge is decimated and the input triangle is on the top half of the left edge.

FIG. 42E shows an example microtriangle topology for edge decimation style 3. This style is used when the left edge is decimated and the input triangle is on the bottom half of the left edge.

FIG. 42F shows an example microtriangle topology for edge decimation style 4. This style is used when the right edge is decimated and the input triangle is on the bottom half of the right edge.

FIG. 42G shows an example microtriangle topology for edge decimation style 5. This style is used when the right edge is decimated and the input triangle is on the top half of the right edge.

FIG. 42H shows an example microtriangle topology for edge decimation style 6. This style is used when the bottom and left edges are decimated and the input triangle is on the lower-left corner of the base triangle.

FIG. 42I shows an example microtriangle topology for edge decimation style 7. This style is used when the left and right edges are decimated and the input triangle is on the topmost corner of the base triangle.

FIG. 42J shows an example microtriangle topology for edge decimation style 8. This style is used when the bottom and right edges are decimated and the input triangle is on the lower-right corner of the base triangle.

FIG. 42K shows an example microtriangle topology for edge decimation style 9. This style is used when all edges are decimated and the base triangle is resolution 1.

In example embodiments, a consequence of the decimation scheme outlined above is that adjacent base triangles are constrained so they differ only by one level in the level of detail of their microtriangle subdivisions. Those skilled in the art will understand that other techniques could be employed instead of or in addition to the above decimation scheme (for example many more cases than outlined above, resulting in increased circuit complexity and associated real estate) if it were necessary to accommodate larger mismatches in the levels of detail of adjacent microtriangles. The ramification of the constraint is simply that the builder must distribute larger jumps in resolution across some number of base triangles.

Discrete Barycentric Coordinates

Just as three barycentric coordinates define a single point on a triangle, three discrete barycentric coordinates can be used to pinpoint a single microtriangle on a base triangle. This is for example useful in the decimation scheme above in terms of determining when a microtriangle is on the edge of a base triangle.

Those skilled in the art understand that barycentric coordinates are commonly used in ray tracing e.g., to determine whether a ray intersecting with a plane is intersecting a point on the plane inside a given triangle. For example, one expression of barycentric coordinates is:

$$\text{so that } \begin{aligned} P(\alpha, \beta, \gamma) &= \alpha a + \beta b + \gamma c, \text{ where } \alpha = 1 - \beta - \gamma \\ P(\beta, \gamma) &= (1 - \beta - \gamma)a + \beta b + \gamma c = a + \beta(b - a) + \gamma(c - a). \end{aligned}$$

In this expression, $\beta(b-a)$ and $\gamma(c-a)$ are vectors describing the triangle's three vertices, the vectors lying on the triangle's plane. Any point on the plane of the triangle can be expressed as a weighted average of the vertices of the triangle, and the weight of the weighted average are the barycentric coordinates of that point. As is well known, if the weights $$\alpha, \beta, \gamma \geq 0$$

(this means that each of $\alpha, \beta, \gamma$ is greater than or equal to 0 and less than or equal to 1), then P is a point inside the triangle or on its boundary. When $$\alpha = \beta = \gamma = \frac{1}{3},$$

P defines the barycenter of the triangle. Barycentric coordinates can parameterize an edge of a triangle or even a vertex of a triangle. A well-known use of barycentric coordinates in ray tracing is to determine the point at which a ray intersects a plane containing a triangle, compute the barycentric coordinates of that point, and check the signs of those barycentric coordinates to determine whether the ray intersects the triangle. See e.g., U.S. Pat. Nos. 11,295,508; 8,411,088; Amanatides et al, "Ray tracing triangular meshes", pp 43-52, Proceedings of the Eighth Western Computer Graphics Symposium (April 1997); //mathworld.wolfram.com/BarycentricCoordinates.html.

In example embodiments, we use "discrete" barycentric coordinates to assign a unique coordinate to each microtriangle in a base triangle. Discrete barycentrics can be used to trivially know if a particular microtriangle is adjacent to any edge of the base triangle a property that is desirable for informing the edge decimation mechanism.

In one embodiment as illustrated in FIG. 43, the three discrete barycentric coordinates—iu, iv, and iw—indicate the microtriangle's distance to the corresponding (projected) base triangle vertex. For example, on a resolution 2 mesh such as illustrated in FIG. 43, the bottom left microtriangle has the discrete barycentric coordinates 003, as it is closest to the "w" vertex. The middle triangle has the coordinates 111 as it is equidistant to all base triangle vertices.

FIG. 43 thus shows a discrete barycentric map of a resolution 2 micro-mesh. The map shows that the discrete barycentric coordinates assigned to microtriangles on a base triangle are structurally related to where each microtriangle is on the base triangle. It is easy to see from the discrete barycentric coordinates where the associated microtriangles are in the base triangle. For example, all microtriangles assigned a discrete barycentric coordinate of the form "*0*" where "*" could be any value, are found on or touch the bottom edge of the base triangle. Similarly, all microtriangles assigned a value of "0" are on or touch the left edge, and all microtriangles assigned a value of "0" are on or touch the base triangle's right edge. And a microtriangle that is assigned a discrete barycentric coordinate with all digits being non-zero is an interior microtriangle that is not found on or touching any edge of the base triangle. One can also tell the orientation of a microtriangle from its discrete barycentric coordinates (if the digits add up to 3, the base of the microtriangle is at the bottom (the microtriangle is "upright"), and if the digits add up to 2, the orientation is reversed with a microvertex of the triangle being at the bottom (the microtriangle is "inverted"). There are situations where upright and inverted microtriangles are handled or processed differently.

The discrete barycentric coordinates in one embodiment is different from the space-filling "bird curve". However, in one example embodiment, a microtriangle's "bird index" can be used to compute its discrete barycentrics using bit-manipulation. One embodiment provides a hardware circuit in the TTU (see below) that uses bit or other data manipulations to return the discrete uvw barycentric coordinates of a specified micro-triangle based on subdivision level and the "bird" index of the target micro-triangle at the input subdivision level. See FIG. 45 example pseudocode.

Level of Detail (LOD) of Displaced Micro-meshes

An object's level of detail, as the name suggests, indicates the quality of its mesh representation. Objects that are far away from the camera can be drawn at a low level of detail to improve performance without sacrificing much visual fidelity. For displaced micro-meshes, the resolution of the base triangle itself a good indicator of level of detail (the more microtriangles a base triangle defines, the higher level of detail and the finer displacement patterns the DMM primitive can model).

To take advantage of this fact, displaced micro-meshes in one embodiment support a dynamic (or runtime) LOD bias which acts to reduce the amount of runtime subdivision performed on the base triangle. In other words, it is possible to control the hardware to subdivide a base triangle to less than the level of detail than it is structured to define, thereby stopping the hardware's hierarchical subdividing process early and saving time. This also means that each DMM primitive can support multiple levels of detail for the same sub triangle, and the hardware can "decide" (be controlled) at runtime to declare any level of sub triangle subdivision supported by a particular DMM primitive the final microtriangle level so long as a displacement map/block is available for it. As an example, this can used to simulate rays having different widths/diameters.

In one embodiment, the mechanism used is to selectively apply a negative bias amount that controls the hardware to reduce the level of detail of a primitive when subdividing the base triangle by that negative bias amount. For example, a resolution 5 base triangle with an applied LOD bias of 3 effectively acts as a resolution 2 base triangle (5−3=2). A LOD bias can be specified dynamically per-ray and per-instance and those biases are additive. Specifying the LOD bias per ray helps to achieve watertightness because the same LOD bias will then be used for each relevant calculation for the ray to provide microtriangle microvertices that still match in a bit-exact sense. Furthermore, specifying a bias per ray and per instance (e.g., a relative adjustment to the LOD the builder constructed as opposed to specifying an absolute detail level) in some examples preserves the effect of the LOD differences the builder encodes in the micro-mesh primitives forming the mesh while keeping the mesh watertight (since the LOD is reduced by the same relative amount according to the bias for every DMM primitive the ray encounters, thereby not requiring restitching). The LOD bias value effectively reuses all of the same microtriangle geometry the builder specified, but just exacting different LODs from it by dynamically downsampling at runtime. However, other example implementations or applications using a uniform mesh LOD might specify an absolute (reduced) detail level per ray under some conditions or circumstances, and such an absolute detail level would preserve watertightness because it would force all DMM primitives the ray encounters to have their LODs reduced to the specified absolute LOD.

Displaced micro-meshes also support static (or build time) LOD. To achieve a static LOD, the Builder inserts multiple copies of each DMM primitive into the scene at the instance level, where each copy has a different base resolution. Then at runtime, a known technique of instance masking is used to selectively enable a single, selected copy at the BLAS level of instancing. A LOD effect is achieved by enabling (effectively swapping in and out d at runtime) lower resolution copies at further distances and higher resolution copies at closer distances. And as mentioned above, the example embodiments store a new LOD bias value with each instance. This overall technique saves time at runtime but at the expense of additional storage of multiple copies of each DMM primitive.

Motion Blur

It is possible to use ray tracing hardware to provide motion blur animation effects. See e.g., U.S. Pat. No. 11,373, 358. Example embodiments of displaced micro-meshes can be used with motion blur. To achieve motion blur, two DMM triangle blocks are specified as the two temporally-different motion keypoints. For a given ray, the two key base triangle positions and displacement directions are then interpolated using the ray-provided motion timestamp, and the motion-interpolated value is used for minimum and maximum triangle generation. In one embodiment, the base triangle's scalar displacement amounts are unchanged by motion and remain constant—that is, they are not interpolated based on motion. Once the motion-interpolated minimum and maximum triangles have been generated in one embodiment, there is no more interaction with motion blur—displacing of the microvertices relative to the different temporal sets of minimum and maximum triangles is the same for each temporal set. Because the displacements are calculated relative to the base triangle and its minimum and maximum triangles, manipulating the minimum and maximum triangles can impart apparent motion to the micro-mesh without the need to change the microvertex interpolations (see FIGS. 23A-23C) as well. This arrangement has the advantage of allowing the uncompressed keypoints to be spread out across multiple DMM primitive triangle blocks, which requires the hardware to fetch multiple triangle blocks but avoids the need to replicate keypoints across different temporal encodings (e.g., a T1-encoded triangle block can be used with a T0-encoded triangle block and then reused with a T2-encoded triangle block).

FIG. 46 schematically shows such multiple fetches. In this example, the complets point to triangle blocks, which are laid out with the keys contiguous in memory such that pointing to key0 implicitly also points to key1. The hardware fetches both key0 and key1 triangle blocks in successive cachelines—which are identical in content except for the vertex positions and the displacement directions. Whichever triangle block that arrives first from the memory subsystem can then be mapped to the same displacement map that will be used to map the other triangle block—in other words, the same displacement map is applied independently of the key, and the interpolation can be performed independent of the order in which the blocks are obtained.

FIGS. 46A-46E show an example flip chart animation that gives an idea of what kind of animation effects can be achieved. In this example, hitting the page down key of your browser will change the Figure like a cartoon. One can see that the displaced micromesh can be stretched and/or pitched without the need to alter the displacement map itself, by simply manipulating the base triangle vertex positions and/ or the base triangle vertex direction vectors. Of course, swapping between displacement blocks is also possible but as these Figures show, a wide range of interesting animation effects can be achieved just by manipulating the values in the base triangle block of a DMM primitive between display frames.

Displaced Micro-mesh Data Structures and Fields Overview

In one example, two main data structures as shown in FIG. 10 are used to encode the DMM primitive:
Base Triangle block
Displacement block.

Example Base Triangle Block

The base triangle block defines the base triangle of the DMM primitive. Each base triangle, and its associated metadata, is stored in a triangle block. In one embodiment, the triangle block is structured to fit within a single cacheline. FIG. 60 shows an example format/layout of a base triangle block.

To define the micro-mesh itself, the base triangle block primarily specifies the corner positions and the displacement vectors of the base triangle, as well as the base triangle's resolution. A displacement scale is also provided to generate the maximum interpolating triangle. The displacement scale enables achievement of displacements in the 0-n range where n can be large because the displacement amounts are normalized/scaled to values of 0-1 (see FIGS. 23A-23C). The displacement amounts can be multiplied by the displacement scale to get much larger values. The displacement scale thus defines maximum displacement and determines the distance the maximum triangle is from the minimum triangle. More bits are added to specify the edge decimation, if any, to apply to the base triangle. In one embodiment, a single bit (the alpha bit) indicates that the base triangle may have alpha content.

The block specifies the number of defined sub triangles on the base triangle and provides a description of those sub triangles including their size and resolution. A given base triangle block may only accommodate a maximum number of sub triangles, so base triangles with more than that maximum number of sub triangles use multiple base triangle blocks to describe them. A sub triangle start index is provided to define the location of the 0th sub triangle on the base triangle. The start index is a Bird index. When multiple triangle blocks are used, this start index tells the hardware where on the base triangle to start populating the sub triangles (and associated microtriangles) the block specifies.

The sub triangle array (subtri array) shown in FIG. 61 is also part of the triangle block. It specifies, for each sub triangle, the size and resolution of the sub triangle. The array is ordered in terms of successive sub triangles along the "bird curve" traversal order to conserve memory space that might otherwise be taken up by indices for each sub triangle definition in the array. Bit manipulations are sufficient to "traverse" the "bird curve" to select the appropriate array element.

Each sub triangle has its own associated displacement block, Therefore, the triangle block also provides details about the base triangle's displacement set. A displacement offset ("DMOffset") is specified for differently sized displacement blocks to make the indexing easier given that sub triangles in one embodiments can have differently-sized displacement blocks such as a full cacheline or ½ cacheline. In one embodiment, two different offsets are used to index the two differently sized displacement blocks for calculating a memory address of the next displacement block to retrieve (the example orders all full cacheline blocks together and all half cacheline blocks together, each ordered according to the "bird curve", in order to simplify the math and avoid padding to achieve alignment if the "bird curve" order were strictly followed for assigning memory addresses to differently-sized, contiguously-stored displacement blocks). This offset, combined with the sub triangle metadata and a target sub triangle index, is used to compute a displacement block memory address. A bit is added to indicate that an instance offset should be applied to the displacement block address to get the final block address.

FIG. 62 shows a memory map of an example DMM triangle block header. The header contains useful information such as:
the number ("NumTris") of valid sub triangles exist in the triangle block;
a force no cull ("FNC") flag that forces no culling based on the winding of a hidden microtriangle;
an "alpha" bit or value that indicates whether all of the sub triangles are alpha sub triangles (in place of visibility masks if the visibility masks are disabled on the base triangle);
the resolution of the base triangle ("baseResolution");
an aperture for the displacement block address ("dmAp") (allowing a local aperture instance based pointer for BLAS instance nodes to allow dynamic swapping out of displacement maps between frames for different instances for the same base triangle); and
edge Decimation value (indicating which base triangle edges should be decimated).

Example Displacement Block

In one embodiment, the DMM primitive includes at least one displacement block for each triangle block as discussed above. See FIG. 44. Displacement amounts for each sub triangle are stored in cacheline sized (or half cacheline sized) granular blocks called displacement blocks. The collection of displacement blocks for all the sub triangles in a single base triangle is called a displacement block set or displacement set. A single displacement block encodes displacement amounts for a sub triangle with different numbers of (e.g., 8×8 (64), 16×16 (256), or 32×32 (1024)) microtriangles.

Uncompressed displacement blocks are cacheline sized and used for 8×8 or smaller sub triangles. These blocks specify an explicit UNORM11 displacement amount for each of the up to 45 micro-vertices in the sub triangle, as shown in FIG. 44. In other words, if the current subdivision level is small (e.g., to encode 64 microtriangles or less), the displacements for all of the (45 or less) microvertices can fit within a single conventional cacheline without compressing the displacements. In one embodiment, each of the microvertex displacement values for multiple levels of sub triangle subdivision (e.g., three level 1 displacements, nine level 2 displacements, and 30 level 3 displacements) are stored in a full UNORM11 precision along with the displacements for the three sub triangle "anchor" vertices also stored in the same UNORM11 format. Because the displacement data is uncompressed, the hardware does not need to decompress it in order to use its displacement data.

Because some DMM primitives encode more microtriangles the displacements of which can fit into the FIG. 44 single cacheline displacement block in uncompressed form, example embodiments provide a different displacement block format for compressed displacement values. An example format is shown in FIG. 52. Compressed displacement blocks can be sized to fit within a cacheline (the format shown can have two different sizes: full cacheline or half cacheline), and are used for encoding displacements of larger numbers of (e.g., 16×16 or 32×32) sub triangles. Such compression can take advantage of self-similarity of closely-spaced microvertices relative to their neighbor microvertices—and thus different displacement value precisions are provided for encoding different numbers of microtriangle vertex displacements (less precision is used for denser microtriangle vertex clouds because of the self-similarity property). See the Displacement Compression Patent for more details.

Because the lengths of the compressed information shown in the FIG. 52 format matter, we also show in the Figure the bit counts for the various values. As in the FIG. 44 format, the FIG. 52 format includes the displacements for the three sub triangle "anchor" vertices encoded in full (UNORM11) precision. The FIG. 52 format further includes correction and shift values for each of plural subdivision levels (in this case levels 1-5), In particular, the following correction levels are provided in one embodiment:

| | |
|---|---|
| 3 "correct.level1" signed values | Corrections for level 1 |
| 9 "correct.level2" signed values | Corrections for Level 2 |
| 30 "correct.level3" signed values | Corrections for Level 3 |
| 108 "correct.level4" signed values | Corrections for Level 4 |
| 408 "correct.level5" values | Corrections for Level 5 |

For example, FIG. 52 shows that when a half cacheline sized displacement block is used to encode displacements for 16×16 microtriangles, the level 1 displacement corrections will each be 11 bits in length, the level 2 displacement corrections will each be 8 bits in length, the level 3 displacement corrections will each be 4 bits in length, and the level 4 displacement corrections will each be 2 bits in length. Note that these are corrections to displacements rather than the displacement values themselves; as described in the copending patent application referenced in the paragraph above, the hardware calculates predictions for each displacement value and then uses the corrections the builder provides to correct the predicted displacement values.

The FIG. 52 example format also includes shift values that are applied to the corrections to provide more dynamic range using a minimal number of total bits. The tradeoff is loss of precision in the least significant bits of the correction values, but the most significant bits tend to be more important. There are multiple shift values because the shift values in one embodiment are per level and per type.

Per Level: In one embodiment, shift values have longer lengths at higher subdivision levels to provide additional dynamic range, whereas lower levels of subdivision are likely to require less dynamic range due to self-similarity and thus typically require fewer shift bits to adequately represent the displacements of the geometry being modeled. For example, in one embodiment, a single sign bit is used to encode level 5 corrections of −1 or 0.

Per Type: In one embodiment, shifting of correction values for "outwardly facing" microvertices on the edges of the sub triangle can be shifted differently from correction values for interior microvertices that are not on the edges of the sub triangle. This allows the compressor to independently compress (and the decompressor in the hardware to independently decompress) triangles that share an edge to arrive at bit-for-bit identical values for microvertices on the shared edges—thereby avoiding watertightness problems. In one embodiment, this capability is used to guarantee watertightness when applying different degrees of lossy compression.

In one embodiment, even though the smallest displacement block size is an array of (e.g., 8×8) sub triangles, smaller base triangle resolutions (e.g., 0×0, 1×1, and 2×2) are still supported. In these cases, the sub triangle resolution can be reduced to match that of the base triangle, and the uncompressed displacement block of FIG. 44 may be used to encode the displacements.

Instance Nodes

The DXR specification supports two types of traversal acceleration structures (AS): the top-level acceleration structure (TLAS) and the bottom-level acceleration structure (BLAS). Intuitively, objects in the TLAS are defined in world space, whereas objects in the BLAS are defined in object space. The transition from TLAS to BLAS occurs when the ray intersects an instance node, and is transformed by the instance-specified transform matrix.

For displaced micro-meshes, the header of the single instance node specifies the instance's LOD bias (FIG. 53). In more detail, FIG. 53 shows an "lodBias" value that in one embodiment states a bias for displaced micro-meshes (for example, 0=no bias, 1=one fewer level of subdivision than stated in the triangle block, 2=two fewer levels of subdivision than stated in the triangle block, 3=three fewer levels of subdivision than stored in the triangle block). This bias will be applied, alongside any per-ray LOD bias, for any displaced micro-mesh test under this instance. A double instance node is also introduced to support a per-instance displacement base pointer (FIG. 54, field called "displacementBasePtr"). As mentioned above, this pointer (for a local memory aperture) is added to all displacement block memory requests during BLAS traversal to allow swapping of displacement maps on a per frame basis as discussed above.

The displacement base pointer enables swappable displacement palettes, which allow the renderer to quickly update the visual appearance of a mesh. For example, consider a video game character wearing a customizable suit of armor. The basic shape of the armor can be represented with a constant set of base triangles. To achieve customizability, a different displacement block set can be created for each version of the armor. The per-instance appearance of the armor can then be changed by simply pointing the displacement base pointer in the appropriate instance node to a different displacement block set.

Ray Flags

Ray flags are per-ray properties that can be set by the client to fine tune each ray's behavior. Previous NVIDIA legacy architectures used a number of different ray flags for different purposes. For displaced micro-meshes, two new ray flags—"dm_f" and "dm_p" are added to specify the ray's behavior on intersecting a leaf node containing a DMM sub triangle (FIG. 55).

For example ray flags values:
a first (default) value indicates processing in RTT as usual.
a second value immediately culls the leaf and pops the stack.
a third value returns the leaf to the SM as a node-reference to give the SM a pointer into the AS tree, e.g., to allow the SM to adjust the complet.
a fourth value returns the sub triangle's metadata to the SM, including its triangle pointer, the sub triangle index and the t value where the ray was detected to hit the child leaf node (FIG. 56). In one embodiment, this hit type is returned when a ray with the "return to SM" ray flag set intersects a displaced-subtri leaf node.

There are plural flags so that the behavior can be made programmable depending on the outcome of a ray-op test done in the ray-complet test (RCT) unit. In one embodiment, if the ray-op test produces a "pass" result, then the "dm_p" field is used. In one embodiment, if the ray-op test produces a "fail" result, then the "dm_f" field is used. This allows for programmable behavior as described in previous patents covering ray-ops. See e.g., U.S. Pat. Nos. 10,867,429; 11,380,041. Generally, these ray flag settings are applied at the beginning of the hardware-based micro-mesh processing pipeline to cull or return to the SM.

Displaced Micro-mesh Algorithms Overview

This section overviews example non-limiting algorithms for displaced micro-mesh intersection testing and microtriangle fetch. The former allows the programmer to determine if a ray intersects a sub triangle on a base triangle. The latter allows the programmer to fetch the coordinates of a specific microtriangle on a base triangle. A ray-sub triangle intersection executes in three phases the base triangle pass, the sub triangle pass, and the intersection pass. A microtriangle fetch does not perform any intersection testing and so only executes the base triangle pass and the sub triangle pass.

Ray-Sub Triangle Intersection Test

A ray-sub triangle intersection test determines if a ray intersects any microtriangles on a target sub triangle. To perform this test, the client provides an input ray, a base triangle block, and a target sub triangle index on that base triangle. A displacement set is also provided in memory. Based on this information, the ray tracing hardware determines whether the ray intersects the any microtriangles and provides a hit or miss result.

Figure 47A:
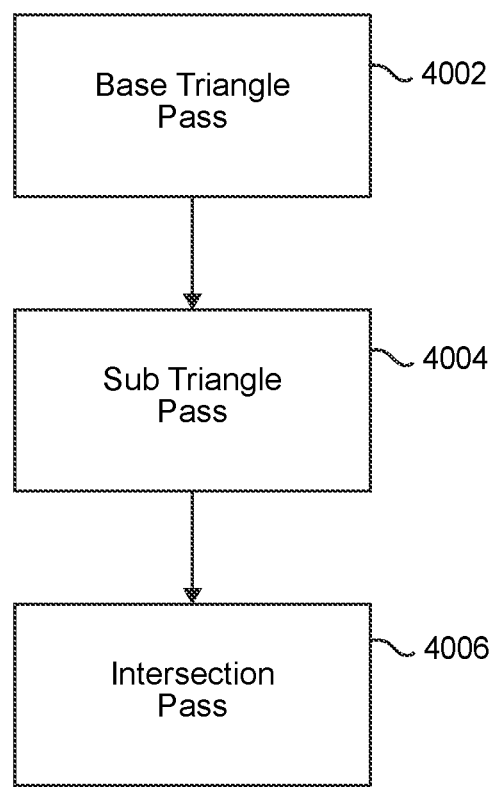

In one embodiment, this operation in hardware can be divided into three passes: a base triangle pass 4002, a sub triangle pass 4004 and an intersection pass 4006 (see FIG. 47A).

Base Triangle Pass

Figure 47B:
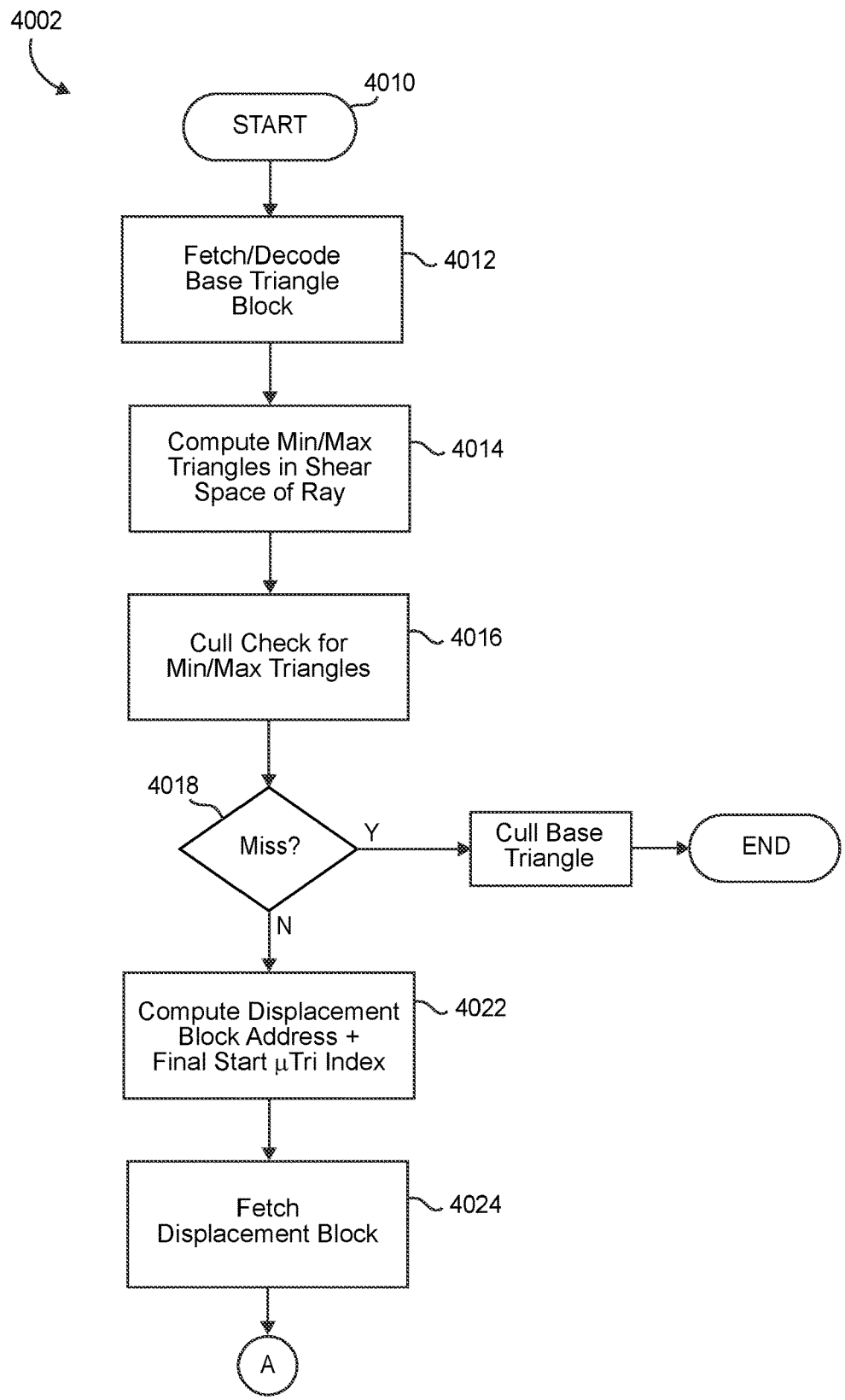

Once the base triangle block has been fetched (FIG. 47B blocks 4010, 4012), the base triangle pass decodes the base triangle block and prepares for microtriangle generation (to be performed in the subsequent sub triangle pass). During this pass, the minimum and maximum triangles are computed in the ray's shear space (FIG. 47B, block 4014) (as discussed above—although it could also be done in object space in other implementations+) using the base triangle's vertices, displacement directions, displacement scale, and displacement bias. A culling check (FIG. 47B, block 4016) is performed on the minimum and maximum triangles to determine if the ray is guaranteed to miss the displaced micro-mesh. If so, the base triangle is culled and processing ends (FIG. 47B, decision block 4018, end block 4022). If the ray is not guaranteed to miss the displaced micro-mesh, a displacement block address is computed using the target sub triangle index and the base triangle's sub triangle descriptors (FIG. 47B, block 4022). The target sub triangle index is also used to compute a final start microtriangle index for traversal, and various error conditions are checked (block 4022). If no errors are detected, the final displacement block address is sent to the memory subsystem to fetch the relevant displacement block (FIG. 47B, block 4024). The processed base triangle data is stored in memory for use during the next pass. The sub triangle pass begins when the memory system returns the requested displacement block.

As noted above, the algorithm also works if the minimum and maximum triangles are generated in object space (or some other space) instead of the ray's shear space. However, object space subdivision may be lower performance in some embodiments as it may use more bounding-box bloat and a more conservative culling approach (larger bounding volumes) while providing potential advantages in terms of stitching the micro-mesh to other objects such as triangles explicitly defined in object space.

Sub Triangle Pass

The sub triangle pass in one embodiment generates the final microtriangles for intersection testing through iterative subdivision and culling. Because the sub triangle pass is iterative, it is conveniently implemented as a stack where the first entry onto the stack is the base triangle (FIG. 47C block 4030).

Figure 47C:
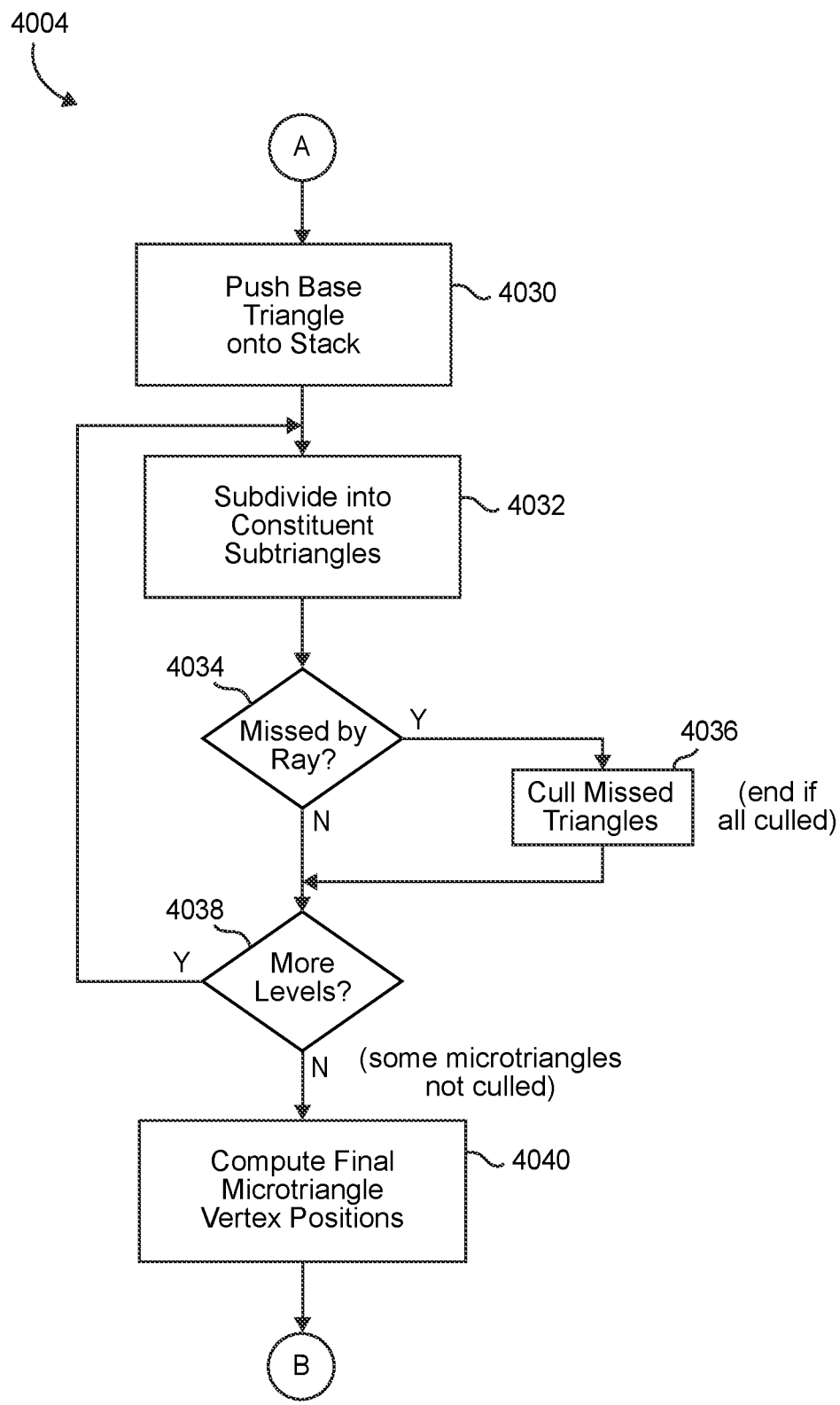
Figure 47D:
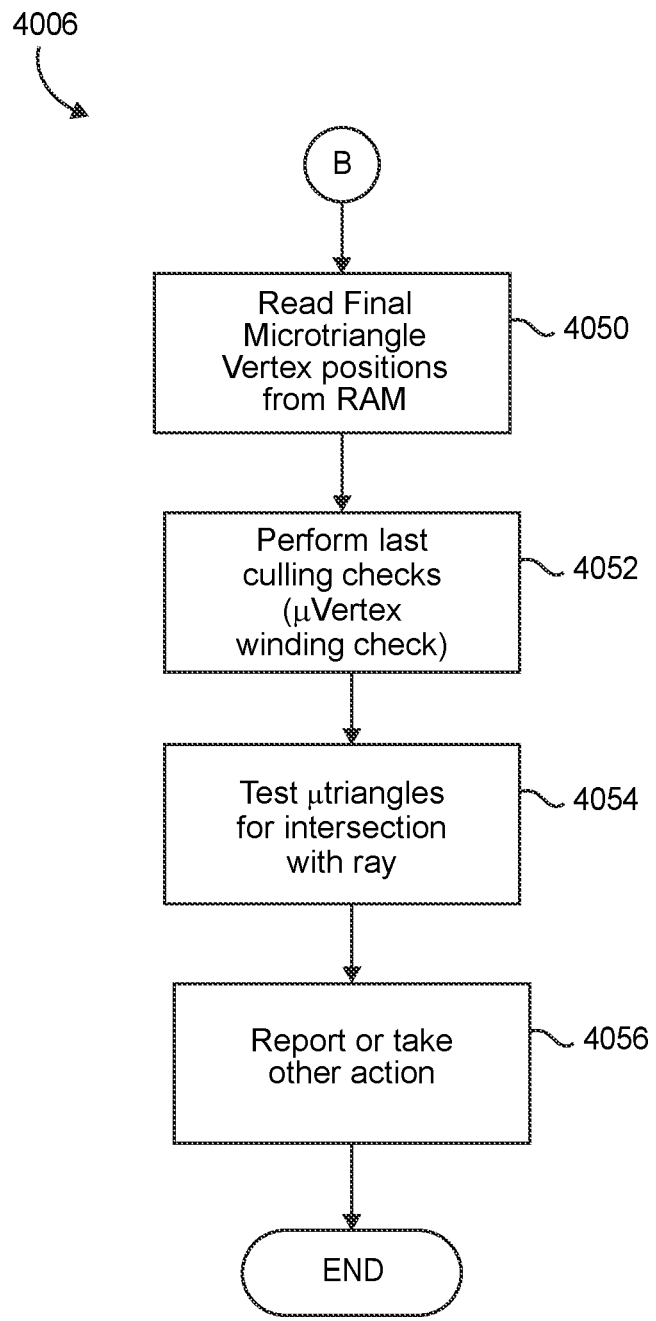

The sub triangle pass in one embodiment starts from the base triangle, and iteratively performs base triangle subdivision to produce four subdivided triangles (see FIG. 47C block 4032) to first cull all triangles that are outside of the target sub triangle (FIG. 47C, decision block 4034, 4036).

If the ray intersects the sub triangle ("No" exit to decision block 4034), further sub-division and culling steps are recursively performed until all the microtriangles of the sub triangle have either been generated or culled (see decision blocks 4036, 4038). During each sub-division pass, the base triangle displacement directions are interpolated, and displacements are applied to newly created vertices. If the displacement block is a compressed displacement block, the predict-and-correct algorithm is used at this time.

It should be noted that sub triangles of the base triangle other than the designated sub triangle can be culled/ignored (not fetched or subdivided) because the testing is focused on the designated sub triangle and no other sub triangles in the base triangle. See for example FIGS. 50, 51 for purposes of illustration; if sub triangle 1 is designated for testing and its displacement block is fetched, the sub triangle pass will in one embodiment begin by subdividing the base triangle but will then immediately cull sub triangles, 2, 3 and 4 and proceed to subdivide (e.g., by pushing onto the stack) only designated sub triangle 1. In example embodiments, culling thus can be performed because (a) the ray does not intersect the sub triangle volume or (b) the sub triangle is not of interest (even if it could be intersected by the ray) because the system has been commanded to test a different sub triangle. In other implementations, it might be possible to specify plural or a range of sub triangles instead of a single sub triangle for testing, and only non-specified sub triangles would culled by this "bird index" culling mechanism while the algorithm would proceed to subdivide and try to cull groups of microtriangles on the selected or designated sub triangles. Depending on the grain of the micro-mesh, each culling event has the potential of culling thousands, hundreds of thousands or even millions of microtriangles from having to be further tested.

To avoid confusion: in example embodiments, the sub triangle pass culling is in addition to the bounding volume culling performed by the base triangle pass' ray-bounding volume intersection testing; it is a lower level culling used e.g., once the ray-bounding volume intersection test finds intersection with the base triangle's bounding volume, to cull sets of microtriangles from having to be individually tested against the ray in ray-triangle tests while at the same time subdividing the hierarchy the DMM primitive defines in order to present non-culled. In one embodiment, the culling is done by using stack pushes and pops to descend down into a volumetric hierarchy of prismoids between the minimum and maximum triangles the DMM primitive defines and testing the ray against each successively smaller subdivision (each of which eventually contains a set of microtriangles) to cull away as many sets of microtriangles as possible that don't need to be generated and tested (FIG. 47C blocks 4032-4038).

As is well known, a prismoid such as the convex hull described above is a polyhedron whose vertices all lie in either of two parallel planes, and has planar sides and the same number of vertices in both of its parallel planes. In one embodiment, the culling of such prismoids is performed in a shear space for ray-triangle intersection by projecting the prismoid (maximum and minimum triangle) bounding volume into a shear space where the input ray is at the origin, and testing an axis-aligned approximation of the projection against the origin. The projection step is conceptual and does not need to be performed explicitly because subdividing in shear space yields the information needed for testing. In particular, in the ray's shear space the minimum and maximum triangles are simply tested as a 2D bounding box test against the origin. If the results are either strictly negative values or strictly positive values, then no intersection is detected because the minimum and maximum triangles cannot overlap the origin which is where the ray is located. The prismoid bounding volumes are thus implicitly generated "on the fly" and don't need to be explicitly stored. Furthermore, such testing is very cheap (just comparing signs) and no memory storage is taken up. A rotated version can also be provided by comparing the minimum and maximum triangles to a diagonal.

However, the TTU should never cull geometry the ray-triangle test would have hit. But this could occasionally happen due to floating point rounding errors. Therefore, in one embodiment, particular TTU circuitry for performing the mathematical calculations for recursive averaging to subdivide the triangles (e.g., a floating point adder that modifies the exponent to perform averaging) and for linear interpolation/displacement conversion (e.g., a two element dot product calculator) is designed to be "convex"—meaning the calculations only round to nearest, and accordingly produce outputs that are always within inputs. See IEEE 754-2019 (July 2019). The culling that is performed based on such computed values is thus exact in the sense that no rounding errors occur and everything is guaranteed to stay self-consistent.

Once the culling reveals there is some microtriangle at the specified/selected last level of subdivision taking bias into account as discussed above ("No" exit to decision block 4038) that cannot be culled, this means the ray needs to be tested against all the generated microtriangles (i.e., the actual microtriangle geometry as opposed to collections of such microtriangles) in this last (or "microtriangle") level and a final hit or miss result, along with relevant metadata, should be produced. At the microtriangle level, the per-micro-vertex displacement direction and displacement amount is used to compute each non-culled microtriangle vertex final positions (applying edge decimation if needed/ specified) and may at this time convert between numerical representations (e.g., from UNORM11 to FP) (FIG. 47C block 4040) in preparation for a high precision the ray-triangle test. The final micro-vertex positions are the input for the intersection pass for intersection testing—that is, the test where the hardware tests the microtriangle itself (as opposed to a bounding volume encompassing it) against the ray. Because the sub triangle pass has subdivided the DMM primitive hierarchy already while culling as much as possible, the handoff from the sub triangle pass to the intersection pass is the displaced positions of microvertices of microtriangles of interest for ray-geometry intersection testing. What the sub triangle pass delivers to the intersection pass is essentially "just a triangle"—just like any other triangle that the hardware tests against the ray—although in one embodiment the sub triangle pass actually delivers a quad of microtriangles for the intersection pass to test in parallel.

From an implementation perspective, the sub triangle pass and intersection testing pass can operate in parallel in a pipelined fashion, which will be detailed in a later section. Briefly though, the intersection testing pass can be operating on depthfirst results produced first or earlier by the sub triangle pass for a given sub triangle while the sub triangle pass continues in parallel to recursively subdivide and attempt to cull other parts of that same sub triangle. In other words, the sub triangle pass in one embodiment does not need to be completely finished processing a given sub triangle before it hands off work from that sub triangle for the intersection pass to do.

Intersection Pass

As the name suggests, the intersection pass performs a ray-triangle test using the input ray and the input microtriangle vertices. Up to four ray-microtriangle tests are performed in parallel. Note that in cases of edge decimation or alpha replay, the number of microtriangles available for testing in a single pass may be less than four. Various last culling checks are performed for intersected triangles, including a microtriangle winding check. For microtriangles that are ultimately hit, the hit information is produced and sent for further processing. See FIG. 47D, blocks 4050, 4052, 4054, 4056).

The ray-sub triangle intersection test ends when all microtriangles in the target sub triangle have either been culled or tested for intersection.

Micro-Triangle Fetch Query Function

In another operating mode, the SM can query the hardware to return position data pertaining to a particular microtriangle. A use case for this feature is the ability to do precise hit point calculations. In world space, one can typically use the parametric equation of the ray ($P=O+tR$) to calculate a precise hit point on a triangle. However, it turns out that in some implementations, this technique would be less precise than using the barycentric hit point and interpolating from the vertex positions of the triangle that was hit. Although the SM has access to the AS, it can use the hardware to accelerate subdividing of a DMM primitive to return the microvertex positions of a microtriangle of interest. This allows the SM to calculate a precise hit point in object space much more precisely than the SM could do using the ray's parametric equation.

A microtriangle fetch returns the coordinates of a client specified microtriangle. See FIG. 58. To perform a microtriangle fetch, the client provides:

an input base triangle block,
a target sub triangle index on that base triangle, and
a target microtriangle index on that sub triangle (this is the index of the particular microtriangle the SM is querying).

A displacement set is also provided in memory.

Base Triangle Pass

For microtriangle fetch, the base triangle pass performs the same operations as for ray-sub triangle intersection. As before, the minimum and maximum triangles are generated, a displacement block address is computed, the sub triangle start index is calculated, and error checks are performed. The primary difference is that the minimum and maximum triangles for microtriangle fetch are generated in object space, whereas for ray-sub triangle intersection they are generated in the ray's shear space (because no ray intersection test is being performed, there is no ray to define a shear space). Base triangle culling is also disabled for microtriangle fetch. If there are no errors, the processed base triangle data is stored in memory for use during the sub triangle pass.

Sub Triangle Pass

For microtriangle fetch, the sub triangle pass performs base triangle subdivision and displacement computation for each micro-vertex, just as for ray-sub triangle intersection. The primary difference is that for microtriangle fetch only a single microtriangle is of importance the one specified by the client. As such, all other microtriangles are automatically culled during the sub-division process. This means there will be only one depthwise traversal of the DMM primitive hierarchy down to a particular identified microtriangle. The sub triangle pass, and the microtriangle fetch algorithm, ends once the desired microtriangle's vertices have been generated for the single microtriangle being queried. No intersection pass is needed or performed for this function. For microtriangle fetch in one embodiment, the target microtriangle's vertices are returned along with the triangle id.

Displaced Micro-Mesh Example Overall System

Before looking at more detailed structure of the TTU hardware, FIGS. 48A-48G together present a flip chart animation showing on a high level how an example builder constructs DMM primitive information and stores it into memory, and how the TTU tracing hardware retrieves this DMM primitive information and uses it to create images. These diagrams show three columns: "Builder", "Memory System" and "Tracing Hardware." The activities shown under "Builder" are performed by (typically software controlled) operations a CPU/GPU performs to create an AS to be consumed by the Tracing Hardware. The Builder can create the AS in advance (e.g., at time of production of an application such as a video game) and/or can create or modify the AS at runtime, depending on the application. The Builder writes/stores the AS it creates into non-transitory memory, and the AS then (or eventually) is stored in a main system RAM for the Tracing Hardware to access, read and use. The Tracing Hardware (a "TTU" such as shown in FIG. 4-8-5 in one particular example) reads the AS from memory and uses it for ray or path tracing to create images.

As will become clear, the Builder (or support software processes associated with the Builder) performs a lot of work to recursively subdivide base triangles to desired and/or needed levels of detail and/or compression, and stores the results of such work as an AS into the memory system. The Builder cannot anticipate which rays the Tracing Hardware will be asked to test the AS against, so the Builder must construct an AS that represents all of the geometry in the scene. In this case, this means recursively subdividing the base triangles of a triangle mesh into smaller and smaller sub triangles and constructing a corresponding hierarchy of tessellation levels represented by DMM primitive data blocks such as shown in FIG. 10. See FIG. 48A.

As described above, in performing these operations, the Builder follows an ordered traversal protocol that makes use of the barycentric grid and the "bird" space filling curve discussed above. But to save memory, the resulting acceleration data structure stored in memory does not, in example embodiments, contain explicit instructions specifying how to use the barycentric grid and space filling curve. Rather, such instructions are implicit in the stored data structures, which essentially assume the consumer of the data structures understands how to construct a prismoid maximum/minimum triangle convex hull bounding volume, how to use the barycentric grid to locate sub triangle vertices, how to use the space filling curve to traverse a micromesh, how to linearly interpolate sub triangle vertices and associated direction vectors, how to define vertex positions along such direction vectors based on compressed and uncompressed displacement blocks, how to decompress displacement blocks and use the decompressed information in recursive subdivision, etc. This is a little like specifying only quantities of ingredients to a chef who knows all the recipes by heart.

Once the Builder (or a support process associated with the Builder) writes out the DMM primitive information to memory, the Builder builds an AS (e.g., a BVH) over the sub triangles under each DMM primitive. See FIG. 48B. As described above, this AS BVH may be largely conventional but includes references in the complets to reference DMM primitives and invoke DMM primitive functions.

Figure 48A:
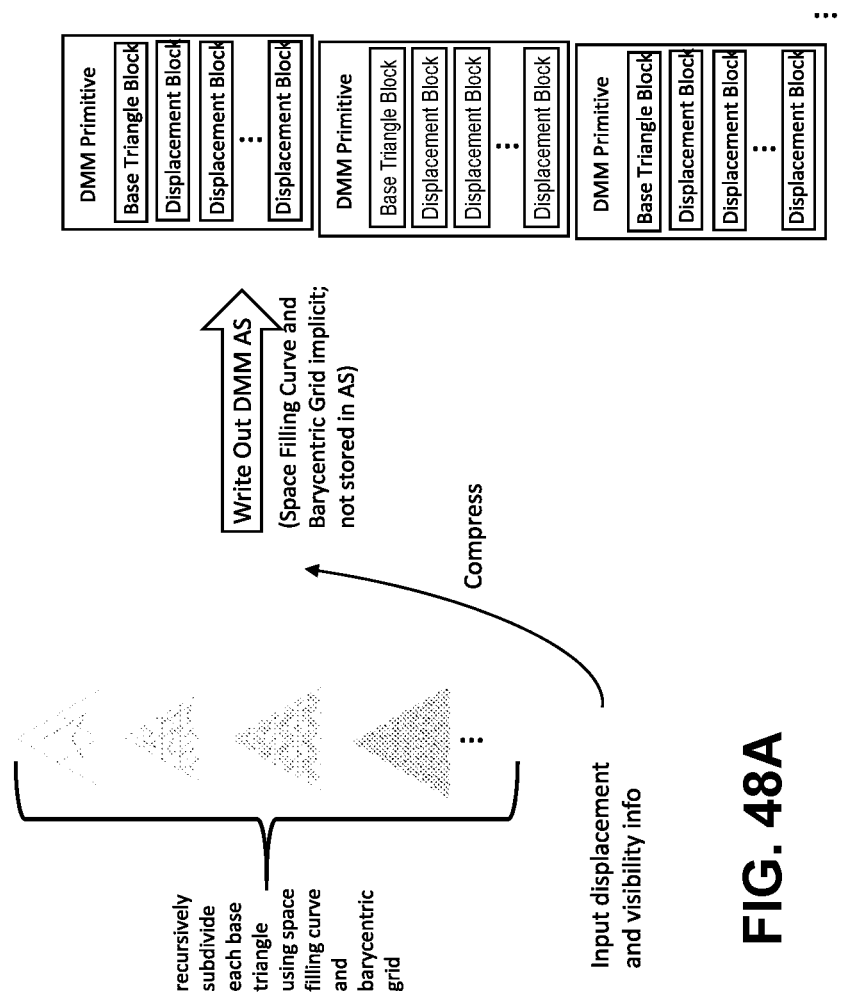
Figure 48B:
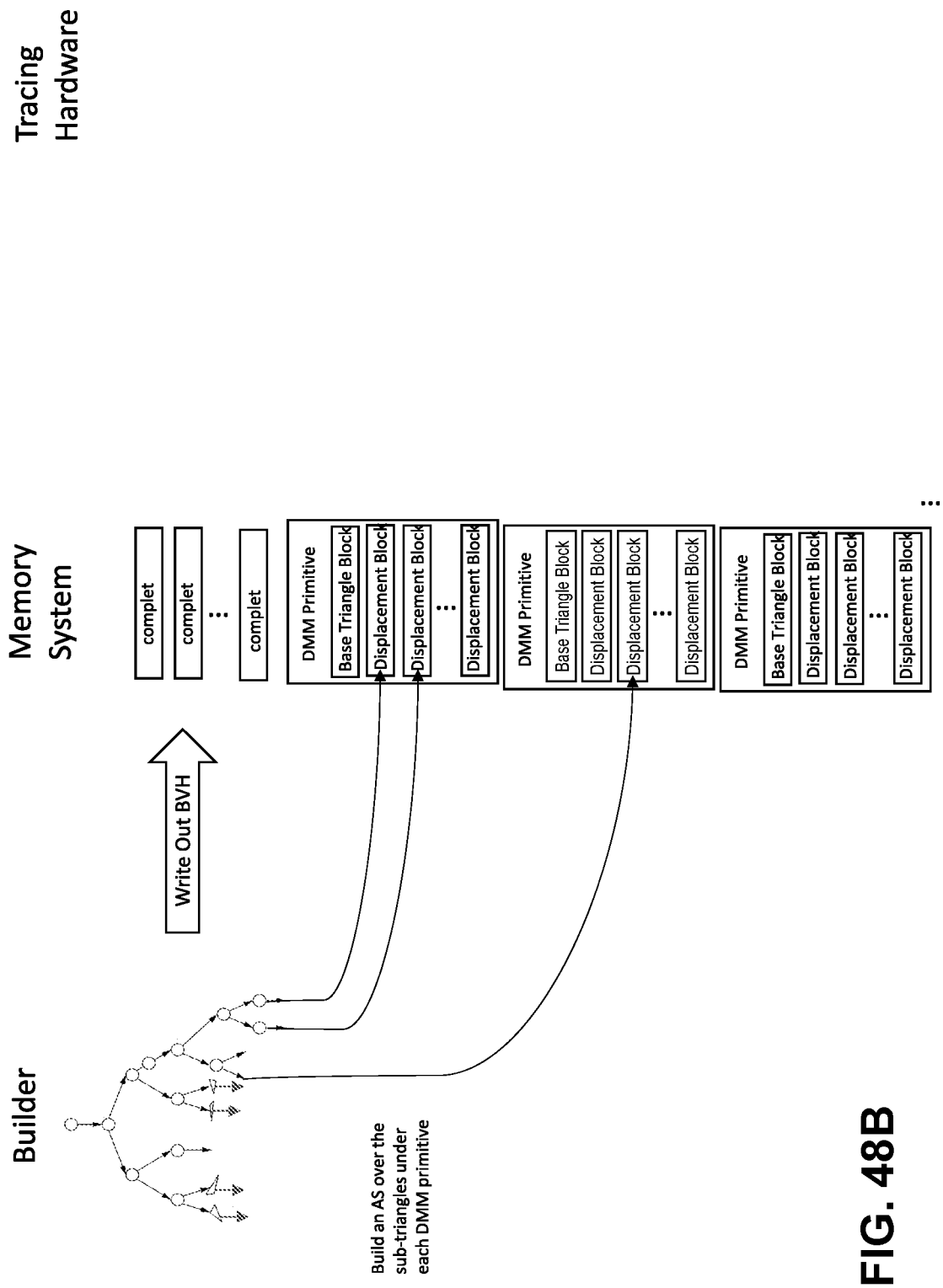
Figure 48C:
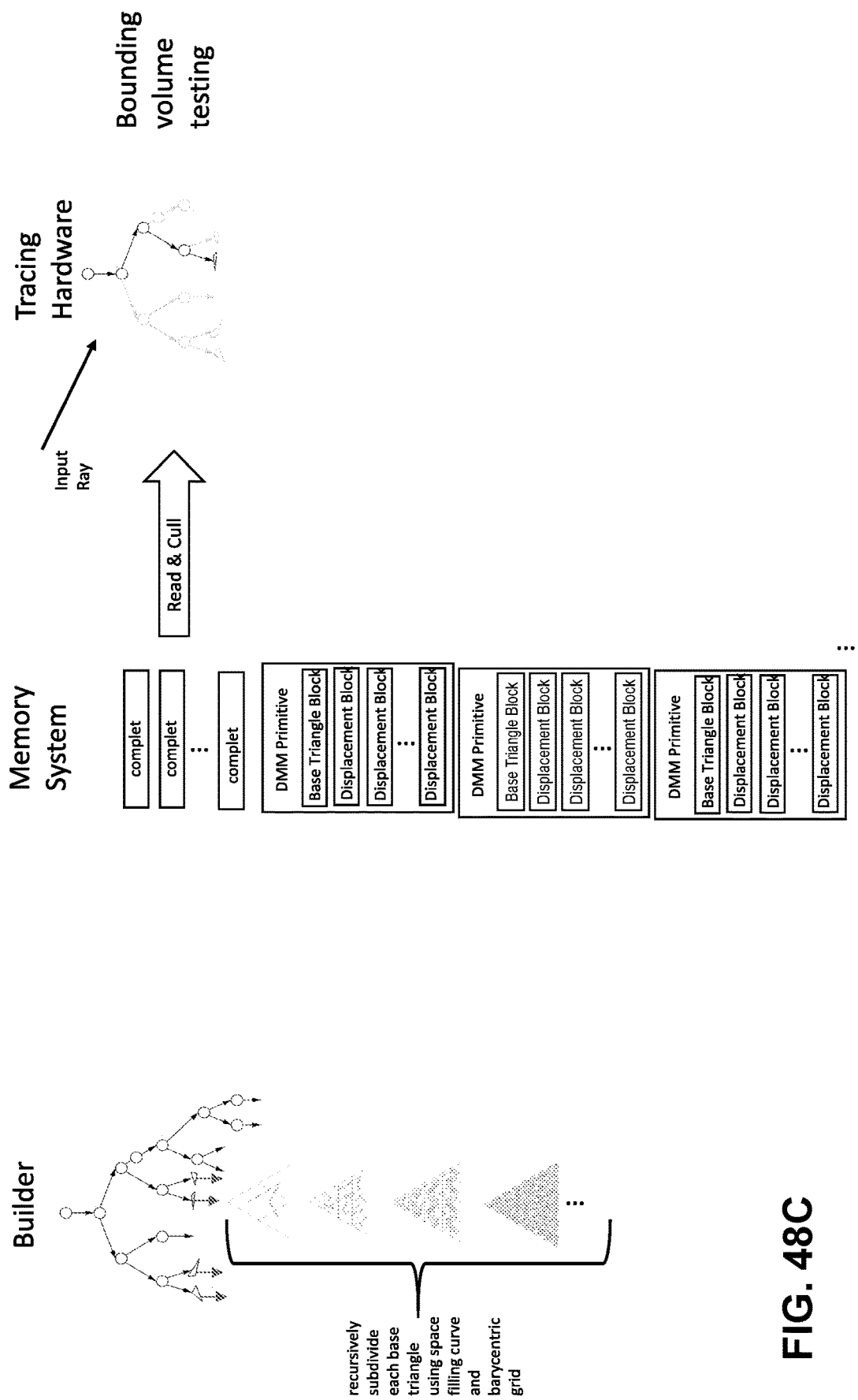

As FIG. 48C shows, the Tracing Hardware when presented with an input ray begins traversing the AS based on the input ray's particular position/direction in the 3D scene to determine, through intersection testing with bounding volumes the AS BVH defines, which geometry in the scene the ray might intersect. As FIG. 48C shows, the Tracing Hardware is generally able to cull large portions of the AS BVH through such ray-bounding volume intersection testing and thus follows a narrow traversal path downward into the AS BVH to reach a single (or small number of) leaf node that cannot be culled—i.e., the corresponding bounding volume(s) of which the ray intersects.

Figure 48D:
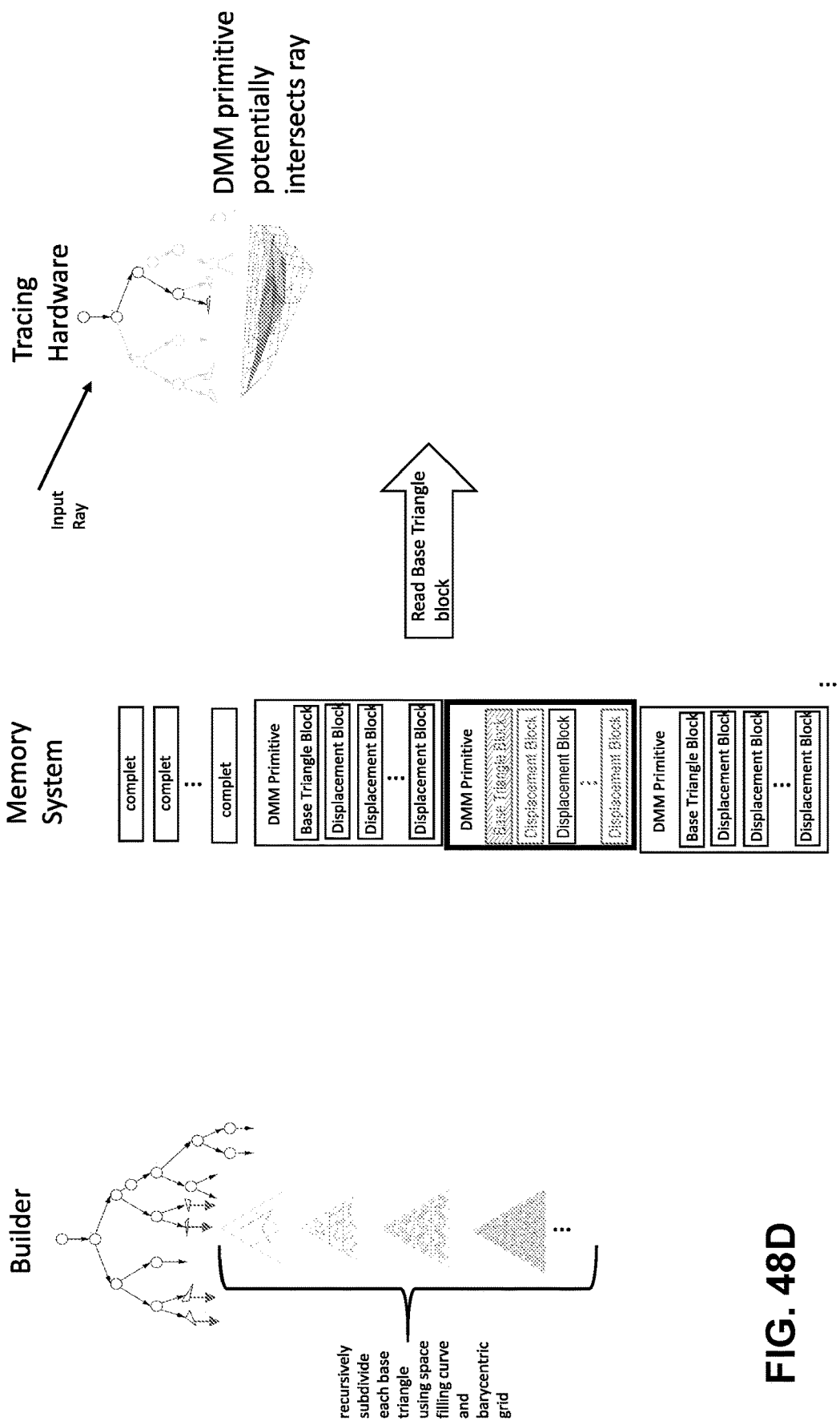
Figure 48E:
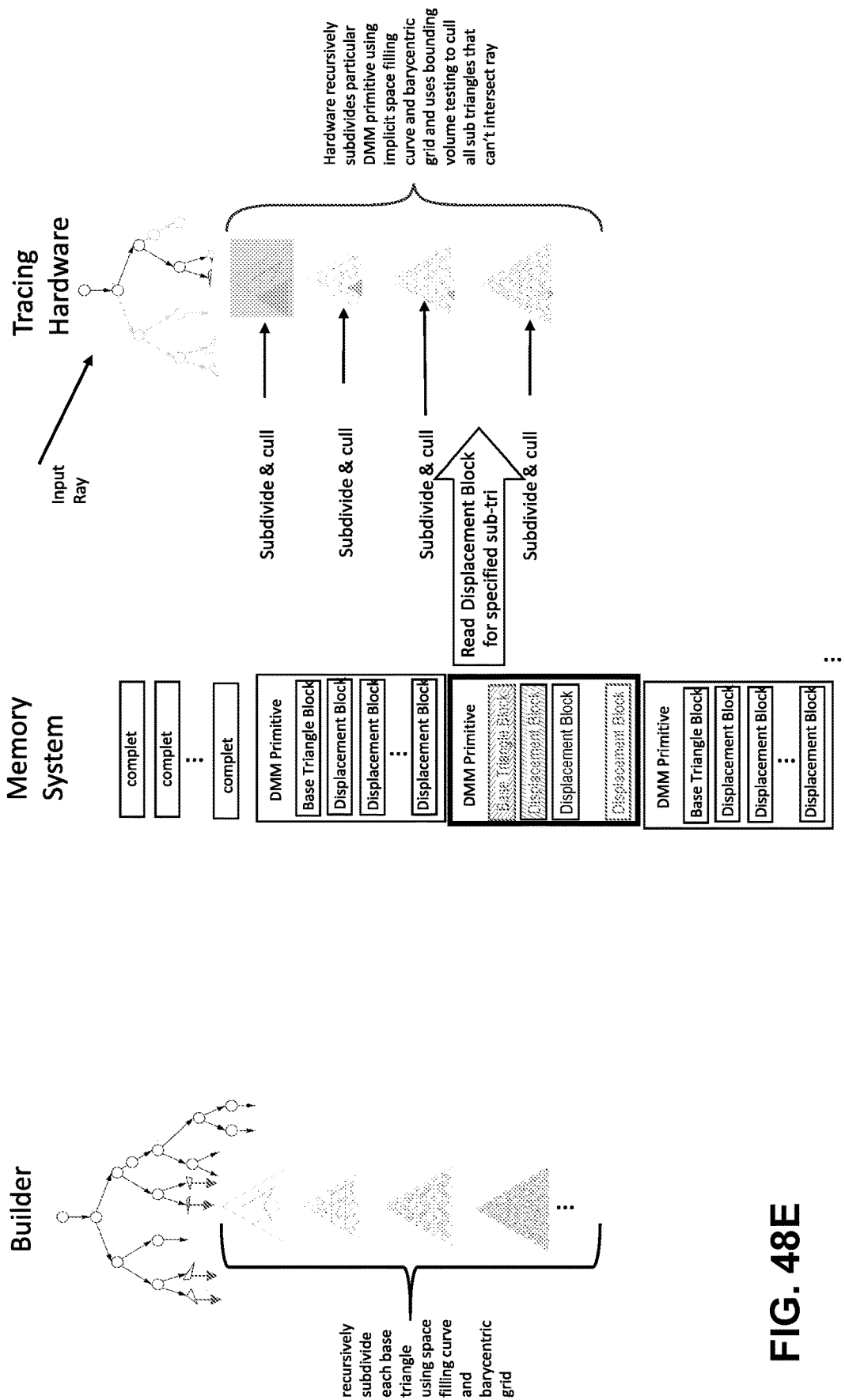

Assume now that the Tracing Hardware finds a leaf node complet in the AS referencing a DMM primitive with a convex hull bounding volume (as defined by the DMM primitive Triangle Block) the ray may intersect (see FIG. 48D). The Tracing Hardware begins traversing down the hierarchy the DMM primitive defines to try to cull as much of the hierarchy as possible and isolate which particular sub triangle(s) the ray intersects (see FIG. 48E). In this example, the Tracing Hardware uses the barycentric grid and the "bird" space filling traversal curve to subdivide the base triangle into sub triangles, sub sub triangles, etc., in order to cull sub triangles at each tessellation level, and subdivide non-culled sub triangles into smaller and smaller sub triangles. The Tracing Hardware performs these operations recursively until reaching a specified or desired level of detail (which may be ray dependent).

As can be seen, the Tracing Hardware is not responsible for performing all of the operations the Builder performed when the Builder created the AS—rather, the Tracing Hardware is at this point concerned only with those particular portions of the DMM primitive hierarchy the ray may intersect and culls/ignores all remaining portions. Nevertheless, in one example, the Tracing Hardware performs the same or similar overall steps to traverse the micromesh hierarchy the DMM primitive defines and recursively subdivides the sub triangles of the micromesh into smaller and smaller sub triangles as shown in FIG. 48F.

In example embodiments, the Tracing Hardware's subdivide and cull process decodes and decompresses displacement amounts encoded in a displacement block(s) as it goes. Uncompressed displacement amounts can be read directly for a micro-vertex whereas compressed displacement amounts are iteratively reconstructed. It's not necessary to do this for culling reasons, as the example embodiment uses the full range between the 0 and 1 (or min and max) triangles to do culling. But in one embodiment, the number of steps the Tracing Hardware performs to do iterative decompression is exactly the same as what's required to do subdivision—that is, they naturally align.

Figure 48F:
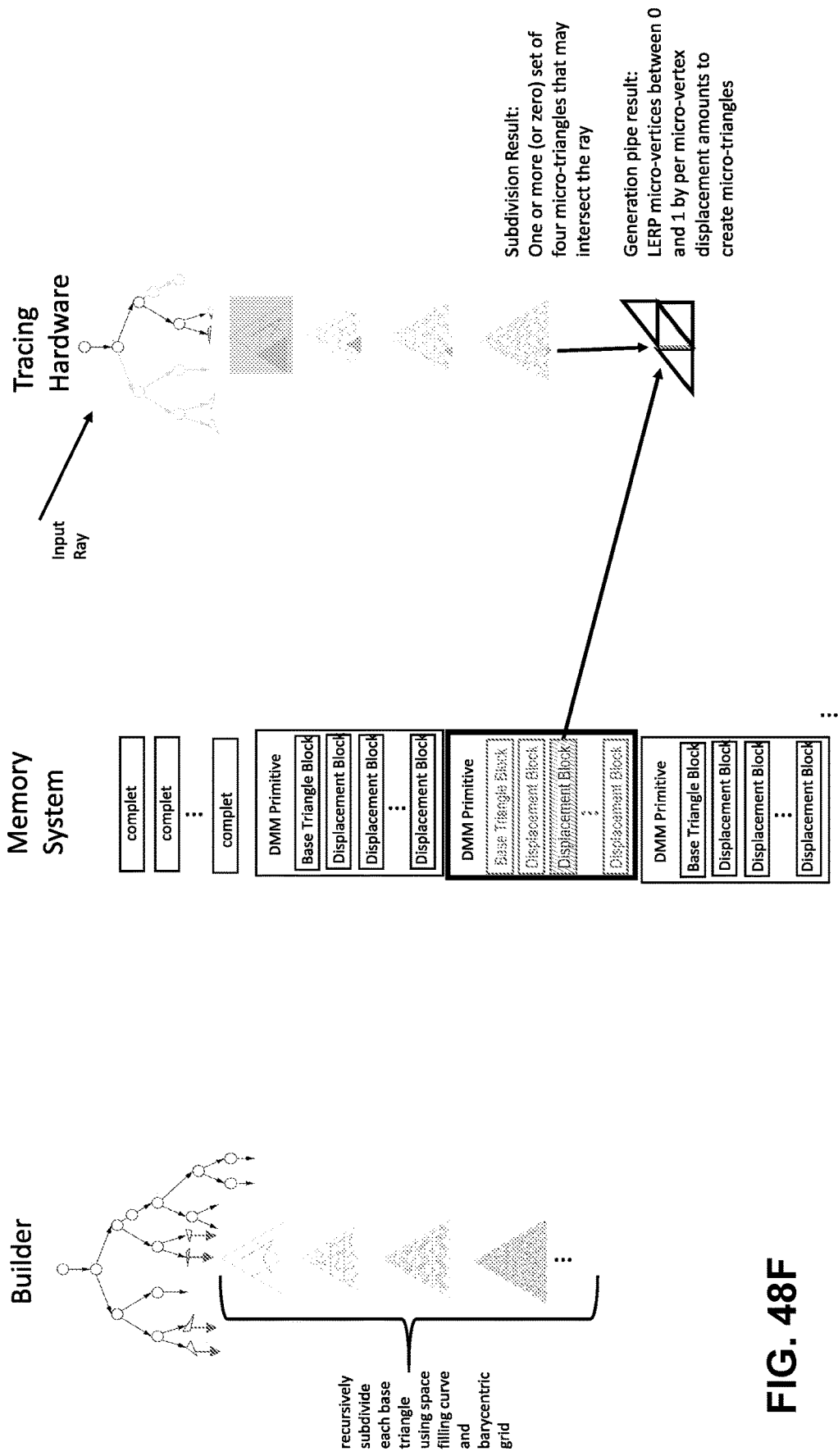
Figure 48G:
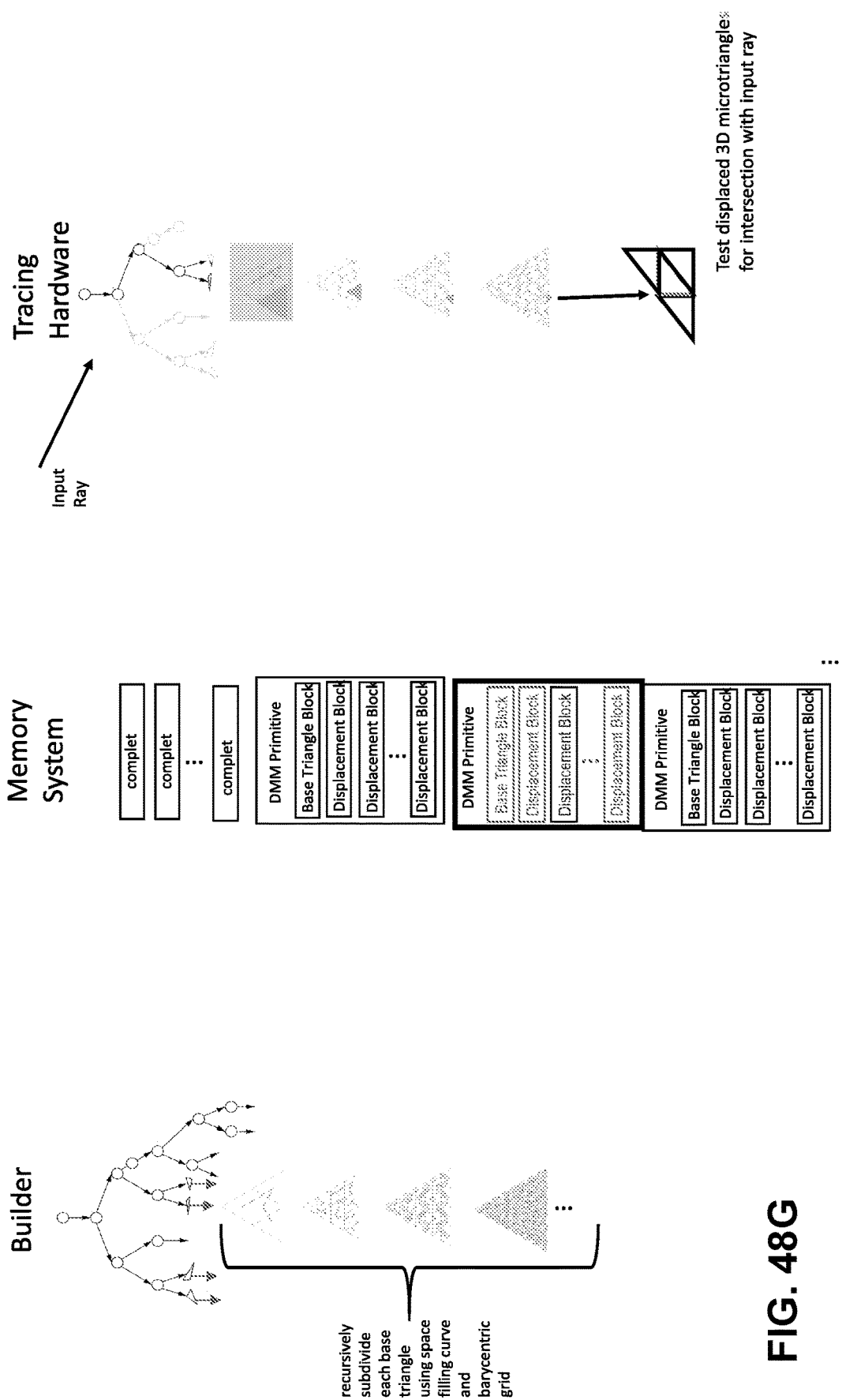

As FIG. 48F shows, the result of the Tracing Hardware's subdivision process in one embodiment is one or more (or zero) sets of four (a quad of) micro-triangles that may intersect the ray (one embodiment generates 4 micro-triangles at a time and tests all 4 in parallel based on how wide the example triangle test is, but it could go down to a single triangle). The generation pipe result (see below) is a LERP of micro—vertices between the 0 and 1 (or min and max) triangles by per micro—vertex displacement amounts, which the Tracing Hardware uses to create 3D displaced micro—triangles for intersection testing against the input ray. See FIG. 48G.

Displaced Micro-Mesh Example Hardware Implementation

The following paragraphs detail the hardware implementation of the displaced micro-mesh primitive type in the TTU hardware. The reader is referred to the discussion at the beginning of this specification of the overall structure and operation of example TTU hardware in the context of a real time graphics system in conjunction with FIG. 1 and following. The discussion immediately below describes improvements and additions to the TTU hardware as shown in FIG. 5 specifically to implement functionality concerning and support the DMM primitive.

The FIG. 5 TTU block diagram shows in crosshatch where new TTU circuitry has been added, changed and/or enhanced to implement functionality concerning and support the DMM primitive. In one embodiment, DMM affects many sub-units in the TTU including the Ray-Complet Test (RCT) unit, the Ray-Triangle Test (RTT) unit, the Ray Management Unit (RMU), the Intersection Management Unit (IMU), the Stack Management Unit (SMU), the Traversal Logic (TL) unit, and the L0 Triangle Cache (L0TC). New RAMs and new datapaths are also introduced to carry out the sub-division and micro-triangle generation processes, as shown in FIG. 49. The TTU as modified/enhanced implements in hardware both of the two displaced micro-mesh operations described in the previous section:

Ray-subtri intersection—test the intersection between a ray and a sub triangle on a displaced micro-mesh, also known as a displaced subtri.

Micro-triangle fetch—fetch the properties of a specific microtriangle on a displaced micro-mesh, including its coordinates.

The following sections describe the implementation both of these operations in detail, starting from query setup.

Query Setup

Clients query the TTU by first loading the TTU's memory-mapped registers with the query parameters. The client communicates these parameters to the TTU Interface (TIF) sub-unit via TTUST (TTU Store) instructions. TIF forwards the parameters to both the Ray Management Unit (RMU) as well as the Stack Management Unit (SMU). The client then issues a TTGO instruction, which begins execution of the query in the SMU.

Stack Management Unit (SMU) 740:

The SM initiates a function related to a DMM primitive by creating a stack entry and pushing the entry onto the TTU's SMU traversal stack. After the TTUGO, SMU inspects the entry at the top of the traversal stack and begins processing accordingly. In one embodiment, two new stack entry types are introduced for DMM: the Displaced Subtri entry for ray-microtriangle testing (FIG. 57) and the Microtri Addr entry for microtriangle fetches (FIG. 58).

Displaced Subtri Stack Entry

This entry begins the execution of a ray-subtri intersection test within the TTU. There are two versions of this stack entry, the "first" type and the "subsequent" type. The "first" type is used for the first displaced subtri entry in the stack, whereas the "subsequent" type is used for all subsequent displaced subtri entries. The following fields are specified in the displaced subtri stack entry (memory map in FIG. 57):

addrLast (address last): aligned address of the cacheline containing the target DMM triangle block. This block defines the base triangle to be tested.

addrLastOfs (address last offset): a signed offset to addrLast used by "subsequent" displaced subtri entries. The DMM triangle block's address is computed as addrLast+addrLastOfs.

subTriIdx (sub triangle index): the index of the sub triangle in the DMM triangle block to intersect against. A single DMM triangle block describes up to a maximum number of sub triangles.

utriIdxHi/utriIdxLo (microtriangle index): "bird index" of the starting microtriangle within the sub triangle. Only microtriangles with indices higher than this index will be tested for intersection.

rp (ray operation pass): indicates whether the ray operation failed or passed.

co (cull opaque): a flag to select whether or not to cull opaque hits.

ca (cull opaque): a flag to select whether or not to cull alpha hits. If co and ca are both set, SMU immediately returns to the SM.

nr (no return): allows co and ca to both be set without forcing a return to SM.

Displaced subtri entries are crafted automatically by SMU if a complet child containing a subtri leaf is intersected by RCT (detailed in a future section). Displaced subtri entries can also be crafted by the client and restored directly by SMU for more advanced use cases.

Microtri Addr Stack Entry

This entry begins the execution of a microtriangle fetch in the TTU. Only four fields are specified in this entry (memory map in FIG. 58):

addrLast (address last): aligned address of the cacheline containing the target DMM triangle block.

subTriIdx (sub triangle index): index of the target sub triangle in the DMM triangle block.

utriIdxHi/utriIdxLo (microtriangle index): "bird index" of the target microtriangle in the sub triangle.

Microtri address entries are crafted automatically by SMU if the client performs a stack initialization called StackInit MicroTriFetch (detailed in a future section). The following fields are specified by the client for this initialization (memory map in FIG. 59):

triPtrHiAligned/triPtrLoAligned (triangle pointer aligned): aligned address of the cacheline containing the target DMM triangle block.

instancePtrHi/instancePtrLo (instance pointer): optional pointer to an instance node for an instance specific displacement block address.

subTriIdx (sub triangle index): index of the target sub triangle in the DMM triangle block.

microTriIdxLo (microtriangle index low): "bird index" of the target microtriangle in the sub triangle.

For both of these stack entries, SMU sends an activation to TriSched with the DMM triangle block pointer, which in turn will fetch one or two cachelines of base triangle blocks (e.g., depending on whether it is a motion sub triangle or not).

TriSched

A TriSched (triangle scheduling) block of the TTU constructs a memory read request for the DMM triangle block and sends an activation to the L0TC to fetch the cacheline. See FIG. 47B block 4012.

If the sub triangle is a motion sub triangle, TriSched also fetches the next cacheline which contains the DMM triangle block corresponding to the second motion keypoint.

L0 Triangle Cache (L0TC)

L0TC interacts with the memory subsystem to fetch the cacheline containing the DMM triangle block. Once the memory system returns the requested triangle block, L0TC forwards it to RTT. RMU simultaneously sends the ray data for the corresponding ray.

Base Triangle Pass: Ray Triangle Test (RTT)

Once the base triangle block has been fetched from the memory subsystem, then given the base triangle block and the input ray, RTT first performs a base triangle pass (FIG. 47B) to prepare for the displaced sub triangle test. Note that the displaced sub triangle test itself occurs on a second pass of RTT (FIG. 47C) which is detailed later on. As described in the algorithms overview section, this pass computes a shear space minimum and maximum triangle for interpolation, generates the displacement block address, computes the sub triangle's starting index, and performs various culling and error checks. The displaced micro-mesh triangle block is used for all of these functions.

FIG. 49 is a zoomed in example block diagram of the RTT. In one embodiment, the base triangle block entering from the top righthand portion of the Figure from the L0 cache is decompressed if compressed, and is then provided to the intersection pipe which will perform the algorithms of FIG. 47B. If not culled, the metadata results of the base triangle pass are temporarily stored in the shaded RTT base RAM that has been added to RTT to await delivery by the memory subsystem of the displacement block(s), which RTT needs to perform the sub triangle pass of FIG. 47C. If there is motion, the RTT in one embodiment waits until both motion-based base triangle blocks have been returned by the memory subsystem (the first to arrive can be parked in the RAM while RTT waits for the second one to arrive) before processing them both and performing motion interpolation between them.

Displaced Micro-mesh Triangle Block

The displaced micro-mesh triangle block describes the base triangle to be tested. The block contains the following fields (example memory map in FIGS. 60, 61, and 62):

Position0.XYZ: coordinates of vertex 0 of the base triangle.

Position1.XYZ: coordinates of vertex 1 of the base triangle.

Position2.XYZ: coordinates of vertex 2 of the base triangle.

Direction0.XYZ: displacement vector for vertex 0 of the base triangle.

Direction1.XYZ: displacement vector for vertex 1 of the base triangle.

Direction2.XYZ: 48 bits—displacement vector for vertex 2 of the base triangle.

subTri array: an array of descriptors for up to a maximum number of sub triangles on the base triangle, including each sub triangle's displacement block size and displacement resolution.

subSize: if set, indicates that this sub triangle uses a larger displacement block.

subRes: the sub triangle's resolution; indicates a sub triangle resolution of e.g., 64 microtriangles, 256 microtriangles, 1024 microtriangles, etc.

displacementScale—the base triangle's displacement scale.

utriStartIdx: 20 bits—the starting microtriangle index for the first sub triangle in the block. Start indices for subsequent sub triangles are calculated during this pass.

DMOffset128: aligned displacement block address for the first sub triangle using a large sized displacement block. Displacement block addresses for subsequent sub triangles are calculated during this pass.

DMOffset64: aligned, signed displacement block offset applied to DMOffset128 for small sized displacement blocks.

TriangleID: a client specified triangle ID.

Header: contains more base triangle metadata.

Mode: set to indicate a displaced micro-mesh base triangle.

M (Num tris): the number of valid sub triangles in the triangle block.

FNC: if set, do not cull due to triangle facing.

Alpha: if set, indicates all sub triangles are alpha.

baseResolution: the resolution of the base triangle.

dmAperture: indicates that the displacement block offset (DM Offset) is the final displacement block address or that the DM Offset must be added to the active instance's displacement base pointer to compute the final displacement block address.

edgeDecimation: a bit vector specifying which edges of the base triangle should be decimated. The bit vector can encode decimation for: edge v0-v1, edge v1-v2, edge v2-v0

Minimum Triangle Generation

For hardware simplification in one embodiment, a non-zero bias is not supported in the triangle block and the hardware effectively treats the base triangle itself as the minimum triangle. Any desired displacement bias can be pre-added to the base triangle vertices by the builder during AS construction without any loss of functionality.

Maximum Triangle Generation

During the base triangle pass, RTT generates and stores a maximum triangle for use during the sub triangle pass. The maximum triangle's coordinates are computed by displacing the base triangle's vertices to their maximum value, as shown by the pseudo-code in FIG. 63.

For ray-subtri intersection queries, the maximum triangle is generated in the ray's shear space to simplify required the culling logic in the sub triangle pass. For microtriangle fetch queries, the maximum triangle is instead generated in object space as there is no input ray to shear to.

Displacement Block Address Generation

During the base triangle pass, RTT computes the address of the displacement block used to displace the target sub triangle. The displacement block address is computed in two steps: base address generation for the first sub triangle in the triangle block, followed by an adjustment to compute the displacement block address for the target sub triangle.

The first step of address generation computes a base address using DMOffset128 and DMOffset64. If the target sub triangle uses a larger sized displacement block (sub-Size), the base address is simply equal to DMOffset128. If the sub triangle uses a smaller displacement block (subSize), the baseaddress is given as DMOffset128+DMOffset64. Because DMOffset64 is signed, 64B displacement blocks can be earlier in memory order than 128B displacement blocks.

The second step of address generation adjusts the base address to compute the displacement block address for the target sub triangle. Displacement blocks for all sub triangles in a triangle block are laid out linearly in memory, such that sub triangle N's displacement block address is equal to sub triangles N−1's displacement block address plus its size: displacement_addr[N]=displacement_addr[N−1]+subtri_size[N−1]

In one embodiment, displacement blocks for smaller sub triangles and displacement blocks for larger sub triangles are addressed independently, so "all sub triangles" in this context refers to all sub triangles of the same size. The pseudocode in FIG. 64 shows the full address generation procedure.

Micro-Triangle Start Index Computation

During the base triangle pass, RTT also computes the starting microtriangle index of the target sub triangle. In one embodiment, a sub triangle's location on a base triangle is completely specified by a single Bird index the index of the first microtriangle within that sub triangle.

The triangle block specifies such a starting microtriangle index for only the first sub triangle in the block. Just as the displacement blocks for each sub triangle are laid out linearly in memory, the sub triangles themselves are laid out linearly on the base triangle. This allows the hardware to compute the starting index of any sub triangle in the block, as the starting index for sub triangle N is equal to the starting index of sub triangle N−1 plus its number of microtriangles: subtri_start_index[N]=subtri_start_index[N−1]+subtri_num_utris[N−1]

Unlike the displacement block calculation, in one embodiment, this calculation does not act independently for different sub triangle sizes. All sub triangles are linearized together regardless of their resolution. The pseudo-code in FIG. 65 shows the full start index generation procedure.

Alpha Culling Check

During the base triangle pass, RTT applies the ray's triangle mode flags (at_p/at_f and ot_p/ot_f) (see FIG. 55) to the base triangle to either cull the triangle or determine its final visibility state. The cullAlpha and cullOpaque flags are then applied, which force culling of alpha and opaque base triangles, respectively.

Shear Space Culling Check

During the base triangle pass, RTT checks if the base triangle can be conservatively culled by inspecting the signs of the minimum and maximum triangle vertices. Recall that the minimum and maximum triangles are generated in the ray's shear space. In this coordinate space, any triangle that does not bound the origin is guaranteed not to intersect the ray. Consequently, if the minimum and maximum triangles both do not bound the origin, the base triangle is culled and processing ends.

Error Checks

During the base triangle pass, RTT also performs error checks to detect malformed triangle blocks or invalid configurations. If no errors are detected, RTT stores the information computed during the base triangle pass a new RAM called the RTT Base RAM, and forwards the target sub triangle's displacement block address to IMU.

Base RAM

The RTT Base RAM stores base triangle data until the target sub triangle's displacement block is fetched by the memory subsystem. The RTT Base RAM stores data for each individual ray-subtri intersection test that proceeds past the base triangle pass. At a high level, three types of information are stored: base triangle information, displacement information, and triangle information:

Base Triangle Information:
  min_coordinates: coordinates of the base triangle also known as the minimum triangle.
  max_coordinates: coordinates of the maximum triangle.
Displacement Information:
  subtri_start_index: microtriangle starting index of the target sub triangle.
  base_resolution: resolution of the base triangle.
  subtri_size: displacement block size of the target sub triangle.
  subtri_resolution: resolution of the target sub triangle.
  edge_decimation: bitmask of the desired edge decimation for the base triangle.
Triangle Information:
  triangle_id: client specified triangle ID.
  alpha: if set, indicates that the target sub triangle is an alpha sub triangle.
  force_no_cull: if set, disables culling due to triangle facing during intersection.
  triangle_block_addr: cacheline address of the base triangle block.

Motion

For motion interpolation, two triangle blocks containing the two motion keypoints are used. Because the order of arrival of the two triangle blocks is not guaranteed, the first triangle block to arrive is not processed by RTT. Instead, its vertices and displacement directions are stored in the RTT Base RAM. When the second block arrives, the first block's vertices and displacement directions are interpolated with the second block's vertices and displacement directions using the ray specified timestamp. The interpolated vertices and displacement directions are used for minimum and maximum triangle generation.

Base Triangle Pass: Intersection Management Unit (IMU)

During the base triangle pass, IMU computes a final displacement block address using the initial displacement block address from RTT. If no instance level displacement block offset has been specified, the address from RTT is the final displacement block address. However, if an instance level displacement block offset has been specified, IMU adds this offset to the address from RTT to compute a final displacement block address. IMU then forwards the final displacement block address to SMU.

Base Triangle Pass: Stack Management Unit (SMU)

During the base triangle pass, SMU stores the incoming displacement block address from IMU into a new RAM and sends an activation to TriSched with the displacement block pointer.

Base Triangle Pass: TriSched

Using the displacement block address from IMU, TriSched constructs a memory read request and sends an activation to the L0TC to fetch the displacement block.

Base Triangle Pass: L0 Triangle Cache (L0TC)

L0TC interacts with the memory subsystem to fetch the cacheline containing the target sub triangle's displacement block. The details of the cacheline fetch are not relevant to this invention. Once the memory system returns the requested displacement block, L0TC forwards it to RTT. RMU simultaneously sends the ray data for the corresponding ray. This begins the sub triangle pass.

Sub Triangle Pass: Ray Triangle Test (RTT)

During the sub triangle pass (see FIG. 47C), RTT iteratively subdivides the base triangle until all microtriangles of the target sub triangle have either been generated or culled. Two new pipelines in RTT—the culling pipe and the generation pipe—perform base triangle subdivision and microtriangle generation in parallel.

Culling Pipe

The culling pipe uses a culling stack to iteratively subdivide the base triangle over multiple passes. During each pass, the top entry of the culling stack is subdivided into four candidate triangles, following the algorithm from the earlier "Base Triangle Subdivision Process" section. UNORM11 displacement amounts for each newly created micro-vertex are also computed. Various culling checks are then performed on the four candidate triangles, and those that survive culling are pushed back on to culling stack for the next pass. The culling pipe continues subdividing in this fashion until level 1, right before the microtriangle level. Micro-vertices at this level are sent to the generation pipe for displaced micro-vertex position generation. When the culling stack eventually becomes empty, the culling pipe sends a "done" signal to the generation pipe to indicate that the subdivision process has been completed.

Culling Stack

As shown in FIG. 49, the culling stack ("c-stack") is a RAM that stores subdivided triangle data during the subdivision process. The culling stack is deep enough to accommodate the largest number of subdivisions or levels of sub triangles. At the start of each culling pipe pass, the top entry of the culling stack is the input to the culling pipe also shown in FIG. 49. Up to four new entries are pushed on to the culling stack at the end of each culling pass. Each entry in the culling stack represents a subdivided triangle including its positions, displacement amounts, and other metadata:
  micro_vertex_0/micro_vertex_1/micro_vertex_2—micro-vertex data for the "w", "u", and "v" micro-vertices of the subdivided triangle.
  min_position: the micro-vertex's location on the minimum triangle.
  max_position: the micro-vertex's location on the maximum triangle.
  displacement_amount: the micro-vertex's UNORM11 displacement amount.
  level: the level of the subdivided triangle. Counts down from the base triangle resolution.
  bird_index: the microtriangle index of the subdivided triangle.

Culling Stack Initialization

At the start of the sub triangle pass, the culling pipe is initialized with a first entry representing the base triangle. The three micro-vertices of the entry are simply the corner vertices of the base triangle.

Displacement amounts are initialized, and the subtri_start_index from the RTT Base RAM is left shifted to produce a full sub triangle starting index. The level of the first entry is set to the base triangle level. Each subdivided triangle from here on decrements the level, meaning lower-level triangles are higher resolution. Ignoring any LOD bias, a level of 0 represents the final microtriangle level. See FIG. 66 for a pseudo-code implementation.

After initialization, the culling pipe pulls the first entry from the culling stack and begins the subdivision and culling process.

Entry Subdivision

The culling pipe first subdivides the input entry's micro-vertex positions, creating three new micro-vertices. Both the minimum and maximum triangles are subdivided using a standard floating-point average, as shown in the pseudo-code in FIG. 67. The three original vertices and the three subdivided vertices are then used to define the four new candidate triangles for the next pass.

Displacement Amount Computation

The culling pipe also computes each new micro-vertex's displacement amount, depending on the level of the stack entry. If the stack entry is not yet at the sub triangle level, then the displacement amount is simply 0 as only the sub triangle needs to be displaced. At the sub triangle level, the anchor displacements are fetched from the displacement block and applied to the micro-vertices. From the sub triangle level to the microtriangle level, displacement amounts for each micro-vertex are fetched from the block, and the predict-and-correct mechanism is applied for compressed displacement blocks. See FIGS. 68 and 69 for a pseudo-code implementation.

Culling Checks

After computing the displacement amounts for the new micro-vertices, the culling pipe determines which of the four new triangles to cull, and pushes the survivors onto the culling stack. There are three types of culling performed in example embodiments:
  "bird index" culling,
  shear space culling, and
  microtriangle start index culling.

Bird Index Culling Check

Bird index culling culls candidate triangles that are outside of the target sub triangle. For example, consider a resolution-4 base triangle comprised of four resolution-3 sub triangles (FIG. 50). During the first culling pipe pass, each of the four new candidate triangles correspond to an entire sub triangle.

However, for both ray-subtri intersection as well as microtriangle fetch, the culling pipe only operates on a single sub triangle at a time as specified by the subTriIdx field in the stack entry. If the subTriIdx specifies sub triangle 1, then only the bottom left candidate triangle is of interest and the other three can be culled (FIG. 51). Similarly, if the subTriIdx specifies sub triangle 2 then only the middle sub triangle is of interest and the other three can be culled.

For microtriangle fetch, "bird index" culling is applied all the way from the base triangle level to the microtriangle level, because only a single microtriangle is of interest. For ray-subtri intersection, "bird index" culling is only used for candidate triangles above the sub triangle level. Below the sub triangle level, only candidate triangles that do not intersect the ray can be culled. This type of culling is called shear space culling.

Shear Space Culling Check

Shear space culling culls candidate triangles that are guaranteed to not intersect the incident ray. The same operating principle used for base triangle shear space culling is also used here. The culling pipe performs this check for the minimum and maximum triangles of each candidate triangle. If a candidate's minimum and maximum triangles both do not bound the origin, the candidate is culled. To further improve culling efficacy, a 45-degree rotated version of the shear space check is also performed in example embodiments. In one embodiment, the TTU generation pipe includes a determining circuit that determines the output microtriangle topology based on an identification of the edge decimation style to apply, the input triangle's "bird index" and the client-specified edge decimation. The circuit computes the discrete barycentrics of the micro-triangle group, determines which edges need to be decimated, and outputs the micro-triangle topology to use.

Note that this culling check is conservative, meaning it does not cull all non-intersecting candidate triangles. A full ray-triangle intersection test is still required to determine which microtriangles intersect the ray.

Micro-Triangle Start Index Culling Check

For alpha intersections and query replay purposes, it is desirable to be able to only test microtriangles after a specific starting "bird index", rather than starting at the beginning of the sub triangle. This index is called the microtriangle start index, and is provided by a utriIdx field in the stack entry. The culling pipe performs this check by comparing each candidate triangle's "bird index" to the microtriangle start index. Candidate triangles that are before the microtriangle start index (in "bird curve" order) are culled. Candidate triangles that are after the microtriangle start index are not culled.

FIG. 70 show an example. Suppose the intersection testing indicates that microtriangle 23 is hit, and another microtriangle in the sub triangle that is an alpha microtriangle is also hit. When multiple alpha hits occur, the TTU only reports a single hit back to the SM but can set a flag informing the SM that there are other potential alpha triangle hits in the sub triangle. The TTU in this example could thus return microtriangle 23 to the SM as a hit, and also sets microtriangle 23 as the starting index in the stack entry. The SM can do whatever it needs to do based on the initial hit, but can relaunch the query onto the TTU to ask the TTU to find a next alpha hit. Because alpha triangles are non-opaque, a ray could pass through one alpha triangle to strike a second triangle—and if the second triangle is alpha, could pass through that triangle to strike a third triangle—and so on. In some applications, the SM may wish to learn all of the alpha triangles within the sub triangle that the ray strikes since each such intersection can affect visualization.

The purpose: on a relaunch, the TTU will exclude all microtriangles before microtriangle 23 in the bird order because those microtriangles have already been tested. So in this example, the start index would be set to microtriangle 24. When the task is relaunched by the SM, the TTU will exclude all of the shaded microtriangles in FIG. 70 from being tested and start testing at microtriangle 24. The culling shown is on the level of a single microtriangle so that any microtriangle index can be the start index.

Final Subdivision Level

The culling pipe stops subdivision when the next candidate triangles reach the LOD bias level, which is the effective microtriangle level. At this level, the final six vertices (corresponding to a microtriangle quad such as shown in FIG. 35) and their displacement amounts are sent to the generation pipe for final microtriangle generation. See example pseudo-code in FIG. 71.

Generation Pipe

The RTT generation pipe shown in FIG. 49 uses the vertex position and displacement data from the culling pipe to generate the final micro-vertex positions and microtriangle topologies—also accounting for any edge decimation that needs to be performed. For ray-subtri intersection tests, the final (last level or microtriangle level) micro-vertex positions and microtriangle topologies are sent to the intersection pipe (also shown in FIG. 49) for intersection testing. For microtriangle fetch, only a single microtriangle is generated the one requested by the client and its data is forwarded to IMU.

On receiving the culling pipe's "done" signal, the generation pipe forwards it to the intersection pipe to indicate the end of microtriangle generation. The "done" signal may be sent with a final set of generated microtriangles or without any valid microtriangles.

Micro-Vertex Generation

The generation pipe displaces the position of each incoming micro-vertex by first normalizing its UNORM11 displacement amount, and then linearly interpolating between its minimum and maximum triangles using the normalized displacement. A new math unit is added to perform the UNORM11 to FP32 conversion. The linearly interpolation is performed using a 2-component dot product, as shown in FIG. 72.

Micro-Triangle Topology Lookup

Using pre-defined lookup tables, the generation pipe applies any desired edge decimation, if applicable, and determines the topology of the output microtriangles. With the six incoming vertices, the generation pipe can generate up to four microtriangles during each pass. However, with edge decimation and microtriangle index culling, it is also possible to generate fewer than four. For micro-triangle fetch only one microtriangle is generated.

To determine if edge decimation should be applied, the generation pipe computes the discrete barycentrics of the incoming subdivided triangle relative to the base triangle (FIG. 45). Based on the decimated edges, a corresponding topology of microtriangles is selected out of various possible topologies, some examples of which are shown in FIGS. 41 through 42(K).

The chosen topology and the micro-vertex positions are sent to the intersection pipe for the full precision ray-triangle test.

Intersection Pipe

The intersection pipe performs a ray-triangle test on the microtriangles generated by the generation pipe, up to k tests per pass (k could for example be 4 in one embodiment, meaning that the intersection pipe operates on microtriangle quads). For any hit microtriangles, the intersection pipe computes the microtriangle's winding and performs front-face/back-face culling if specified in the ray flags. Setting the FNC bit in the DMM triangle block disables front-face/back-face culling. Thus, the intersection pipe cannot do its work until it receives outputs the generation pipe generates, and the generation pipe cannot do its work until it receives outputs the culling pipe generates.

If a microtriangle is hit, the t-value of the intersection and the hit-point barycentrics are sent to IMU for handling. In one embodiment, the hit-point barycentrics are relative to the hit microtriangle, not the base triangle or sub triangle (thus treating the microtriangles as if they are simply triangles). The intersection pipe also forwards the generation pipe's "done" signal to IMU to indicate that all microtriangle intersection testing is complete.

Sub Triangle Pass: Intersection Management Unit (IMU) 722

The IMU records each valid microtriangle hit from RTT in its Primary Intersection Status RAM.

Primary Intersection Status RAM

The following fields are stored in Primary Intersection Status RAM of which five are designed specifically to support enhanced reporting for displaced micro-meshes:

hit_user_triangle_id: user triangle ID of the hit base triangle.
hit_t: the ray parametric t-value of the intersected microtriangle.
hit_u: microtriangle relative, barycentric hit point coordinate U.
hit_v: microtriangle relative, barycentric hit point coordinate V. Note: the "w" hit point barycentric coordinate is not computed nor stored. It can be computed by the client as 1−hit_u−hit_v
hit_is_alpha: set if the hit microtriangle's base triangle is alpha.
hit_is_back_facing: set if the hit microtriangle is back-facing.
remaining_alphas: set if more than one alpha microtriangles are intersected during a single ray-subtri intersection test. Only the earliest alpha hit in t-order is stored and returned.
is_micro_tri: Set on all microtriangle intersections.
lod: Final LOD bias applied to the hit microtriangle's base triangle.
micro_tri_index: Full "bird index" of the hit microtriangle.
sub_tri_index: Index of the hit sub triangle.
resolution: Resolution of the hit microtriangle's base triangle.
edge_decimation: The desired edge decimation of the hit microtriangle's base triangle. Note that this is not the actual edge decimation applied to the hit.

Multiple Hits

If multiple microtriangles in the same sub triangle are hit, the following rules apply:
  If the hit microtriangle is opaque and there is an existing opaque hit in the Primary Intersection Status RAM: store the closest hit (t-ordering).
  If the hit microtriangle is alpha and there is an existing alpha hit in the Primary Intersection Status RAM: keep the existing alpha hit (memory/traversal ordering) and set the remaining_alphas bit to indicate that there are remaining alpha hits to process in the sub triangle.

A benefit of displaced micro-meshes is that all of the triangles for a ray-subtri test are contained in a single triangle block, as opposed to explicit triangle ranges which can span multiple triangle blocks. Displaced micro-meshes therefore have deterministic triangle ordering, and do not have to deal with ordering hits across multiple triangle blocks.

In the absence of a visibility mask (described in a later section), the entire sub triangle is either all alpha or all opaque meaning alpha-after-opaque and opaque-after-alpha microtriangle hit cases are not possible. However, it is possible for a previous legacy (non-DMM) hit to be present in the intersection status RAM at the time of a microtriangle hit. In this case, the following rules apply:
  If the hit microtriangle is opaque and the legacy-triangle is alpha: overwrite the legacy-triangle hit.
  If the hit microtriangle is opaque and the legacy-triangle is opaque: store the closest hit (t-ordering).
  If the hit microtriangle is alpha and the legacy-triangle is opaque: set the remaining_alphas bit if the microtriangle's hit-t is less than the legacy-triangle's hit-t.
  If the hit microtriangle is alpha and the legacy-triangle is alpha: keep the existing alpha hit (memory/traversal ordering) and set the remaining_alphas bit.

Once IMU receives the "done" signal from RTT, all the microtriangles in the sub triangle have been tested and IMU now sends an activation to SMU to update the traversal stack.

Sub Triangle Pass: Stack Management Unit (SMU) 740

After sub triangle intersection testing is finished, SMU updates the traversal stack based on the traversal results from IMU. The following rules apply:
  If there is no hit: the top stack entry is popped and traversal continues.
  If there is an opaque hit and remaining_alphas is 0: the top stack entry is popped and traversal continues.
  If there is an opaque hit and remaining_alphas is 1: the top stack entry's cullOpaque bit is set, and the hit is returned to the SM for processing and relaunch.

The hit data is available the HitType_Triangle (FIG. 73) and HitTrianglePtr fields (FIG. 74).

Note: in this case, the graphics driver may store the opaque hit and relaunches the query without calling the Any Hit Shader (AHS).
  If there is an alpha hit and remaining_alphas is 0: the top stack entry is popped and the current hit information is returned to the SM for AHS processing. (FIG. 81).
  If there is an alpha hit and remaining_alphas is 1: the top stack entry's utriIdx is set to the next microtriangle index, and the stack cull opaque bit is set (FIG. 57). The hit is returned to the SM for AHS processing and possible relaunch. The client can restart the traversal at the next micro-triangle to get the hit information for the remaining alpha triangle.

Visibility Mask Integration

As described in the Visibility Patent, a visibility mask (VM) is used to represent the varying visibility within a triangle to create effects such as shown in FIGS. 8D and 10C. In one embodiment, a VM and a DM associated with a same area of a scene may be stored at different resolutions that can be independent of one another. The independent resolution of VMs and DMs determine the resolution of their associated μ-meshes. As a result, μ-meshes may have two nesting resolutions when both a DM and a VM are specified. Two μ-meshes that have the same vertices (e.g., such as when they pertain to the same geometric primitive 202) nest in the sense that the μ-triangles of a lower order μ-mesh (e.g., a triangle μ-mesh having an order of two or $2^2$ μ-triangles per side) can be divided to form μ-triangles of a higher order μ-mesh (e.g., a triangle μ-mesh having an order of four or $2^4$ μ-triangles per side) since the two μ-meshes are powers of two in dimension. It is common in some implementations for the resolution of the VM to be higher than the DM. In this case the DM displaces the μ-triangles at a coarser resolution and then the VM controls the visibility of μ-triangles within the displaced μ-triangles.

FIGS. 10A, 10B and 10C schematically illustrate displacement mapped μ-triangles, visibility masked μ-triangles, and a μ-mesh defined by combined DM and VM, respectively. That is, the μ-mesh shown in FIG. 10C has both the displacement shown in FIG. 10A and the visibility mask shown in FIG. 10B applied.

VMs are accessible by the TTU, which allows the TTU to perform visibility tests that would otherwise happen in an any hit shader (AHS) outside of the TTU. Visibility masks and displaced micro-meshes integrate seamlessly, as both use the same underlying micro-mesh representation. Displaced micro-meshes can utilize visibility masks by either encoding a mesh-wide visibility in the DMM triangle block, or by performing a visibility mask lookup for any hit microtriangle in the mesh.

To support visibility masks, the following fields are added to the displaced micro-mesh triangle block:

- subTriVisibility array: an array describing each sub triangle's visibility state: transparent, opaque, unknown (treat like alpha), or indirect-VM, for up to 64 sub triangles. If the result of the above testing is a microtriangle with indirect-VM, the TTU will need to do a visibility mask lookup (see vmOffset value below) to retrieve the microtriangle's visibility state before the intersection test can be performed.
- vmOffset: the base triangle's visibility mask offset.
- vmLevel: indicates the resolution of the visibility mask or a directly encoded VM or no VM present for the base triangle.
- vmType: indicates number of states in visibility mask.
- vmAperture: indicates that the computed VM Offset is to be added to the active instance's visibility mask base pointer or whether the VM offset is the final visibility mask address.

If the VM is directly encoded, interpret as bit 0 of the 4-state mesh-wide visibility state.

During the base triangle pass, the target sub triangle is culled if it is directly encoded and transparent. If the sub triangle is indirectly encoded, its associated VM information is stored in the RTT Base RAM.

Visibility masks do not affect sub triangle subdivision, microtriangle generation, and microtriangle intersection.

For any hit microtriangle that has directly encoded visibility state, the following rules apply in IMU:
- If the microtriangle is opaque: the behavior is identical to non-VM opaque microtriangles.
- If the microtriangle is unknown/alpha: the behavior is identical to non-VM alpha microtriangles.
- If the microtriangle is transparent: the hit is discarded.

For any hit microtriangle that has indirectly encoded visibility state, the behavior is the same as if it were an explicit triangle with indirect visibility. One simplification is that for displaced micro-meshes the order in which microtriangles are processed is deterministic, as opposed to explicit triangles which can span multiple regions that are affected by memory return order.

If the sub triangle is using indirect visibility, then after all microtriangles have been tested IMU initiates a VM lookup for the first hit microtriangle. Once the hit microtriangle's visibility state is known, IMU applies the following rules:
- If the microtriangle is alpha and remaining_alphas is 0: the top stack entry is popped and the hit is retuned to SM for Any Hit Shader (AHS) processing.
- If the microtriangle is alpha and remaining_alphas is 1: the top stack entry's utriIdx is set to the next microtriangle index, and the stack cull opaque bit is set (FIG. 57). The hit is retuned to SM for AHS processing.
- If the microtriangle is opaque or transparent, and remaining_alphas is 0: the top stack entry is popped and traversal continues.
- If the microtriangle is opaque or transparent, and remaining_alphas is 1, the transparent hit doesn't really count and there are potentially other alpha triangles in the sub triangle that are hits: the top stack entry's utriIdx is set to the next microtriangle index, and the stack cull opaque bit is set (FIG. 57). The top stack entry is then replayed by the TTU without returning to the SM.

Because the visibility mask resolution is independent of the base triangle resolution, the hit point's barycentrics is transformed from the microtriangle's reference frame to the base triangle's reference frame before performing the VM lookup. This transformation depends on the "bird index" of the hit microtriangle, as well as the resolution and edge decimation of the base triangle. In one embodiment, the TTU includes a transform circuit that transforms hit point barycentric coordinates from the microtriangle reference frame to the base triangle reference frame. The circuit receives as inputs the mesh resolution and the bird index of the micro-triangle, and outputs the mapped base triangle barycentric coordinates.

Sub Triangle Addressing in Ray-Complet Test (RCT) 710

Though displaced subtri stack entries can be manually crafted and restored by the client, such a use case is not typical. Typically, the client constructs a AS containing displaced micro-mesh primitives and then initiates a ray traversal query on the TTU starting at the AS's root complet. If a complet containing DMM leaves is intersected during traversal, RCT itself crafts a displaced sub-tri stack entry and pushes it onto the traversal stack. The following paragraphs detail the crafting process.

FIG. 75 shows the layout of a typical complet. At a high level, each complet specifies a corner position, a scale, a leaf type, and details of up to 12 children. For displaced micro-meshes, a new leaf type is added to the mode bits (FIG. 76) to indicate that the complet contains displaced micro-mesh leaves.

If one or more complet children containing DMM leaves are intersected, RCT must determine a sub triangle index and a triangle block pointer for each child and craft a matching displaced subtri stack entry.

Each complet child corresponds to a single sub triangle in a triangle block. By default, subsequent children in the same complet correspond to consecutive sub triangles in the same block. However, to support triangle blocks with fewer than 64 sub triangles and motion blur, subsequent children can also reset the sub triangle index while simultaneously skipping a specified number of triangle blocks. This means the sub triangle indices and triangle block pointers are computed differently for the first DMM leaf in the complet and for subsequent DMM leaves.

First DMM Leaf

The first DMM leaf's sub triangle index is directly provided by the subTriIdx bits in the child's data field (FIG. 77). An alpha bit is also provided to indicate that the child only contains alpha displaced micro-meshes. To determine the first DMM leaf's triangle block address, the following rules apply:
- If the complet indicates absolute addressing, the final address is given by the concatenation of the leafPtrHi bits in the complet's misc field (FIG. 78) with the leafPtrLo bits.
- If the complet indicates relative addressing, the final leaf address is computed by adding the leafPtr address from above to the complet's address.

Subsequent DMM Leaves

For subsequent DMM leaves in a complet, the determination of the sub triangle index and the triangle block address depends on the nextLine bit in the leaf's data field (FIG. 79):
- If the nextLine bit is not set, the leaf's sub triangle index is equal to one more than the previous leaf's sub triangle index. The leaf's triangle block address is equal to that of the previous leaf.
- If the nextLine bit is set, the leaf's sub triangle index is reset to 0, and the triangle block address is incremented by a computed line stride. The final line stride is computed by first concatenating the lineStrideHi bits in the complet's misc field with the lineStrideLo bits in the leaf's data field, and then adding one.

The line stride is there explicitly to allow motion blur support. For motion sub triangles, the first motion key is specified by the data subTriIdx field (FIG. 77) and the misc leafPtr (FIG. 78). By convention, the second motion key always comes from the next cacheline (leafPtr+1). When the current triangle block is finished, the "next" bit is set and the corresponding lineStride is used to skip contiguously stored keys and instead jump to the next triangle block with its own set of motion keys (FIG. 46).

Because the addrOfsLast field is a signed field, the maximum delta in number of lines that may be referenced by a single complet, including those skipped by a stride, is limited to a certain maximum. For motion blur this also limits the maximum number of motion keys possible for a single complet, as discussed below.

Motion Blur Example Implementation

How to use the DMM primitive to achieve animation effects such as motion blur is introduced above. For displaced micro-meshes, motion blur is specified at the complet level by setting the "mot" bit in the complet's "misc" field (FIG. 78). When this bit is set, all DMM sub triangles the complet are motion sub triangles.

The lineStride mechanism detailed above is used to support multiple motion keys per block, with a limit of up to a certain number m of motion keys for a single complet (m could be 127 in one example embodiment). For more than m motion keys, multiple complets are used.

For displaced micro-meshes each triangle block corresponds to exactly one motion keypoint, as opposed to explicit triangles where each block contains both the start and end motion keypoints. This is beneficial, and means displaced micro-meshes support multiple keypoints without any duplication.

Furthermore, because the displacement amounts are not interpolated, each new motion key only requires a single new triangle block and no additional displacement blocks. Alternate implementations may store multiple keypoints in a single block but, just like explicit triangles, this comes with the drawback of keypoint duplication for multiple keypoints.

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display. Meanwhile, however, the technology herein provides advantages when used to produce images for virtual reality, augmented reality, mixed reality, video games, motion and still picture generation, and other visualization applications.

Flowcharts, pseudocode and other descriptions of algorithms herein are intended to illustrate and describe a range of implementations including hardware circuitry, software code executed by a CPU and/or GPU, and combined hardware/software implementations. From such algorithmic descriptions, one skilled in the relevant art can design and construct hardware circuitry by expressing the functions and associated structures in a hardware descriptor language (HDL), which is compiled by an electronic design automation system to create a gate netlist. See for example Bhargava et al, Hardware Description Language Demystified: Explore Digital System Design Using Verilog HDL and VLSI Design Tools (BPB 2020); Palnitkar, Verilog Hdl: A Guide to Digital Design and Synthesis (Prentice Hall 2003); IEEE 1364-2001. The gate netlist in turn is used to create a physically realizable form of the circuitry on a semiconductor wafer of an integrated circuit. Most or all of the pseudocode provided herein is, in one example implementation, descriptive of the functions and algorithms performed by hardware circuits and circuitry within a traversal coprocessor or "TTU". But other implementations are possible. Furthermore, the description herein is not intended to be or provide a manufacturing specification since that is neither the purpose of nor a requirement for a patent specification.

While the discussion above relates to triangles, those skilled in the art will understand that the technology herein can be applied to quadrilaterals such as squares, rectangles, parallelograms, and rhombuses; pentagons, hexagons, and other polygons.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A graphics system comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuitry is further configured to recursively subdivide the polygon and process resulting subdivisions in an order dictated by a space filling curve.

2. The graphics system of claim 1 wherein the received data includes vertex displacement specifications, and the ray tracing circuitry is further configured to displace vertices of the polygon mesh in 3D space based on the vertex displacement specifications.

3. The graphics system of claim 2 wherein the vertex displacement specifications include a displacement bias and/or scale, and the ray tracing circuitry is configured to displace the vertices of the polygon mesh in 3D space based on the displacement bias and/or scale.

4. The graphics system of claim 2 wherein the vertex displacement specifications include scalar displacement values.

5. The graphics system of claim 4 wherein the scalar displacement values have reduced precision for smaller polygons of decreased size.

6. The graphics system of claim 1 wherein the smaller polygons comprise triangles.

7. The graphics system of claim 1 wherein the received data representing a polygon comprises at least one base polygon block defining direction vectors, and the ray tracing circuitry is configured to interpolate the direction vectors to define a barycentric grid specifying positions of vertices of non-culled polygons in a 3D space.

8. The graphics system of claim 1 wherein the ray tracing circuitry is configured to subdivide the polygon into four smaller polygons by linearly interpolating direction vectors associated with the polygon to obtain direction vectors for the smaller polygons.

9. The graphics system of claim 1 wherein the polygon mesh is planar or curved by default, and the ray tracing circuitry is configured to displace each smaller polygon relative to the planar or curved mesh.

10. The graphics system of claim 1 wherein the ray tracing circuitry includes a displacement cache, a culling circuit, a generation circuit, and an intersection testing circuit.

11. A graphics system comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuitry is further configured to cull at least some of the smaller polygons by testing a prismoid bounding the polygon mesh for intersection with the input ray in ray shear space.

12. A graphics system comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuitry is further configured to test a quad of four smaller adjoining polygons in parallel for intersection with the input ray.

13. A graphics system comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuitry is further configured to define planar surfaces that sandwich the polygon mesh, and test the planar surfaces against the input ray to cull at least some of the smaller polygons of the polygon mesh.

14. A graphics system comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuitry is further configured to subdivide different portions of the polygon into differently-sized smaller polygons.

15. A graphics system comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuitry is further configured to reconfigure topology of vertices of the non-culled smaller polygons of the polygon mesh to avoid t-junctions when determining intersection with an input ray.

16. The graphics system of claim 15 wherein the ray tracing circuitry is configured to assign discrete barycentric coordinates to the smaller polygons, and to test the discrete barycentric coordinates in order to detect whether a vertex is on an outer edge that may form a t-junction.

17. A graphics system comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuitry is further configured to receive data representing the polygon mesh changing shape between a first time instant and a second time instant, and to interpolate between the polygon mesh shape at the first time instant and the polygon mesh shape at the second time instant.

18. A graphics circuit comprising:
a processor,
a memory, and
ray tracing circuitry connected to the processor and the memory, the ray tracing circuitry being configured to perform operations comprising:
receive data representing a polygon,
subdividing the polygon into smaller polygons thereby forming a polygon mesh;
cull at least some of the smaller polygons of the polygon mesh, and
test vertices of non-culled smaller polygons of the polygon mesh to determine intersection with an input ray,
wherein the ray tracing circuit is further configured to operate on the received data in a first pass that calculates geometric values and a second pass that applies displacement values, and includes random access memory that stores the calculated geometric values while waiting to retrieve displacement values from the memory.

* * * * *